(12) United States Patent
Satou et al.

(10) Patent No.: US 7,070,206 B2
(45) Date of Patent: Jul. 4, 2006

(54) IMPACT ABSORBING TYPE STEERING COLUMN APPARATUS

(75) Inventors: Kenji Satou, Gunma-ken (JP); Tetsuo Nomura, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/757,418

(22) Filed: Jan. 15, 2004

(65) Prior Publication Data

US 2004/0145169 A1   Jul. 29, 2004

Related U.S. Application Data

(62) Division of application No. 09/855,637, filed on May 15, 2001, now Pat. No. 6,726,248.

(30) Foreign Application Priority Data

| May 16, 2000 | (JP) | ............................ 2000-143646 |
| Aug. 25, 2000 | (JP) | ............................ 2000-255886 |
| Sep. 4, 2000 | (JP) | ............................ 2000-266950 |
| Oct. 6, 2000 | (JP) | ............................ 2000-307709 |
| Mar. 23, 2001 | (JP) | ............................ 2001-085183 |

(51) Int. Cl.
*B62D 1/19* (2006.01)

(52) U.S. Cl. ........................ 280/777; 188/371; 188/376

(58) Field of Classification Search .................. 74/493; 280/777; 188/371, 374, 375, 376; B62D 1/19
See application file for complete search history.

(56) References Cited

U.S. PATENT DOCUMENTS

| 4,786,076 A | 11/1988 | Wierschem .................. 280/777 |
| 4,805,478 A | 2/1989 | Beauch .......................... 74/492 |
| 4,886,295 A | 12/1989 | Browne ...................... 280/777 |
| 5,425,553 A | 6/1995 | Yazane et al. ............... 280/777 |
| 5,547,221 A | 8/1996 | Tomaru et al. .............. 280/777 |
| 6,116,648 A | 9/2000 | Holly et al. ................. 280/777 |
| 6,152,488 A | 11/2000 | Hedderly et al. ........... 280/775 |
| 6,189,919 B1 | 2/2001 | Sinnhuber et al. .......... 280/731 |
| 6,189,929 B1 | 2/2001 | Struble et al. .............. 280/777 |
| 6,189,941 B1 | 2/2001 | Nohr .......................... 293/118 |
| 6,234,528 B1 | 5/2001 | Ben-Rhouma et al. ...... 280/777 |
| 6,279,952 B1 | 8/2001 | Van Wynsberghe et al. ..... 280/777 |
| 6,296,280 B1 | 10/2001 | Struble et al. .............. 280/777 |
| 6,322,103 B1 | 11/2001 | Li et al. ..................... 280/777 |

(Continued)

FOREIGN PATENT DOCUMENTS

DE    24 17 543    10/1975

(Continued)

OTHER PUBLICATIONS

"Computer Controlled Energy Absorbing Steering Column for Automotive Use", 2244 Research Disclosure, No. 359, pp. 157-159, Mar. 1994.

(Continued)

*Primary Examiner*—Ruth Ilan
(74) *Attorney, Agent, or Firm*—Miles & Stockbridge P.C.

(57) ABSTRACT

An impact absorbing type steering column apparatus provided with a collision energy absorbing device for absorbing an energy of a secondary collision of an occupant upon a collision of a vehicle comprises an energy absorption quantity adjusting device for changing a secondary collision energy absorption quantity of the collision energy absorbing device, at least one sensor for detecting a condition of the occupant or the vehicle, and electric control device for controlling a drive of the energy absorption quantity adjusting device on the basis of a result of detection by the sensor.

8 Claims, 95 Drawing Sheets

U.S. PATENT DOCUMENTS

| | | |
|---|---|---|
| 6,375,220 B1 | 4/2002 | Kamm .................. 280/777 |
| 6,394,241 B1 * | 5/2002 | Desjardins et al. ......... 188/376 |
| 6,478,333 B1 | 11/2002 | Barton et al. ............... 280/777 |

FOREIGN PATENT DOCUMENTS

| | | |
|---|---|---|
| DE | 195 42 491 | 2/1997 |
| EP | 0 979 768 | 2/2000 |
| EP | 1 060 974 | 12/2000 |
| GB | 2 331 964 | 6/1999 |
| GB | 2 340 457 | 2/2000 |
| GB | 2 350 328 | 11/2000 |
| JP | 46-35527 | 10/1971 |
| JP | 5-68776 | 9/1993 |
| JP | 7-329796 | 12/1995 |
| WO | WO 98/22325 | 5/1998 |
| WO | WO 98 22325 | 5/1998 |
| WO | WO 98 58831 | 12/1998 |
| WO | WO 99 07592 | 2/1999 |
| WO | WO 99 58389 | 11/1999 |

OTHER PUBLICATIONS

"Computer Monitored Energy Absorbing Steering Column", 2244 Research Disclosure, No. 359, p. 164, Mar. 1994.

"Flexible Steering Control Assembly (A Wheel-Shaft-Chain System)", Research Disclosure, vol. 323, No. 113, Mar. 1991.

* cited by examiner

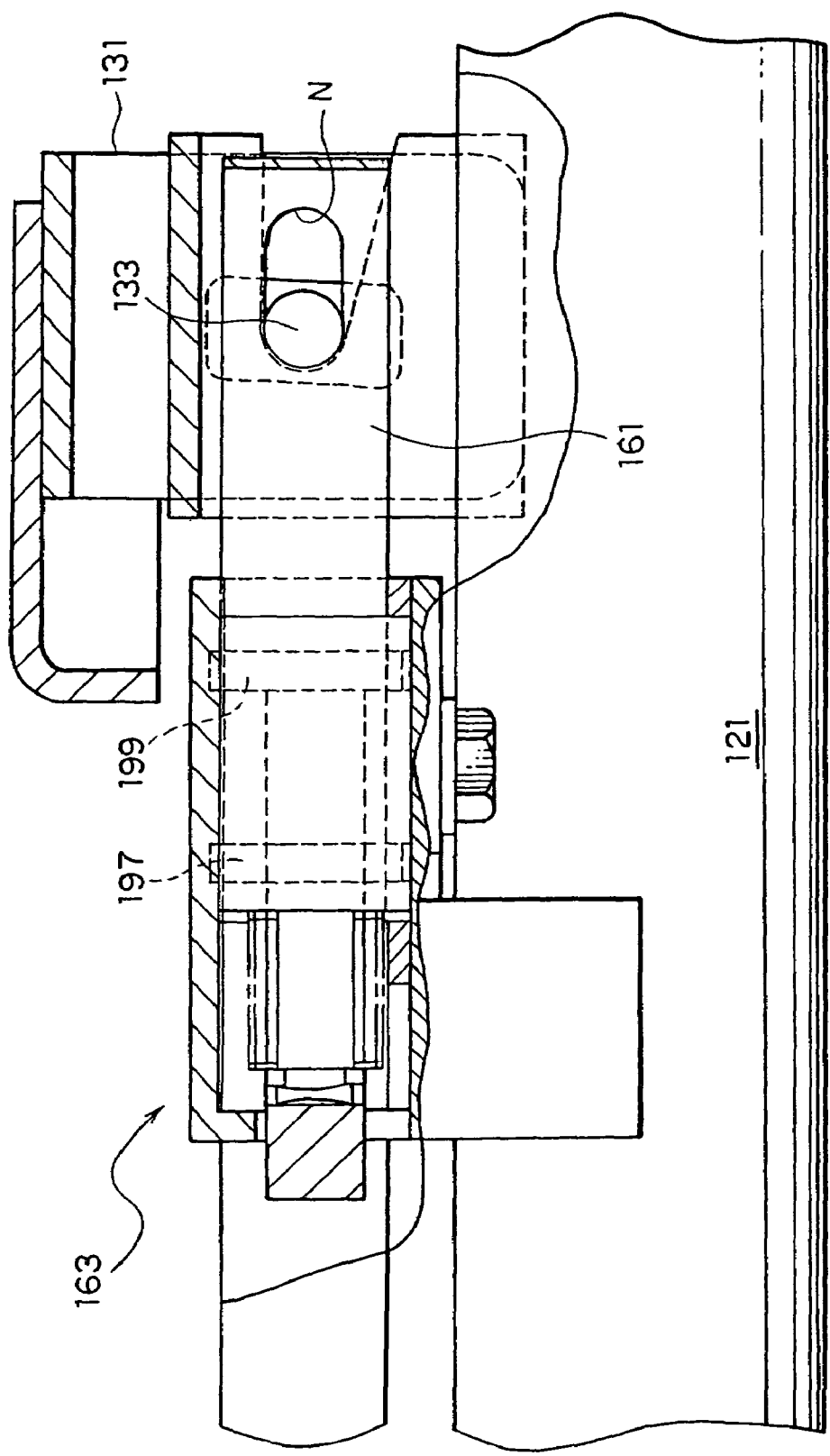

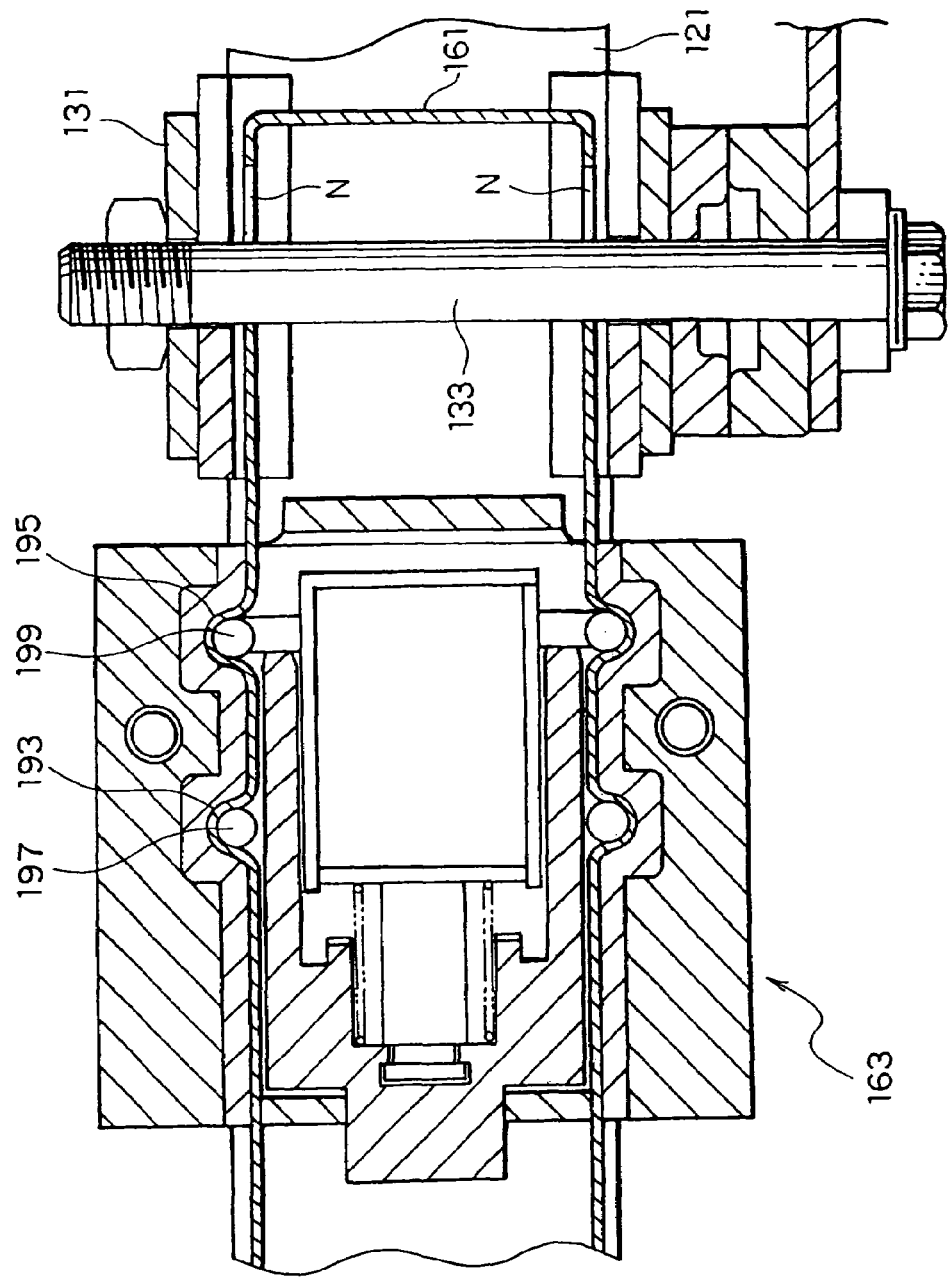

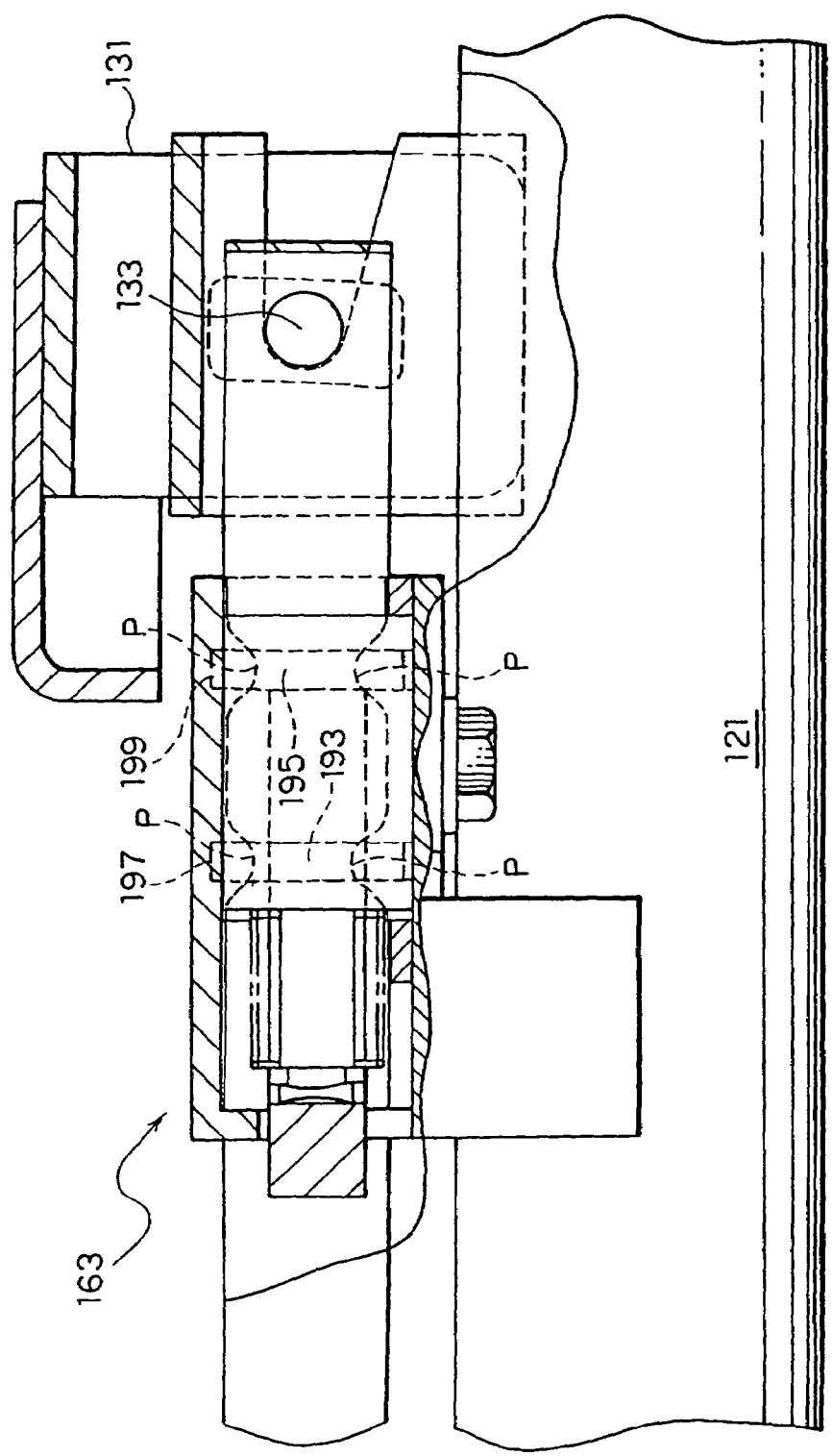

IMPACT ABSORBING TYPE STEERING COLUMN APPARATUS

CROSS-REFERENCE TO RELATED APPLICATION

This application is a division of application Ser. No. 09/855,637 filed May 15, 2001 now U.S. Pat. No. 6,726,248.

This application claims the benefits of Japanese Application Nos. 2000-143646, 2000-255886, 2000-266950, 2000-307709 and 2001-085183 which are hereby incorporated by reference.

BACKGROUND OF THE INVENTION

1. Field of the Invention

The present invention relates generally to an impact absorbing type steering column apparatus, and more particularly to a technology capable of making a collapse load variable.

2. Related Background Art

If an automobile collides with other automobile or a structure etc, a driver might suffer a secondary collision with a steering wheel by its inertia. The automobiles manufactured over the recent years broadly take an impact absorbing type steering shaft and an impact absorbing type steering column apparatus for the purpose of preventing the driver from being injured in that case. The impact absorbing type steering column apparatus is structured such that the steering column gets separated with the steering shaft when the driver suffers the secondary collision, and normally gets collapsed simultaneously with the steering shaft, and a collision energy is absorbed on that occasion.

What has hitherto been known as an collision energy absorbing system is a mesh system for causing a compression buckling deformation of a mesh member formed in a part of the steering column. As disclosed in Japanese Patent Application Post-Exam Publication No. 46-35527, however, there has been widely adopted a ball system in which metal balls are interposed between an outer column and an inner column and act to form plastic grooves in an inner peripheral surface of the outer column and in an outer peripheral surface of the inner column when collapsed.

Further, a drawing type system disclosed in Japanese Patent Application Laid-Open No. 7-329796 has also been taken over the recent years. A drawing type collision energy absorbing mechanism takes such a configuration that one side end of an energy absorbing member composed of, e.g., a band-like steel plate is fixed to a car body sided bracket, and a drawing member such as a steel rod etc fitted in a buckling portion formed in the energy absorbing member is provided on the side of the steering column and causes a drawing deformation of the energy absorbing member when the steering column shifts forward.

Moreover, a tear-up system disclosed in Japanese Utility Model Publication No. 5-68776 has partly been adopted. The tear-up type collision energy absorbing mechanism takes such a configuration that a central portion of the energy absorbing member composed of, e.g., a band-like steel plate is fixed to the car body sided bracket, two side portions of the energy absorbing member are fixed to the steering column in a way that bends it in a U-shape, and the energy absorbing member is torn up while being deformed by bending when the steering column shifts forward.

By the way, in each of the impact absorbing type steering column apparatuses described above, the steering column becomes collapsed when a predetermined collapse load acts, however, this collapse load is normally set based on a kinetic energy generated when a driver having a standard weight secondarily collides with the steering wheel. If the driver is a small-sized women and when a car speed is low, however, as a matter of course, the kinetic energy thereof decreases, and the energy absorption quantity can not be adjusted corresponding to a driver's physique, a car speed etc.

SUMMARY OF THE INVENTION

It is a primary object of the present invention, which was devised to under such circumstances, to provide an impact absorbing type steering column apparatus capable of making a collapse load variable and adjusting an energy absorption quantity upon a secondary collision corresponding to a driver's physique, a car speed etc.

To accomplish the above object, according to a first aspect of the present invention, an impact absorbing type steering column apparatus provided with collision energy absorbing mechanism for absorbing an energy of a secondary collision of an occupant upon a collision of a vehicle, comprises an energy absorption quantity adjusting member for changing a secondary collision energy absorption quantity of the collision energy absorbing mechanism, at least one sensor for detecting a condition of the occupant or the vehicle, and an electric control unit for controlling a drive of the energy absorption quantity adjusting member on the basis of a result of detection by the sensor.

According to the first aspect of the invention, for example, if a weight of the driver is heavy and when a car speed is high the control unit controls a drive of the energy absorption quantity adjusting member, thereby increasing the collapse load with which the collision energy absorbing mechanism operates. While on the other hand, if the weight of the driver is light and when the car speed is low, the control unit decreases the collapse load with which the collision energy absorbing mechanism operates. The collapsible column thus properly gets collapsed.

According to a second aspect of the present invention, the impact absorbing type steering column apparatus according to the first aspect of the invention may comprise a collapsible column rotatably supporting a steering shaft and getting collapsed with a predetermined collapse load, wherein the collapsible column includes an outer column, an inner column entering the outer column when the collapsible column gets collapsed, and the collision energy absorbing mechanism has a plurality of metal balls interposed between the outer column and the inner column and forming plastic grooves in at least one of the outer column and the inner column when the collapsible column gets collapsed.

According to the second aspect of the invention, for instance, the electric control unit, if the weight of the driver is heavy, increases the collapse load by setting larger the number of plastic grooves formed by the metal balls. By contrast, the electric control unit, if the weight of the driver is light, decreases the collapse load by setting smaller the number of plastic grooves. The collapsible column thus properly gets collapsed.

According to a third aspect of the present invention, in the impact absorbing type steering column apparatus according to the second aspect of the invention, the plurality of metal balls may be constructed of a first group of metal balls retained in first metal ball retaining means and a second group of metal balls retaining in second metal ball retaining means, and the energy absorption quantity adjusting member may be provided with a retaining member rotational driving mechanism for rotating at least one of the first group of metal balls and the second group of metal balls in order to make a part or the whole of angular phases of the metal balls in the first metal ball group with respect to the collapsible column coincident with or different from the metal balls in the second metal ball group.

According to the third aspect of the invention, for example, the electric control unit having detected the weight of the driver etc outputs a drive command to the retaining member rotational driving mechanism in order to rotate the first metal ball retaining member or the second metal ball retaining member.

According to a fourth aspect of the present invention, the impact absorbing type steering column apparatus according to the first aspect of the invention may further comprise a steering column for rotatably supporting the steering shaft, and a car body sided bracket, fixed to the car body, for supporting the steering column and allowing the steering column to get released therefrom when an impact load equal to or larger than a predetermined value acts, wherein the collision energy absorbing mechanism may be provided between the steering column and the car body sided bracket, and a drawing member may cause a plastic deformation of an energy absorbing member composed of a metal plate or a metal wire with a shift of the steering column.

According to the fourth aspect of the invention, for instance, the electric control unit, if the weight of the driver is heavy, increases the operation load by augmenting the plastic deformation quantity of the energy absorbing member. By contrast, the electric control unit, if the weight of the driver is light, decreases the operation load by reducing the plastic deformation quantity of the energy absorbing member.

According to a fifth aspect of the present invention, in the impact absorbing type steering column apparatus according to the fourth aspect of the invention, the drawing means may be a metal rod or a metal ball, and the energy absorption quantity adjusting mechanism may change at least one of a plastically deformed portion and a plastic deformation quantity of the energy absorbing member by the drawing member.

According to the fifth aspect of the invention, for example, the drawing member for the energy absorbing member involves the use of four lengths of steel rods. The electric control unit, if the weight of the driver is heavy, operates all the four steel rods and, if the weight of the driver is light, moves the two lengths of steel rods to a retreat position or increases and decreases a drawing depth with respect to the energy absorbing member by use of the two steel rods.

According to a sixth aspect of the present invention, the impact absorbing type steering column apparatus according to the first aspect of the invention may further comprise a steering column for rotatably supporting the steering shaft, and a car body sided bracket, fixed to the car body, for supporting the steering column and allowing the steering column to get released therefrom when an impact load equal to or larger than a predetermined value acts, wherein the collision energy absorbing mechanism may be provided between the steering column and the car body sided bracket, and may cause a fracture, or a bending deformation and the fracture of the energy absorbing member composed of the metal plate with a shift of the steering column.

According to the sixth aspect of the invention, for instance, a central portion of the energy absorbing member is fixed to the car body sided bracket, and two side portions thereof are connected to the steering column. The electric control unit, if the weight of the driver is heavy, gets the energy absorbing member torn up at two portions, thereby increasing the operation load. Further, the electric control unit, if the weight of the driver is light, disconnects one side portion of the energy absorbing member from the steering column and gets the energy absorbing member torn up at only one portion, thereby decreasing the operation load.

According to a seventh aspect of the present invention, an impact absorbing type steering column apparatus comprises a collapsible column rotatably supporting a steering shaft and getting collapsed with a predetermined collapse load. The collapsible column includes an outer column, an inner column entering the outer column when the collapsible column gets collapsed, and a plurality of metal balls interposed between the outer column and the inner column and forming plastic grooves in at least one of the outer column and the inner column in order to absorb a collision energy when the collapsible column gets collapsed. The steering column apparatus is provided with an energy absorption quantity adjusting member for changing an absorption quantity of the collision energy.

According to the seventh aspect of the invention, for instance, if the weight of the driver is heavy, the driver manually manipulates a changeover switch etc, thereby increasing the collapse load by setting larger the number of plastic grooves formed by the metal balls. By contrast, if the weight of the driver is light, the collapse load is decreased by setting smaller the number of plastic grooves. The collapsible column thus properly gets collapsed.

According to an eighth aspect of the present invention, in the impact absorbing type steering column apparatus according to the seventh aspect of the invention, the plurality of metal balls may be constructed of a first group of metal balls retained in first metal ball retaining means and a second group of metal balls retaining in second metal ball retaining means, and the energy absorption quantity adjusting member may be provided with a retaining member rotational driving mechanism for rotating at least one of the first group of metal balls and the second group of metal balls in order to make a part or the whole of angular phases of the metal balls in the first metal ball group with respect to the collapsible column coincident with or different from the metal balls in the second metal ball group.

According to the eighth aspect of the invention, for example, the driver manually manipulates the changeover switch etc, thereby outputting the drive command to the retaining member driving mechanism in order to rotate the first metal ball retaining member or the second metal ball retaining member.

According to a ninth aspect of the present invention, an impact absorbing type steering column apparatus comprises a steering column for rotatably supporting the steering shaft, a car body sided bracket, fixed to the car body, for supporting the steering column and allowing the steering column to get released therefrom when an impact load equal to or larger than a predetermined value acts, and a collision energy absorbing mechanism provided between the steering column and the car body sided bracket, for absorbing an energy of a secondary collision of an occupant by causing a plastic deformation of an energy absorbing member composed of a metal plate or a metal wire by use of a drawing member with a shift of the steering column, wherein the steering column apparatus is provided with an energy absorption quantity adjusting mechanism for changing an absorption quantity of the collision energy.

According to the ninth aspect of the invention, for instance, if the weight of the driver is heavy, the driver manually manipulates the changeover switch etc, thereby increasing the operation load by augmenting the plastic deformation quantity of the energy absorbing member. By contrast, if the weight of the driver is light, the operation load is decreased by reducing the plastic deformation quantity of the energy absorbing member.

According to a tenth aspect of the present invention, in the impact absorbing type steering column apparatus according to the ninth aspect of the invention, the drawing member may be a metal rod or a metal ball, and the energy absorption quantity adjusting mechanism may change at least one of a plastically deformed portion and a plastic deformation quantity of the energy absorbing member by the drawing member.

According to the tenth aspect of the invention, for example, the drawing member for the energy absorbing member involves the use of four lengths of steel rods. If the weight of the driver is heavy, the driver manipulates the changeover switch etc, thereby operating the all the four steel rods. By contrast, if the weight of the driver is light, the driver moves two lengths of steel rods to a retreat position or increases and decreases a drawing depth with respect to the energy absorbing member by use of the two steel rods.

According to an eleventh aspect of the present invention, an impact absorbing type steering column apparatus comprises a steering column for rotatably supporting the steering shaft, a car body sided bracket, fixed to the car body, for supporting the steering column and allowing the steering column to get released therefrom when an impact load equal to or larger than a predetermined value acts, and a collision energy absorbing mechanism provided between the steering column and the car body sided bracket, for absorbing an energy of a secondary collision of an occupant by causing a fracture, or a bending deformation and the fracture of the energy absorbing member composed of the metal plate with a shift of the steering column, wherein the steering column apparatus is provided with an energy absorption quantity adjusting mechanism for changing an absorption quantity of the collision energy.

According to the eleventh aspect of the invention, for instance, a central portion of the energy absorbing member is fixed to the car body sided bracket, and two side portions thereof are connected to the steering column. If the weight of the driver is heavy, the driver manually manipulates a changeover switch etc to get the energy absorbing member torn up at two portions, thereby increasing the operation load. Further, if the weight of the driver is light, the electric control unit disconnects one side portion of the energy absorbing member from the steering column and gets the energy absorbing member torn up at only one portion, thereby decreasing the operation load.

According to a twelfth aspect of the present invention, in the impact absorbing type steering column apparatus according to any one of the first through eleventh aspects of the invention, an electromagnetic actuator may be a driving source of the energy absorption quantity adjusting means.

According to the twelfth aspect of the invention, for example, the electric control unit, based on input signals from a variety of sensors, controls a drive of the electric actuator of the energy absorption quantity adjusting mechanism, thereby shifting a relative position of the drawing member with respect to the energy absorbing member.

According to a thirteenth aspect of the present invention, in the impact absorbing type steering column apparatus according to any one of the first through eleventh aspect of the invention, an electric motor may be a driving source of the energy absorption quantity adjusting mechanism.

According to the thirteenth aspect of the invention, for example, the electric control unit, based on the input signals from the variety of sensors, controls a drive of the electric motor of the energy absorption quantity adjusting mechanism, thereby shifting the relative position of the drawing member with respect to the energy absorbing member.

According to a fourteenth aspect of the present invention, in the impact absorbing type steering column apparatus according to any one of the first through eleventh aspects of the invention, the energy absorption quantity adjusting mechanism may change an absorption quantity of the secondary collision energy by the energy absorbing mechanism at leastwise three or more stages.

According to the fourteenth aspect of the invention, for instance, the electric motor moves forward or backward the slide block facing to the drawing pin with the aid of the screw mechanism, and a position of the drawing pin with respect to the energy absorbing member is shifted by a plurality of stepped portions formed on the slide block.

According to a fifteenth aspect of the present invention, in the impact absorbing type steering column apparatus according to any one of the first, fourth, fifth, ninth and tenth aspects of the invention, the energy absorption quantity adjusting mechanism may change an absorption quantity of the secondary collision energy by the energy absorbing means in an infinitely variable manner.

According to the fifteenth aspect of the invention, the electric motor moves forward or backward the slide block facing to the drawing pin with the aid of the screw mechanism, and a position of the drawing pin with respect to the energy absorbing member is shifted by an inclined surface formed on the slide block.

According to a sixteenth aspect of the present invention, in the impact absorbing type steering column apparatus according to any one of the first through eleventh aspects of the invention, the energy absorption quantity adjusting mechanism may change an absorption quantity of the secondary collision energy by the energy absorbing mechanism in two or more modes, and energy absorption loads may be substantially fixed with respect to a progress of a collapse stroke after points of inflections of energy absorption characteristics in the two or more modes.

According to the sixteenth aspect of the invention, in the case of a structure with a sufficient allowance of the collapse stroke, the energy absorption quantities suited respectively to the largeand small-sized physiques are obtained.

According to a seventeenth aspect of the present invention, in the impact absorbing type steering column apparatus according to any one of the first through eleventh aspect of the inventions, the energy absorption quantity adjusting mechanism may change an absorption quantity of the secondary collision energy by the energy absorbing mechanism in two or more modes, and energy absorption loads may gradually increase with respect to a progress of a collapse stroke after points of inflections of energy absorption characteristics in the two or more modes.

According to the seventeenth aspect of the invention, for instance, in the case of a structure with no sufficient allowance of the collapse stroke, if bottomed at a full stroke, a peak load occurs. A bottomed peak can be, however, eliminated by gradually increasing the load at the second half of the stroke.

According to an eighteenth aspect of the present invention, an impact absorbing type steering column apparatus comprises a collapsible column rotatably supporting a steering shaft and getting collapsed with a predetermined collapse load. The collapsible column includes an outer column, an inner column entering the outer column when the collapsible column gets collapsed, and a plurality of metal balls interposed between the outer column and the inner column and forming plastic grooves in at least one of the outer column and the inner column in order to absorb a collision energy when the collapsible column gets collapsed. The steering column apparatus is provided with a plurality of metal ball retainers for retaining the metal balls in phases different from each other, and a retainer separating mechanism for separating at least one of the metal ball retainers from the car body sided member in order to reduce the number of plastic grooves formed by the metal balls when the collapsible column gets collapsed.

According to an eighteenth aspect of the invention, for example, if the weight of the driver is heavy, all the metal balls are made to form the plastic grooves, thereby attaining a comparatively large collapse load. In contrast with this, if the weight of the driver is light, the retainer separating mechanism separates a part of the metal ball retainers from the car body sided member, thereby reducing the number of the plastic grooves. The collapsible column is thus collapsed with a comparatively small collapse load.

According to a nineteenth aspect of the present invention, in the impact absorbing type steering column apparatus according to the eighteenth aspect of the invention, the retainer separating mechanism may be an electrically driven actuator.

According to the nineteenth aspect of the invention, for instance, the electrically driven actuator is operated by an electric current given from a drive control unit integrally incorporated into the apparatus, and the collapse load is adjusted corresponding to the weight of the driver, a driving condition etc.

According to a twentieth aspect of the present invention, in the impact absorbing type steering column apparatus according to the nineteenth aspect of the invention, the electrically driven actuator may separate the metal ball retainer from the car body sided member only when being charged with electricity.

According to the twentieth aspect of the invention, even when a supply of the electric current to the electrically driven actuator is cut off due to an impact when collided and so on, the metal ball retainer is not separated from the car body sided member, and an unintended decrease in the collapse load is prevented.

According to a twenty first aspect of the present invention, an impact absorbing type steering column apparatus comprises a collision energy absorbing mechanism for absorbing an energy of a secondary collision energy of an occupant upon a collision of a vehicle, and an energy absorption quantity adjusting mechanism for changing an absorption quantity with which the collision energy absorbing mechanism absorbs the secondary collision energy, wherein an electromagnetic actuator is a driving source of the energy absorption quantity adjusting means, and a plunger of the electromagnetic actuator is adsorptively held in a predetermined position by a permanent magnet.

According to the twenty first aspect of the invention, for instance, when a first coil in the electromagnetic actuator is charged with the electricity, the plunger magnetically attracted by the first coil is moved to a first position and adsorptively held by a first permanent magnet. Further, when the electrification is switched over to a second coil from the first coil, the plunger magnetically attracted by the second coil is moved to a second position from the first position and adsorptively held by a second permanent magnet.

According to a twenty second aspect of the present invention, in the impact absorbing type steering column apparatus according to the twenty first aspect of the invention, the collision energy absorbing mechanism may be provided between the steering column and the car body sided bracket and may cause a plastic deformation of an energy absorbing member composed of a metal plate or a metal wire by use of drawing means with a shift of the steering column.

According to the twenty second aspect of the invention, for example, if the weight of the driver is heavy, the operation load is increased by augmenting the plastic deformation quantity of the energy absorbing member. By contrast, if the weight of the driver is light, the operation load is decreased by reducing the plastic deformation quantity of the energy absorbing member. The steering column thus properly moves forward.

According to a twenty third aspect of the present invention, in the impact absorbing type steering column apparatus according to the twenty first or second aspect of the invention, the drawing means may be a metal rod or a metal ball, and the energy absorption quantity adjusting mechanism may change at least one of a plastically deformed portion and a plastic deformation quantity of the energy absorbing member by the drawing member.

According to the twenty third aspect of the invention, for example, the drawing member for the energy absorbing member involves the use of four lengths of steel rods. If the weight of the driver is heavy, all the four steel rods are used and, if the weight of the driver is light, the two lengths of steel rods are moved to a retreat position, or there is increased or decreased a drawing depth with respect to the energy absorbing member by use of the two steel rods.

BRIEF DESCRIPTION OF THE DRAWINGS

FIG. 69 is a side view showing the steering apparatus in a fourteenth embodiment of the present invention;

FIG. 70 is a plan sectional view showing the steering apparatus shown in FIG. 69;

FIG. 71 is a side view (corresponding to FIG. 24 in the fifth embodiment) showing the steering apparatus in a fifteenth embodiment of the present invention;

DESCRIPTION OF THE PREFERRED EMBODIMENTS

First through twenty first embodiments of the present invention will hereinafter be described with reference to the accompanying drawings.

Figure 1:
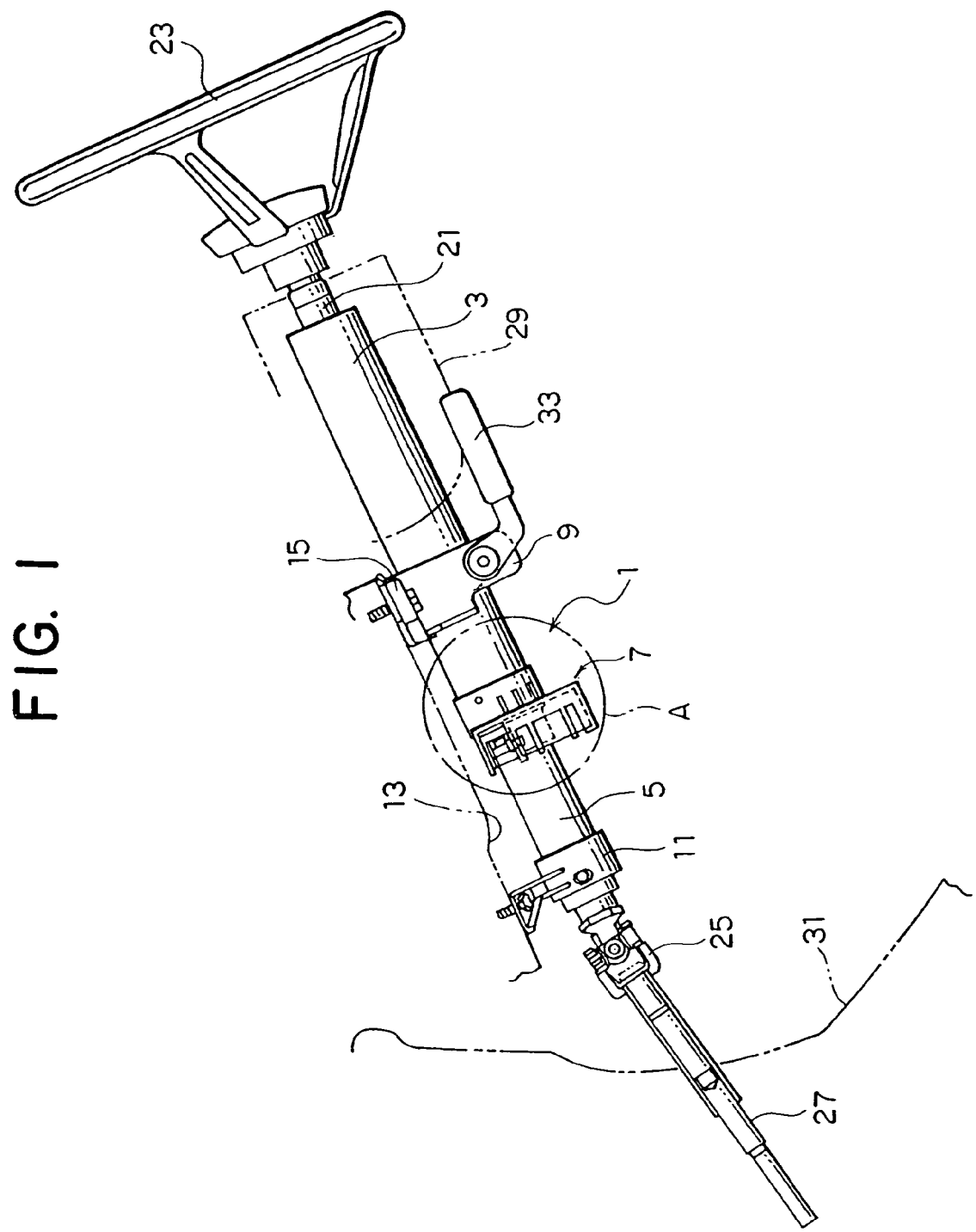
FIG. 1 is a side view showing a steering apparatus on the side of a car cabin in a first embodiment of the present invention.

FIG. 1 is a side view showing a steering apparatus on the side of a car cabin in the first embodiment, wherein the reference numeral 1 represents a collapsible column. The collapsible column 1 is constructed of outer and inner columns 3, 5 composed of steel pipes, and a collision energy absorption mechanism 7. The collapsible column 1 is attached to a car body sided member 13 through an upper column bracket 9 for holding the outer column 3 and a lower column bracket 11 for holding the inner column 5. Note that a capsule 15 made of an aluminum alloy is interposed in between the upper column bracket 9 and the car body sided member 13 in the first embodiment. If an impact load equal to or larger than a predetermined value acts, the upper column bracket 9 is released forwards together with the outer column 3, however, a release mechanism other than the capsule system may also be adopted.

The collapsible column 1 rotatably holds an upper steering shaft 21 through an unillustrated bearing. A steering wheel 23 is secured to an upper side end of the upper steering shaft 21, and a lower steering shaft 27 is connected to a lower side end thereof via a universal joint 25. Referring again to FIG. 1, there are shown a column cover 29 for covering an upper portion of the steering column 1, a dashboard 31 for partitioning a car cabin from an engine room, and a tilt lever 33 used for a tilt operation of the collapsible column 1. Note that the upper steering shaft 21 is provided with a known collision energy absorption mechanism formed based on a resin injection, a serration elliptical fitting and so on, thereby absorbing the collision energy while getting collapsible upon a secondary collision of the driver.

According to the present steering apparatus, when the driver rotates the steering wheel 23, the rotation thereof is transferred to an unillustrated steering gear via the upper steering shaft 21 and the lower steering shaft 27. The steering gear has a built-in rack-and-pinion mechanism for translating the inputted rotation into a rectilinear motion, and a steering angle of the wheels is changed via a tie rod etc, thus performing the steering. Note that the steering gear may take a variety of known types such as a ball screw type, a worm roller etc in addition to the rack and pinion type.

Figure 2:
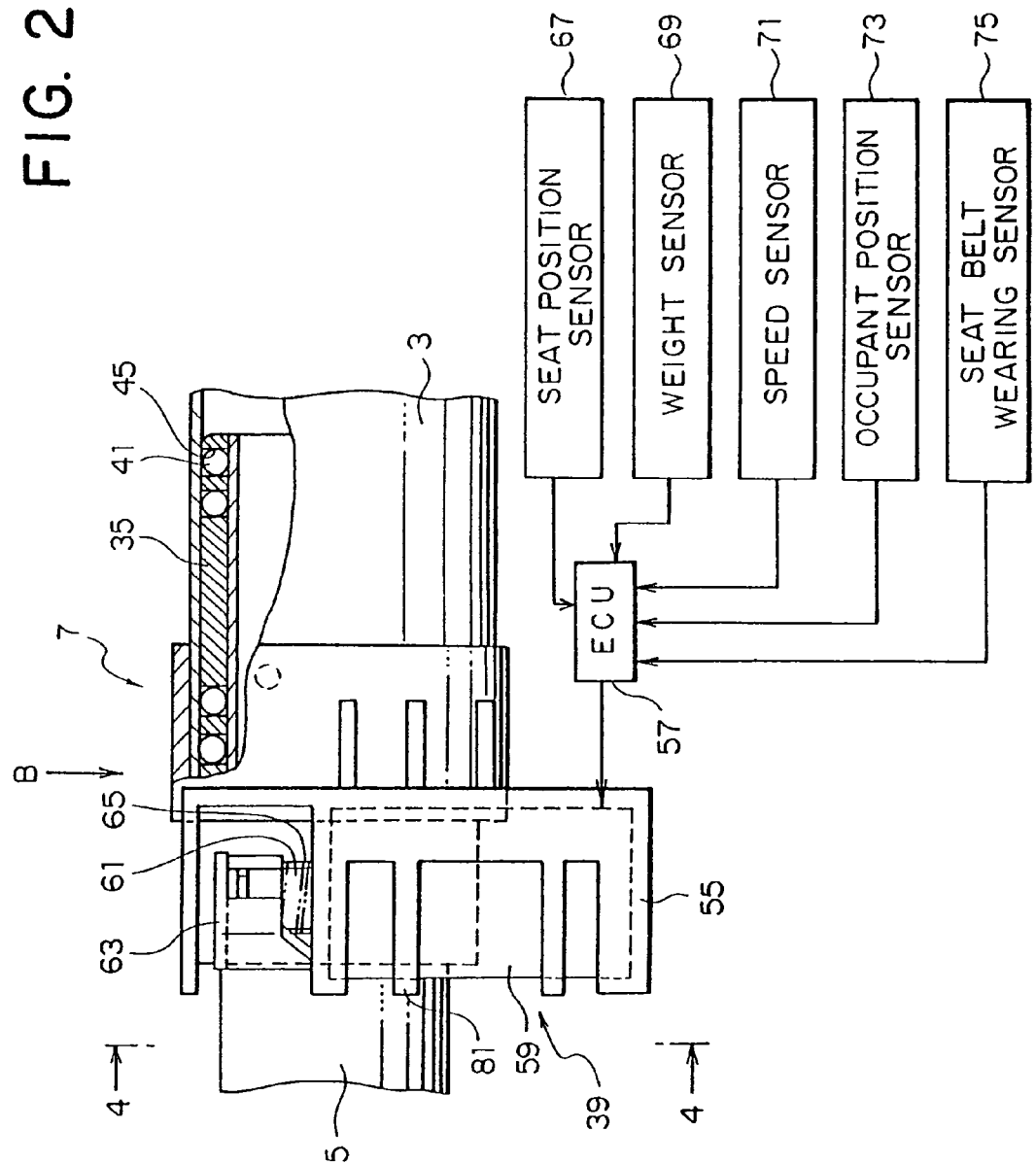
FIG. 2 is an enlarged view of a portion A in FIG. 1.
Figure 3:
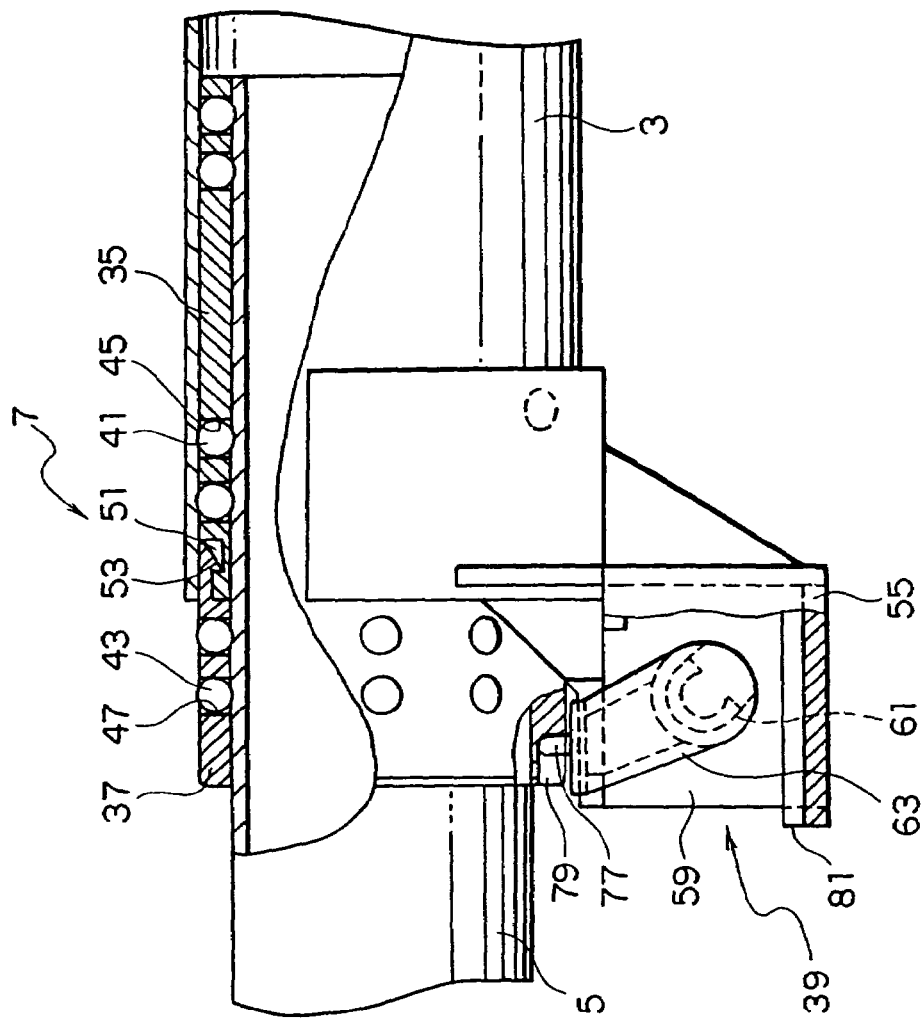
FIG. 3 is a view taken along the arrow line B in FIG. 2.
Figure 4:
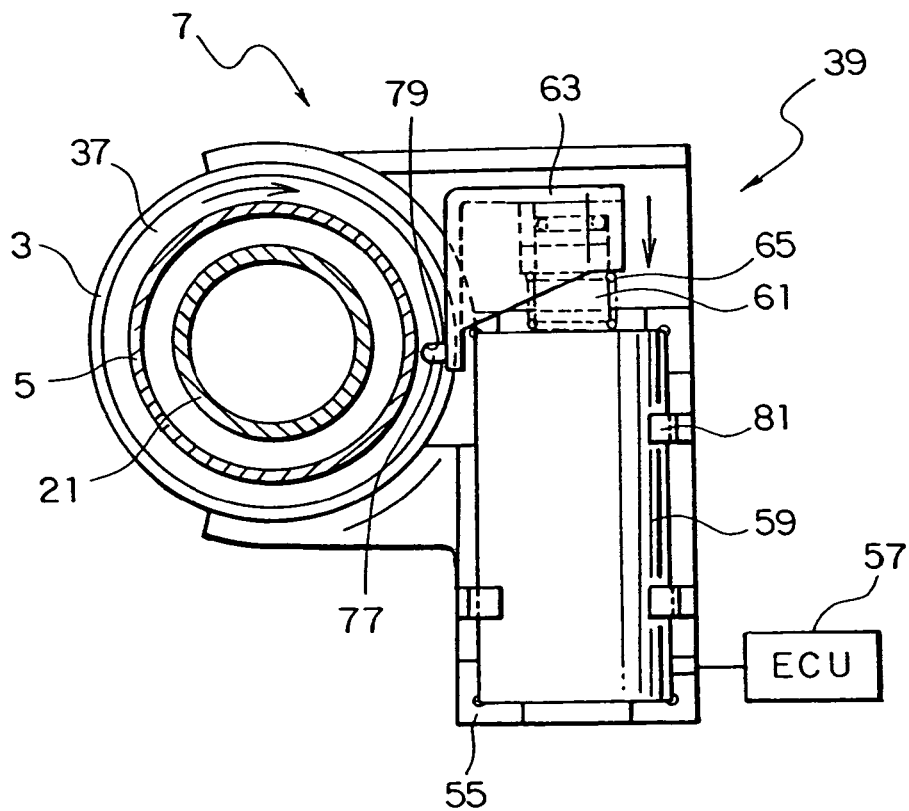
FIG. 4 is a sectional view taken along the line 4—4 in FIG. 2.

FIG. 2 is an enlarged view of a portion A in FIG. 1. FIG. 3 is a view taken along an arrow line B in FIG. 2. FIG. 4 is a sectional view taken along the line 4—4 in FIG. 2. As shown in these drawings, principal constructive members of the collision energy absorption mechanism 7 are a first metal ball retaining cylinder 35 interposed between the outer column 3 and the inner column 5, a second metal ball retaining cylinder 37 disposed in front of the first metal ball retaining cylinder 35, and a retaining cylinder driving device 39 for rotationally driving the second metal ball retaining cylinder 37.

The first and second metal ball retaining cylinders 35, 37 are each composed of a synthetic resin and an oil-impregnated sintered alloy etc, and are respectively formed with steel ball retaining holes 45, 47 for rotatably retaining steel balls 41, 43. Further, an annular groove 51 is formed in a front side end of the first metal ball retaining cylinder 35. An engagement pawl 53 provided at a rear side end of the second metal ball retaining cylinder 37 engages with the annular groove 51, whereby the first and second metal ball retaining cylinders 35, 37 are rotatably connected to each other. Note that an outside diameter of each of the steel balls 41, 43 is set larger by a predetermined quantity than a spacing between the outer column 3 and the inner column 5, whereby plastic grooves are formed in inner and outer peripheral surfaces of the two columns 3, 5 when these two columns 3, 5 relatively move in the axial direction.

The retaining cylinder driving device 39 includes a housing 55 fixed to the outer column 3 and composed of an aluminum alloy or a synthetic resin, and an electromagnetic actuator (which is hereinafter be called a solenoid) 59 driven under control of an ECU (Electronic Control Unit) 57 in a way of its being held in the housing 55. The retaining cylinder driving device 39 further includes a drive arm 63 fixed to a front side end of a plunger 61 of the solenoid 59, and a compression coil spring 65 for biasing upward the drive arm 63 (i.e., the plunger 61). In the first embodiment, in addition to a seat position sensor 67, at least one of a weight sensor 69, a car speed sensor 71, an occupant position sensor 73, a seatbelt attaching sensor 75, is connected to the ECU 57.

A drive protrusion 77 taking a cylindrical shape protrudes from on a surface, adjacent to the second metal ball retaining cylinder 37, of the drive arm 63. The drive protrusion 77 fits in a straight groove 79 formed in an outer peripheral surface f the second metal ball retaining cylinder 37. The straight groove 79 is formed in the axial direction of the second metal ball retaining cylinder 37, and opens at its front side end. A member denoted by the numeral 81 in FIGS. 2 through 4 is a retaining pawl provided on the housing 55 and firmly retaining the solenoid 59. Note that the solenoid 59 may be retained and fixed not by the retaining pawl 81 exemplified herein but by a screw or by providing a cover.

Figure 5:
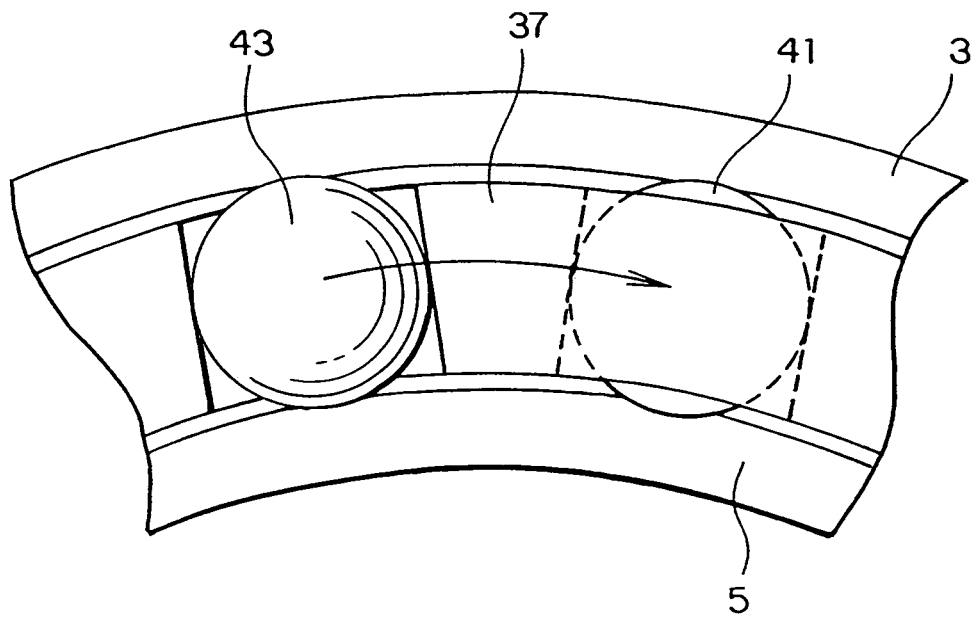
FIG. 5 is an explanatory view showing a relationship between steel balls retained in first and second metal ball retaining cylinders.
Figure 6:
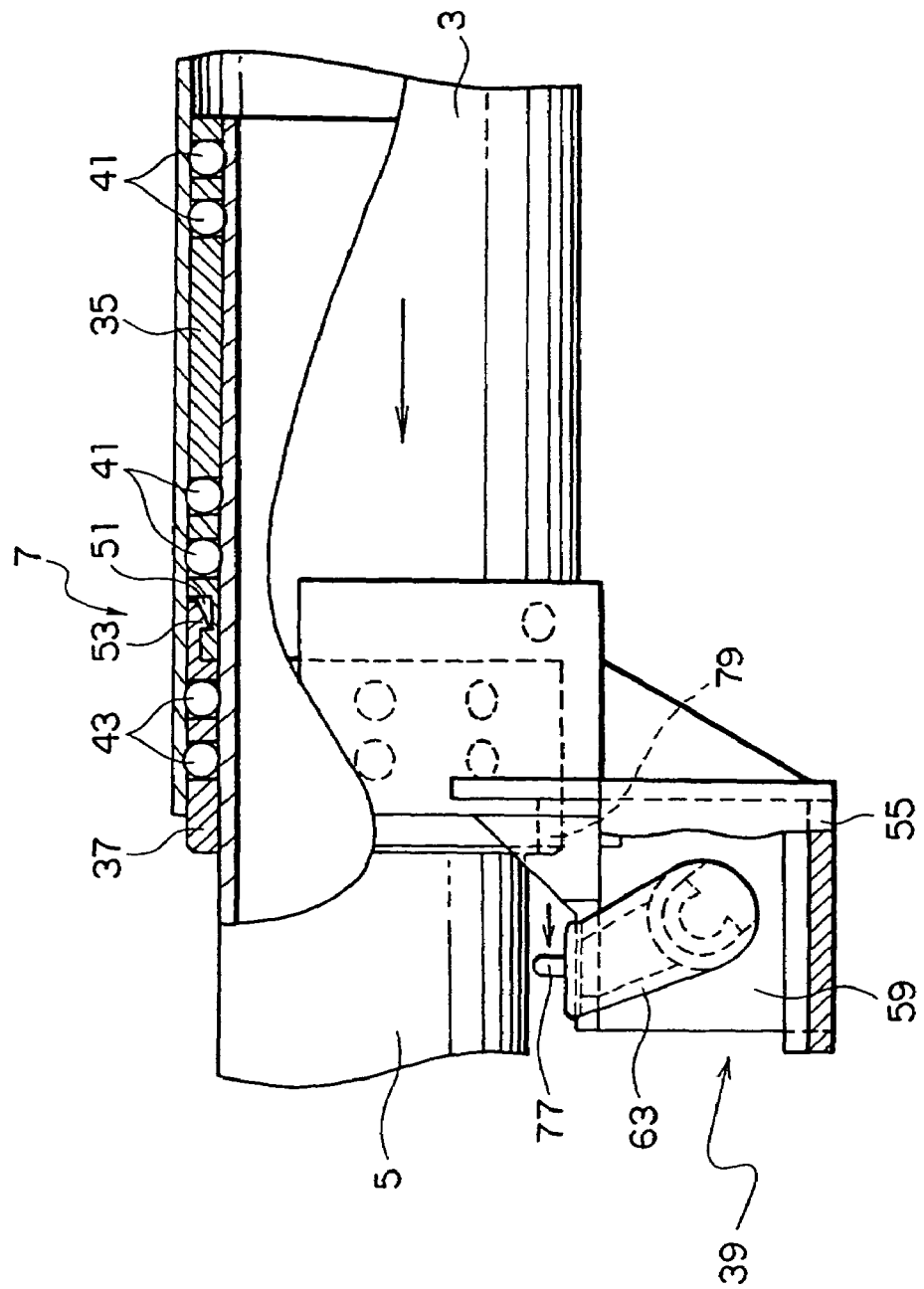
FIG. 6 is a side view showing an operation of a collapsible column.

According to the first embodiment, in the states shown in FIGS. 2 through 4, the steel ball 43 retained by the second metal ball retaining cylinder 37 is, as indicated by a solid line in FIG. 5, different in a phase of angle from the steel ball 41 retained by the first metal ball retaining cylinder 35. When the second metal ball retaining cylinder 37 rotates through a predetermined angle, however, it follows that the phases of angles of the two steel balls 41, 43 become coincident.

An operation of the first embodiment will hereinafter be described.

When an automobile starts traveling, the ECU 57, based on detection signals of the variety of sensors 67, 69, 71, 73, 75, repeatedly calculates a target collapse load at a predetermined control interval. For instance, if a weight of the driver is comparatively heavy, or if a car speed is high even though the driver's weight is comparatively light, a kinetic energy of the driver at a collision increases, and therefore the target collapse load rises. Then, the ECU 57 does not output a drive command to the solenoid 59, with the result that the angular phases of the steel ball 41 retained in the first metal ball retaining cylinder 35 and of the steel ball 43 retained in the second metal ball retaining cylinder 37, remain different.

In this state, if the automobile collides with other automobile or an obstacle on the road, the driver suffers a secondary collision with the steering wheel 23 by its inertia, and at first the upper column bracket 9 gets released forward together with the outer column 3 due to its impact. Thereafter, a kinetic energy of the driver causes the steering wheel 23 to be pressed forward, and the inner column 5 enters the outer column 3, whereby the collapsible column 1 starts collapsing.

Figure 7:
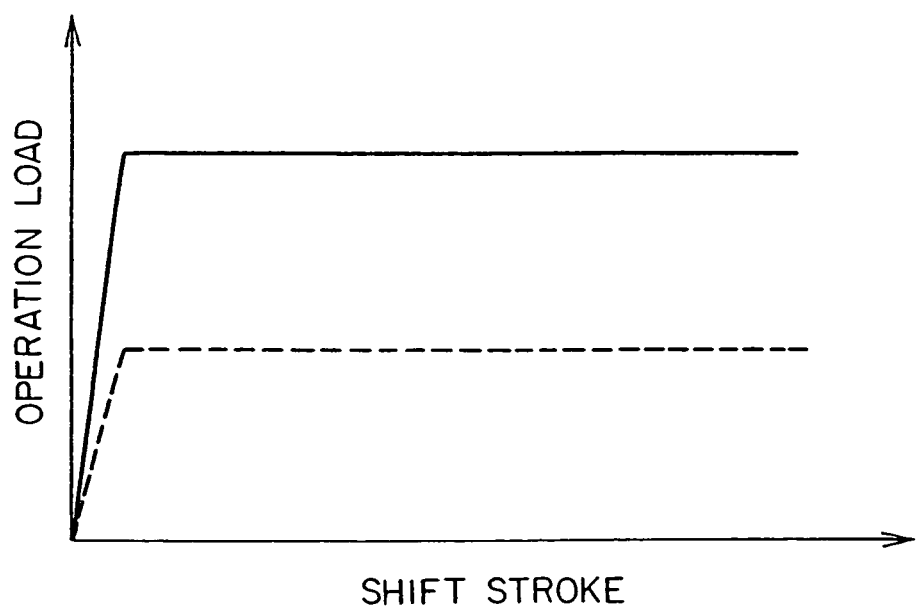
FIG. 7 is a graph showing a relationship between an operation load and a shift stroke of an outer column.

On this occasion, according to the first embodiment, the angular phases of the steel ball 41 in the first metal ball retaining cylinder 35 and of the steel ball 43 in the second metal ball retaining cylinder 37, are different, and hence the plastic grooves based on the two steel balls 41, 43 are formed in the inner peripheral surface of the outer column 3 and in the outer peripheral surface of the inner column 5, thereby actualizing the absorption of the comparatively large collision energy. It is to be noted that when the outer column 3 starts collapsing, the retaining cylinder driving device 39 advances with respect to the second metal ball retaining cylinder 37, and it follows that the drive protrusion 77 of the drive arm 73 comes off the straight groove 79 in the second metal ball retaining cylinder 37. FIG. 7 is a graph showing a relationship between a shift stroke of the outer column 3 and an operation load, wherein a solid line indicates a result of test on that occasion (in the case of a large collapse load).

Further, if the driver is a small-sized women having a comparatively light weight, the kinetic energy of the driver at the collision is comparatively small, so that the target collapse load calculated by the ECU 57 decreases. Then, the ECU 57 outputs the drive command to the solenoid 59, thereby descending the plunger 61. With this descent, the second metal ball retaining cylinder 37 is rotationally driven clockwise in FIG. 4 by the drive protrusion 77 provided on the drive arm 63. Then, it follows that the angular phases of the steel ball 41 retained in the first metal ball retaining cylinder 35 and of the steel ball 43 retained in the second metal ball retaining cylinder, become coincident with each other.

In this state, if the automobile collides with other automobile or the obstacle on the road, as in the process described above, after the outer column 3 has got released, the collapsible column 1 starts collapsing. On this occasion, because of the angular phases of the two steel balls 41, 43 being coincident with each other, the steel ball 43 in the second metal ball retaining cylinder 37 rolls along the plastic groove formed by the steel ball 41 in the first metal ball retaining cylinder 35, and there is almost no absorption of the collision energy. As a result, even when the driver is the small-sized women, the collapsible column 1 smoothly gets collapsible, thereby eliminating a possibility that a large impact is applied upon the breast and the head of the driver. A broken line in FIG. 7 indicates a result of test on that occasion (in the case of a small collapse load), wherein it can be understood that the small collapse load becomes significantly small with respect to the large collapse load.

Figure 8:
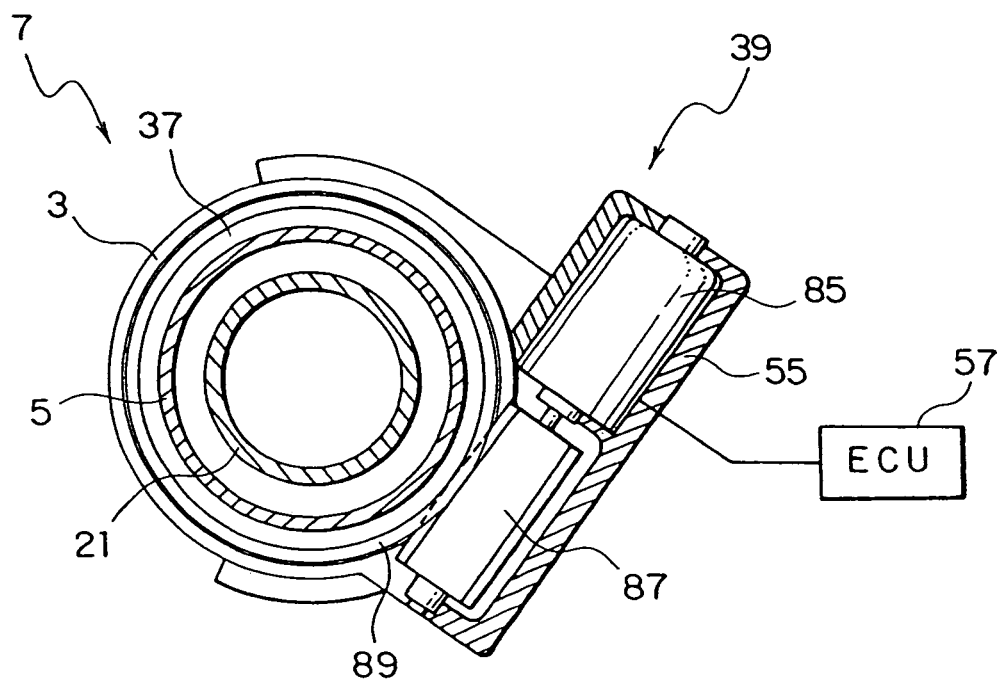
FIG. 8 is a cross-sectional view showing principal components of the steering apparatus in a second embodiment of the present invention.

FIG. 8 is a cross sectional view showing main components of the steering apparatus in a second embodiment. The second embodiment takes substantially the same construction as that in the first embodiment discussed above, however, a configuration of the retaining cylinder driving device 39 is different. To be specific, according to the second embodiment, the retaining cylinder driving device 39 incorporates an electric motor 85 and a worm pinion 87 meshing with a worm wheel 89 formed on an outer peripheral surface of the second metal ball retaining cylinder 37. Then, when the electric motor 85 rotates in response to a command of the ECU 57, the worm wheel 89 (the second metal ball retaining cylinder 37) meshing with the worm pinion 87 rotates. In the second embodiment, even if a supply of electric power is cut off due to an impact caused by the collision, the second metal ball retaining cylinder 37 is kept at an angle just before the collision, and hence the collapse load does not change without preparation. Note that a super gear train and a bevel gear train in addition to the worm mechanism may be used as the gear device provided between the retaining cylinder driving device 39 and the second metal ball retaining cylinder 37.

Figure 9:
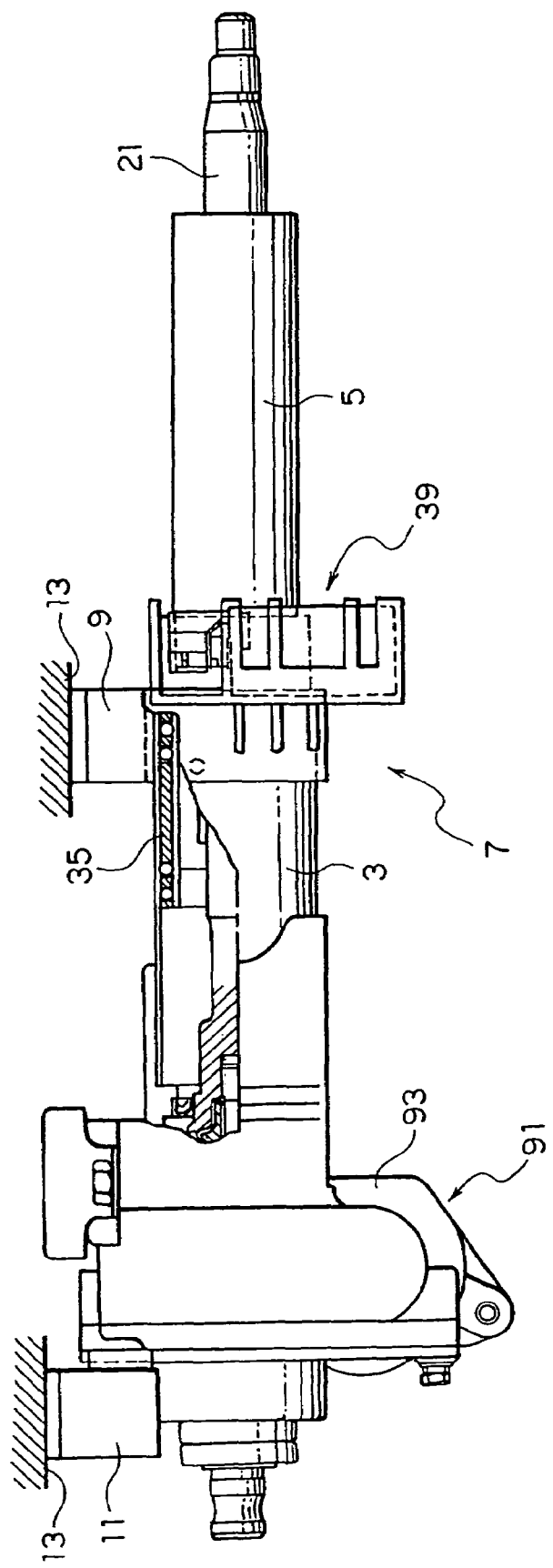
FIG. 9 is a side view showing the steering apparatus in a third embodiment of the present invention.

FIG. 9 is a side view showing the steering apparatus in a third embodiment of the present invention. The third embodiment is what the present invention is applied to an electric power steering apparatus. The third embodiment takes substantially the same construction as that of the first embodiment except for a point that the positional relationship between the outer column 3 and the inner column 5 is reversed and a point that the outer column 3 is fixed to the car body sided member 13 through the upper column bracket 9 and the lower column bracket 11. The numeral 91 in FIG. 9 represents a steering actuator constructed of the electric motor 93, an unillustrated gear etc.

Figure 10:
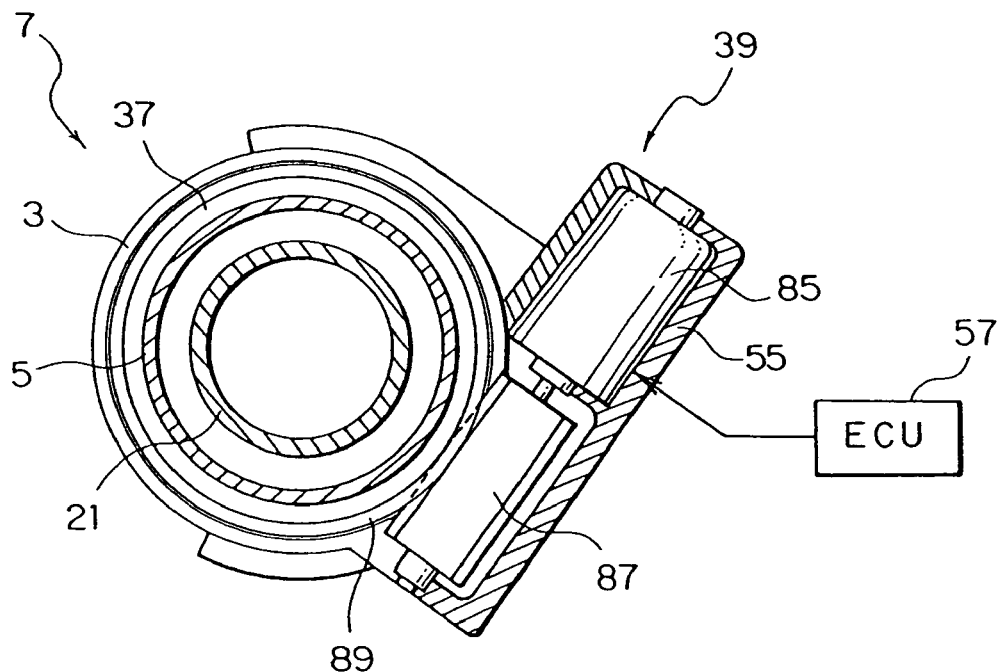
FIG. 10 is a cross-sectional view showing principal components of the steering apparatus in a fourth embodiment of the present invention.
Figure 11:
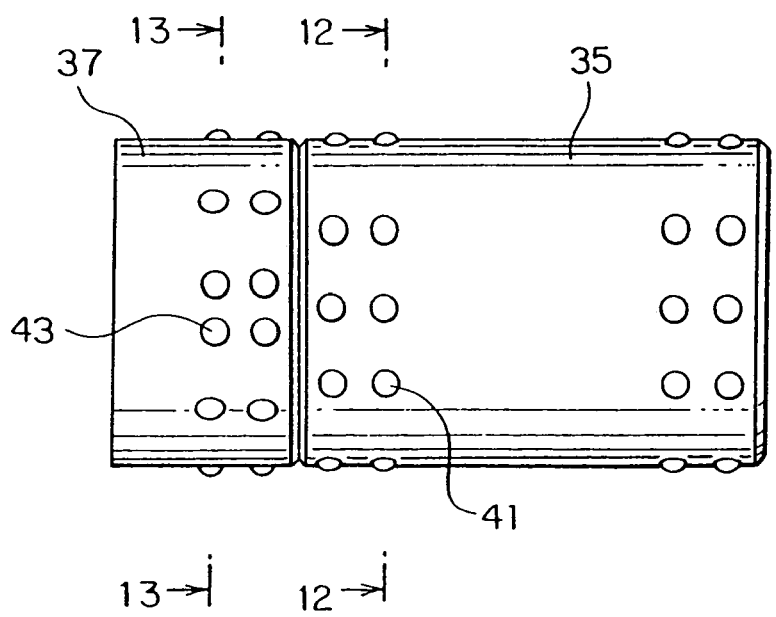
FIG. 11 is a side view showing the first and second metal ball retaining cylinders in the fourth embodiment.
Figure 12:
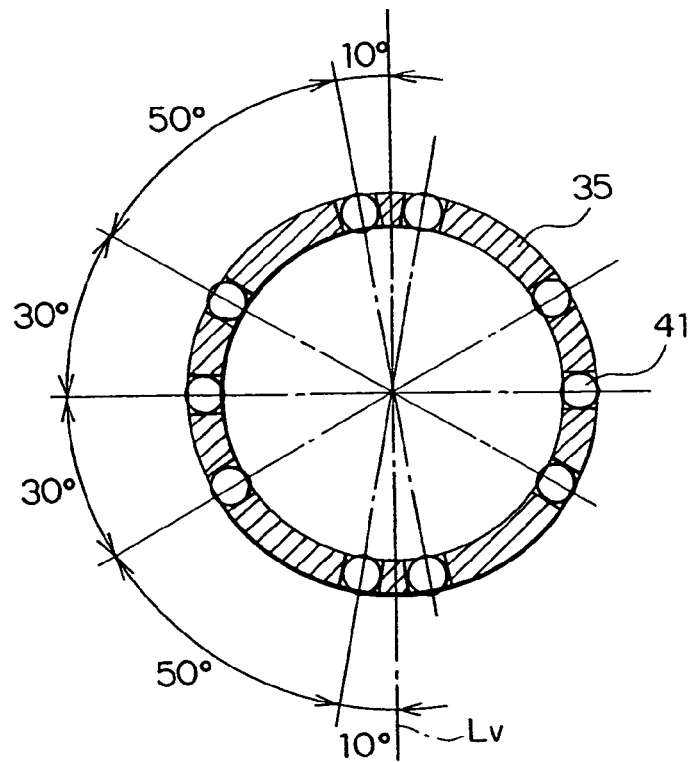
FIG. 12 is a sectional view taken along the line 12—12 in FIG. 11.
Figure 13:
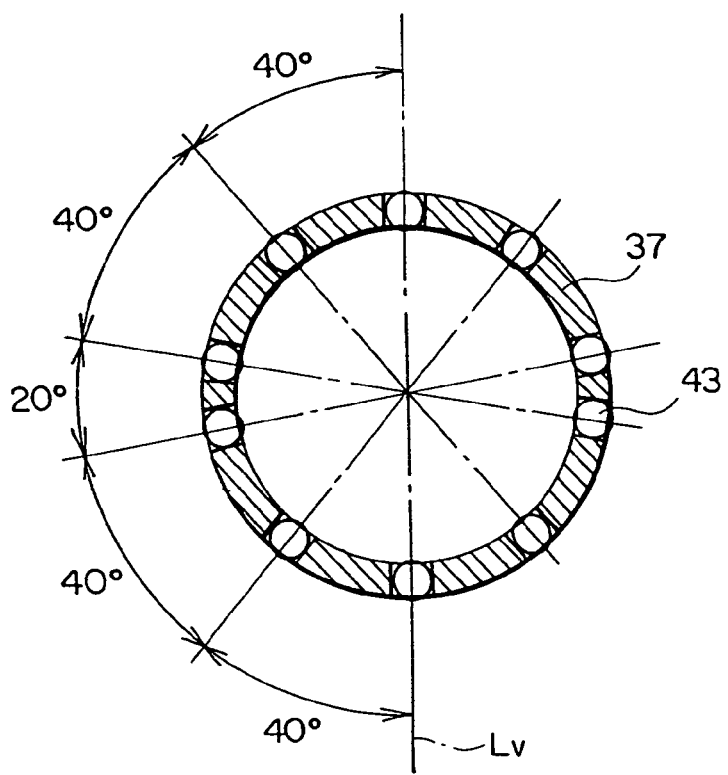
FIG. 13 is a sectional view taken along the line 13—13 in FIG. 11.

FIG. 10 is a vertical sectional view showing main components of the steering apparatus in a fourth embodiment of the present invention. The fourth embodiment takes, as in the second embodiment, the configuration that the second metal ball retaining cylinder 37 is rotationally driven by the electric motor 85 and the worm mechanism. The fourth embodiment is, however, different from the first embodiment in terms of the retaining positions of the steel balls 41, 43 in the first and second metal ball retaining cylinders 35, 37 and in terms of the driving mode of the second metal ball retaining cylinder 37. Namely, as shown in FIG. 11 (the side view showing the first and second metal ball retaining cylinders), FIG. 12 (the sectional view taken along the line 12—12 in FIG. 11) and FIG. 13 (the sectional view taken along the line 13—13 in FIG. 11), two trains of steel balls 41 in the first metal ball retaining cylinder 35 face to two trains of steel balls 43 in the second metal ball retaining cylinder 37. Further, intervals of retaining the steel balls 41 in the first metal ball retaining cylinder 35 are set at 10°, 50°, 30°, 30°, 50° and 10° from an upper side end to the left and right with an origin being a perpendicular line Lv on one hand, and intervals of retaining the steel balls 43 in the second metal ball retaining cylinder 37 are set at 0°, 40°, 40°, 20°, 40° and 40° from the upper side end to the left and right with the origin being the perpendicular line Lv on the other hand. Note that the worm wheel on the outer periphery of the second metal ball retaining cylinder 37 is not illustrated in order to avoid an intricacy in the illustration in FIG. 11.

An operation of the fourth embodiment will be explained referring to FIGS. 14 through 17.

Figure 14:
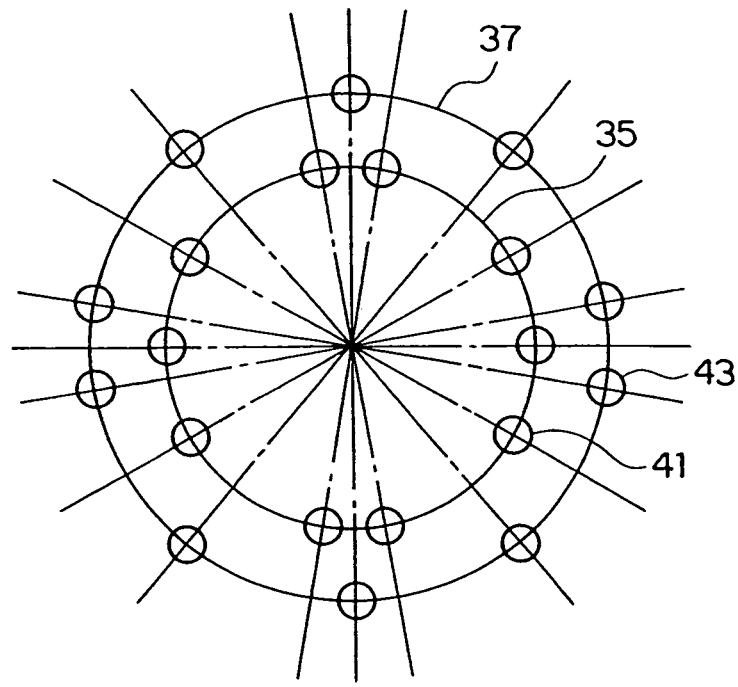
FIG. 14 is an explanatory view showing an operation of the fourth embodiment.

When the automobile starts traveling, the ECU 57, after calculating a target collapse load at a predetermined control interval, properly rotationally drives the second metal ball retaining cylinder 37 in accordance with the calculated value. For example, when the target collapse load is equal to or larger than a first set value, as shown in FIG. 14, the second metal ball retaining cylinder 37 is kept unrotational from the original position. In this case, the angular phases of the steel ball 41 in the first metal ball retaining cylinder 35 and of the steel ball 43 in the second metal ball retaining cylinder 37, are not absolutely coincident with each other, and the collapse load is maximized. Note that for an explanatory convenience in FIGS. 14 through 17, the inner circle indicates the first metal ball retaining cylinder 35, while the outer circle represents the second metal ball retaining cylinder 37.

Figure 15:
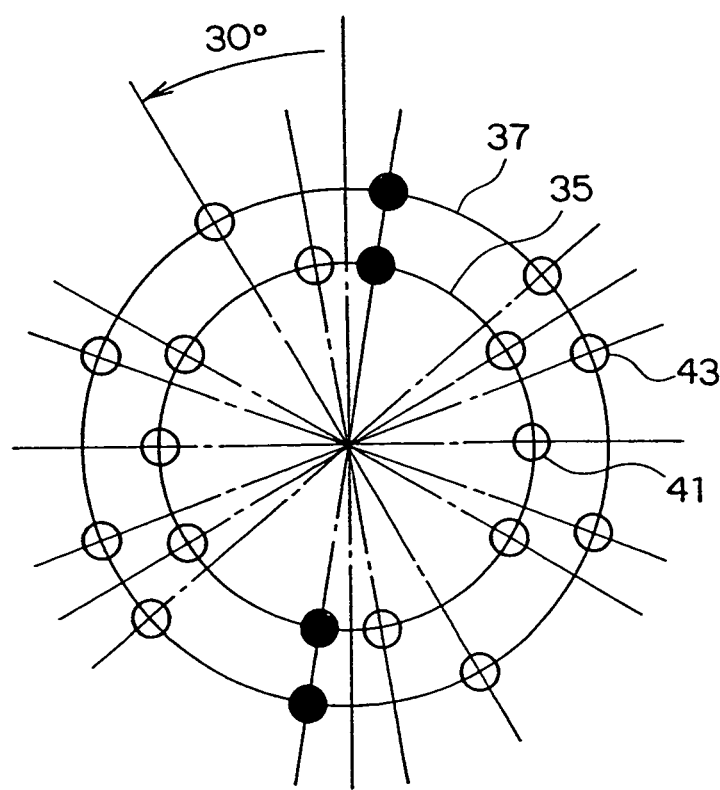
FIG. 15 is an explanatory view showing the operation of the fourth embodiment.
Figure 16:
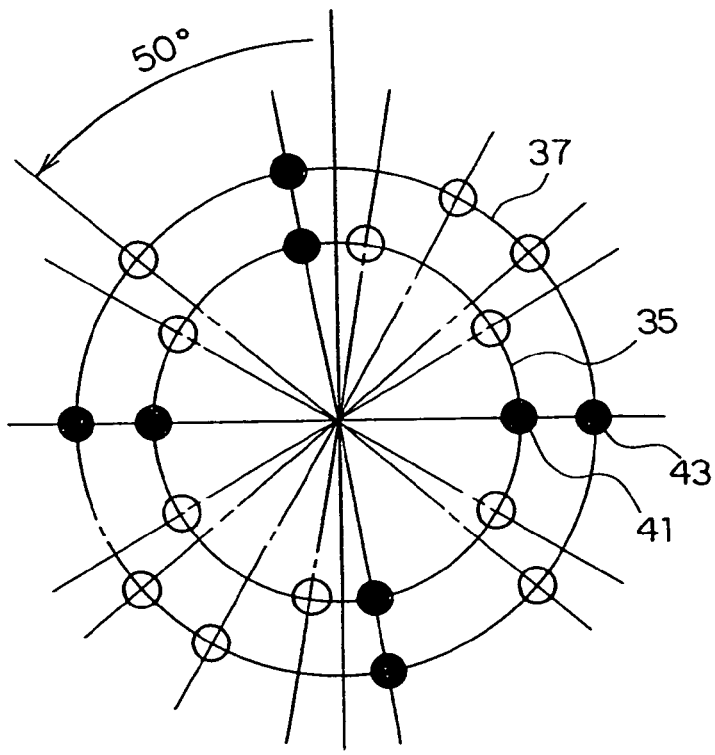
FIG. 16 is an explanatory view showing the operation of the fourth embodiment.
Figure 17:
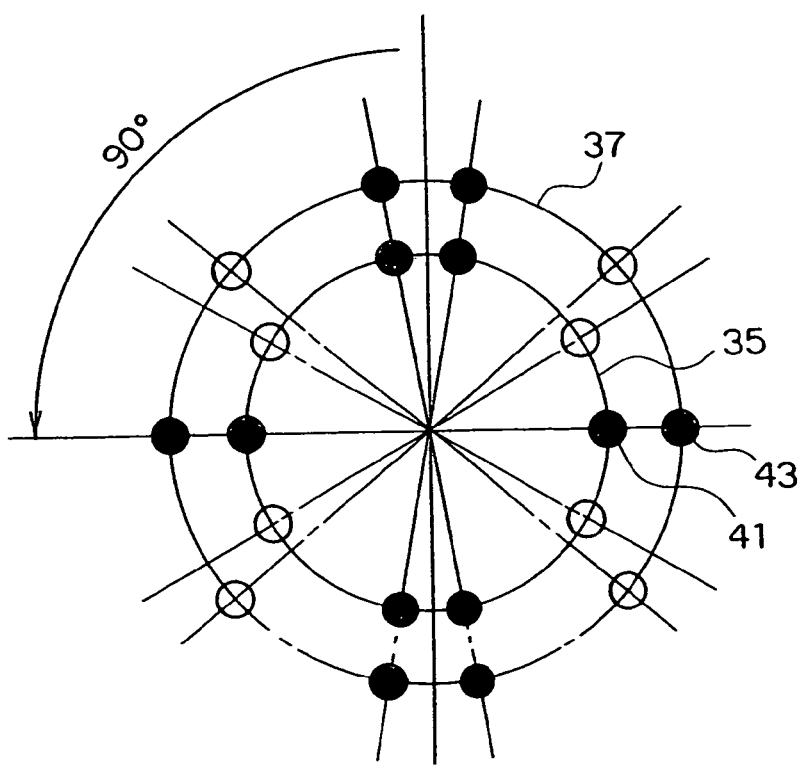
FIG. 17 is an explanatory view showing the operation of the fourth embodiment.

On the other hand, the ECU 57, when the target collapse load is smaller than the first set value and equal to or larger than the second set value, as shown in FIG. 15, causes the second metal ball retaining cylinder 37 to rotate leftward through 30° from the original position. In this case, the angular phases of the steel ball 41 in the first metal ball retaining cylinder 35 and of the steel ball 43 in the second metal ball retaining cylinder 37 are coincident at two points, and the collapse load becomes slightly small. Note that the steel balls 41, 43 with their angular phases coincident are blackened for facilitating the understanding in FIGS. 15 through 17. Further, the ECU 57, when the target collapse load is smaller than the first set value and equal to or larger than a third set value, as shown in FIG. 16, causes the second metal ball retaining cylinder 37 to rotate leftward through 50° from the original position. In this case, the angular phases of the steel ball 41 in the first metal ball retaining cylinder 35 and of the steel ball 43 in the second metal ball retaining cylinder 37 are coincident at four points, and the collapse load becomes further decreases. Then, the ECU 57, when the target collapse load is smaller than the third set value, as shown in FIG. 17, causes the second metal ball retaining cylinder 37 to rotate leftward through 90° from the original position. In this case, the angular phases of the steel ball 41 in the first metal ball retaining cylinder 35 and of the steel ball 43 in the second metal ball retaining cylinder 37 are coincident at six points, and the collapse load is minimized.

Thus, according to this embodiment, the collapse load can be changed over at the four stages by properly rotating the second metal ball retaining cylinder 37. Further, as a matter of course, the collapse load can be changed over at five or more stages by properly setting the retaining positions of the steel balls 41, 43 in the first and second metal ball retaining cylinders 35, 37.

In the first through fourth embodiments discussed above, the second metal ball retaining cylinder is rotated by the actuator, thereby changing the collapse load in the way that makes coincident or different the angular phases of the steel balls in the first and second metal ball retaining cylinders. A disengagement mechanism may, however, be provided between the first and second metal ball retaining cylinders, the first and second metal ball retaining cylinders may be disconnected when the collapse load is small, and only the steel ball in the first metal ball retaining cylinder may be operated.

As discussed above, the impact absorbing type steering column apparatus in the first through fourth embodiments of the present invention includes the collapsible column that rotatably supports the steering shaft and gets collapsed with the predetermined collapse load. The collapsible column includes the outer column, the inner column entering the outer column when the collapsible column gets collapsed, and the plurality of metal balls interposed between the outer column and the inner column and forming the plastic grooves in at least one of the outer column and the inner column in order to absorb the collision energy when the collapsible column gets collapsed. The thus constructed impact absorbing type steering column apparatus is provided with the absorbed energy variable mechanism for changing the number of the plastic grooves formed by the metal balls when the collapsible column gets collapsed. Therefore, for example, if the driver has a heavy weight, the collapse load is increased by setting large the number of the plastic grooves formed by the metal balls and is, if the driver has a light weight, decreased by setting small the number of the plastic grooves, whereby the collapsible column becomes capable of getting collapsed properly.

Figure 18:
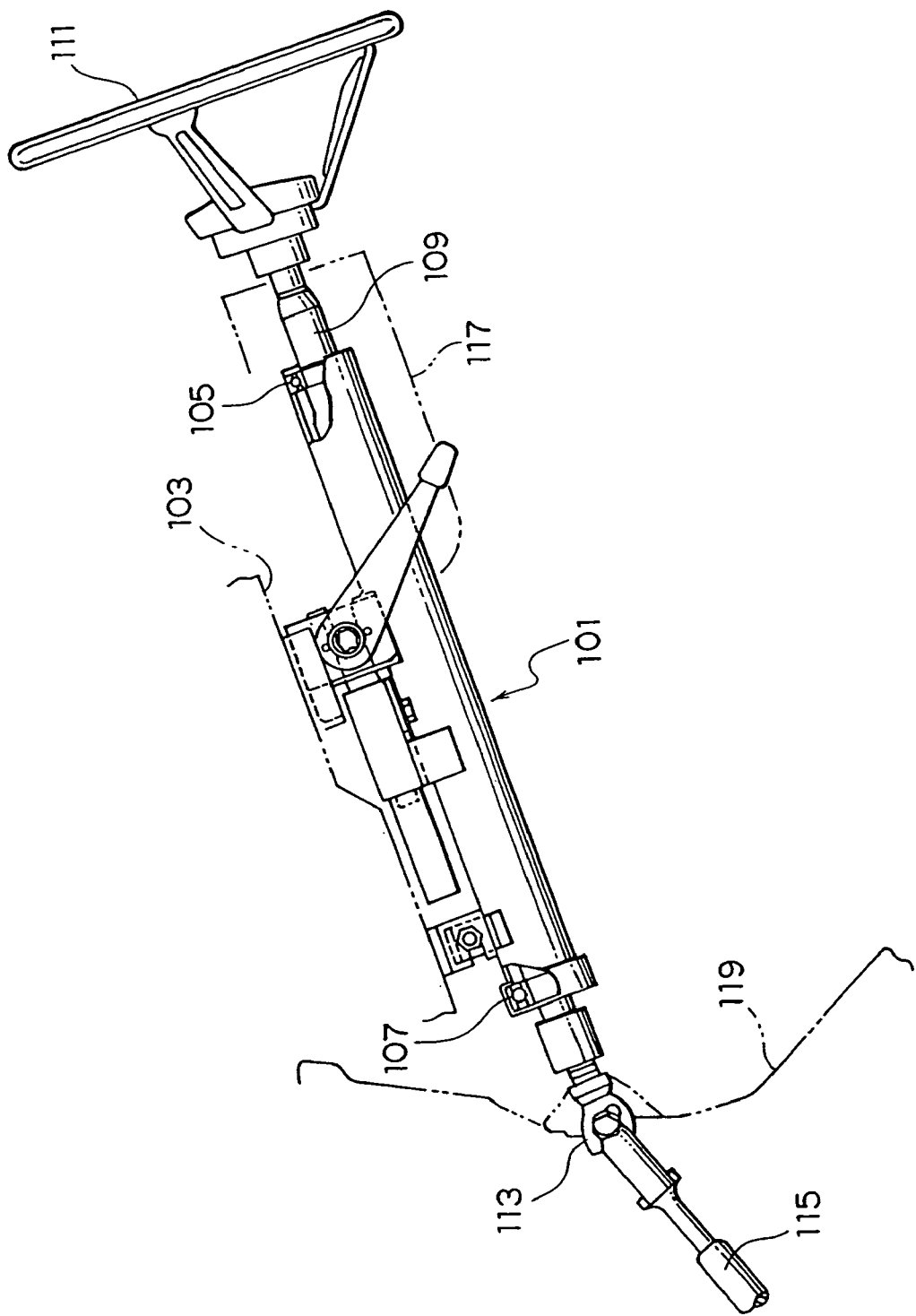
FIG. 18 is a side view showing the steering apparatus on the side of the car cabin in a fifth embodiment.

FIG. 18 is a side view showing the steering apparatus on the side of the car room in a fifth embodiment of the present invention, wherein the numeral 101 indicates an impact absorbing type steering column apparatus. The impact absorbing type steering column apparatus 101 is attached to the car body sided member 103 at upper and lower two portions, and rotatably supports the upper steering shaft (which will hereinafter be simply called a steering shaft) with bearings 105, 107. A steering wheel 111 is secured to an upper side end of the steering shaft 109, and a lower steering shaft 115 is connected via a universal joint 113 to a lower side end of the steering shaft 109. Referring again to FIG. 18, the numeral 117 denotes a column cover for covering an upper portion of the steering column 1, and the numeral 119 represents a dashboard for partitioning the car cabin from the engine room.

According to the present steering apparatus, when the driver rotates the steering wheel 111, the rotation thereof is transferred to an unillustrated steering gear via the steering shaft 109 and the lower steering shaft 115. The steering gear has a built-in rack-and-pinion mechanism for translating the inputted rotation into a rectilinear motion, and a steering angle of the wheel is changed via a tie rod etc, thus performing the steering. Note that the steering gear may take a variety of known types such as the ball screw type, the worm roller etc in addition to the rack and pinion type.

Figure 19:
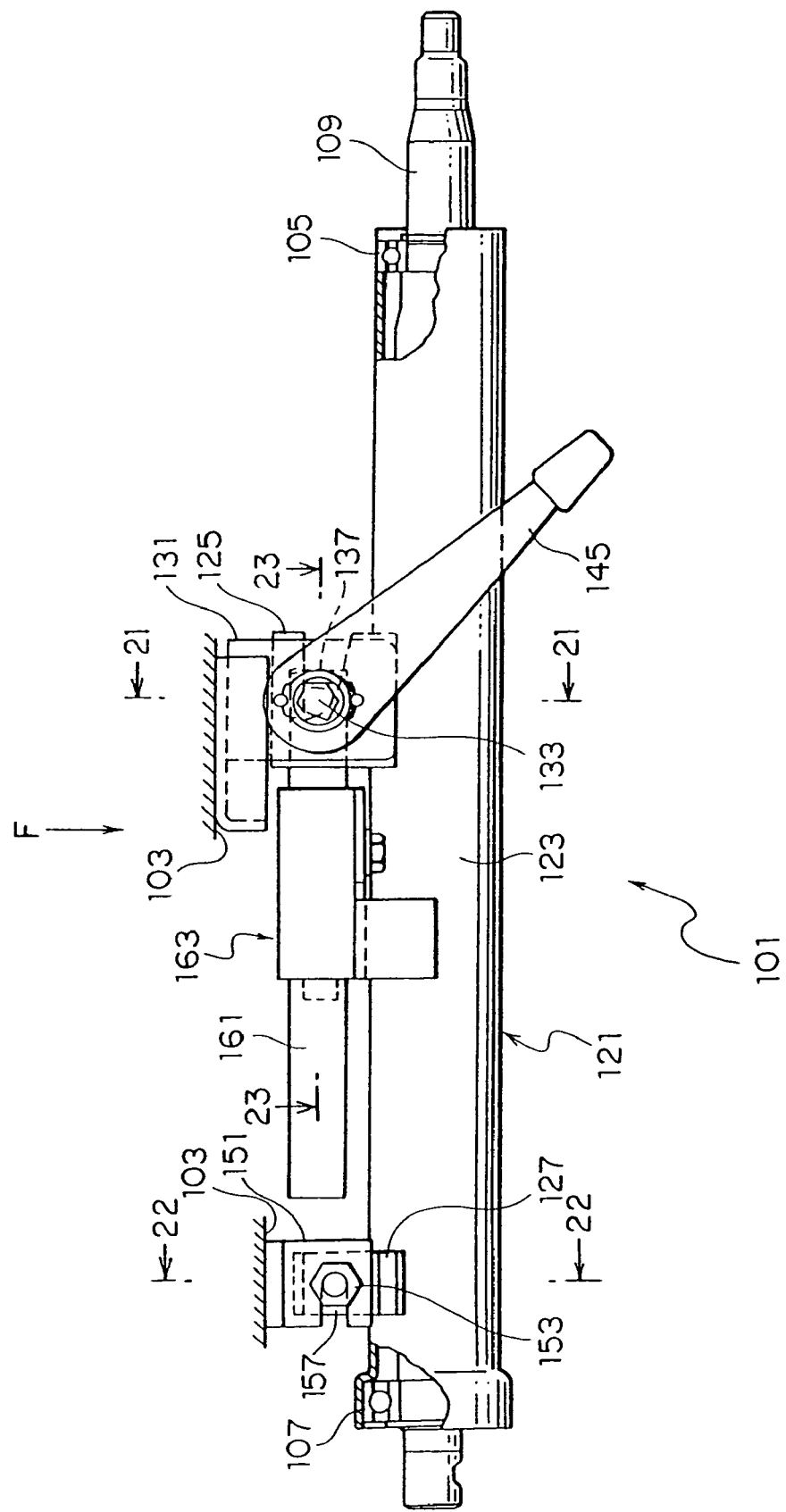
FIG. 19 is a side view showing an impact absorbing type steering column apparatus in the fifth embodiment.
Figure 20:
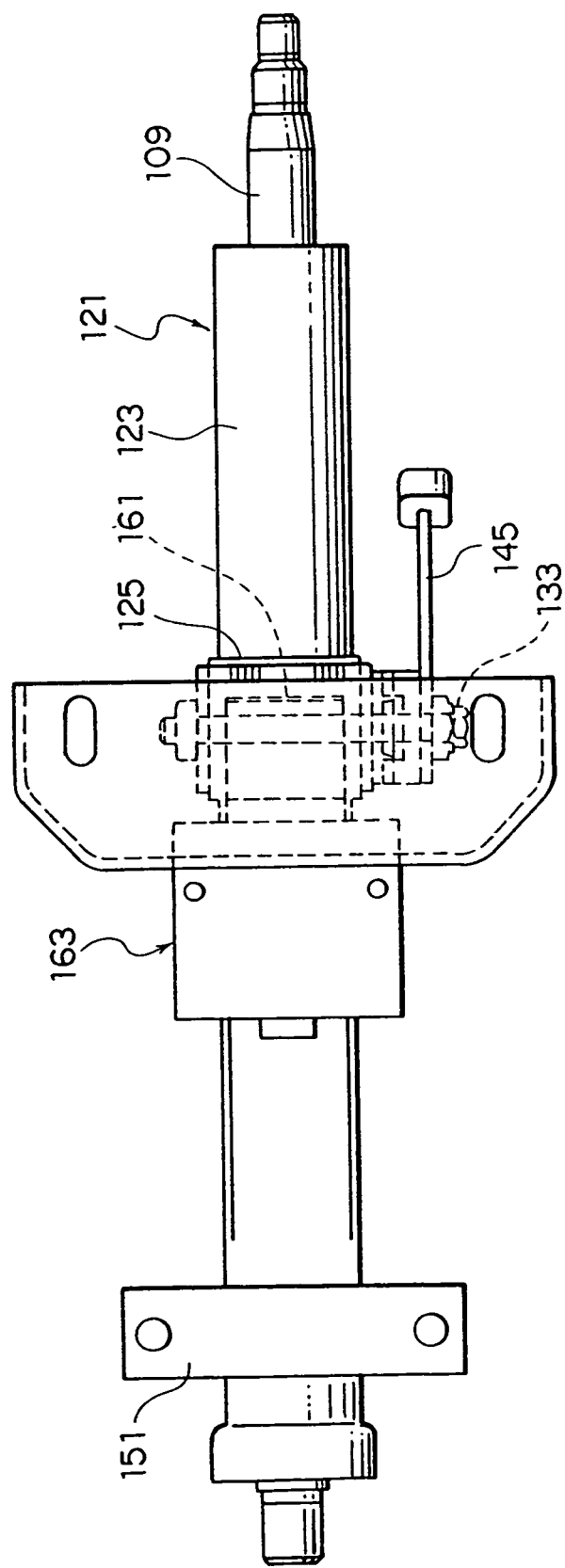
FIG. 20 is view taken along the arrow line F in FIG. 19.
Figure 21:
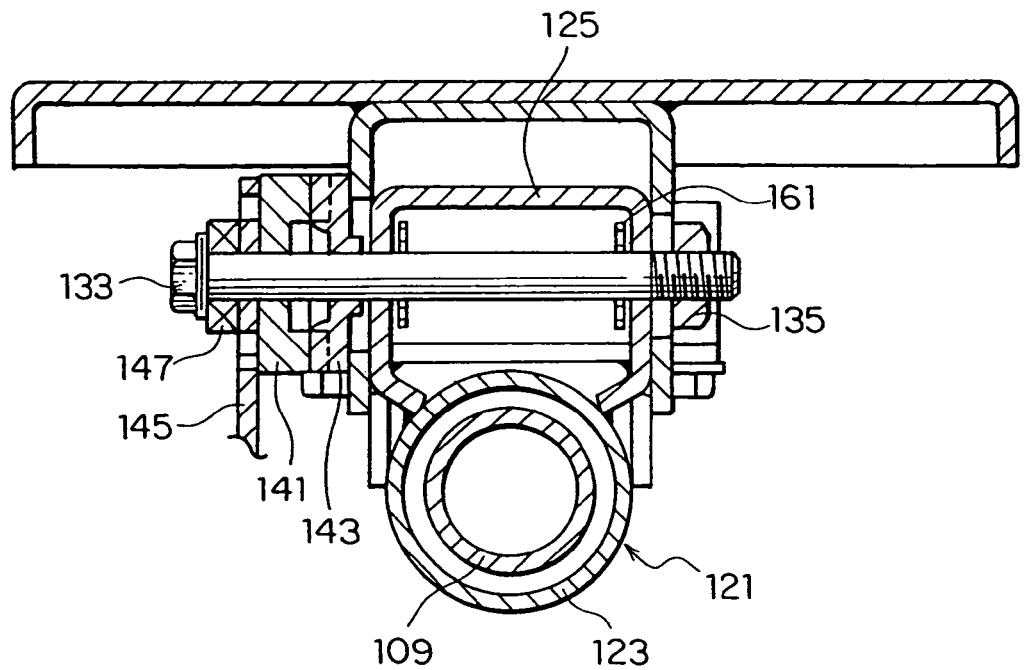
FIG. 21 is an enlarged sectional view taken along the line 21—21 in FIG. 19.
Figure 22:
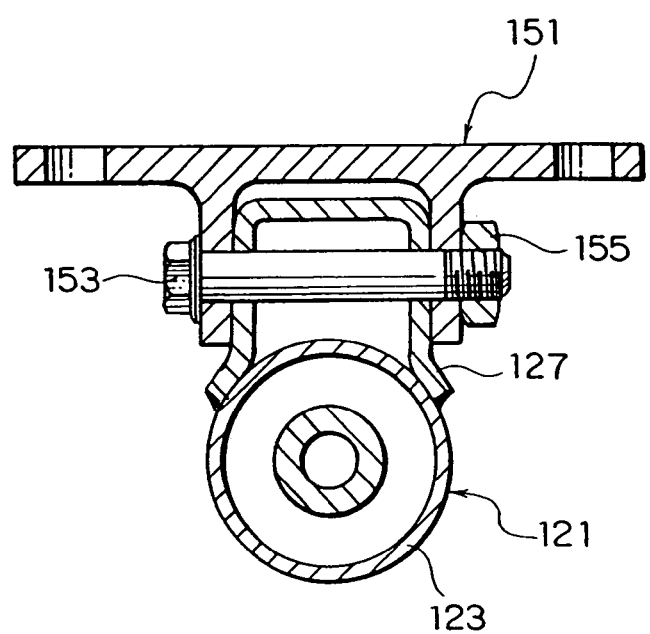
FIG. 22 is an enlarged sectional view taken along the line 22—22 in FIG. 19.
Figure 23:
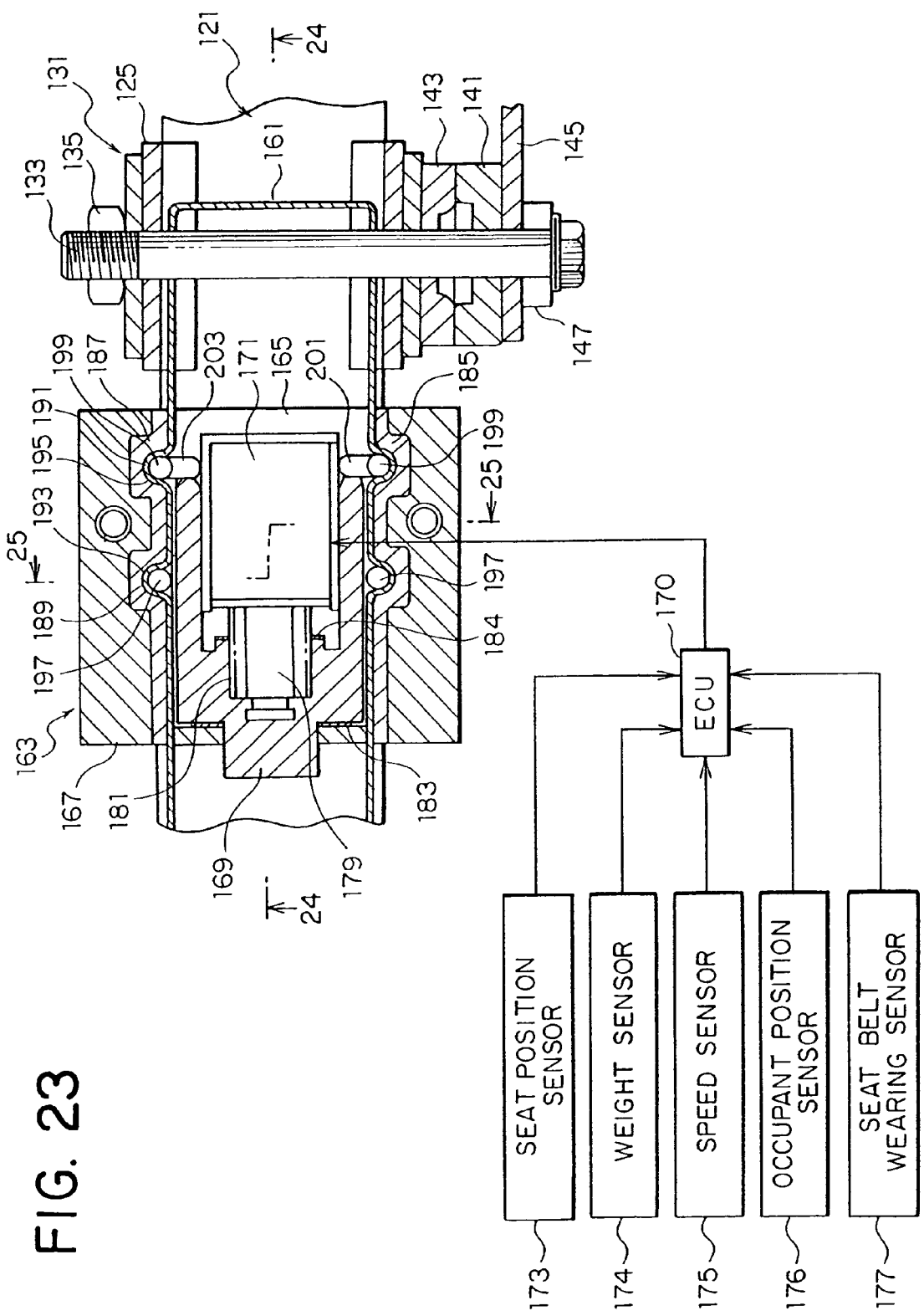
FIG. 23 is an enlarged sectional view taken along the line 23—23 in FIG. 19.

FIG. 19 is a side view showing the impact absorbing type steering column apparatus in a fifth embodiment of the present invention. FIG. 20 is a plan view (taken along the arrow line F in FIG. 19) showing the same apparatus. FIG. 21 is an enlarged sectional view taken along the line 21—21 in FIG. 19. FIG. 22 is a sectional view taken along the line 22—22in FIG. 19. FIG. 23 is an enlarged sectional view taken along the line 24—24 in FIG. 19. As shown in these drawings, a steering column 121 is manufactured by welding an upper distance bracket (which will hereinafter simply called an upper bracket) 125 composed of a steel plate to substantially the central portion of a steel column tube 123 and further welding a lower distance bracket (which will hereinafter simply called a lower bracket) 127 composed of a steel plate to a front portion (the left side in FIGS. 19 and 20) of the tube 123.

The upper bracket 125 is held by a tilt bracket 131 as a steel plate welding structural member fixed to the car body sided member 103. The upper bracket 125 is forced to be fixed by a predetermined fastening force given by a tilt bolt 133 penetrating the tilt bracket 131 and a nut 135. The upper bracket 125 is formed with a substantially U-shaped notch 137 opening backward. The tilt bolt 133 is inserted into a front side end of this notch 137. Referring to FIGS. 21 and 23, members indicated by the numerals 141, 143 are known tilt cams used for fixing the steering column 121 at a predetermined angle. Further, a member designated by the numeral 145 is a tilt lever for rotationally driving the tilt cam 141. A member indicated by the numeral 147 is a thrust bearing interposed between a head of the tilt bolt 133 and the tilt lever 145.

On the other hand, the lower bracket 127 is held by a pivot bracket 151 as a casting fixed to the car body sided member 103. The lower bracket 127 is fixed by a pivot bolt 153 penetrating the pivot bracket 151 and a nut 155. The pivot bracket 151 is formed with a substantially U-shaped notch 157 opening forward. The pivot bolt 153 is inserted into a rear side end of this notch 157. Note that the steering column 121 is swayable about the pivot bolt 153, and the driver is able to adjust upper and lower positions of the steering wheel 111 within a predetermined range by manipulating the tilt lever 145.

In the fifth embodiment, the collision energy absorbing mechanism is constructed of an energy absorbing plate 161 held by the tilt bolt 133 and a variable drawing device 163 fixed to the steering column 121. The energy absorbing plate 161 is a substantially U-shaped steel plate opening forward, and the tilt bolt 133 penetrates a portion vicinal to the rear side end of the plate 161.

Figure 24:
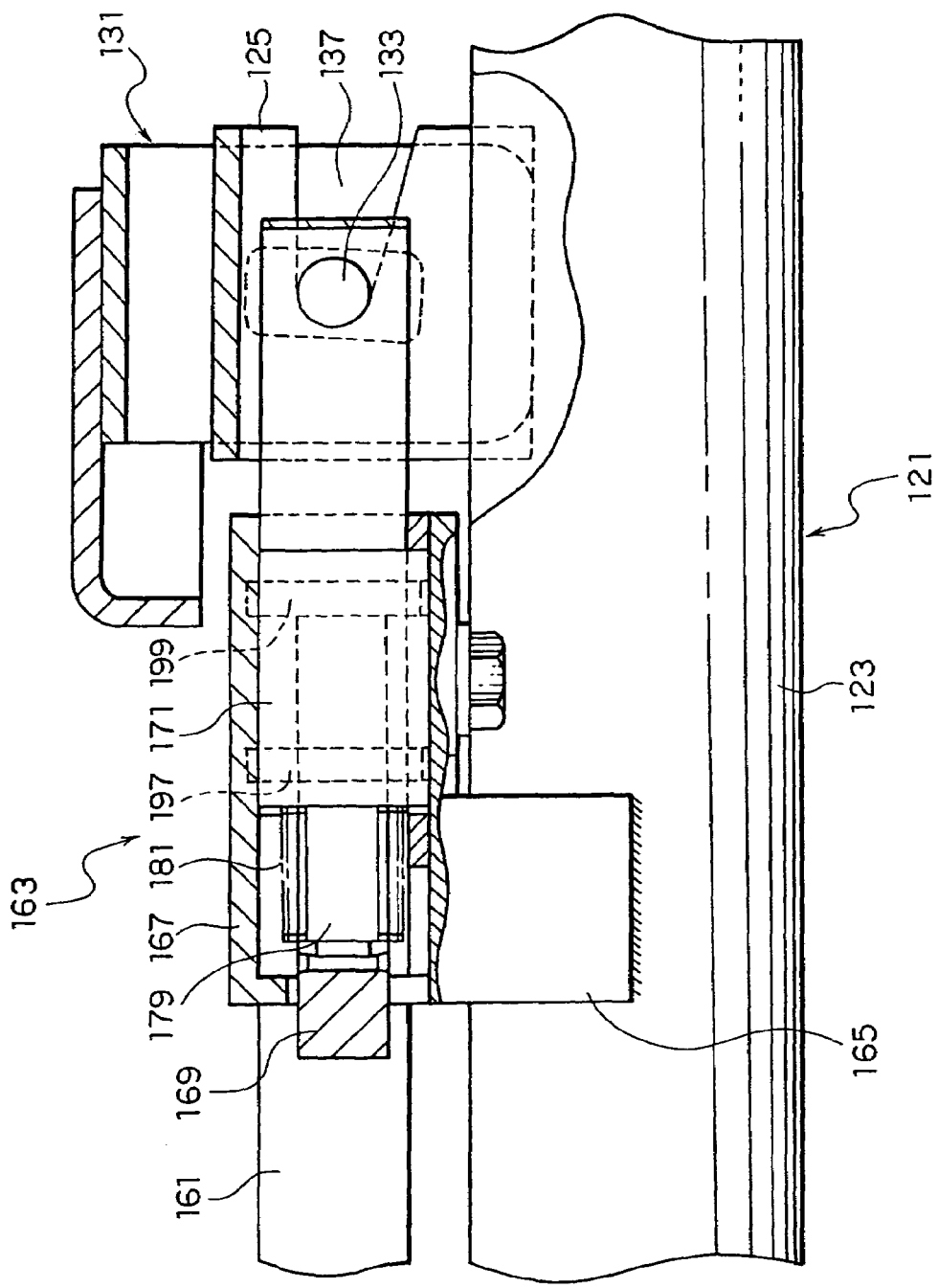
FIG. 24 is a sectional view taken along the line 24—24 in FIG. 23.
Figure 25:
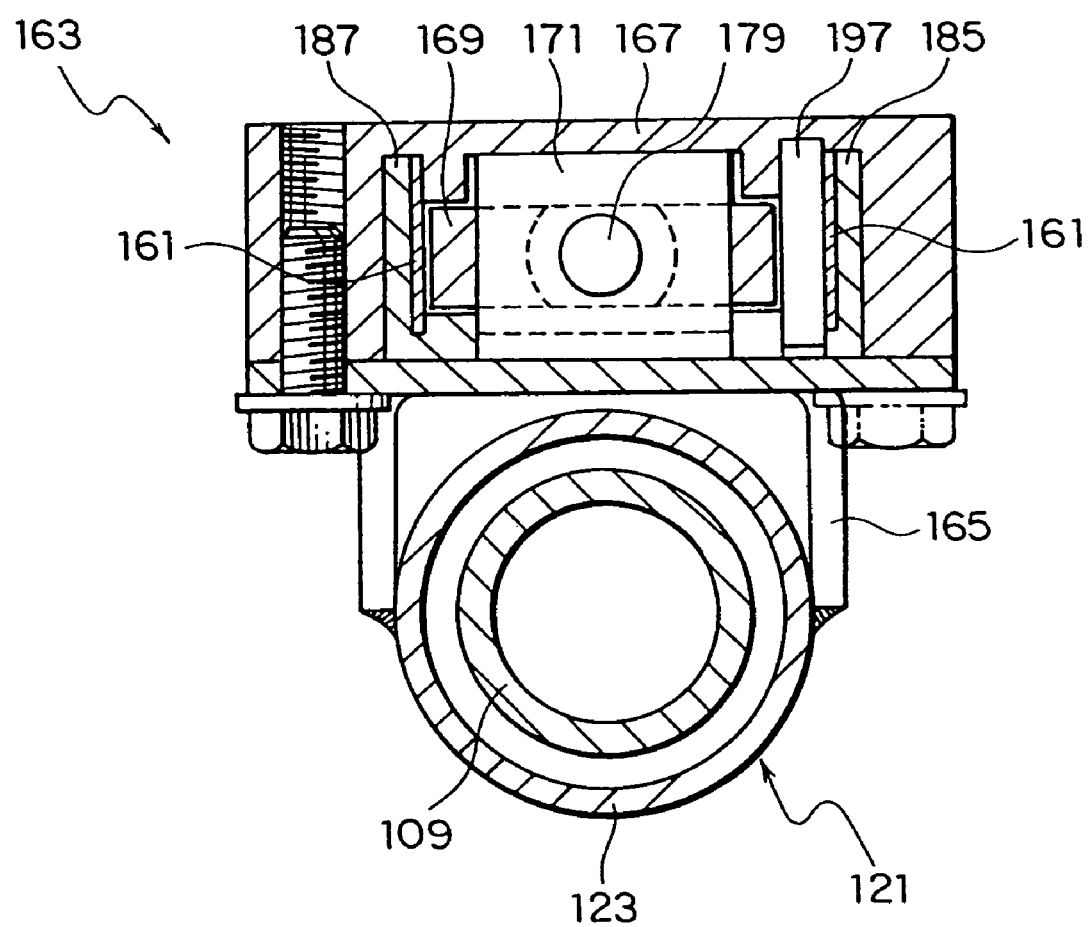
FIG. 25 is a sectional view taken along the line 25—25 in FIG. 23.

On the other hand, the variable drawing device 163 is, as shown in FIGS. 23, 24 (a sectional view taken along the line 24—24 in FIG. 23) and 25 (a sectional view taken along the line 25—25 in FIG. 23), constructed of a base plate 165 as a steel plate press molding welded to a column tube 123, a housing 167 fastened with a bolt to the base plate 165, a slide block 169 slidably held within the housing 167, and an electromagnetic actuator (which will hereinafter be termed a solenoid) 171 retained in the housing 167 and driven under control of an ECU (Electronic Control Unit) 170. Note that in addition to a seat position sensor 173, at least one of a weight sensor 174, a car speed sensor 175, an occupant position sensor 176, a seatbelt wearing sensor 177, is connected to the ECU 170.

A front side end of a plunger 179 of the solenoid 171 is engaged and connected with the slide block 169, and the plunger 179 is kept stretched by a biasing force of a coil spring 181 interposed between the solenoid 171 and the slide block 169 when other than being electrified. Members indicated by the numerals 183, 184 in FIG. 23 are buffer members pasted to the slide block 169. The buffer members 183, 184 function to restrain a sound of impingement of the slide block 169 upon the housing 167 and the solenoid 171.

A pair of guide plates 185, 187 provided right and left are held adjacent to both of the side surfaces of the slide block 169 within the housing 167. The energy absorbing plates 161 are inserted and fitted in between the slide block 169 and these guide plates 185, 187. The two guide plates 185, 187 respectively have U-shaped recessed portions 189, 191 formed inwards at substantially the central portion and the rear portion. The energy absorbing plates 161 are formed with front and rear U-shaped bent portions 193, 195 fitted in the U-shaped recessed portions 189, 191.

In the energy absorbing plates 161, fixed drawing pins 197 are fitted in the front U-shaped bent portions 193, and movable drawing pins 199 are fitted in the rear U-shaped bent portions 195. The housing 167 is formed with a pair of left and right elongate holes 201, 203 for retaining the movable drawing pins 199. The movable drawing pins 199 are movable by a predetermined quantity within those elongate holes 201, 203.

An operation of the fifth embodiment will hereinafter be explained.

Figure 26:
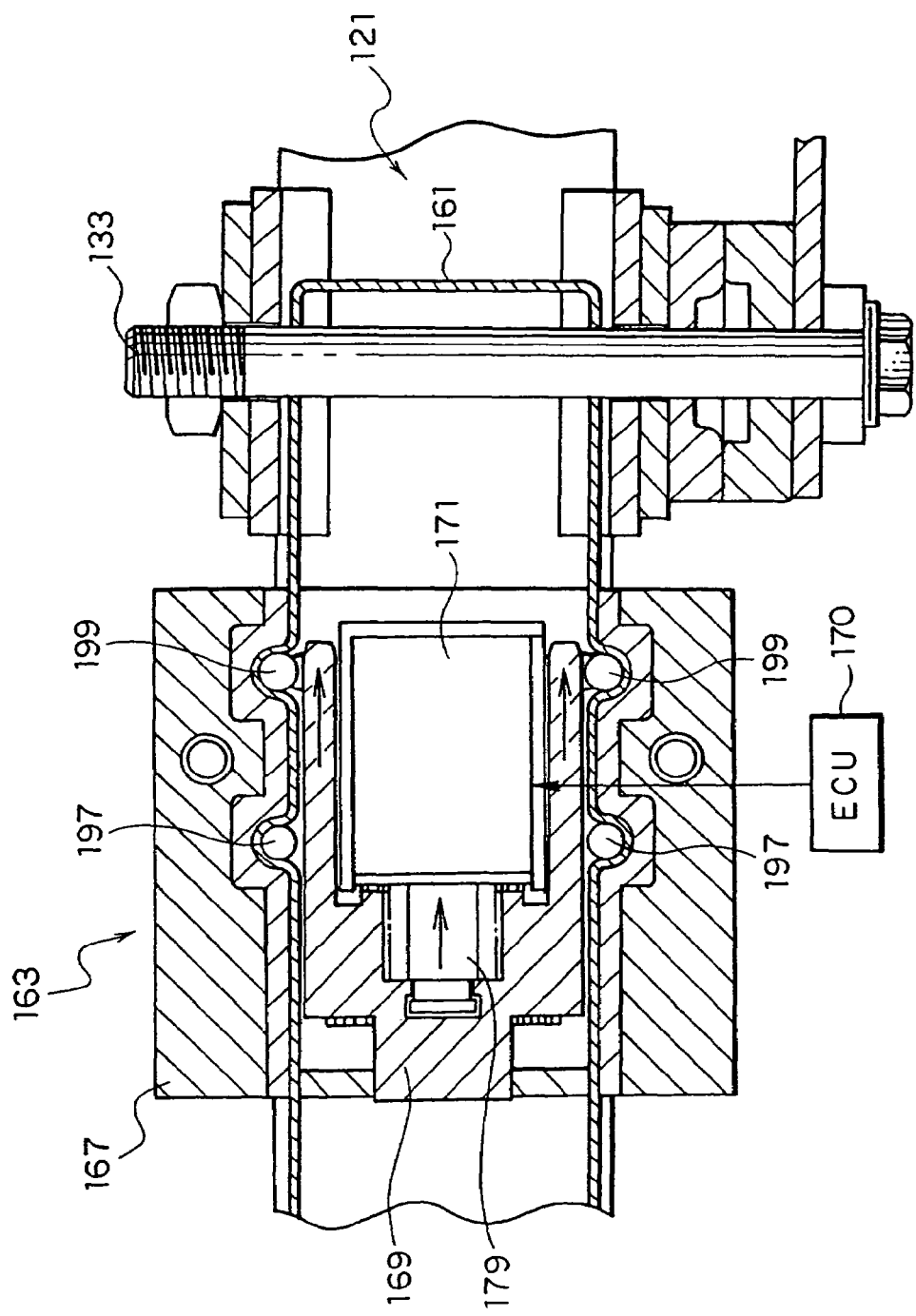
FIG. 26 is an explanatory view showing an operation of the fifth embodiment.
Figure 27:
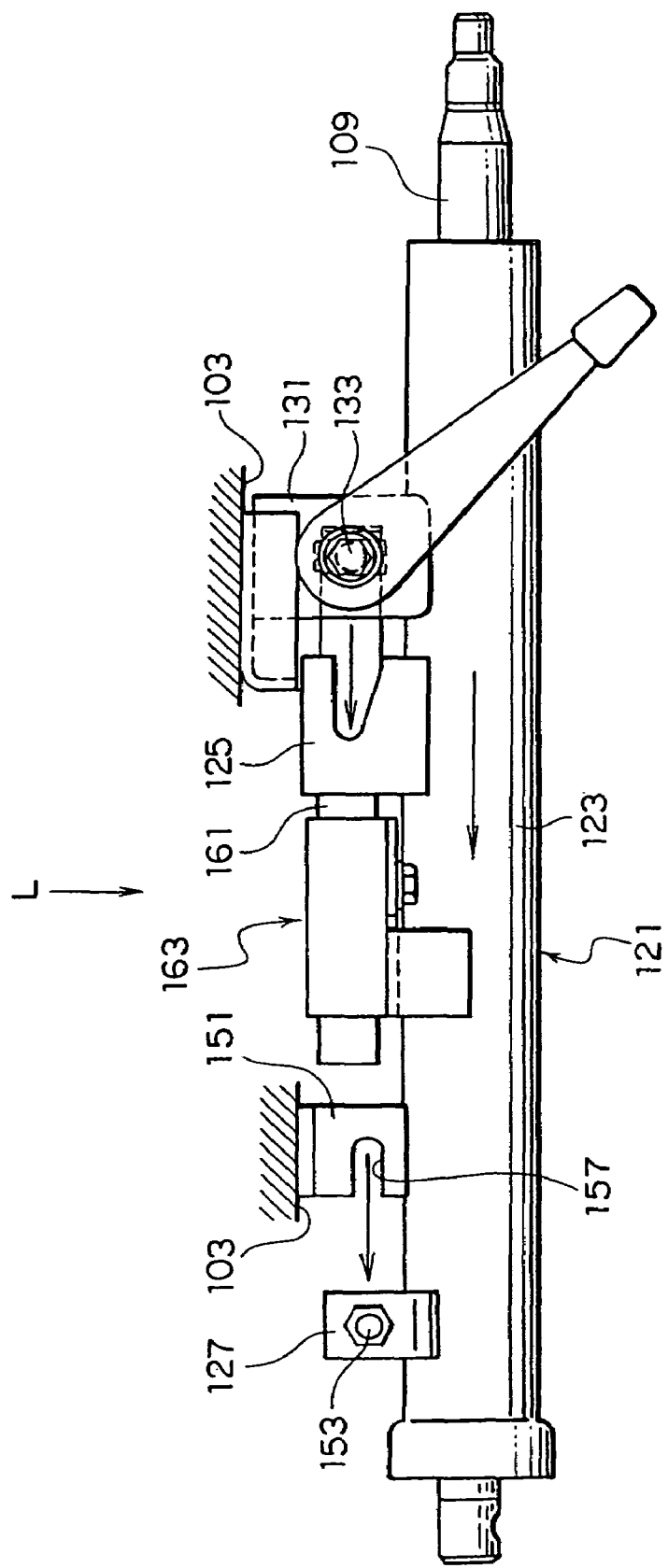
FIG. 27 is an explanatory view showing the operation of the fifth embodiment.
Figure 28:
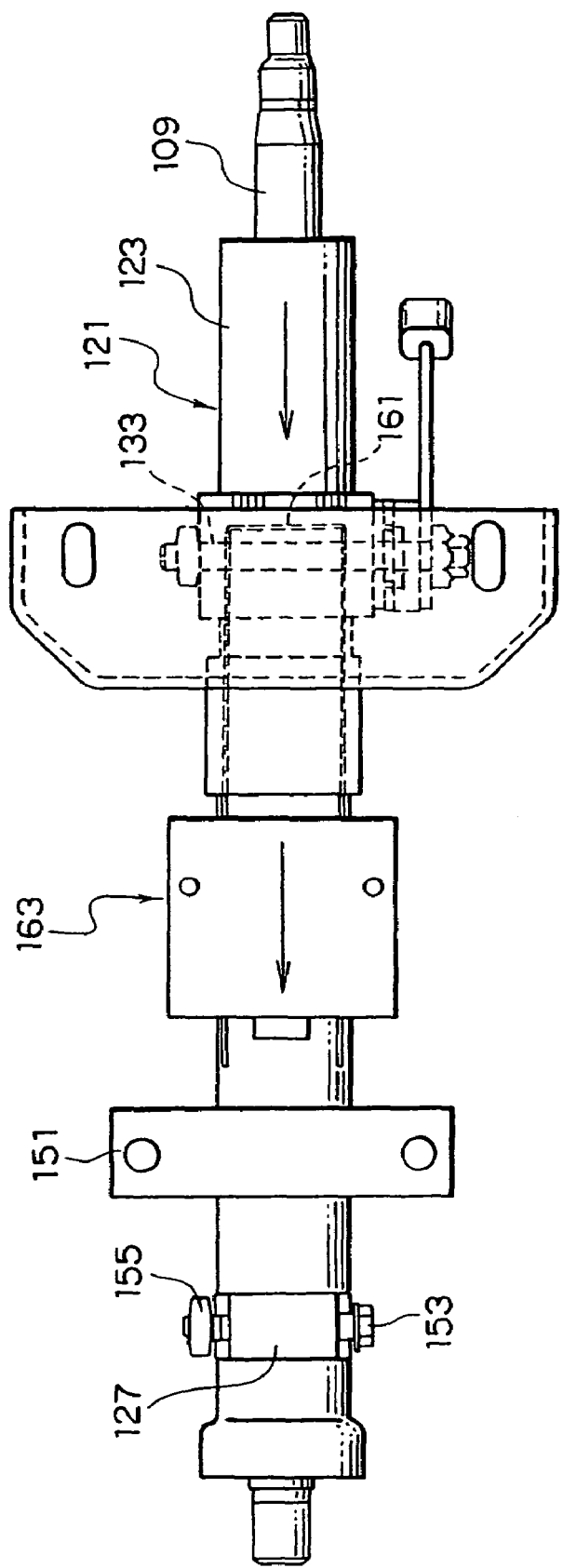
FIG. 28 is a view taken along the arrow line L in FIG. 27.

When the automobile starts traveling, the ECU 170, based on detection signals of the variety of sensors 173~177 described above, repeatedly calculates a target operation load of the collision energy absorbing mechanism at a predetermined control interval. For instance, if a weight of the driver is comparatively heavy, or if a car speed is high even though the driver's weight is comparatively light, a kinetic energy of the driver at a collision increases, and therefore the target operation load increases. Then, the ECU 170 outputs a drive current to the solenoid 171, whereby the plunger 179 is, as shown in FIG. 26, attracted by a magnetic force into the solenoid 171. As a result, the slide block 169 connected to the plunger 179 moves backward, and a side surface of the rear portion of the block 169 is positioned inwardly of the movable drawing pin 199, thereby restricting a shift to the inside of the movable drawing pin 199.

Figure 29:
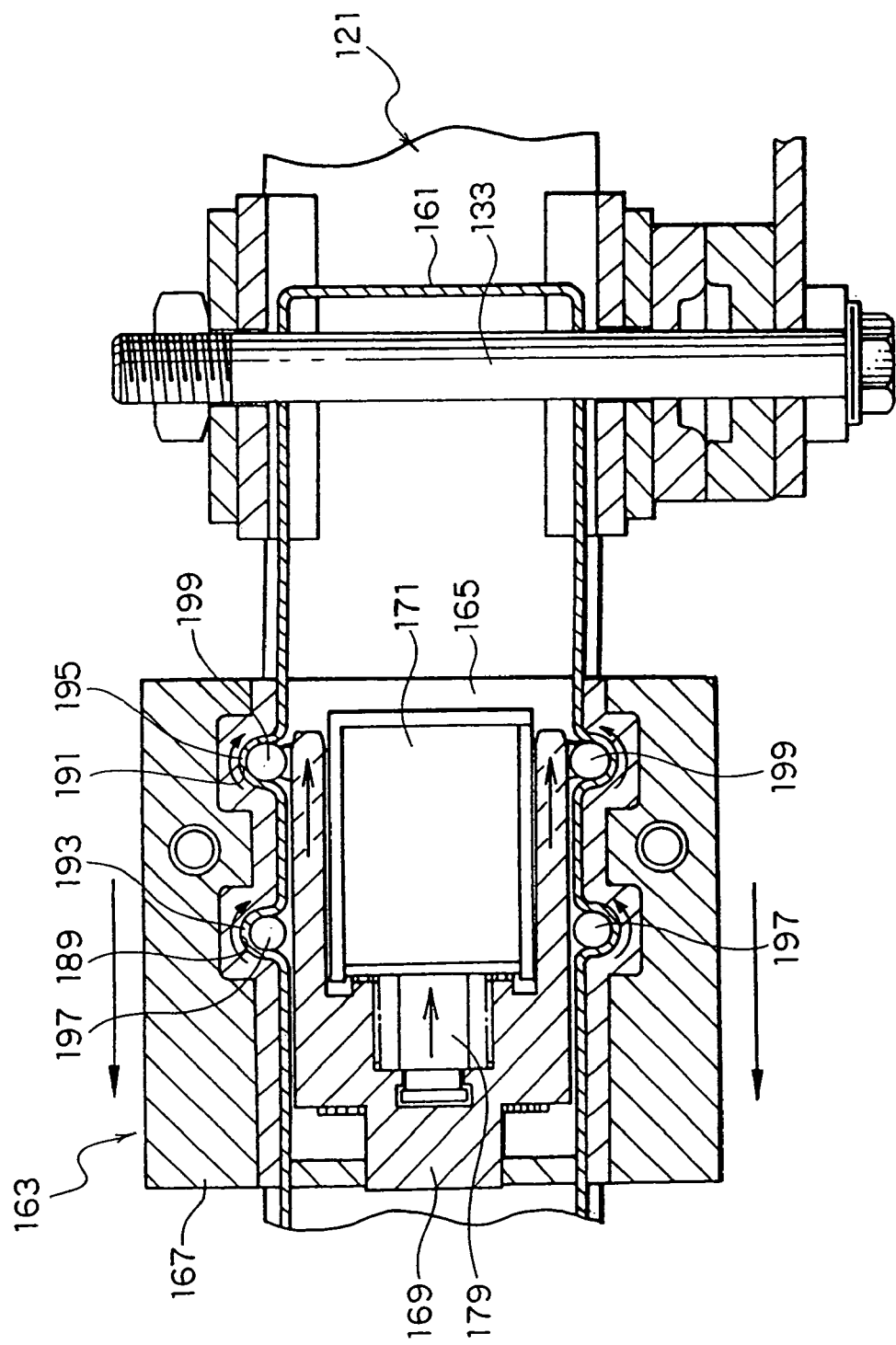
FIG. 29 is an explanatory view showing the operation of the fifth embodiment.

In this state, if the automobile collides with other automobile or an obstacle on the road, the driver suffers a secondary collision with the steering wheel 111 by its inertia. With its impact, the upper bracket 125 gets released forward from the tilt bracket 131, and the steering column 121 gets released forward from the pivot bracket 151, with the result that the steering column 121 gets separated and starts advancing. Then, with the advancement of the steering column 121, as shown in FIG. 29, the variable drawing device 163 on the side of the steering column 121 advances with respect to the energy absorbing plate 161 held by the tilt bolt 133 on the side of the car body sided member 103.

Then, in the energy absorbing plate 161, it follows that there advance the front U-shaped bent portion 193 fitted in between the U-shaped recessed portion 189 and the fixed drawing pin 197 and the rear U-shaped bent portion 195 fitted in between the U-shaped recessed portion 191 and the movable drawing pin 199. As a result, the energy absorbing plate 161 is drawn by the two drawing pins 197, 199 at four right and left portions in a way of its being turned round in sequence, thereby absorbing a comparatively large collision energy. A relationship between the operation load and the shift stroke of the steering column 121 is the same as in the first embodiment.

While on the other hand, if the driver is a small-sized women having a comparatively light weight, the kinetic energy of the driver at the collision is comparatively small, so that the target operation load calculated by the ECU 170 decreases. Then, the ECU 170 does not output the drive current to the solenoid 171, and, as previously shown in FIG. 23, the plunger 179 is set in the state of being stretched by the biasing force of the coil spring 181. This makes the slide block 169 remain advanced, and the movable drawing pins 199 become movable within the elongate holes 201, 203.

Figure 30:
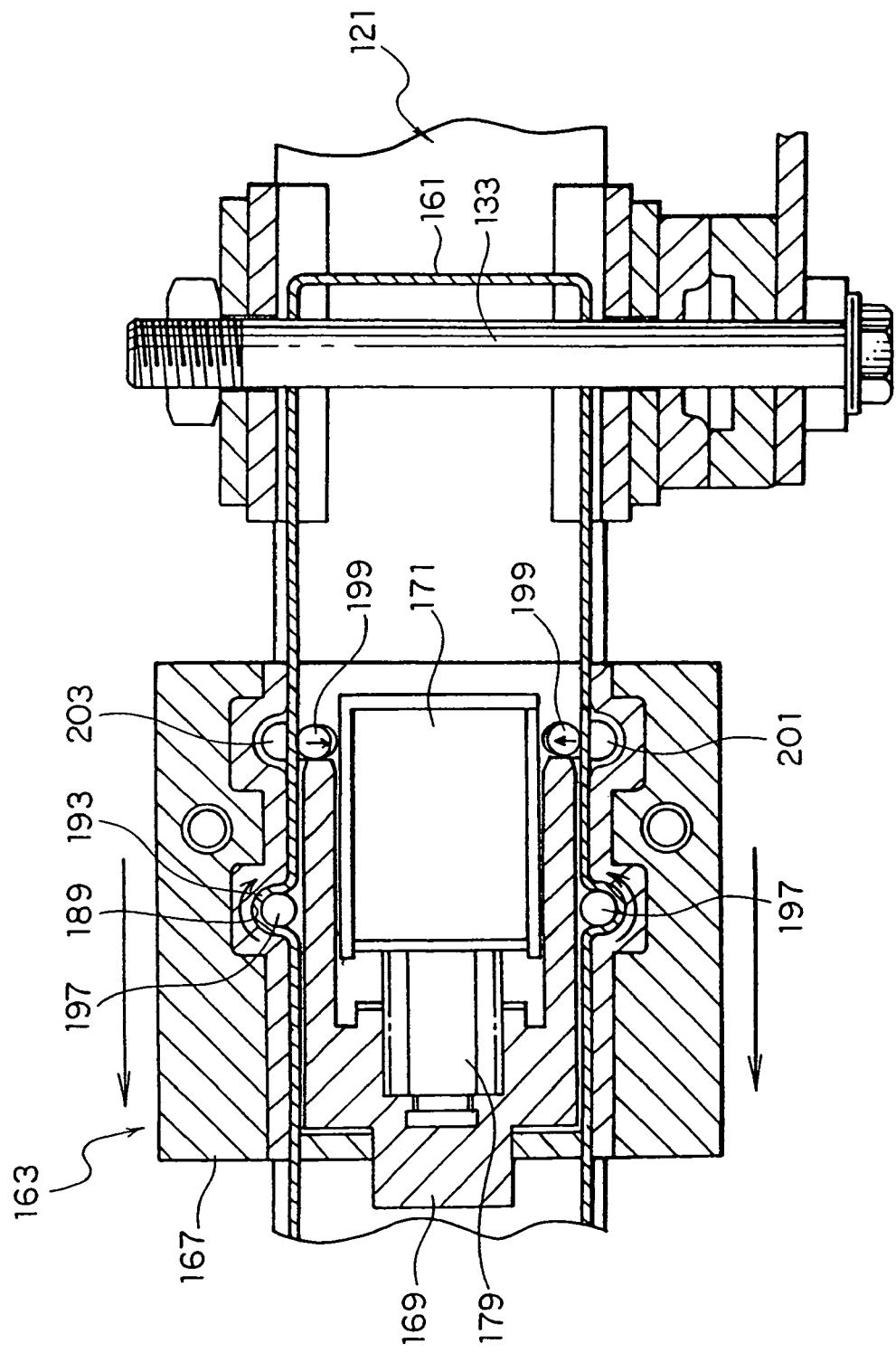
FIG. 30 is an explanatory view showing the operation of the fifth embodiment.

In this state, if the automobile collides with other automobile or the obstacle on the road, in the same process as in the case described above, the steering column 121 gets released and advances, and the variable drawing device 163 moves forward with respect to the energy absorbing plate 161. In this case, however, the movable drawing pin 199 is not restricted by the slide block 169, and hence, as shown in FIG. 30, the rear U-shaped bent portion 195 of the energy absorbing plate 161, when advancing and getting released from the U-shaped recessed portion 191, presses inwards and moves the movable drawing pin 199 away afterward.

As a result, the energy absorbing plates 161 are drawn only by the fixed drawing pins 197 at the two right and left portions, thereby decreasing a quantity of absorbing the collision energy. At the same time, even though the driver is the small-sized women etc, the steering column 121 smoothly advances, and it never happens that the a large impact is applied upon the breast and the head of the driver. The relationship described above in FIG. 7 is applied to the fifth embodiment, wherein the broken line indicates a result of test on this occasion (in the case of the small operation load), and the small operation load significantly decreases with respect to the large operation load.

Figure 31:
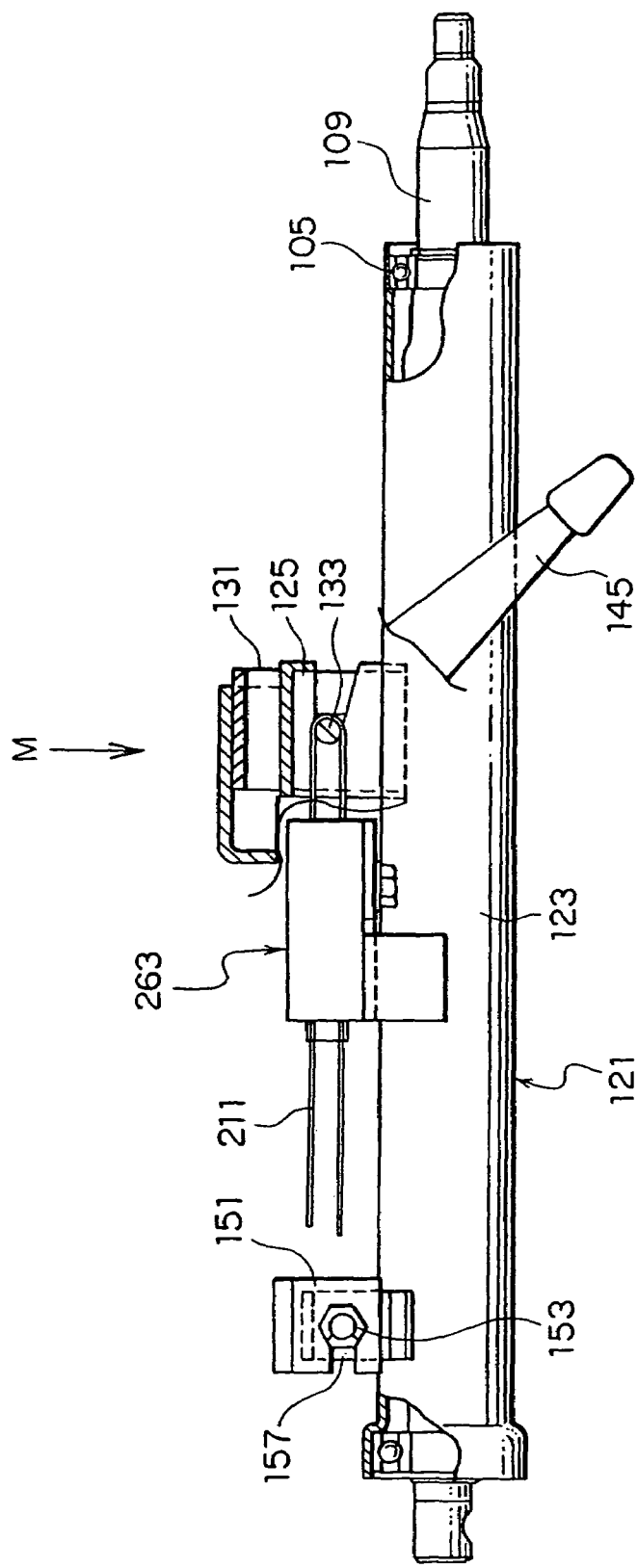
FIG. 31 is a side view showing principal components of the steering apparatus in a sixth embodiment of the present invention.
Figure 32:
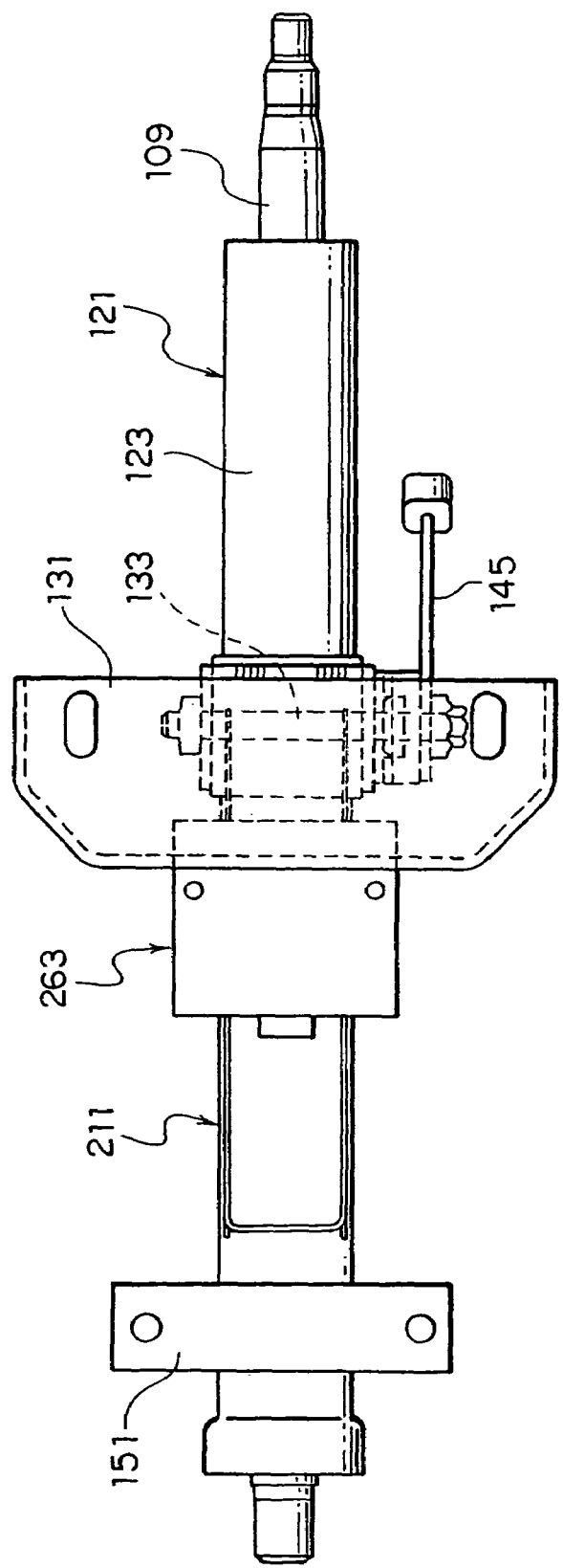
FIG. 32 is a view taken along the arrow line M in FIG. 31.

FIG. 31 is a side sectional view showing the main components of the steering apparatus in a sixth embodiment of the present invention. FIG. 32 is a view taken along the arrow line M in FIG. 31. As shown in these drawings, the whole configuration of the sixth embodiment is substantially the same as that of the fifth embodiment, however, an energy absorbing wire 211 formed by bending a steel wire is used as an energy absorbing member. In the sixth embodiment also, a variable drawing device 263 incorporates the fixed drawing pins and the movable drawing pins, and it is feasible to make the same adjustment of the operation load as in the fifth embodiment by providing eight or four drawing portions of the energy absorbing wire 211. Note that the same components in the sixth embodiment as those in the fifth embodiment are marked with the same numerals.

Figure 33:
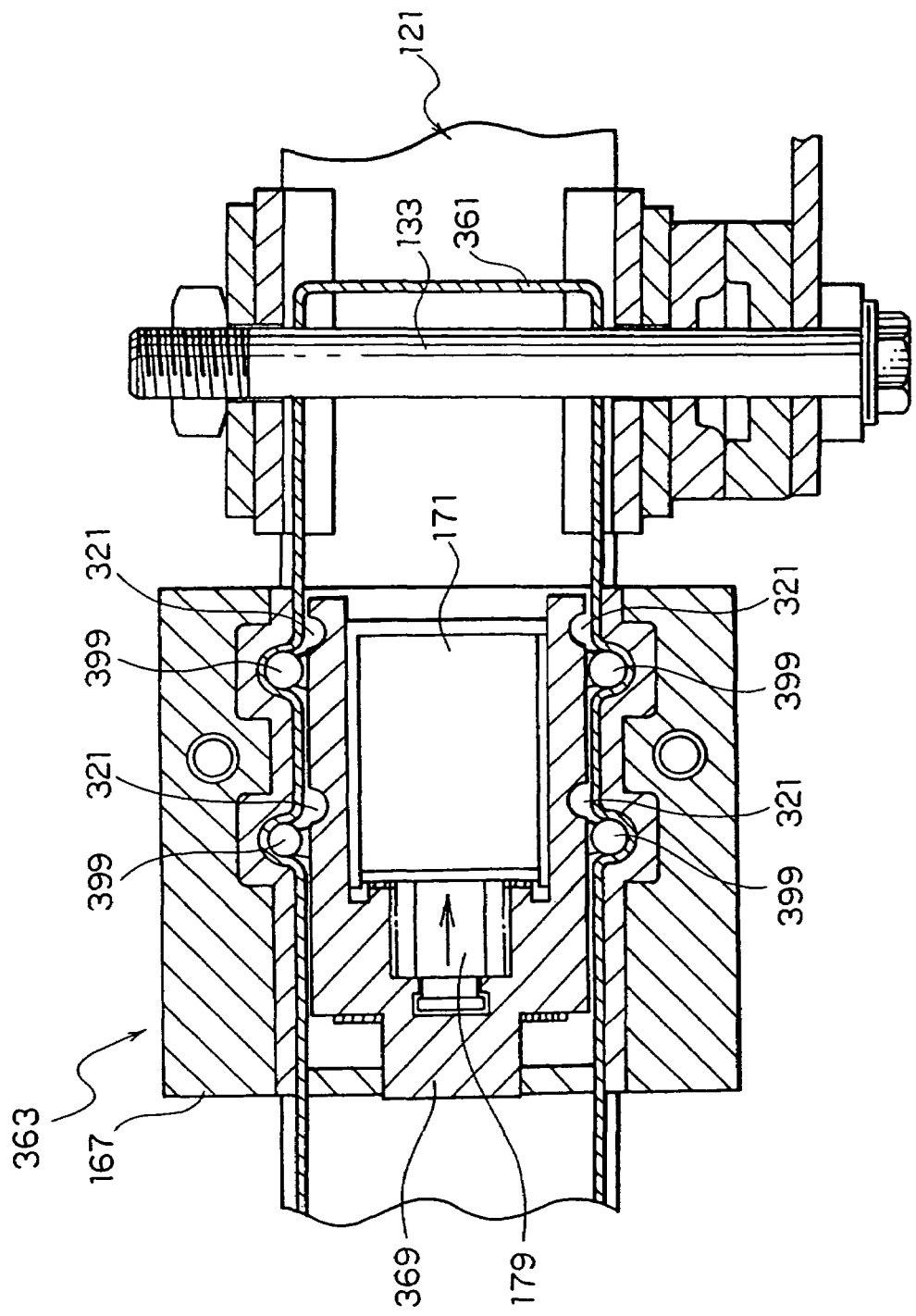
FIG. 33 is a cross-sectional view showing principal components of the steering apparatus in a seventh embodiment of the present invention.
Figure 34:
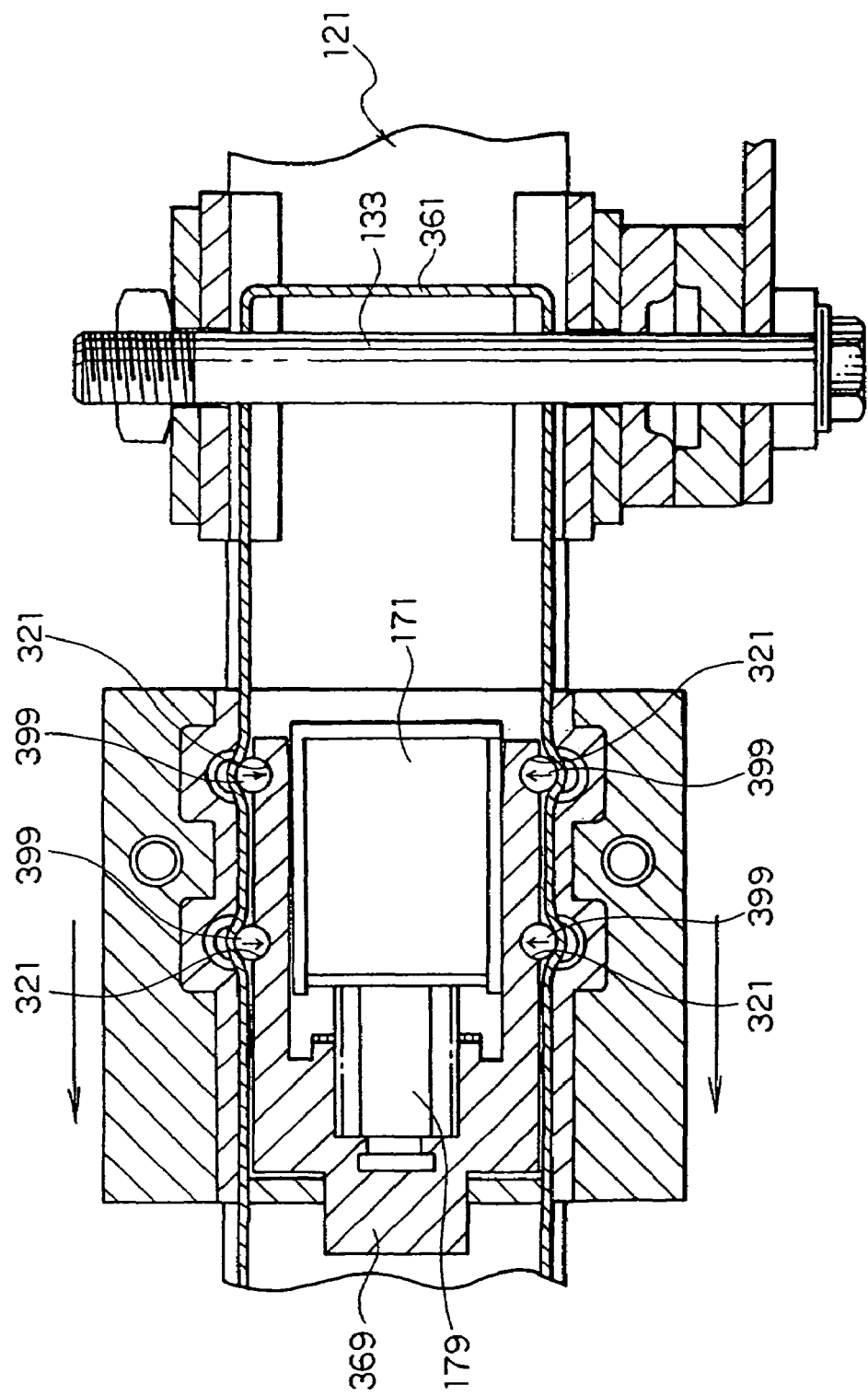
FIG. 34 is an explanatory view showing an operation of the seventh embodiment.

FIG. 33 is a cross-sectional view showing the main components of the steering apparatus in a seventh embodiment of the present invention. As shown in FIG. 33, the whole configuration of the seventh embodiment is substantially the same as that of the fifth embodiment discussed above. A difference is, however, that four pieces of movable drawing pins 399 are provided in the variable drawing device 363 and a slide block 369 takes a different shape. To be specific, the slide block 369 is formed with four semicircular recessed portions 321, and the movable drawing pins 399 are fitted in these semicircular recessed portions 321 when the slide block 369 advances. As shown in FIG. 34, however, the movable drawing pin 399 comes to a state of protruding by a predetermined quantity on the side of the energy absorbing plate 361 on this occasion also. A drawing deformation quantity can be adjusted at two stage, and the same adjustment of the operation load as in the fifth embodiment can be made. The same components in the seventh embodiment as those in the fifth embodiment are likewise marked with the same numerals.

Figure 35:
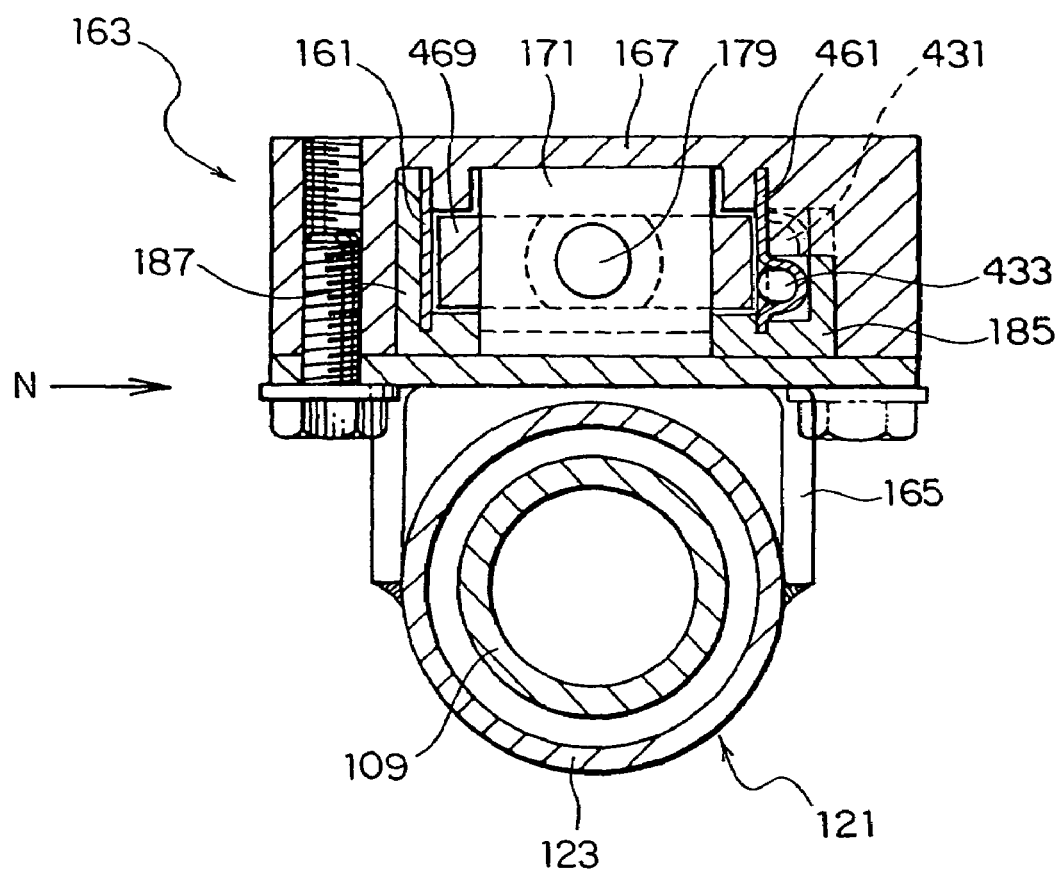
FIG. 35 is a cross-sectional view showing principal components of the steering apparatus in an eighth embodiment.
Figure 36:
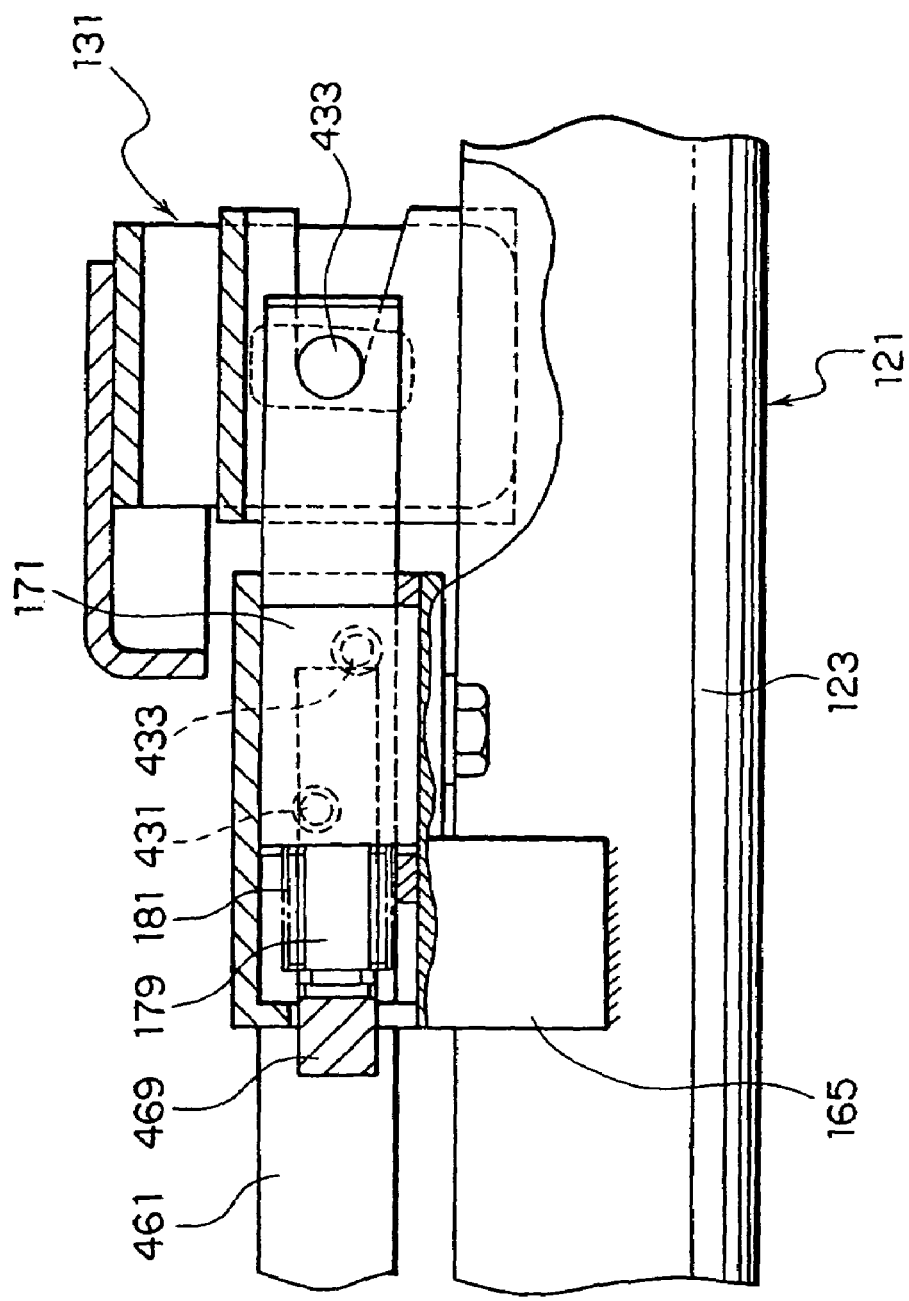
FIG. 36 is a view taken along the arrow line N in FIG. 35.

FIG. 35 is a cross-sectional view showing the steering apparatus in an eighth embodiment of the present invention. FIG. 36 is a view taken along the arrow line N in FIG. 35. As shown in these drawings, the whole configuration of the eighth embodiment is substantially the same as in the fifth embodiment discussed above. A difference is, however, that the drawing mechanism involves the use of fixed drawing balls 431 and movable drawing balls 433 each composed of steel. According to the eighth embodiment also, the movable drawing ball 433 moves close to and moves off the energy absorbing plate 461 by moving the slide block 469, thus adjusting the operation load in the same way as in the fifth embodiment. The same components in the eighth embodiment as those in the fifth embodiment are marked with the same numerals.

Figure 37:
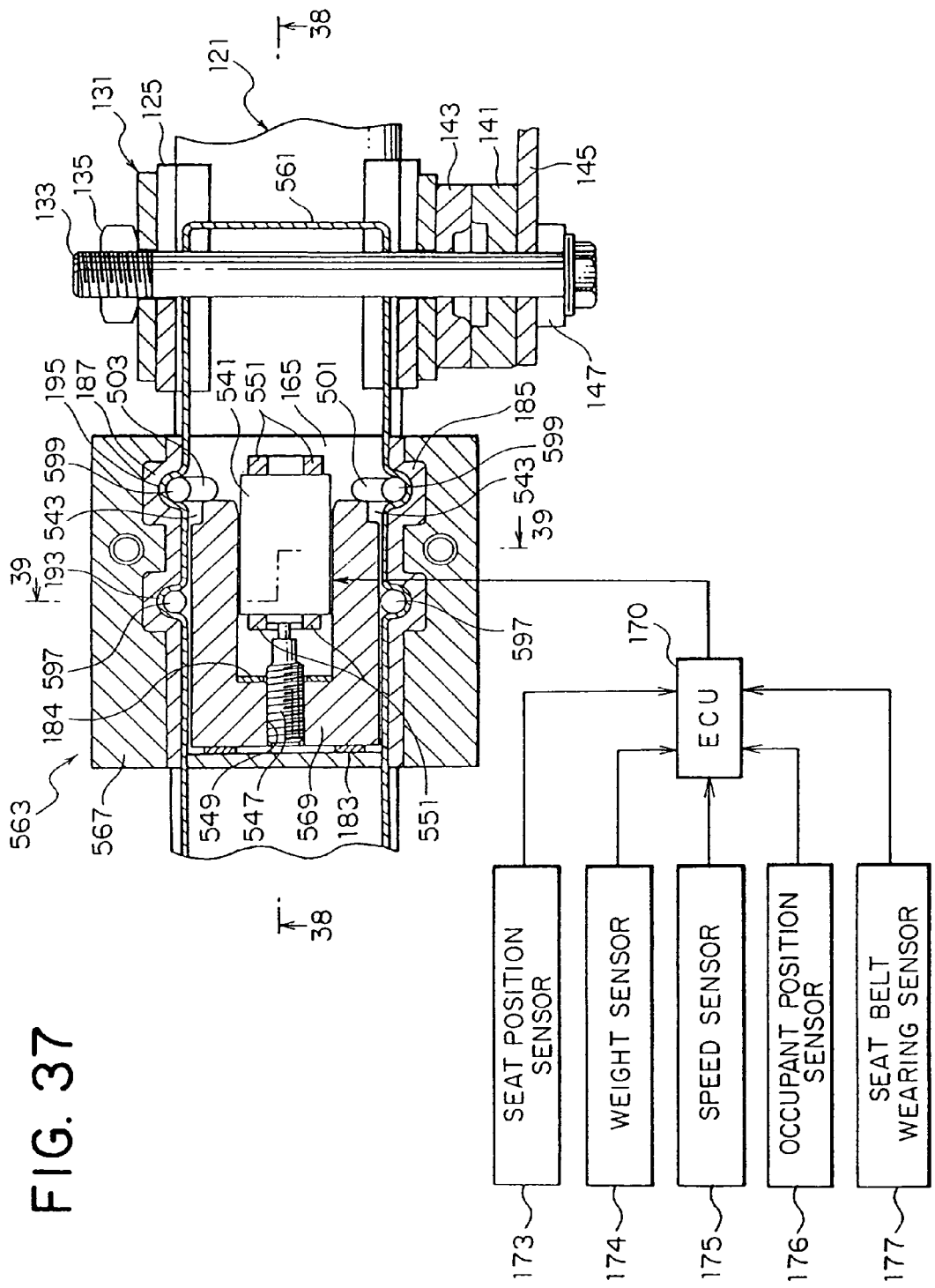
FIG. 37 is a cross-sectional view showing principal components of the steering apparatus in a ninth embodiment of the present invention.
Figure 38:
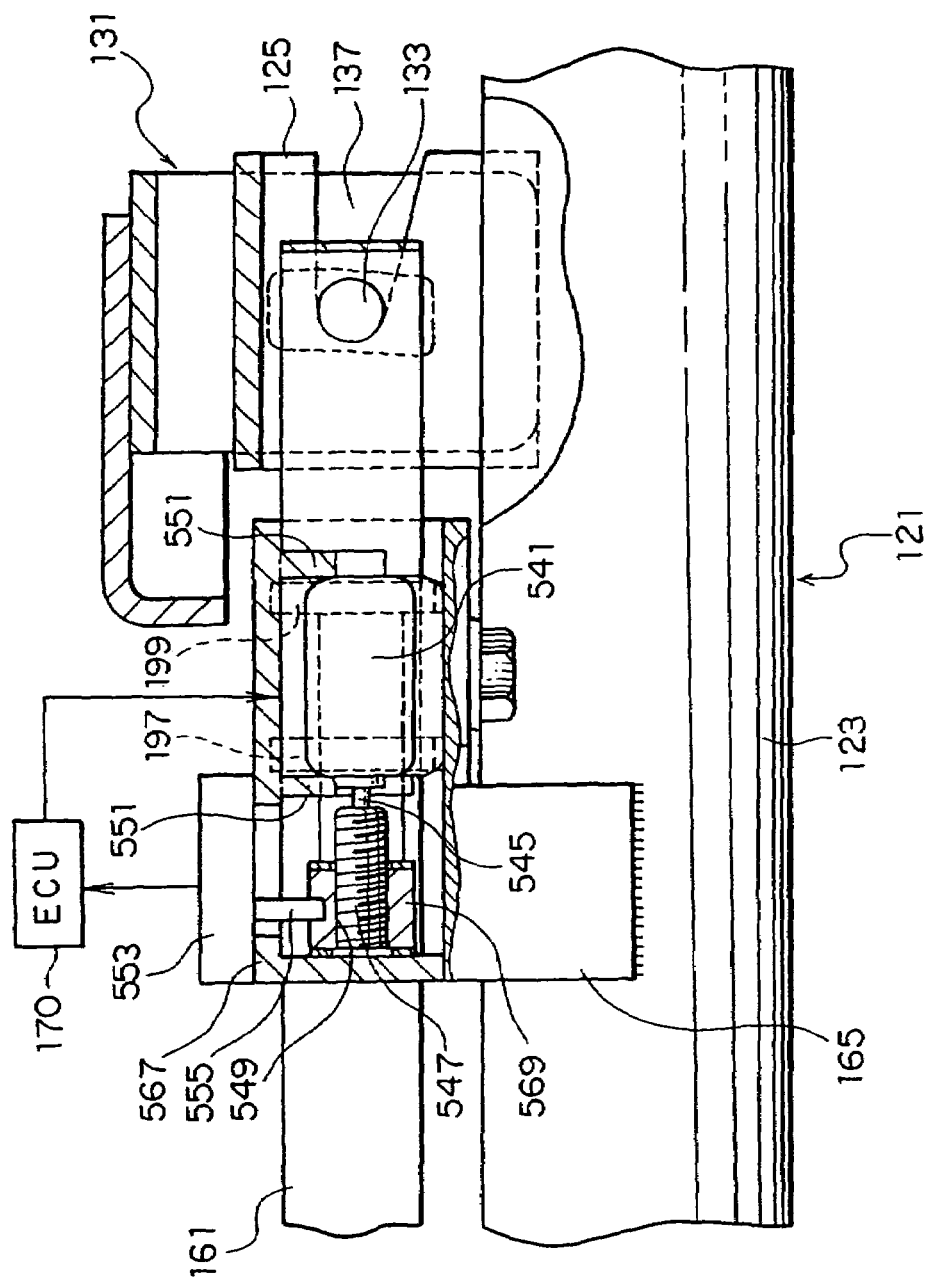
FIG. 38 is an enlarged sectional view taken along the line 38—38 in FIG. 37.
Figure 39:
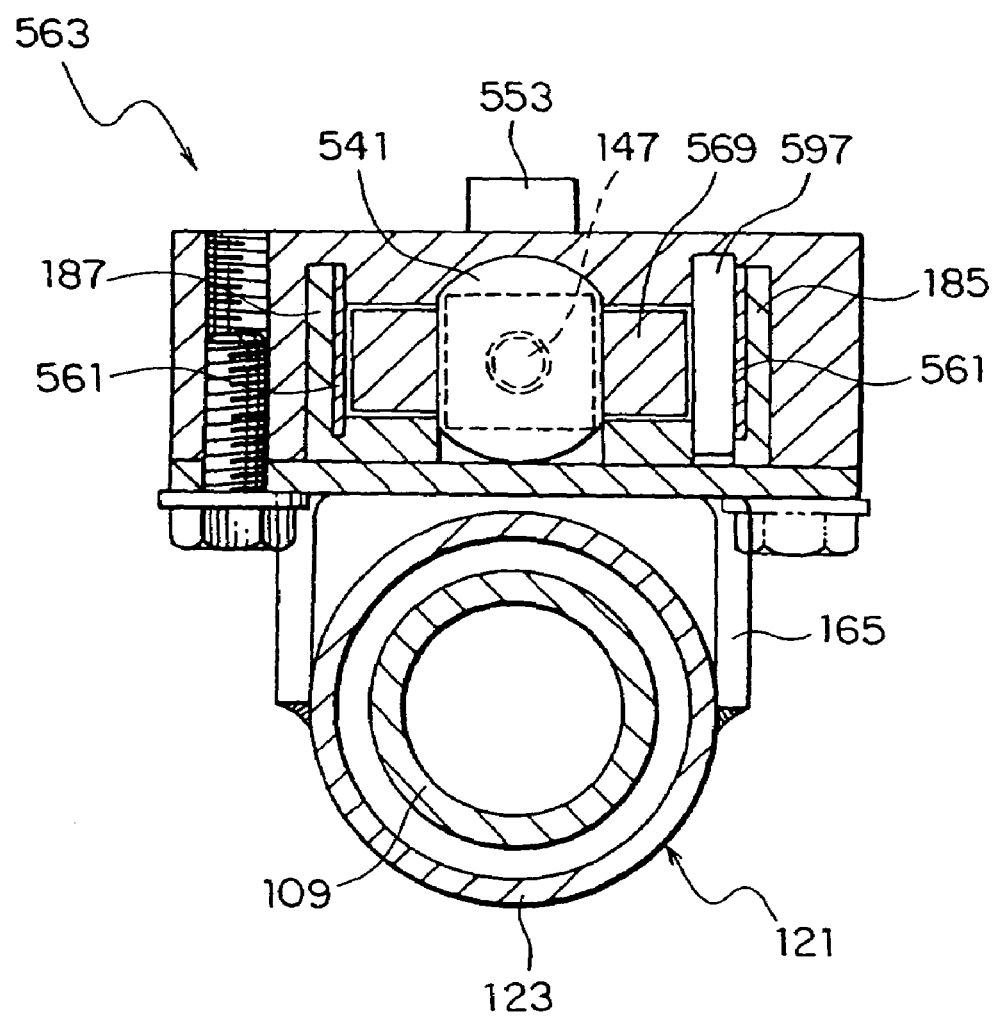
FIG. 39 is an enlarged sectional view taken along the line 39—39 in FIG. 37.

FIG. 37 is a cross-sectional view showing the steering apparatus in a ninth embodiment of the present invention. FIG. 38 is an enlarged sectional view taken along the line 38—38 in FIG. 37. FIG. 39 is an enlarged sectional view taken along the line 39—39 in FIG. 37. As shown in these drawings, the whole configuration of the ninth embodiment is substantially the same as that of the fifth embodiment, however, a variable drawing device 563 has a different structure and a different function. Namely, the variable drawing device 563 has an electric motor 541 as a substitute for the electromagnetic actuator and further has a built-in slide block 569 formed with a stepped portion 543 at its rear side end. A male screw shaft 547 is fixedly integrally fitted to a rotor shaft 545 of the electric motor 541 on one hand, and a female screw 549 screwed to the male screw shaft 547 is formed at the central portion of the slide block 569 on the other hand, whereby the slide block 569 moves forward or backward when the electric motor 541 rotates in a forward or reverse direction. What is indicated by the numeral 551 in the drawings is an engagement pawl protruded on the housing 567. The engagement pawl 551 retains and fixes the electric motor 541. Further, a member designated by the numeral 553 is a position sensor for outputting a position signal of the slide block 569 to the ECU 170, and a detection pin 555 engaging with the slide block 569 protrudes on a lower surface of the position sensor 553. The same components in the ninth embodiment as those in the fifth embodiment are likewise marked with the same numerals.

An operation of the ninth embodiment will hereinafter be explained.

Figure 40:
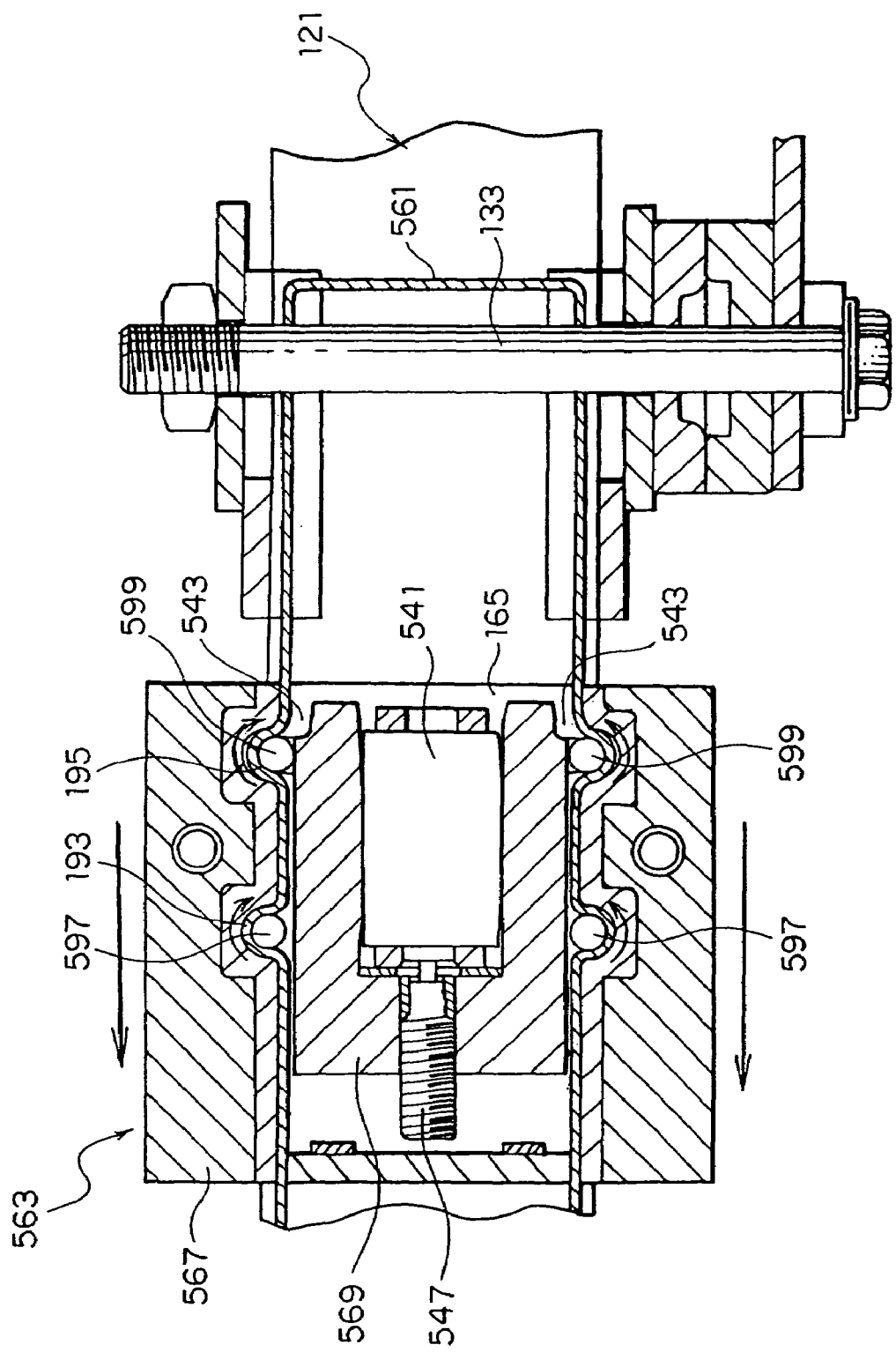
FIG. 40 is an explanatory view showing an operation of the ninth embodiment.
Figure 41:
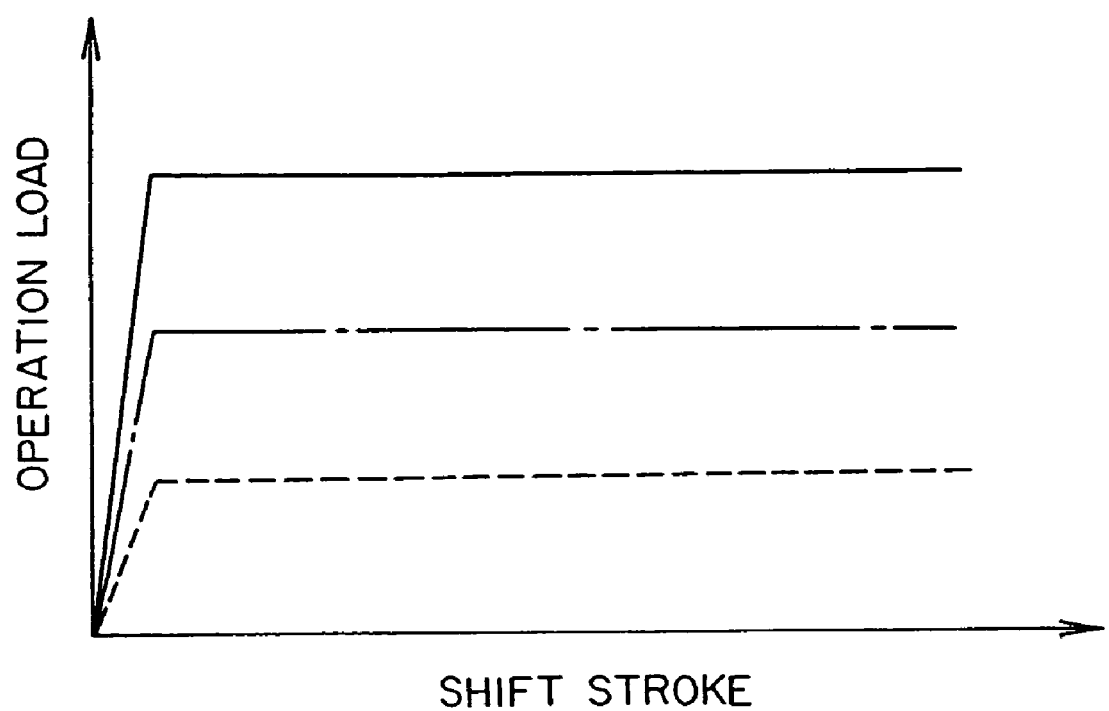
FIG. 41 is a graph showing a relationship between an operation load and a shift stroke of a variable drawing device.

When the automobile starts traveling, the ECU 170, based on detection signals of the variety of sensors 173~177 described above, repeatedly calculates a target operation load of the collision energy absorbing mechanism at a predetermined control interval. For instance, if a weight of the driver is comparatively heavy, or if a car speed is high even though the driver's weight is comparatively light, a kinetic energy of the driver at a collision increases, and therefore the target operation load increases. Then, the ECU 170 outputs a drive current to the electric motor 541 to rotate the male screw shaft 547 in the forward direction, and causes the slide block 560 to move back to a most backward position as shown in FIG. 40 on the basis of the position signal given from the position sensor 553. With this backward movement thereof, the side surface of the slide block 569 is positioned inwardly of the movable drawing pin 599, and the shift to the inside of the movable drawing pin 599 is completely restricted, thereby actualizing the absorption of the comparatively large collision energy when the driver suffers the secondary collision. FIG. 41 is a graph showing a relationship between an operation load and a shift stroke of the variable drawing device 563, wherein the solid line indicates a result of test on this occasion (in the case of the large operation load).

Figure 42:
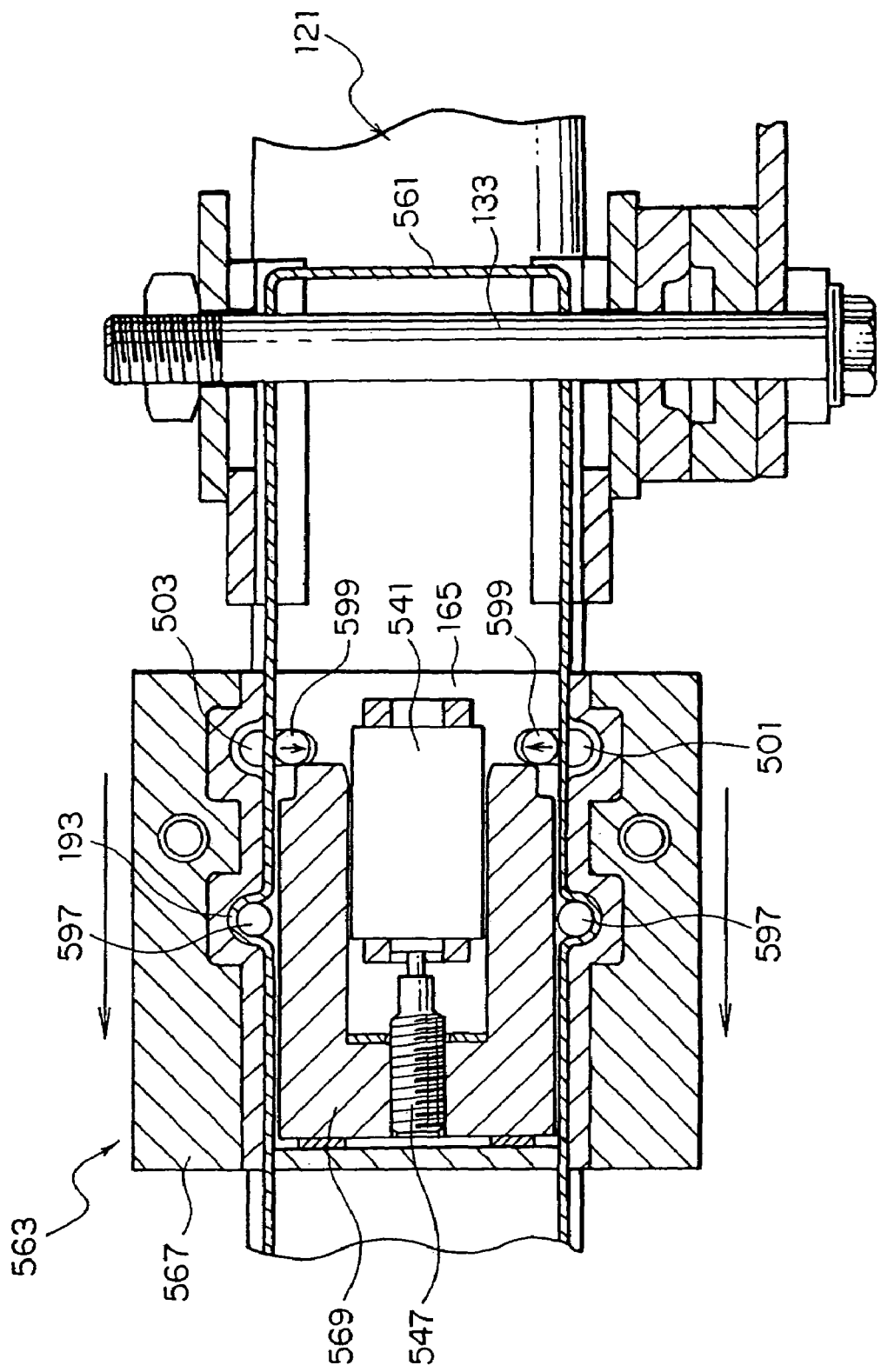
FIG. 42 is an explanatory view showing an operation of the ninth embodiment.

Further, if the driver is a small-sized women having a comparatively light weight, the kinetic energy of the driver at the collision is comparatively small, so that the target collapse load calculated by the ECU 170 decreases. Then, the ECU 170 outputs the drive current to the electric motor 541 to rotate the male screw shaft 547 in the reverse direction, and causes, as shown in FIG. 42, the slide block 569 to advance up to the most forward position on the basis of the position signal given from the position sensor 553. With this advancement, the movable drawing pins 559 become movable within elongate holes 501, 503, thereby actualizing the absorption of a comparatively small collision energy when the driver suffers the secondary collision. The broken line in FIG. 41 shows a result of test on that occasion (in the case of the small operation load).

Figure 43:
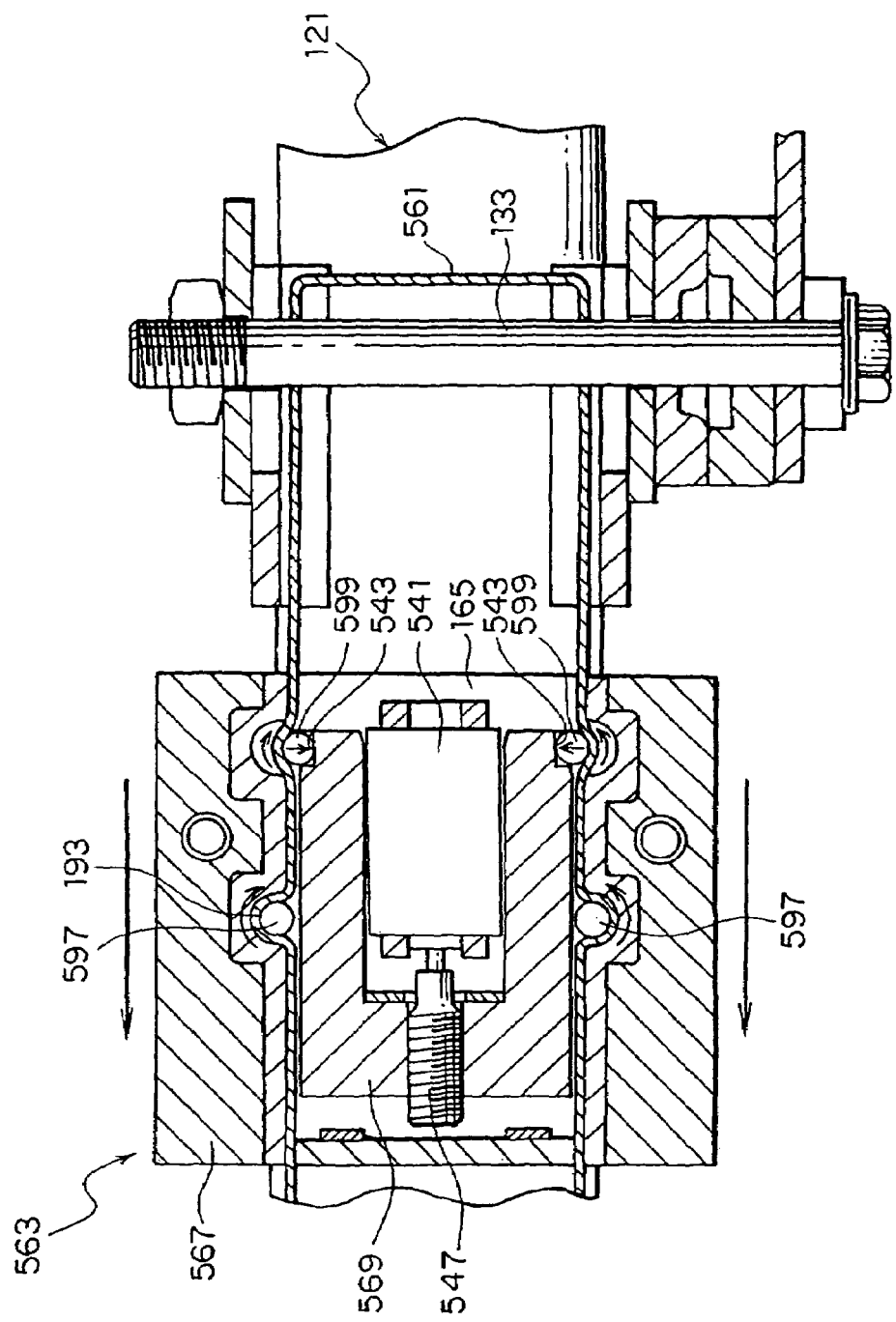
FIG. 43 is an explanatory view showing the operation of the ninth embodiment.

On the other hand, if the weight of the driver is standard, the kinetic energy of the driver at the collision becomes intermediate, and hence the target collapse load calculated by the ECU 170 becomes also intermediate. Then, the ECU 170 outputs the drive current to the electric motor 541 to rotate the male screw shaft 547 in the forward or reverse direction, and causes, as shown in FIG. 43, the slide block 569 to move to a middle position on the basis of the position signal given from the position sensor 553. With this movement, the stepped portion of the slide block 569 is positioned inwardly of the movable drawing pin 599, thereby restricting partially the shift to the inside of the movable drawing pin 599. Then, the movable drawing pins 559 become movable within the elongate holes 501, 503 till the pins 559 impinge upon the stepped portion 543. In this state, if the driver suffers the secondary collision with the steering wheel 111, the movable drawing pins 599 come to a state of protruding by a predetermined quantity on the side of the energy absorbing plates 561, thereby actualizing the absorption of an intermediate collision energy at the driver's secondary collision. The two-dotted line in FIG. 41 shows a result of test on that occasion (in the case of the intermediate operation load).

Figure 44:
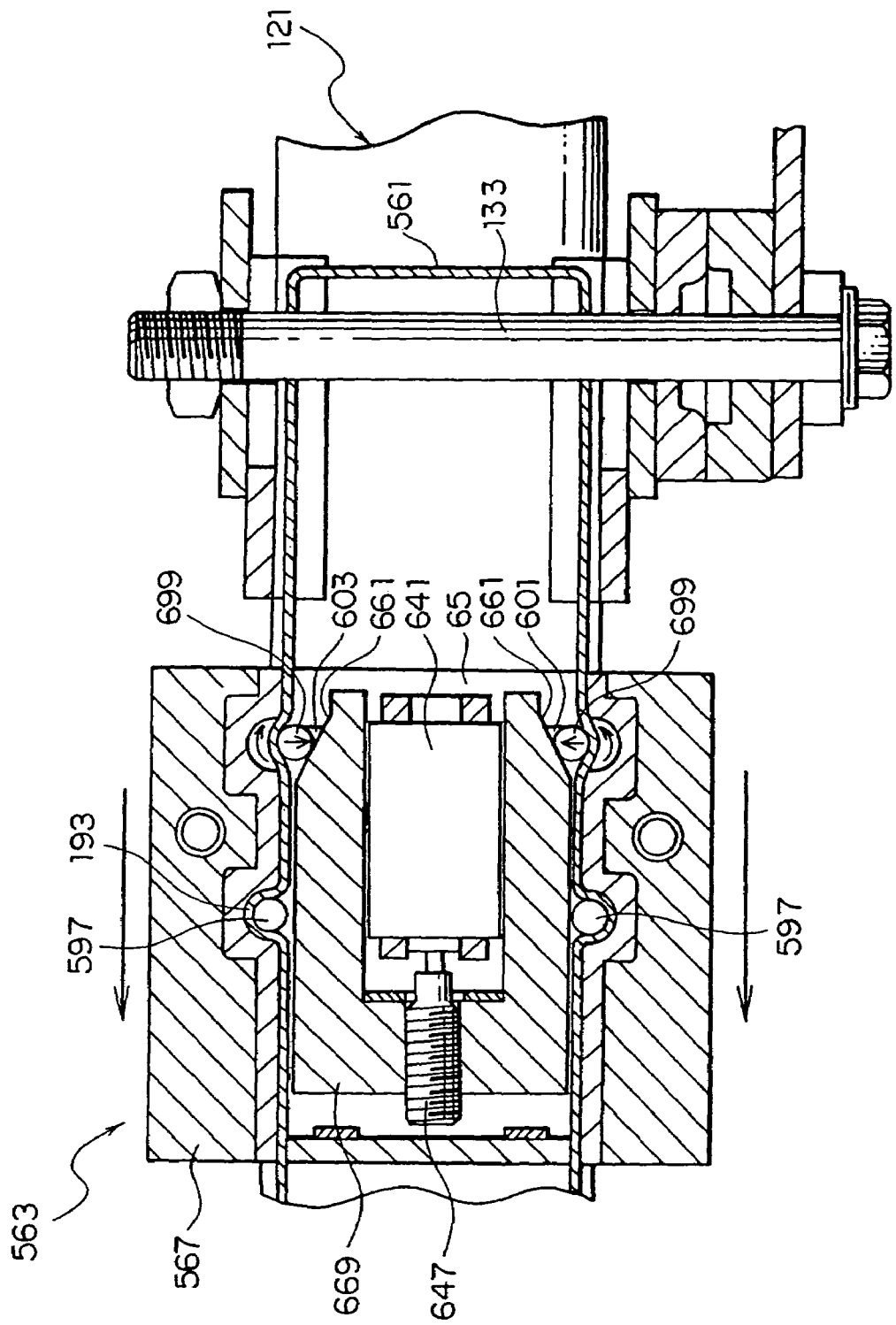
FIG. 44 is a cross-sectional view showing principal components of the steering apparatus in a tenth embodiment of the present invention.

FIG. 44 is a cross-sectional view showing the steering apparatus in a tenth embodiment of the present invention. As shown in FIG. 44, the configuration of the tenth embodiment is substantially the same as that of the ninth embodiment, however, the slide block 669 is formed with an inclined surface 661 as a substitute for the stepped portion. According to the tenth embodiment, the electric motor 641 moves the slide block 669 forward and backward by the predetermined quantity, and movable drawing balls 699 are thereby moved forward and backward within elongate holes 601, 603 with respect to the energy absorbing plate 561. Thus, the operation load can be adjusted in an infinitely variable manner. The same components in the tenth embodiment as those in the eighth embodiment are likewise marked with the same numerals.

According to the fifth through tenth embodiments, the slide block is driven by the solenoid and the electric motor in order to shift the drawing members, thus adjusting the operation load. A cam ring etc may also be used in place of the slide block. Further, in contrast with the embodiments discussed above, the energy absorbing plate may be fixed to the steering column, while the variable drawing device may be fixed to the car body. In addition, the specific configurations of the steering column apparatus and of the energy absorption quantity adjusting mechanism and the material and the shape of the drawing member, may properly be modified within the range of the present invention without departing from the concept of the invention.

As discussed above, the impact absorbing type steering column apparatus in the fifth through tenth embodiments of the present invention includes the steering column for rotatably supporting the steering shaft, the car body sided bracket, fixed to the car body, for supporting the steering column and allowing the steering column to get released therefrom when the impact load equal to or larger than the predetermined value acts, and the collision energy absorbing mechanism, provided between the steering column and the car body sided bracket, for absorbing the energy of the secondary collision of the occupant by plastically deforming the energy absorbing members each composed of the metal plate or metal wire with the drawing members with the shift of the steering column. The impact absorbing type steering column apparatus further includes the energy absorption quantity adjusting mechanism for changing the absorption quantity of the collision energy. Therefore, for instance, if the weight of the driver is heavy, the operation load is increased by setting large the drawing quantity of the energy absorbing member. By contrast, if the weight of the driver is light, the operation load is decreased by setting small the drawing quantity of the energy absorbing member. The steering column can be thus properly advanced.

Figure 45:
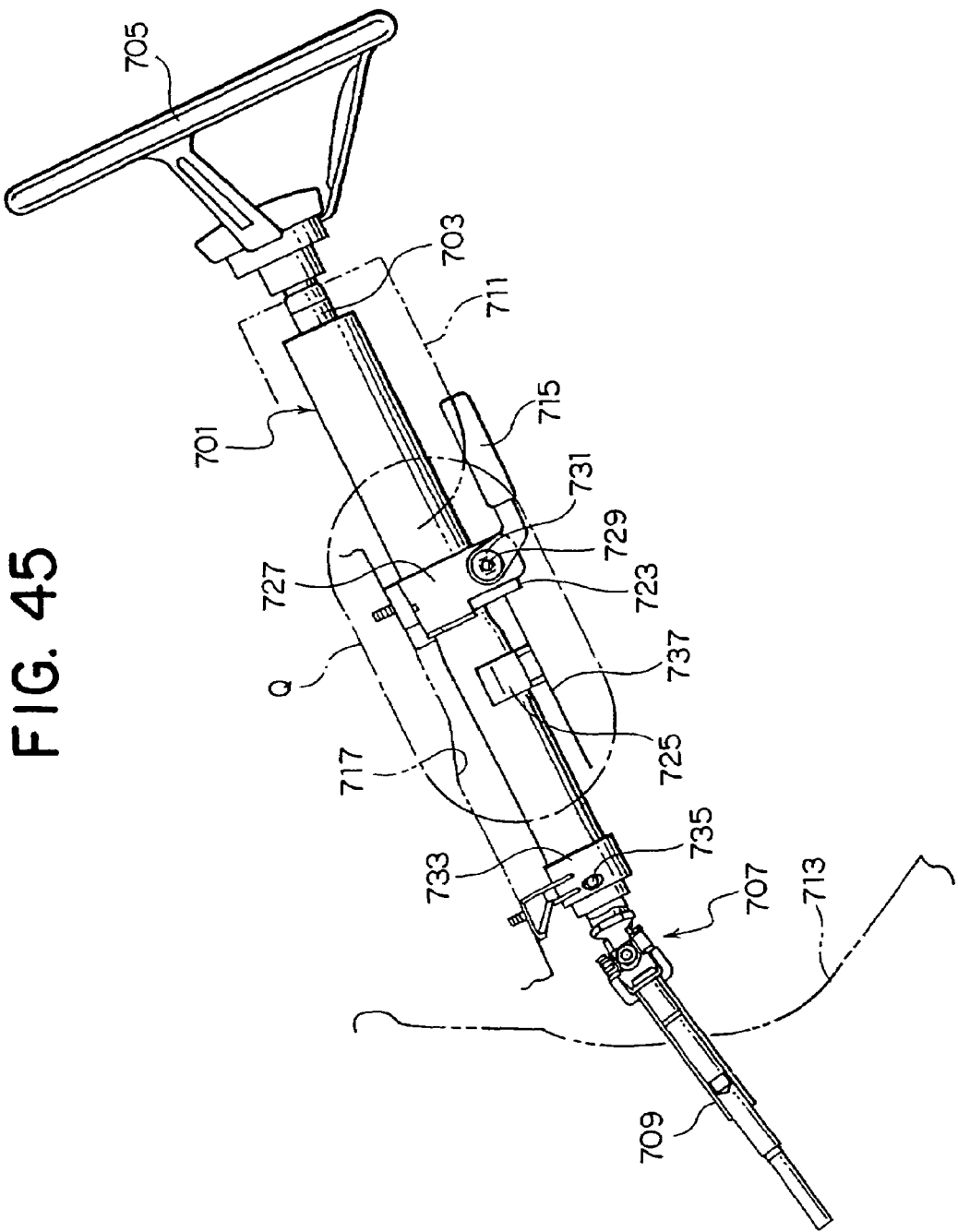
FIG. 45 is a side view showing the steering apparatus on the side of the car cabin in an eleventh embodiment of the present invention.

FIG. 45 is a side view showing the steering apparatus on the side of the car room in an eleventh embodiment of the present invention. A member indicated by the numeral 701 in FIG. 45 is a steering column for rotatably holding an upper steering shaft 703. A steering wheel 705 is secured to an upper side end of the upper steering shaft 703 on one hand, and a lower steering shaft 709 is connected via a universal joint 707 to a lower side end of the shaft 703. Referring again to FIG. 45 there are shown a column cover 711 for covering an upper portion of the steering column 701, a dashboard 713 for partitioning the car cabin from the engine room, and a tilt lever 715 used for a tilt operation of the steering column 701.

The steering column 701 is manufactured in such a way that a distance bracket 723 composed of a steel plate is welded to a substantially central portion of a steel column tube 721, and a steel plate bracket 725 is likewise welded to a portion just anterior (left side in FIG. 1) to the distance bracket 723. The distance bracket 723 is held by a tilt bracket 727 as a steel plate welding structural member fixed to a car body sided member 717. The distance bracket 723 is forced to be fixed by a predetermined fastening force given by a tilt bolt 729 penetrating the tilt bracket 727 and a nut 731. Further, a front portion of the steering column 701 is internally fitted and held within by a lower bracket 733 fixed to the car body sided member 717, and is also positioned in the axial direction by a rubber bush 735 serving as a tilt hinge. A member indicated by the numeral 737 in FIG. 1 is an energy absorbing plate made of steel band plate as well as being a component of a collision energy absorbing mechanism 739.

In this steering apparatus, when the driver rotates the steering wheel 705, the rotation thereof is transferred to an unillustrated steering gear via the upper steering shaft 703 and the lower steering shaft 709. The steering gear has a built-in rack-and-pinion mechanism for translating the inputted rotation into a rectilinear motion, and a steering angle of the wheel is changed via a tie rod etc, thus performing the steering. Note that the steering gear may take a variety of known types such as a ball screw type, a worm roller etc in addition to the rack and pinion type.

Figure 46:
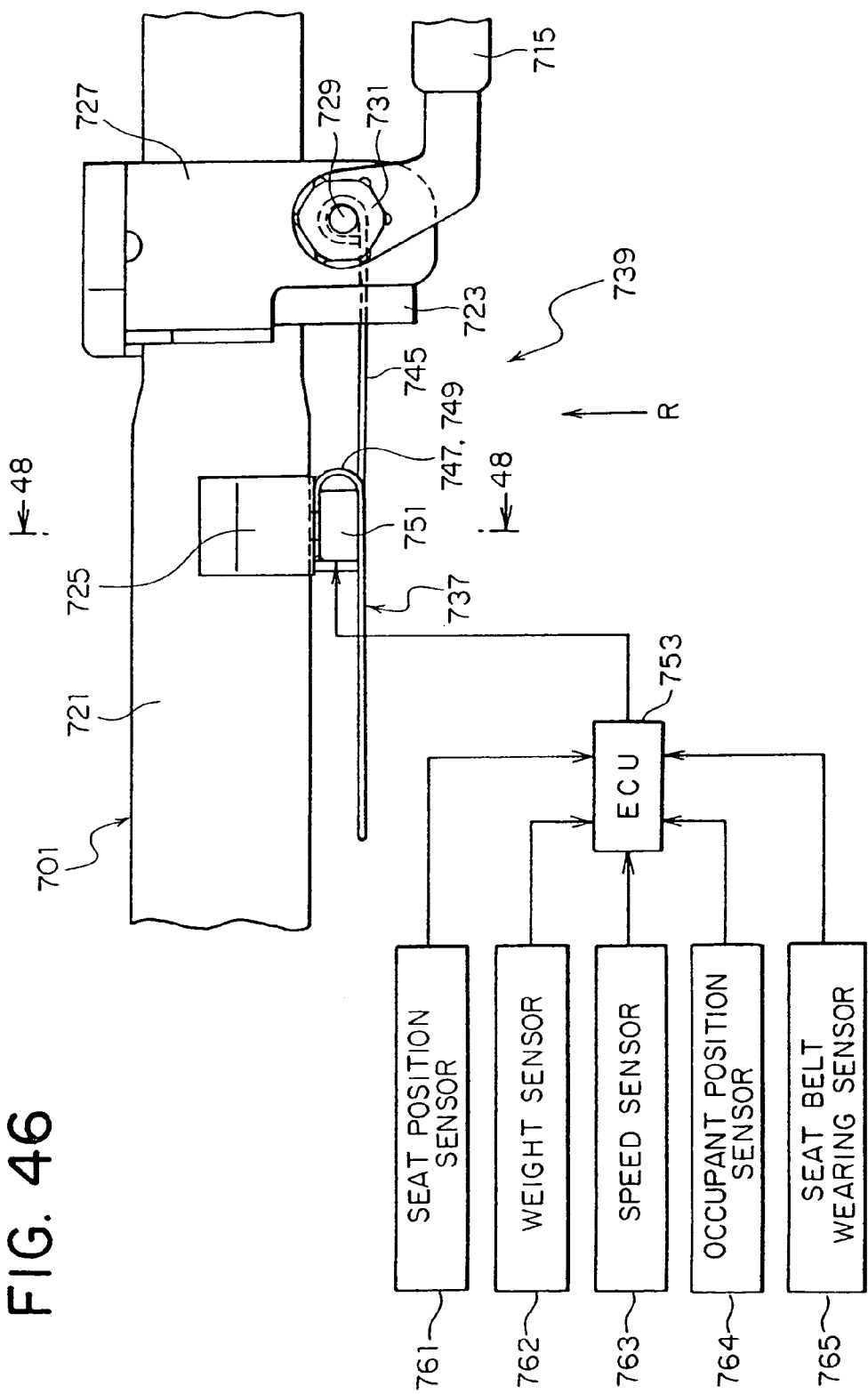
FIG. 46 is an enlarged view showing a portion Q in FIG. 45.
Figure 47:
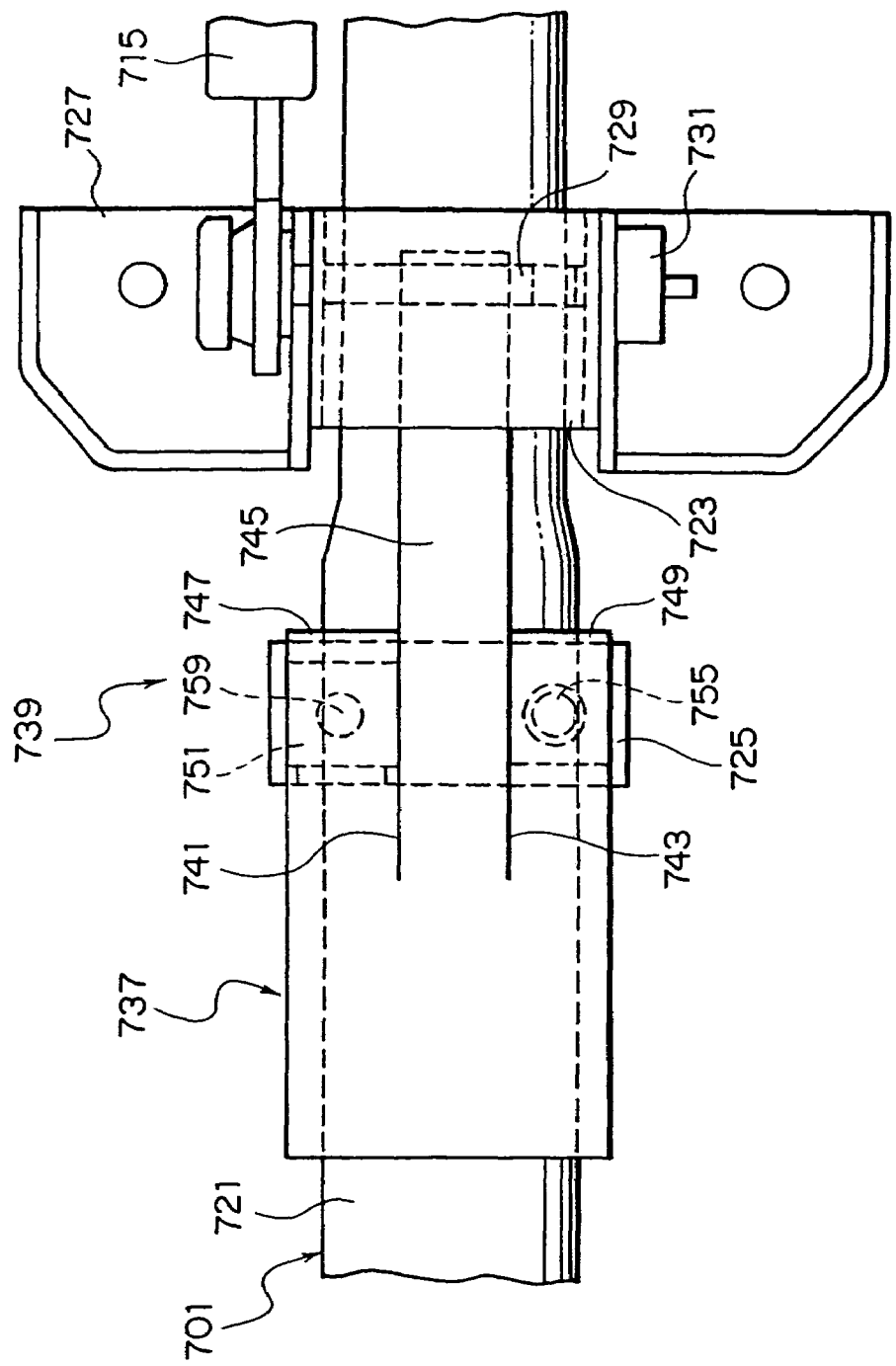
FIG. 47 is a view taken along the arrow line R in FIG. 46.
Figure 48:
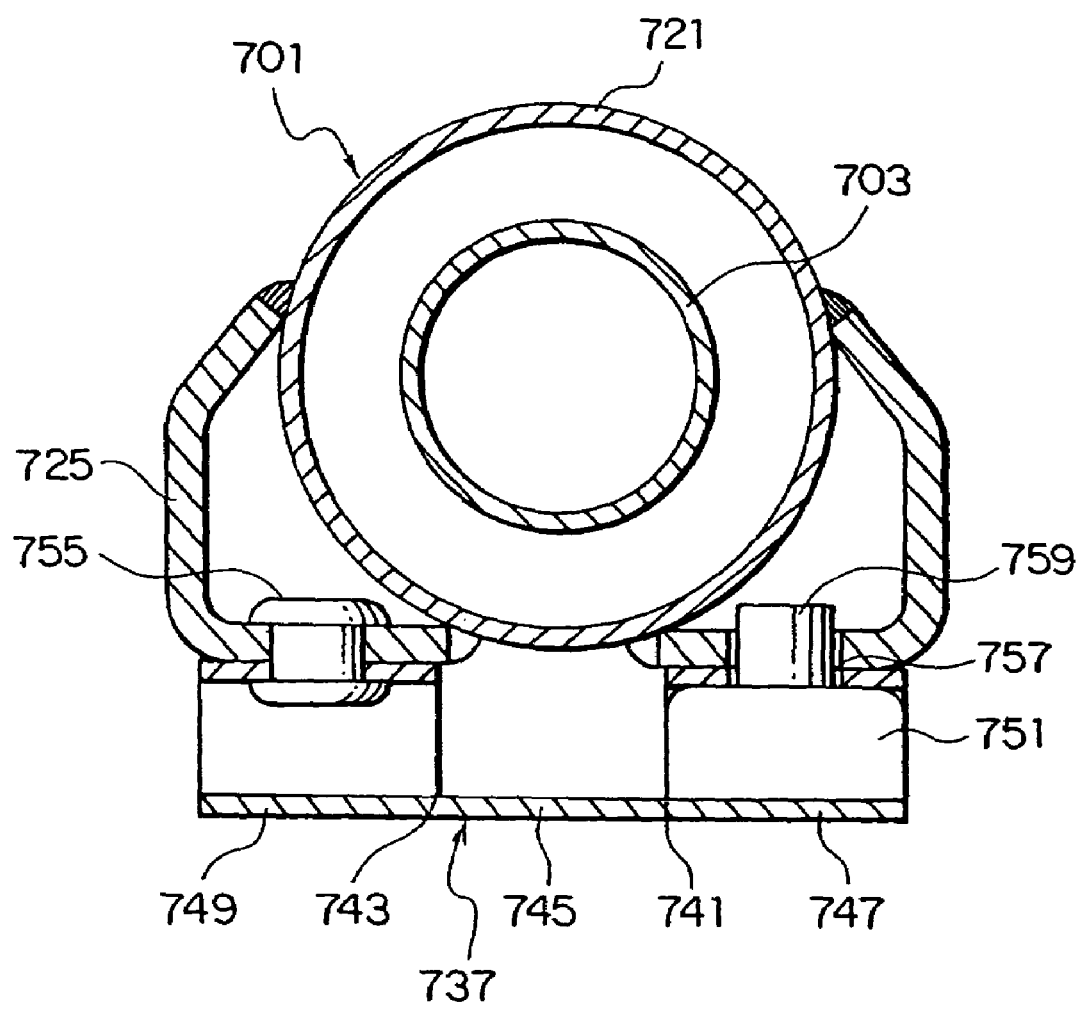
FIG. 48 is a sectional view taken along the line 48—48 in FIG. 46.

FIG. 46 is an enlarged view of a portion Q in FIG. 45. FIG. 47 is a view taken along an arrow line R in FIG. 46. FIG. 48 is a sectional view taken along the line 48—48 in FIG. 46. As shown in these drawings, a rear portion of the energy absorbing plate 737 is divided by a pair of left and right slits 741, 743 into a center lip 745 and left and right side lips 747, 749. A rear side end of the center lip 745 is turned round and thus fixed, while the left and right side lips 747, 749 are bent in a U-shape and respective side ends thereof are connected to the plate bracket 725. The numeral 751 in FIGS. 46 through 48 represents an electromagnetic actuator (which will hereinafter be referred to as a solenoid) driven under control of an ECU (Electronic Control Unit) 753.

As shown in FIG. 48, the left side lip 749 of the energy absorbing plate 737 is fixed to the plate bracket 725 by a rivet 755. On the other hand, the right side lip 747 of the energy absorbing plate 737 is connected to the plate bracket 725 through a plunger 759 of the solenoid 751 that is fitted into a through-hole 757 formed in its side end. Note that in addition to a seat position sensor 761, at least one of a weight sensor 762, a car speed sensor 763, an occupant position sensor 764, a seatbelt wearing sensor 765, is connected to the ECU 753.

An operation of the eleventh embodiment will hereinafter be described.

When the automobile starts traveling, the ECU 753, based on detection signals of the variety of sensors 761~765 described above, repeatedly calculates a target operation load of the collision energy absorbing mechanism 739 at a predetermined control interval. For instance, if a weight of the driver is comparatively heavy, or if a car speed is high even though the driver's weight is comparatively light, a kinetic energy of the driver at a collision increases, and therefore the target operation load increases. Then, the ECU 753 does not output the drive current, and lets, as shown in FIG. 48, the plunger 759 protruded from the solenoid 751. The right side lip 747 is thereby connected to the plate bracket 725 by the plunger 759 fitted into the through-hole 757.

Figure 49:
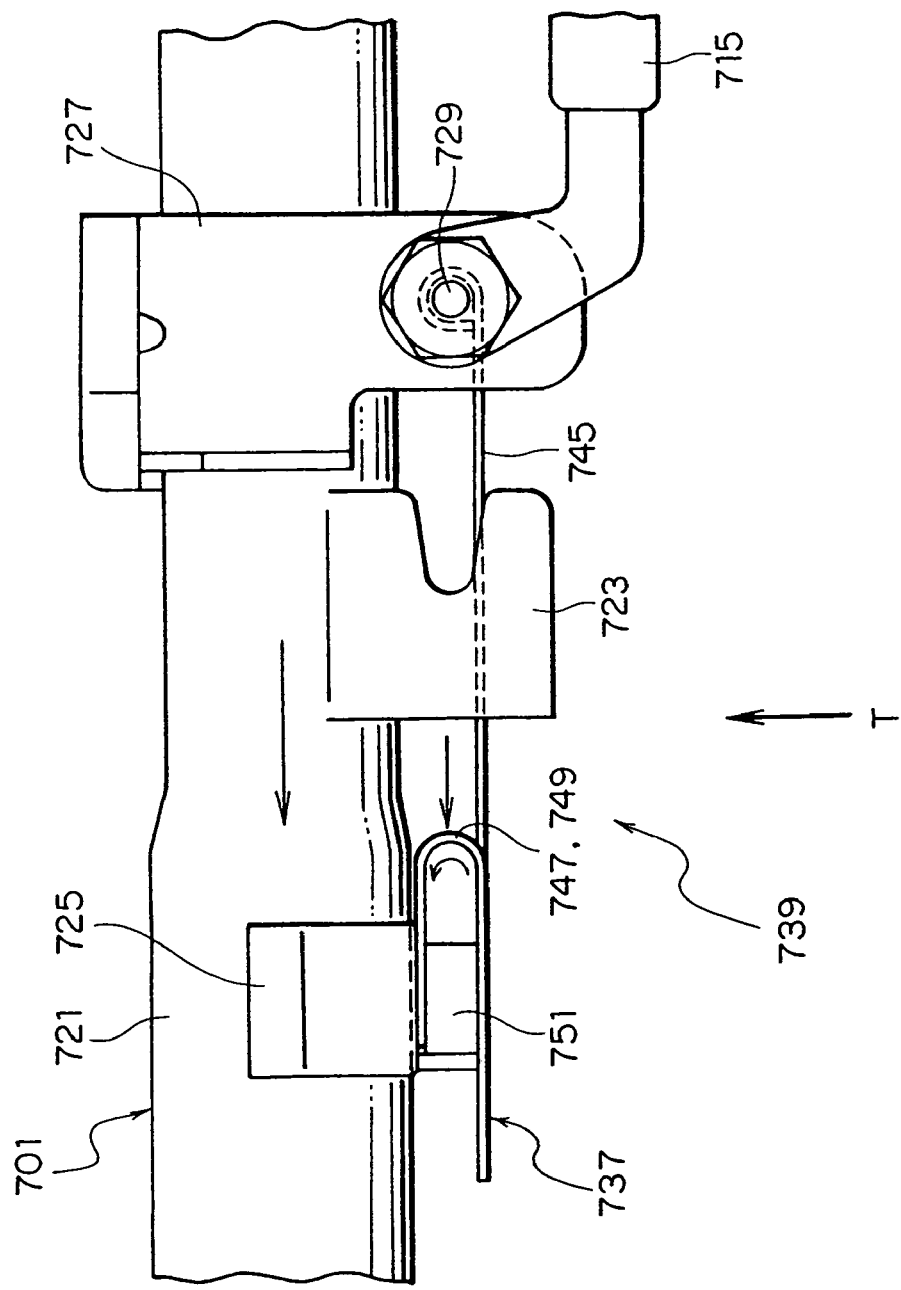
FIG. 49 is an explanatory view showing an operation of the eleventh embodiment.
Figure 50:
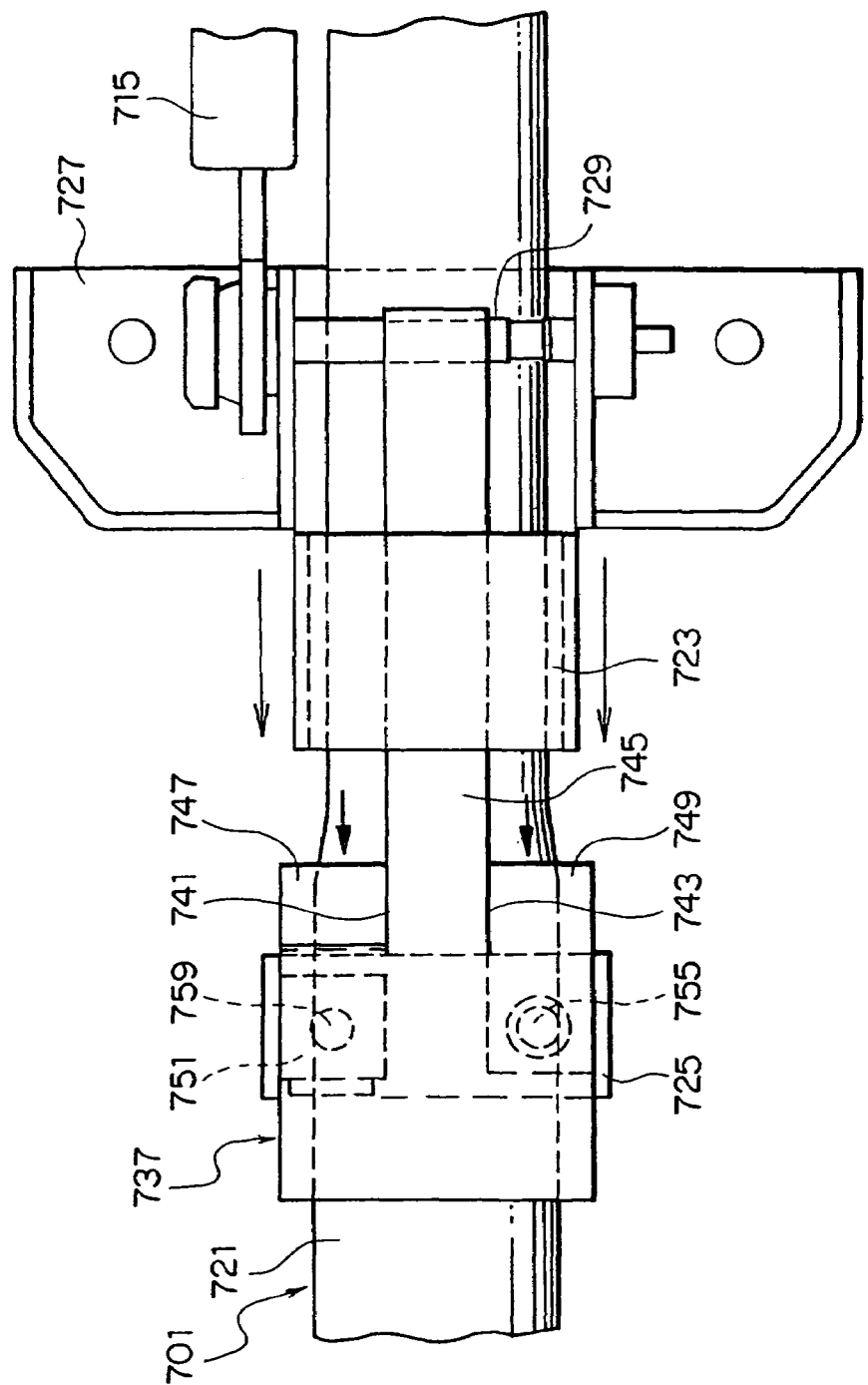
FIG. 50 is a view taken along the arrow line T in FIG. 49.

In this state, if the automobile collides with other automobile or an obstacle on the road, the driver suffers a secondary collision with the steering wheel 5 by its inertia. With its impact, as shown in FIGS. 49 and 50 (taken along the arrow line T in FIG. 49), the distance bracket 723 gets released forward from the tilt bracket 731, and a front portion of the column tube 721 fractures the rubber bush 735, and the steering column 701 starts advancing.

Figure 51:
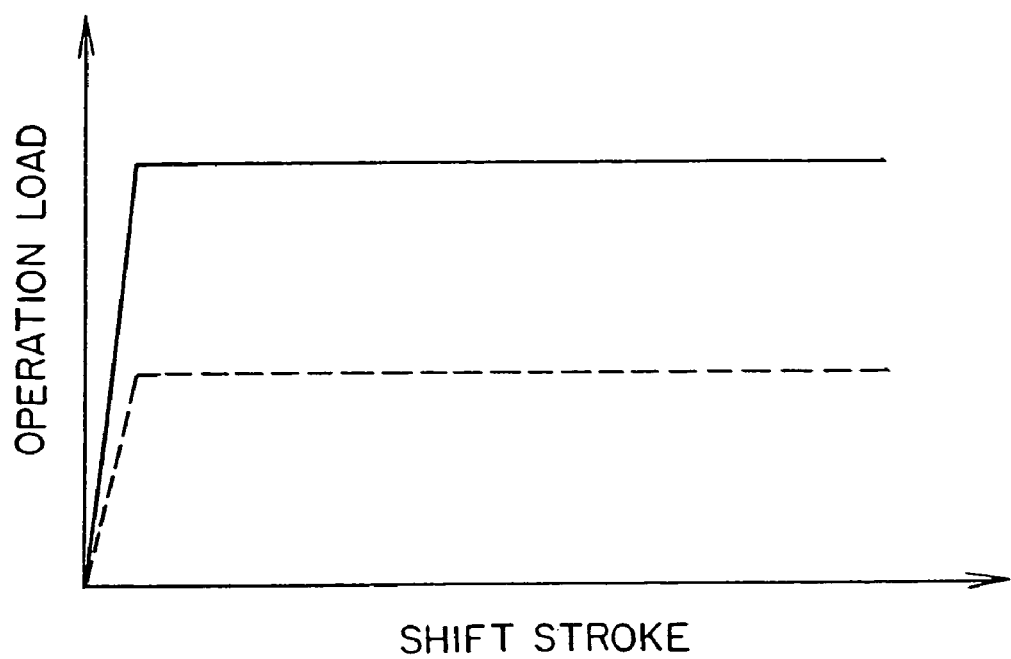
FIG. 51 is a graph showing a relationship between an operation load and a shift stroke of an collision energy absorbing mechanism.

Then, the left and right side lips 747, 749 connected to the plate bracket 725 advance in a way that changes their bending positions with respect to the center lip 745 fixed by the tilt bolt 729. The energy absorbing plate 737 is fractured in the form of being torn up at the portions of the left and right slits 741, 743, thereby actualizing the absorption of the comparatively large secondary collision energy with the resistance against the bending deformation. FIG. 51 is a graph showing a relationship between an operation load and a shift stroke of the collision energy absorbing mechanism 739, wherein the solid line indicates a result of test on that occasion (in the case of the large operation load).

Figure 52:
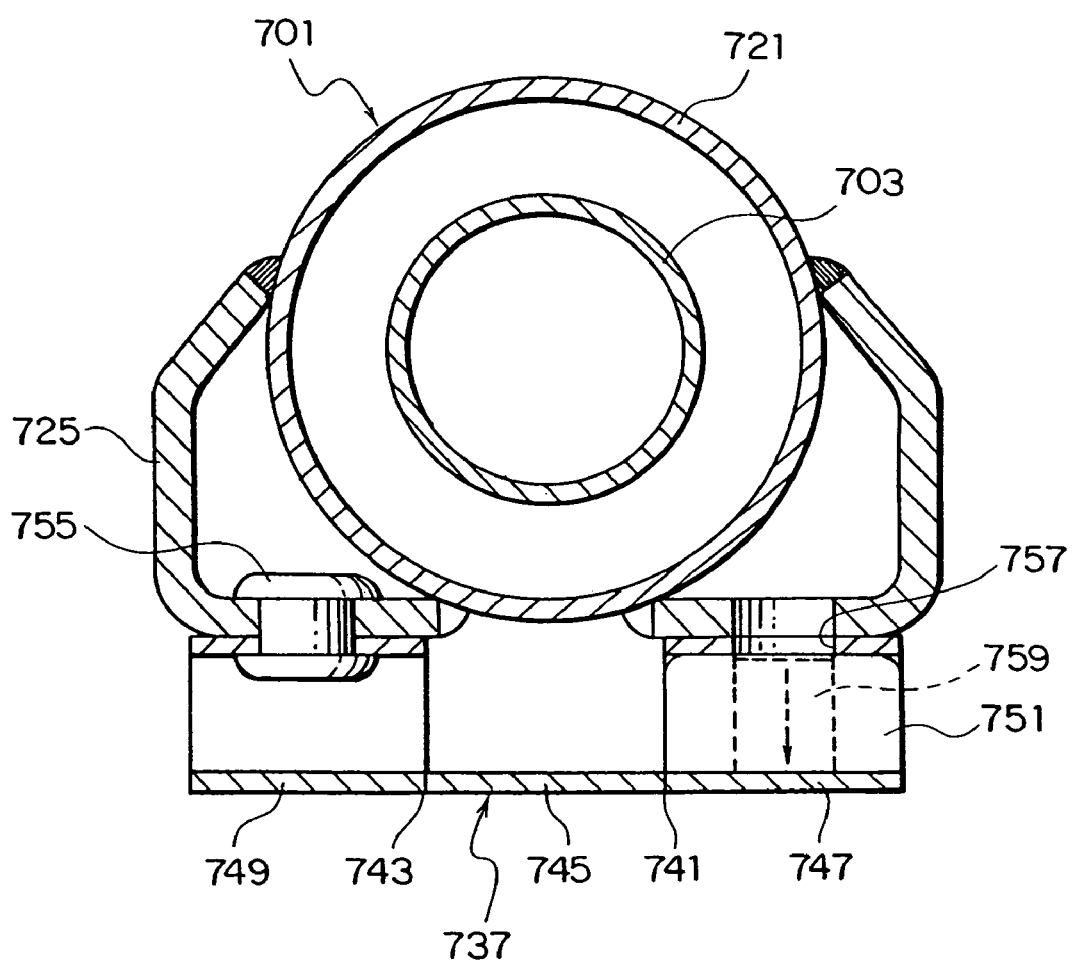
FIG. 52 is an explanatory view showing the operation of the eleventh embodiment.

By contrast, if the driver is a small-sized women having a comparatively light weight, the kinetic energy of the driver at the collision is comparatively small, so that the target operation load calculated by the ECU 753 decreases. Then, the ECU 753 outputs the drive current to the solenoid 751, whereby the plunger 759 is, as shown in FIG. 52, attracted by the magnetic force into the solenoid 751. The plunger 759 is thereby disengaged from the through-hole 757, and the right side lip 747 is disconnected from the plate bracket 725.

Figure 53:
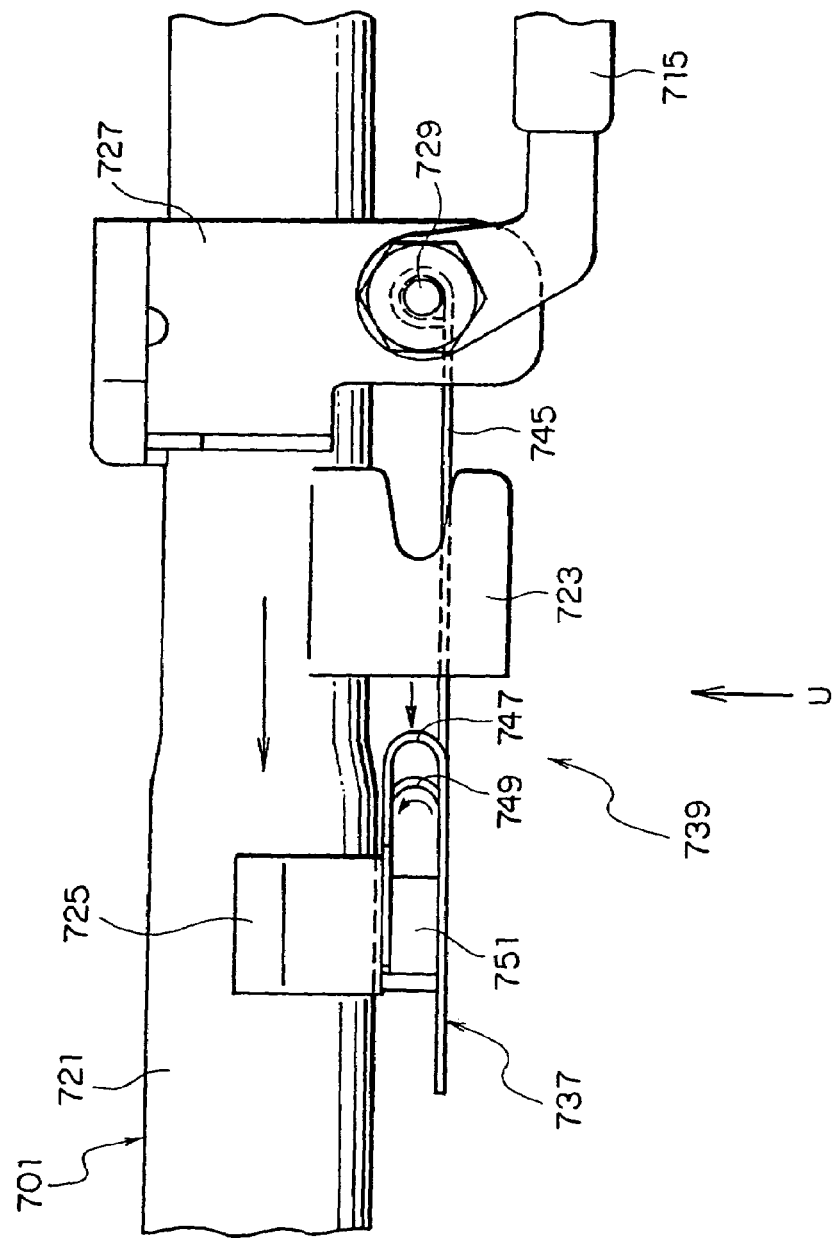
FIG. 53 is an explanatory view showing the operation of the eleventh embodiment.
Figure 54:
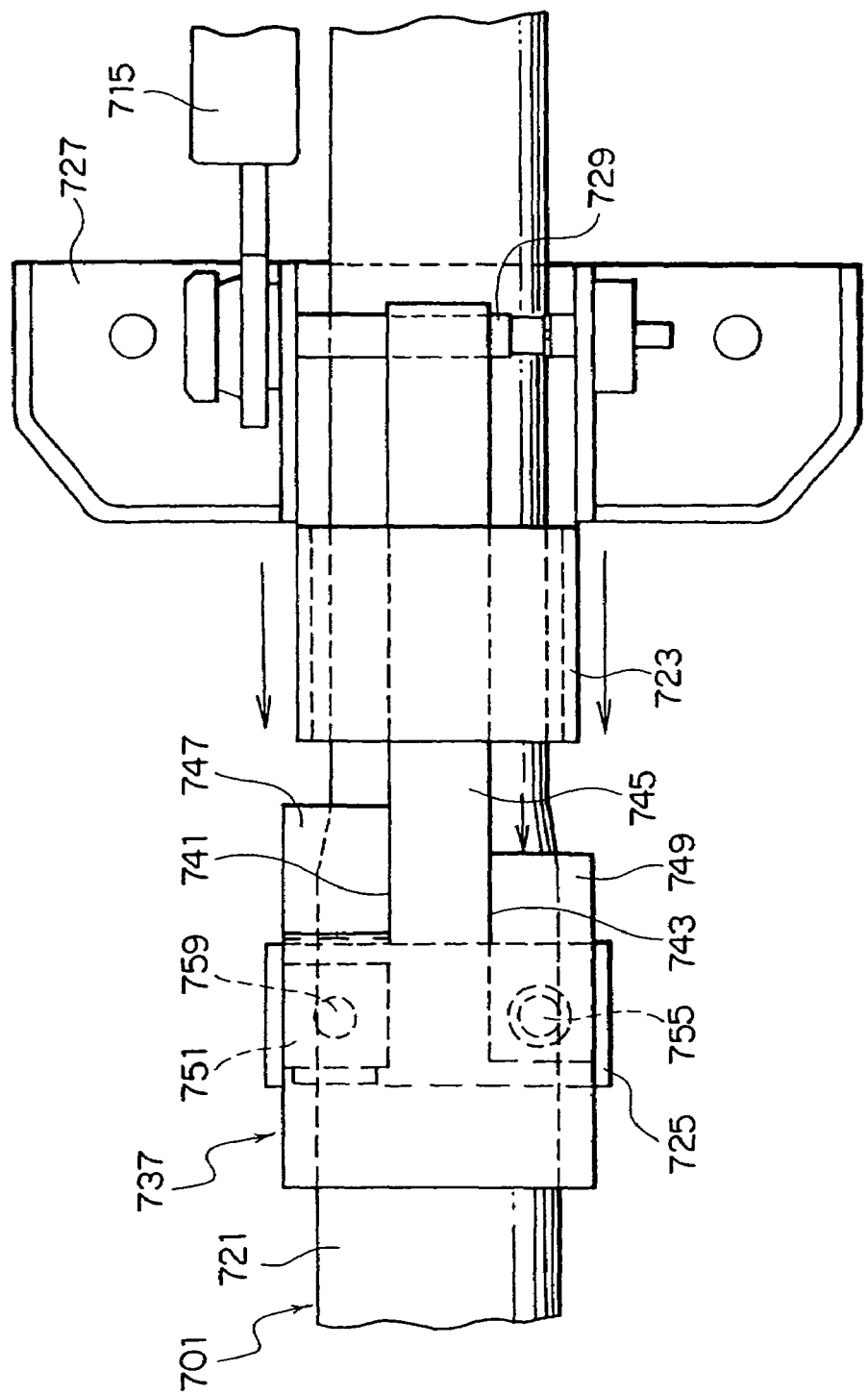
FIG. 54 is a view taken along the arrow line U in FIG. 53.

In this state, if the automobile collides with other automobile or the obstacle on the road, as in the process described above, the steering column 701 gets released and advances. In this case, however, the right side lip 747 is not engaged with the plunger 759, and hence, as shown in FIGS. 53 and 54 (taken along the arrow line U in FIG. 53), the right side lip 747 is released from the plate bracket 725 and advances while keeping its initial shape.

Therefore, it follows that the energy absorbing plate 737 is, with the advancement of the left side lip 749 with respect to the center rip 45, fractured only at the portion of the left slit 743, resulting in a decrease in the secondary collision energy absorption quantity. As a consequence, even though the driver is the small-sized women, the steering column 701 smoothly advances, and it never happens that a large impact is applied upon the breast and the head of the driver. A broken line in FIG. 51 indicates a result of test on that occasion (in the case of the small collapse load), wherein it can be understood that the small operation load becomes significantly small with respect to the large operation load.

Figure 55:
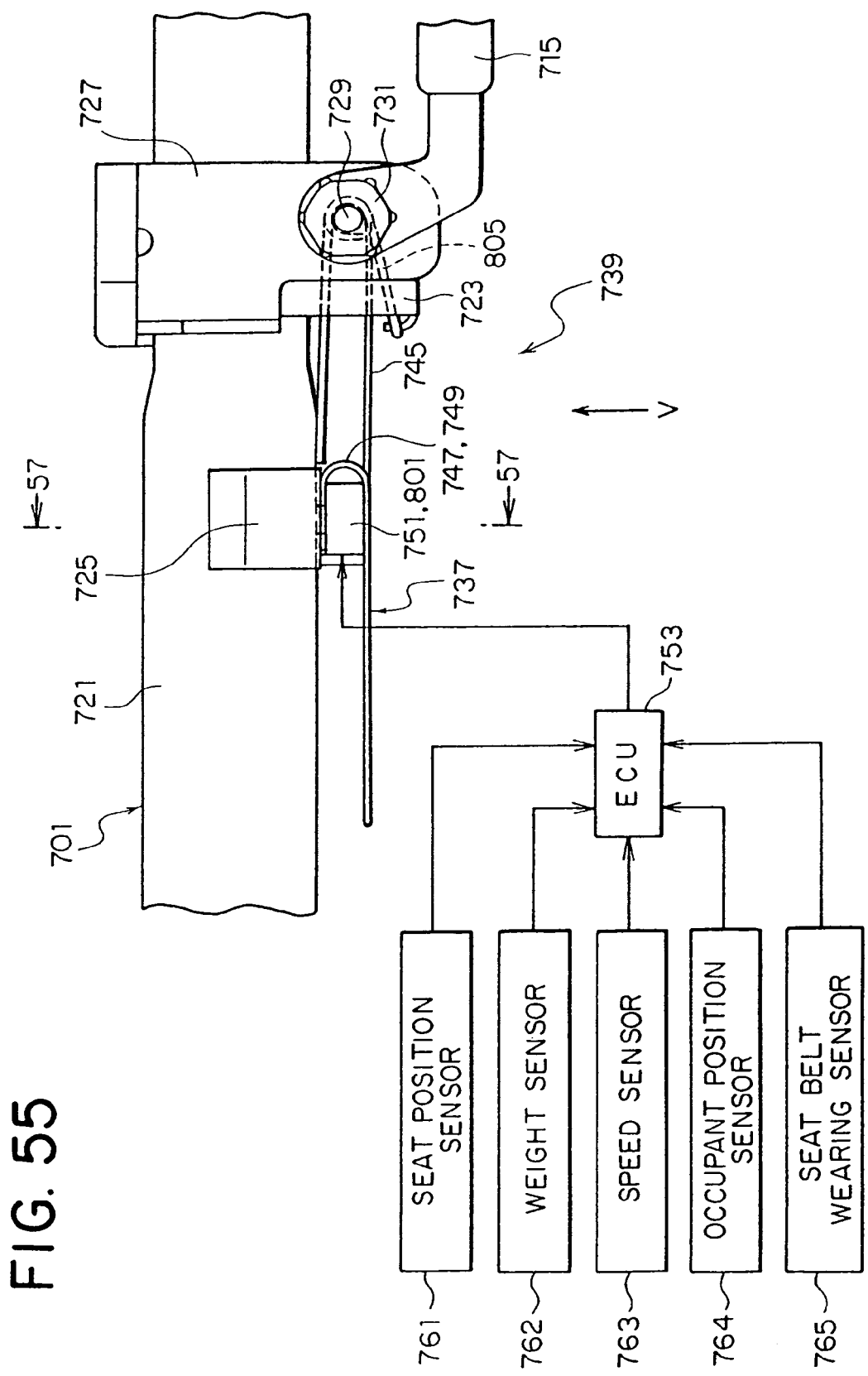
FIG. 55 is a side view showing principal components of the steering apparatus in a twelfth embodiment of the present invention.
Figure 56:
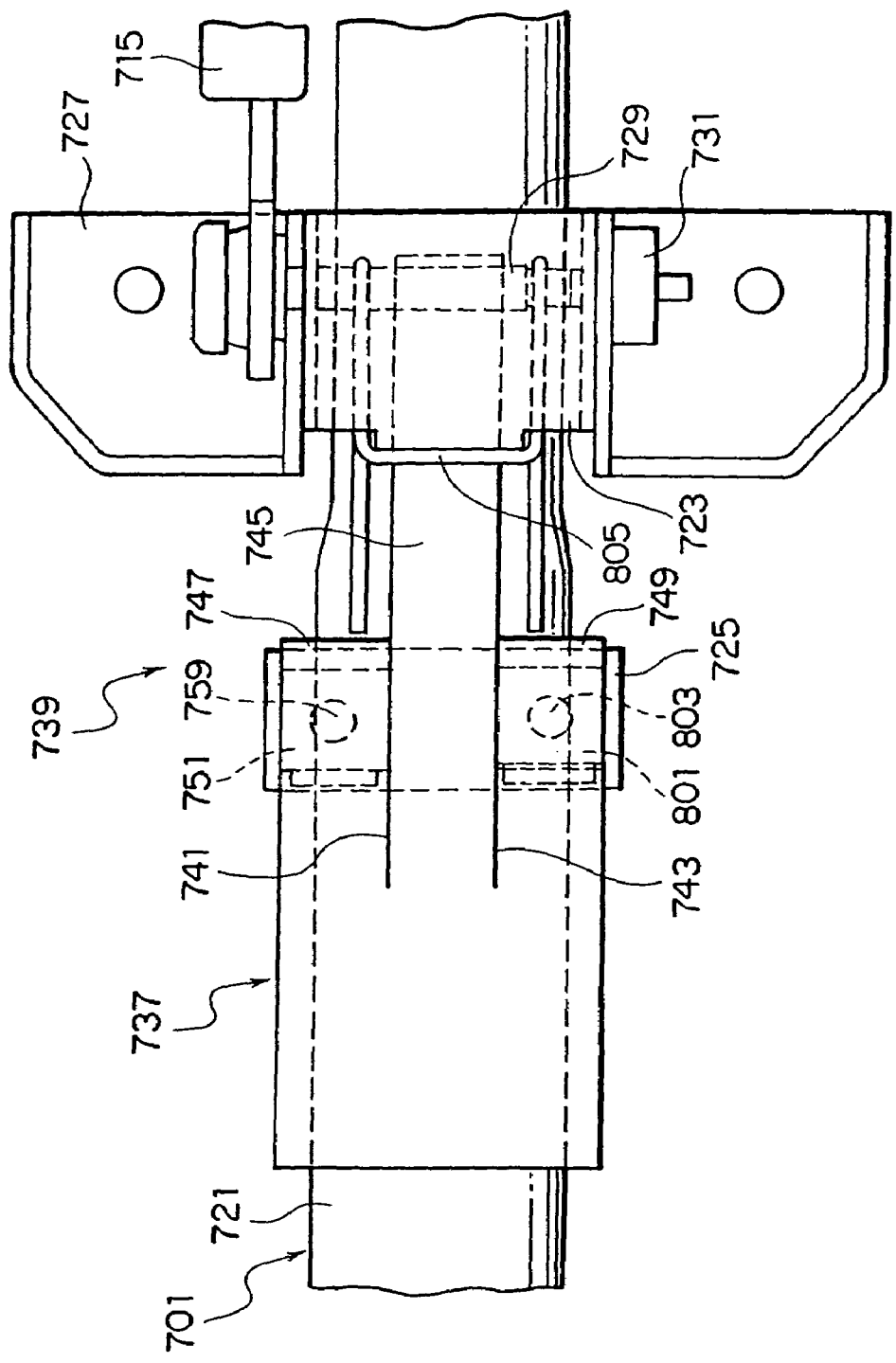
FIG. 56 is a view taken along the arrow line V in FIG. 55.
Figure 57:
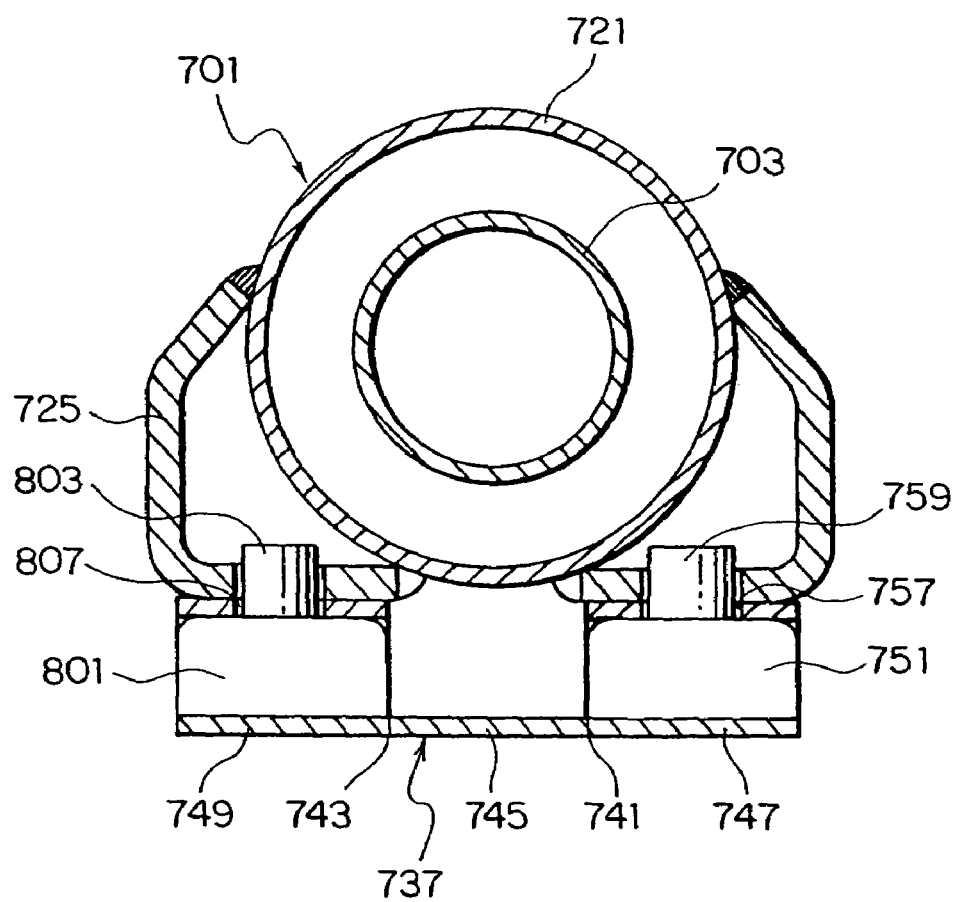
FIG. 57 is a sectional view taken along the line 57—57 in FIG. 55.

FIG. 55 is a cross sectional view showing main components of the steering apparatus in a twelfth embodiment of the present invention. FIG. 56 is a view taken along the arrow line V in FIG. 55. FIG. 57 is a sectional view taken along the line 57—57 in FIG. 55. As shown in these drawings, the whole configuration of the twelfth embodiment is substantially the same as that of the eleventh embodiment discussed above, however, the structure and function of the collision energy absorbing mechanism 739 are different. Namely, in the twelfth embodiment, the right side lip 749 of the energy absorbing plate 737 is, as in the case of the right side lip 747, connected to the plate bracket 725 through a plunger 803 of a solenoid 801 driven under control of the ECU 753. Further, a known energy absorbing wire 805 wound on the tilt bolt 729 is connected to the distance bracket 723. The same components in the twelfth embodiment as those in the eleventh embodiment are marked with the same numerals.

An operation of the twelfth embodiment will be explained.

When the automobile starts traveling, the ECU 753, based on detection signals of the variety of sensors 761~765 described above, repeatedly calculates a target operation load of the collision energy absorbing mechanism at a predetermined control interval. For instance, if a weight of the driver is comparatively heavy, or if a car speed is high even though the driver's weight is comparatively light, a kinetic energy of the driver at a collision increases, and therefore the target operation load increases. Then, the ECU 753 does not output the drive current to the solenoid 751, and lets, as shown in FIG. 57, the plungers 759, 803 protruded from the solenoids 751, 801. The right and left side lips 747, 749 are thereby connected to the plate bracket 725 by the plungers 759, 803 fitted into the through-holes 757, 807.

Figure 58:
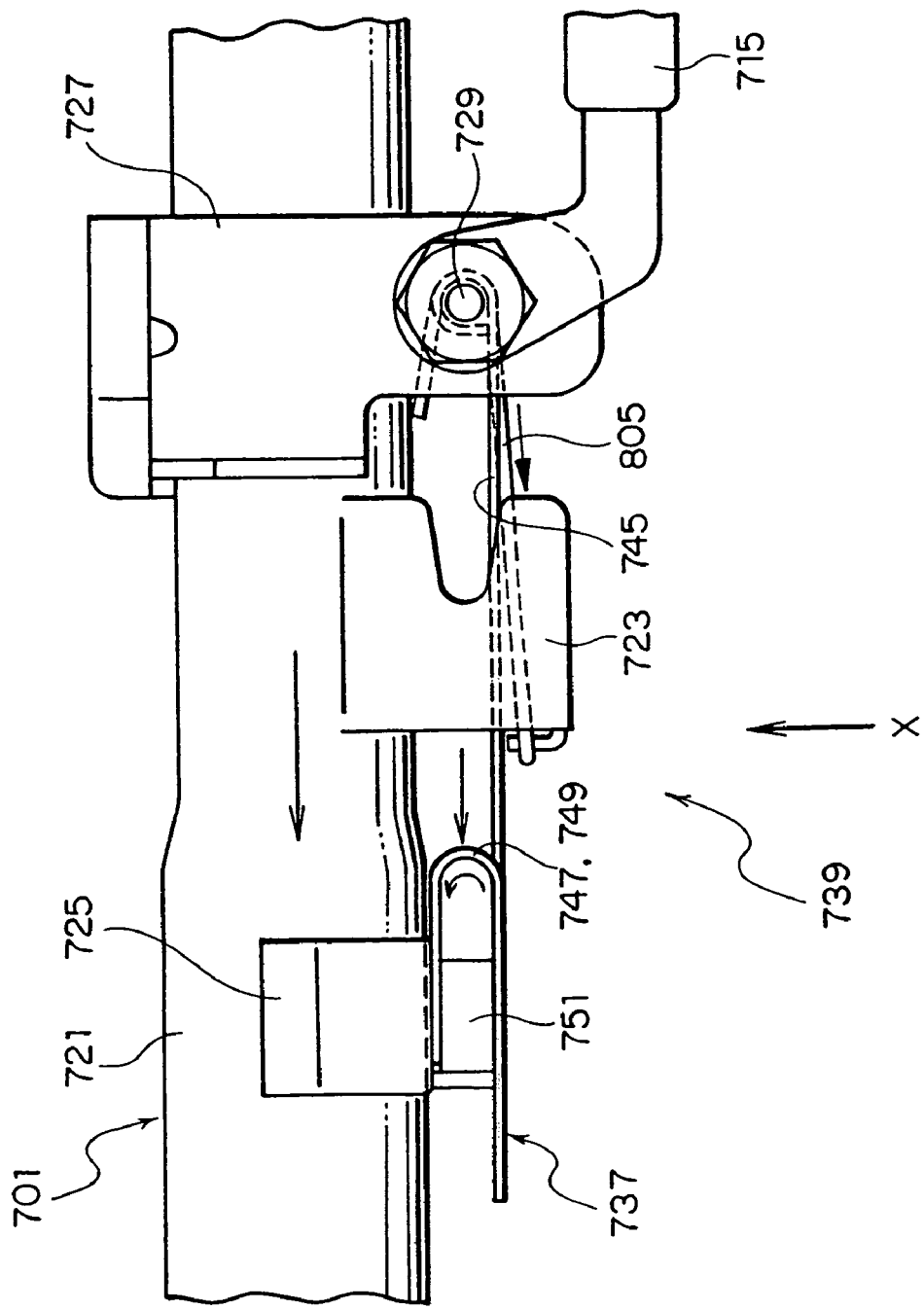
FIG. 58 is an explanatory view showing an operation of the twelfth embodiment.
Figure 59:
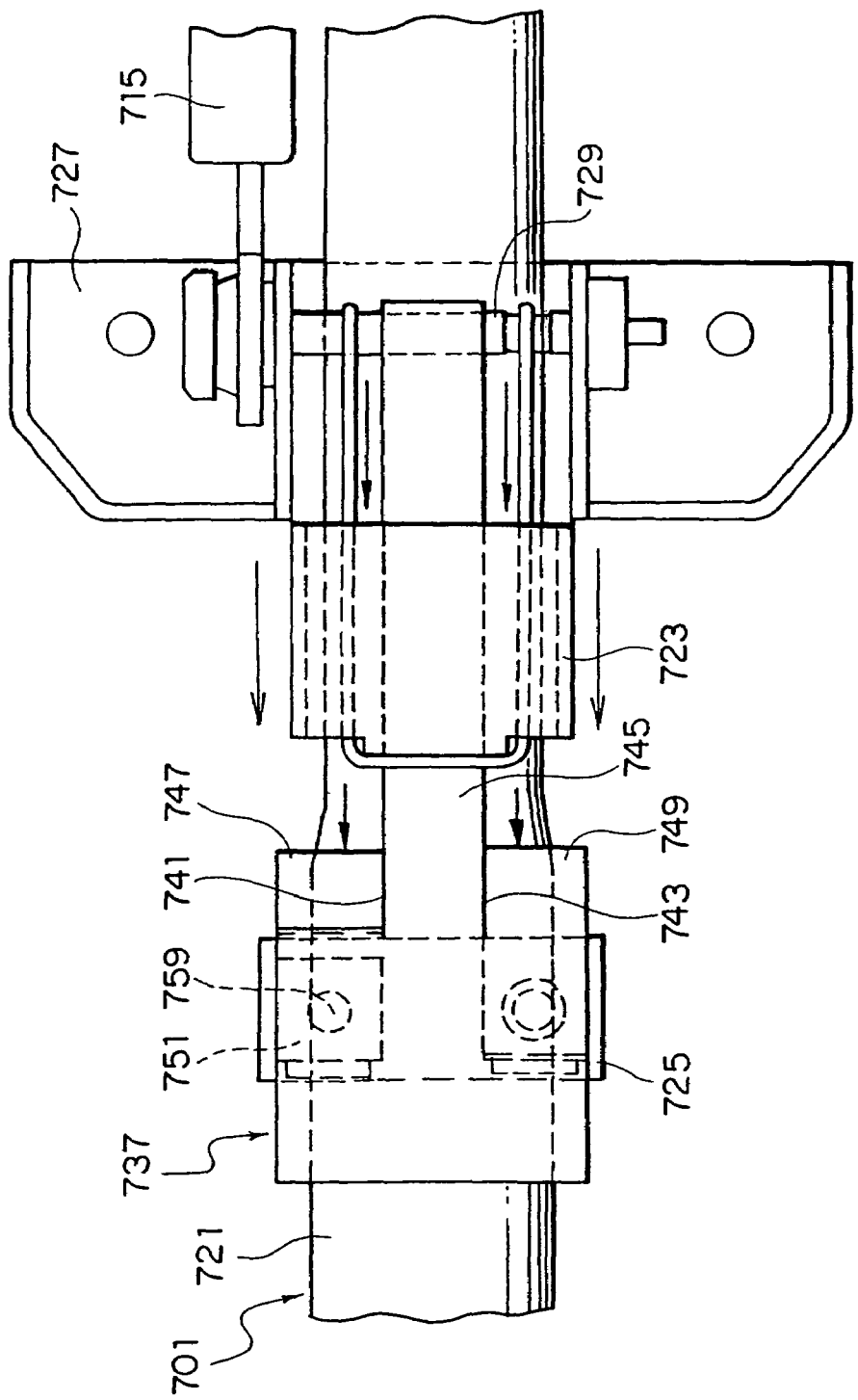
FIG. 59 a view taken along the arrow line X in FIG. 58.

In this state, if the automobile collides with other automobile or an obstacle on the road, the driver suffers a secondary collision with the steering wheel 705 by its inertia. With its impact, as shown in FIGS. 58 and 59 (taken along the arrow line X in FIG. 58), the distance bracket 723 gets released forward from the tilt bracket 731, and the front portion of the column tube 721 fractures the rubber bush 735, and the steering column 701 starts advancing.

Figure 60:
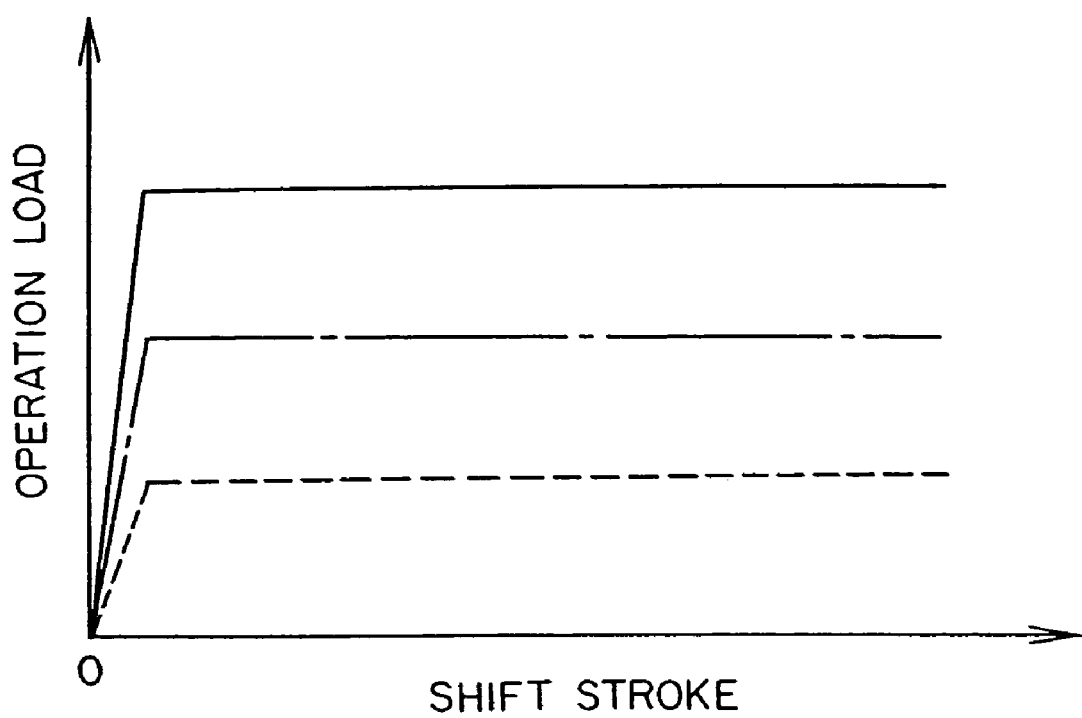
FIG. 60 is a graph showing a relationship between an operation load and a shift stroke of the collision energy absorbing mechanism.

Then, the right and left side lips 747, 749 connected to the plate bracket 725 advance in a way that changes their bending positions with respect to the center lip 745 fixed by the tilt bolt 729. The energy absorbing plate 737 is fractured in the form of being torn up at the portions of the left and right slits 741, 743, thereby actualizing the absorption of the comparatively large secondary collision energy with the resistance against the bending deformation. FIG. 60 is a graph showing a relationship between an operation load and a shift stroke of the collision energy absorbing mechanism 739, wherein the solid line indicates a result of test on that occasion (in the case of the large operation load).

Figure 61:
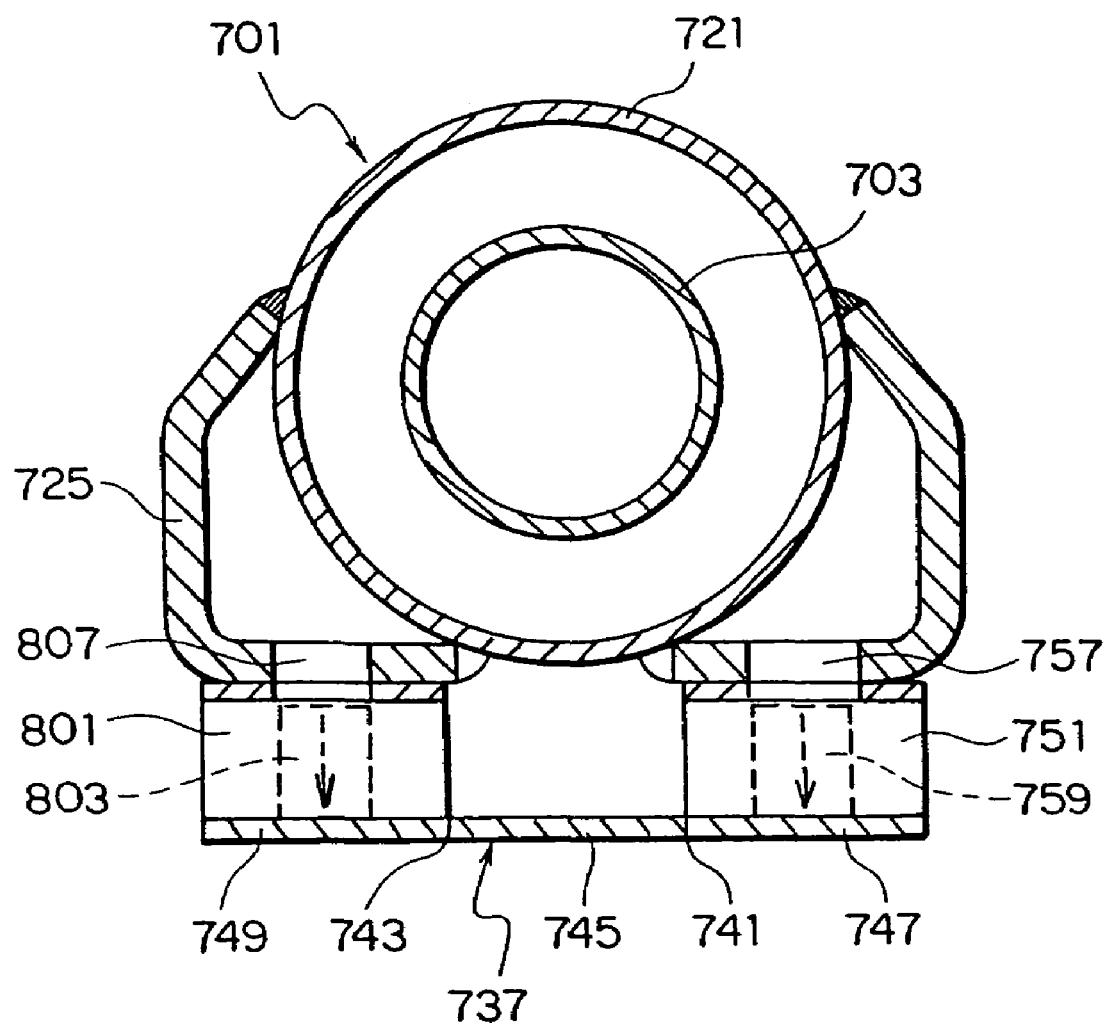
FIG. 61 is an explanatory view showing the operation of the twelfth embodiment.

By contrast, if the driver is a small-sized women having a comparatively light weight, the kinetic energy of the driver at the collision is comparatively small, so that the target operation load calculated by the ECU 753 decreases. Then, the ECU 753 outputs the drive current to the two solenoids 751, 801, whereby the plungers 759, 803 are, as shown in FIG. 61, attracted by the magnetic force into the solenoid 751. The plungers 759, 803 are thereby disengaged from the through-holes 757, 805, and the right and left side lips 747, 749 are disconnected from the plate bracket 725.

Figure 62:
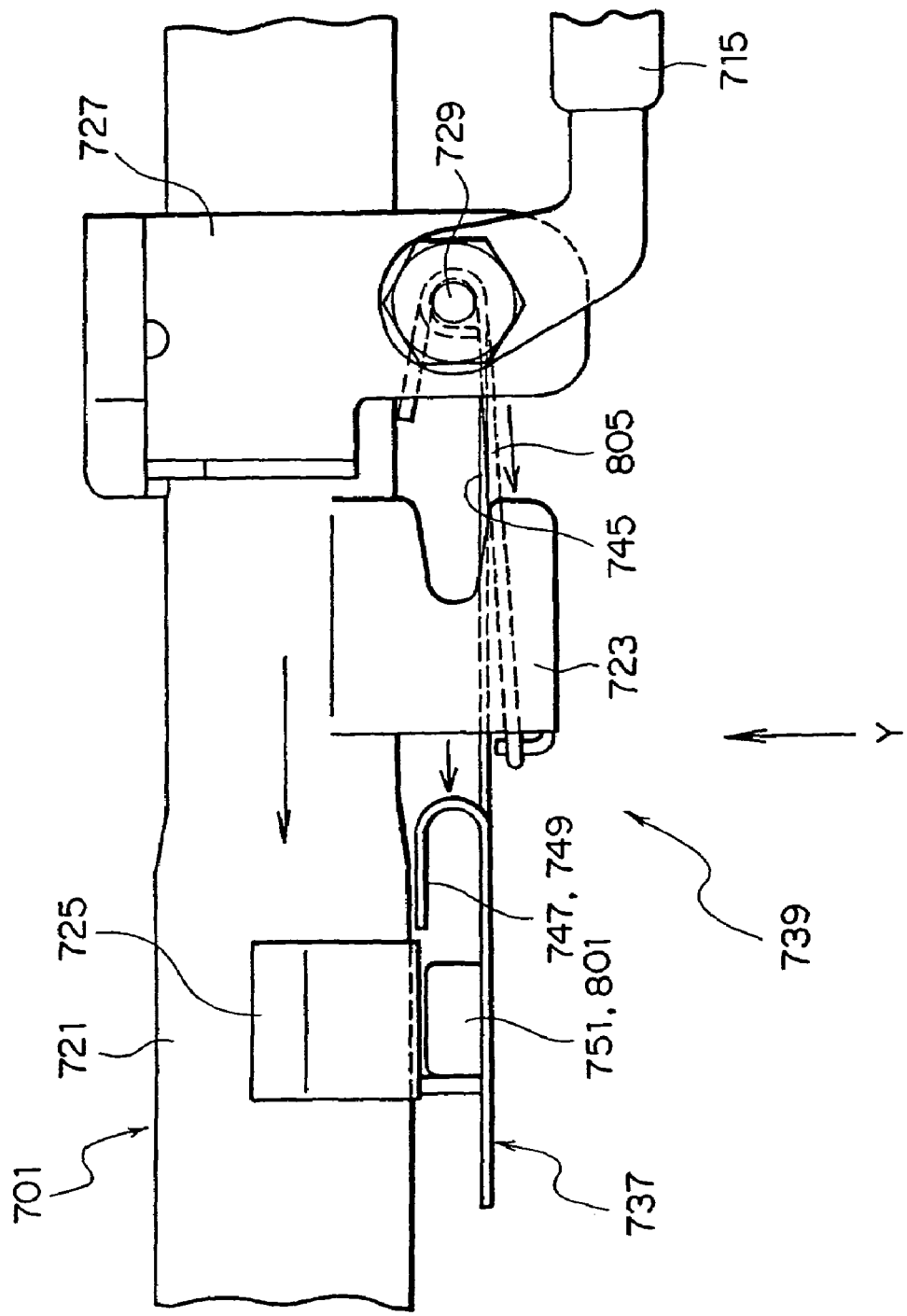
FIG. 62 is an explanatory view showing the operation of the twelfth embodiment.
Figure 63:
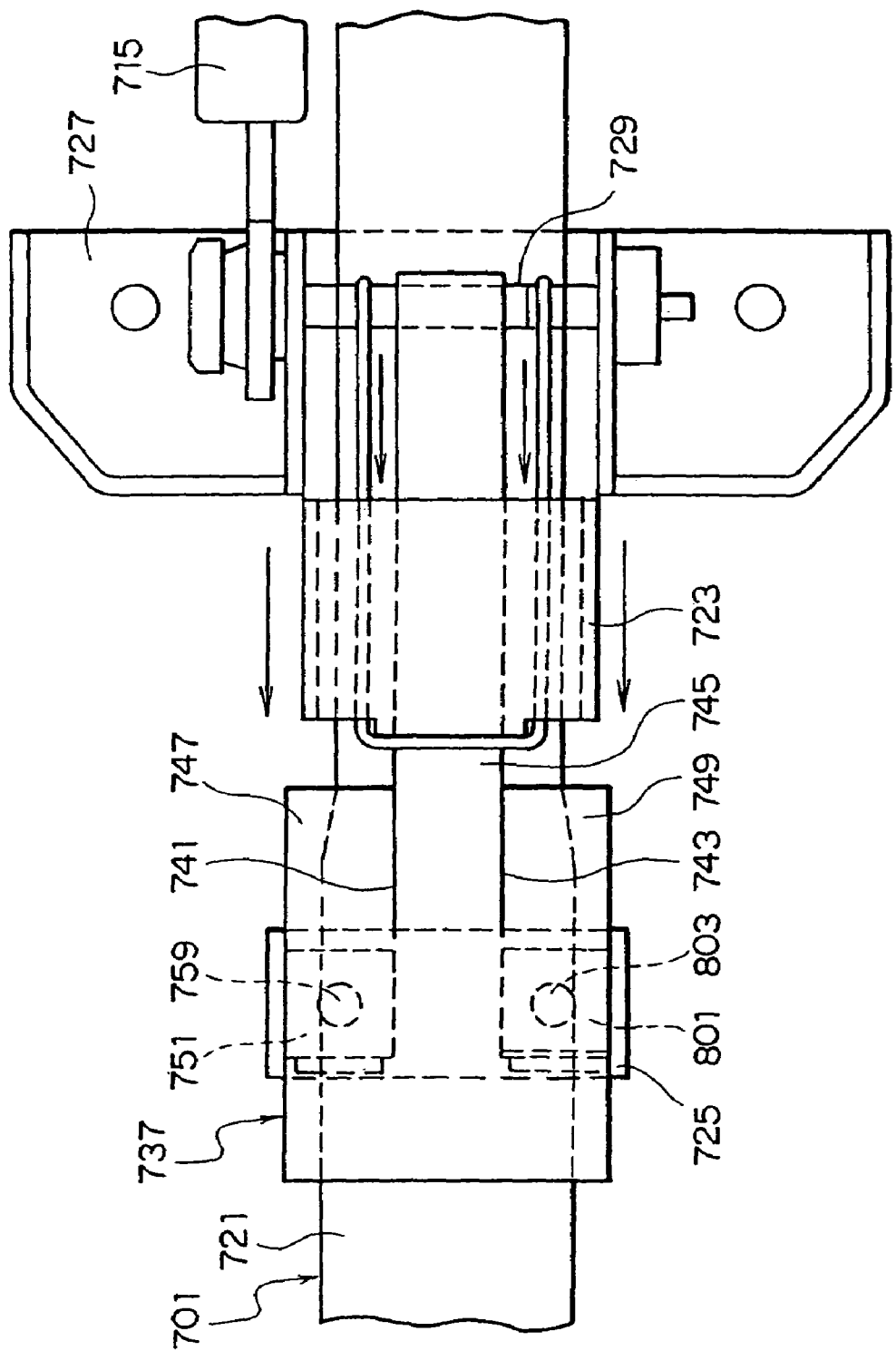
FIG. 63 is a view taken along the arrow line Y in FIG. 62.

In this state, if the automobile collides with other automobile or the obstacle on the road, as in the process described above, the steering column 701 gets released and advances. In this case, however, the right and left side lips 747, 749 are not engaged with the plungers 759, 803, and hence, as shown in FIGS. 62 and 63 (taken along the arrow line Y in FIG. 62), the right and left side lips 747, 749 are released from the plate bracket 725 and advances while keeping their initial shapes.

Therefore, the energy absorbing plate 737 is not fractured, and, because of only the resistance occurring when the energy absorbing wire 805 is drawn by the tilt bolt 729, the secondary collision energy absorption quantity decreases. As a result, even though the driver is the small-sized women, the steering column 701 smoothly advances, and it never happens that a large impact is applied upon the breast and the head of the driver. A broken line in FIG. 60 indicates a result of test on that occasion (in the case of the small collapse load), wherein it can be understood that the small operation load becomes significantly small with respect to the large operation load.

Figure 64:
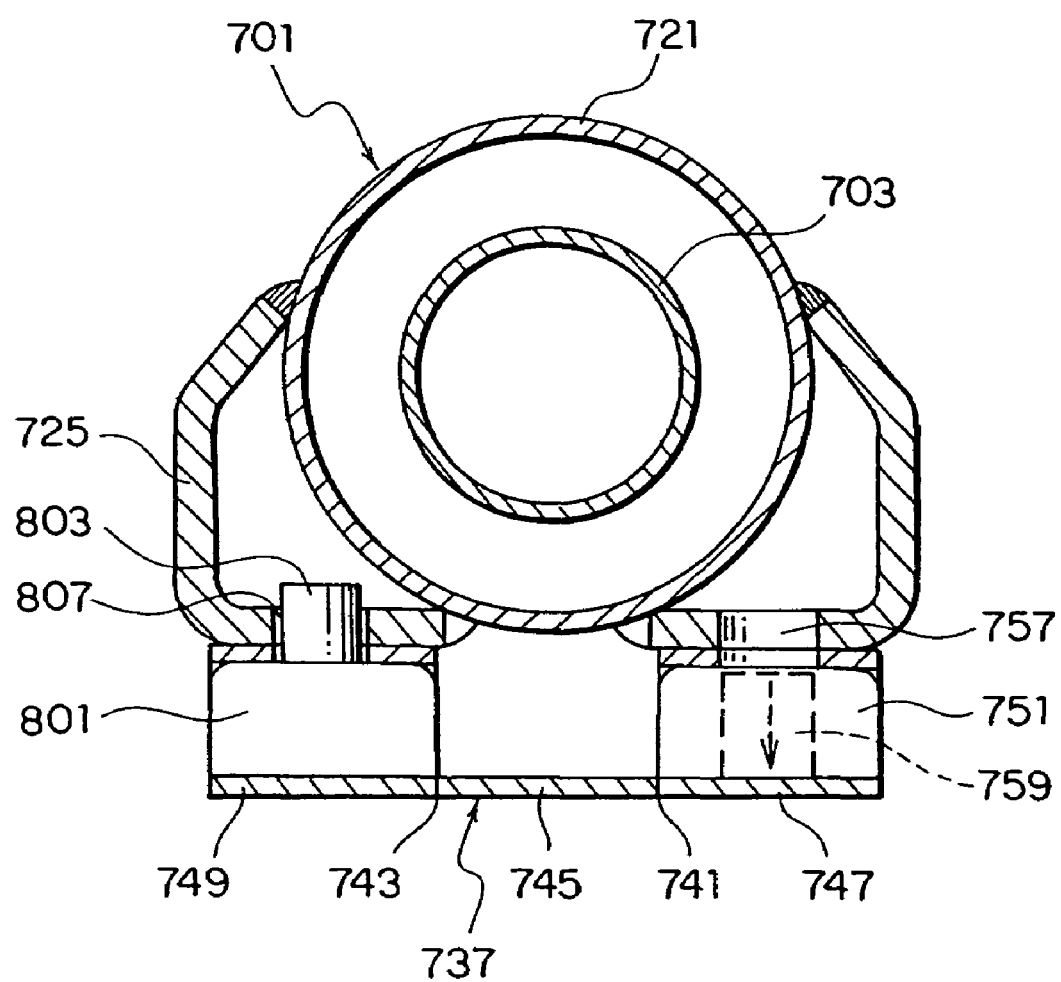
FIG. 64 is an explanatory view showing the operation of the twelfth embodiment.

On the other hand, if the weight of the driver is standard, the kinetic energy of the driver at the collision becomes intermediate, and hence the target collapse load calculated by the ECU 753 becomes also intermediate. Then, the ECU 753 outputs the drive current to one solenoid (751 in the twelfth embodiment), whereby the plunger 759 is, as shown in FIG. 64, attracted by the magnetic force into the solenoid 751. The plunger 759 is thereby disengaged from the through-hole 757, and it follows that the left side lip 747 is disconnected from the plate bracket 725.

Figure 65:
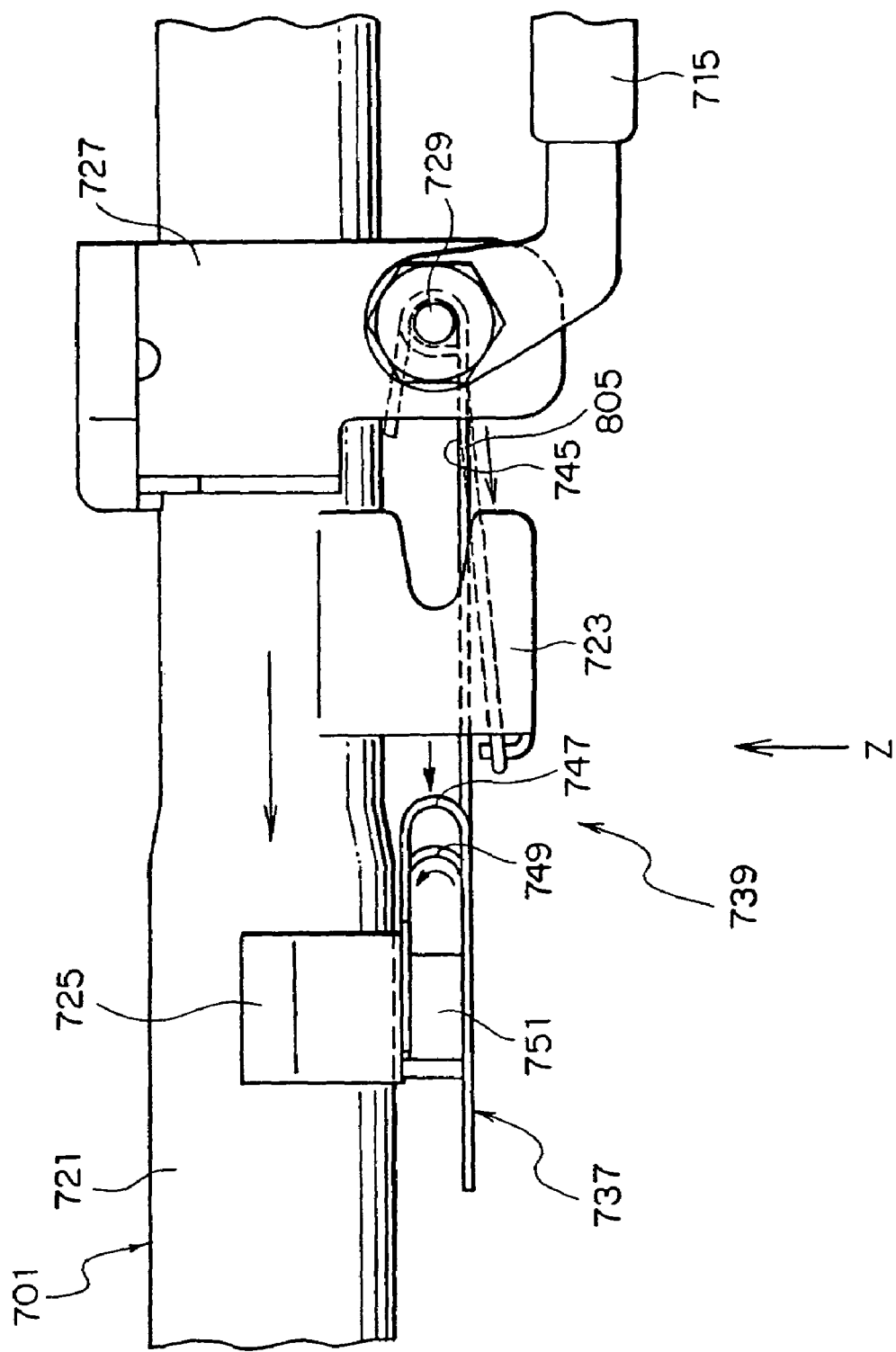
FIG. 65 is an explanatory view showing the operation of the twelfth embodiment.
Figure 66:
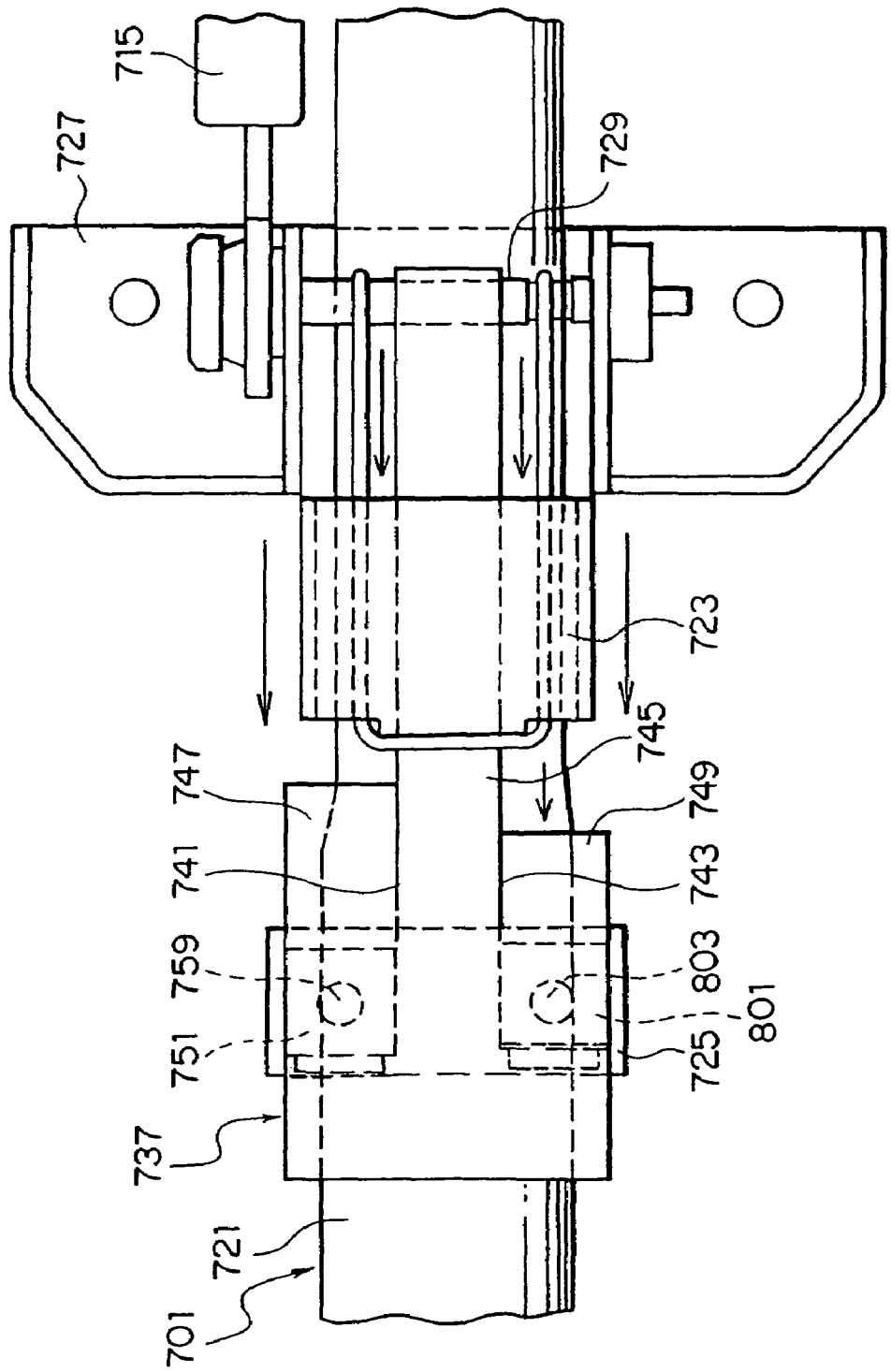
FIG. 66 is a view taken along the arrow line Z in FIG. 65.

In this state, if the automobile collides with other automobile or the obstacle on the road, in the same process as in the case described above, the steering column 701 gets released and advances. In this case, however, the left side lip 747 is not engaged with the plunger 759, and hence, as shown in FIGS. 65 and 66 (taken along the arrow line Z in FIG. 65), the left side lip 747 is released from the plate bracket 725 and advances while keeping its initial shape.

Therefore, the energy absorbing plate 737 is, with the advancement of the left side lip 749 with respect to the center lip 745, fractured only at the portion of the left slit 743, and the absorption quantity of the secondary collision energy decreases. As a result, the absorption of an intermediate collision energy at the driver's secondary collision is actualized. The two-dotted line in FIG. 60 shows a result of test on that occasion (in the case of the intermediate operation load).

Figure 67:
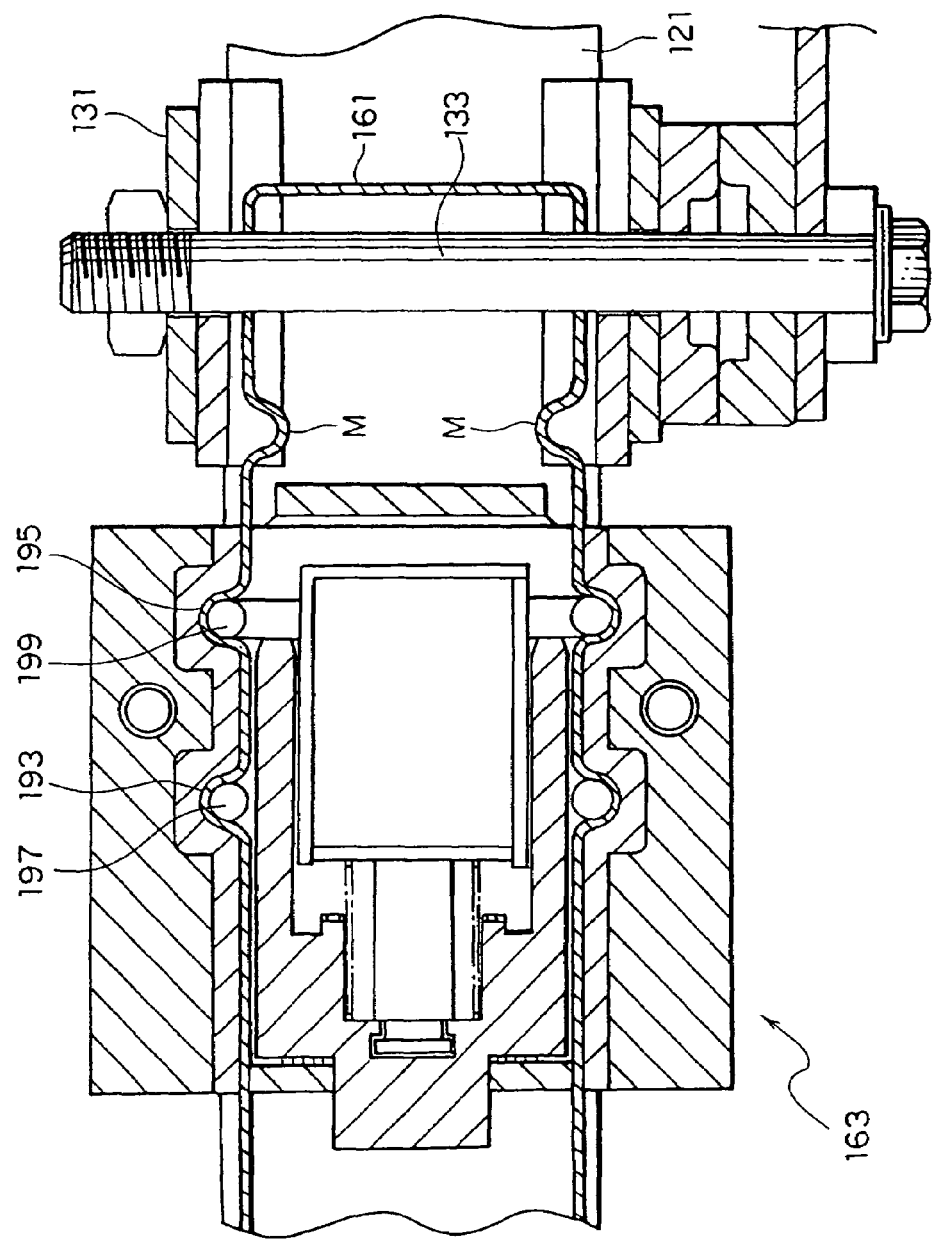
FIG. 67 is a plan sectional view showing the steering apparatus in a thirteenth embodiment of the present invention.
Figure 68A:
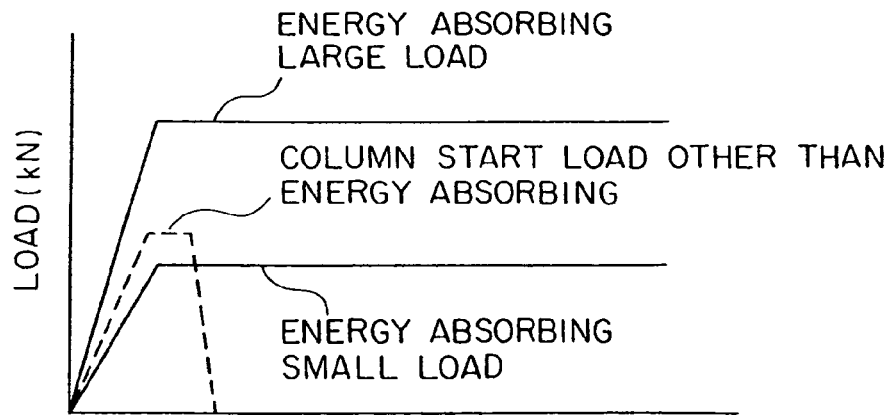
FIG. 68A is a graph showing a relationship between an operation load and a shift stroke of the variable drawing device, and a relationship between a start load and a shift stroke of a column member excluding the variable drawing device.
Figure 68B:
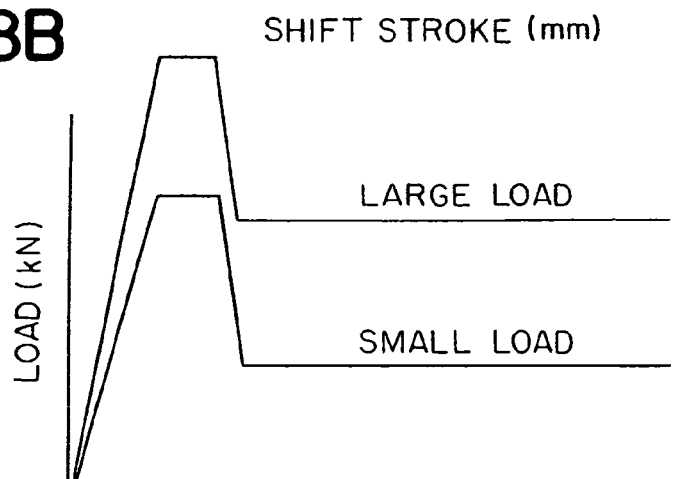
FIG. 68B is a graph showing a relationship between an operation load and a shift stroke of the whole column when a rise timing of the drawing load is not delayed.
Figure 68C:
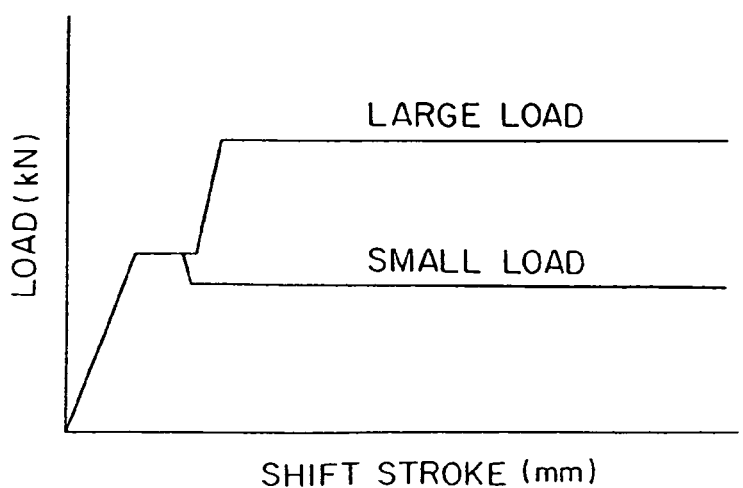
FIG. 68C is a graph showing a relationship between the operation load and the shift stroke of the whole column when the rise timing of the drawing load is delayed.

FIG. 67 is a plan sectional view showing the steering apparatus in a thirteenth embodiment of the present invention. FIG. 68A is a graph showing a relationship between an operation load and a shift stroke of the variable drawing device, and a relationship between a start load and a shift stroke of a column member excluding the variable drawing device. FIG. 68B is a graph showing a relationship between an operation load and a shift stroke of the whole column when a rise timing of the drawing load is not delayed. FIG. 68C is a graph showing a relationship between the operation load and the shift stroke of the whole column when the rise timing of the drawing load is delayed.

A difference of the thirteenth embodiment from the fifth embodiment (FIGS. 18~30) is that a bending portion M is provided between a fixing member (a tilt bolt 133) of the energy absorbing plate 161 and the variable drawing device 163.

With an addition of this bending portion M, the drawing load of the drawing pins 197, 199 does not occur till the bending portion M is stretched out, whereby the rise timing of the drawing load can be delayed.

An effect yielded by delaying the rise timing of the drawing load will be explained with reference to FIGS. 68A, 68B and 68C. Generally, when the steering column gets collapsed, other than the load caused by the energy absorbing member, a start load occurs just when the column body is released from the car body side fixing member. FIG. 68A shows a release load of the column body with a dotted line in addition to the two loads based on the variable energy absorption. If the rise timing of the drawing load is not delayed, as shown in FIG. 68B, the release load of the column body and the energy absorption load are overlapped to increase the start load of the column as a whole. When the start load of the whole column increases, the impact upon the driver becomes large. Then, if the rise timing of the drawing load is delayed, as shown in FIG. 68C, the release load of the column body and the energy absorption load are not overlapped, whereby the start load can be decreased.

Thus, the bending portion M is provided to delay the rise timing of absorbing the energy with the energy absorbing plate 161, thereby making it feasible to further enhance the effect of adjusting the energy absorption quantity with a smoothed start of the collapse.

FIG. 69 is a side view showing the steering apparatus in a fourteenth embodiment of the present invention. FIG. 70 is a plan sectional view showing the steering apparatus shown in FIG. 69.

A difference of the fourteenth embodiment from the fifth embodiment (FIGS. 18~30) is that the hole of the energy absorbing plate 161, into which the tilt bolt 133 is inserted, is replaced with an elongate hole N in order to, as in the thirteenth embodiment, delay the rise timing of the drawing load.

Namely, when collapsed, the energy absorbing plate 161 shifts together with the column body in the forward direction of the car. The tilt bolt 133 is fixed to the car body, and hence, when the tilt bolt 133 comes into contact with the elongate hole N on the rear side of the car, the drawing pins 197, 199 start drawing.

Thus, the elongate hole N is provided to delay the rise timing of absorbing the energy with the energy absorbing plate 161, thereby making it feasible to further enhance the effect of adjusting the energy absorption quantity with a smoothed start of the collapse as in the thirteenth embodiment.

Figure 72:
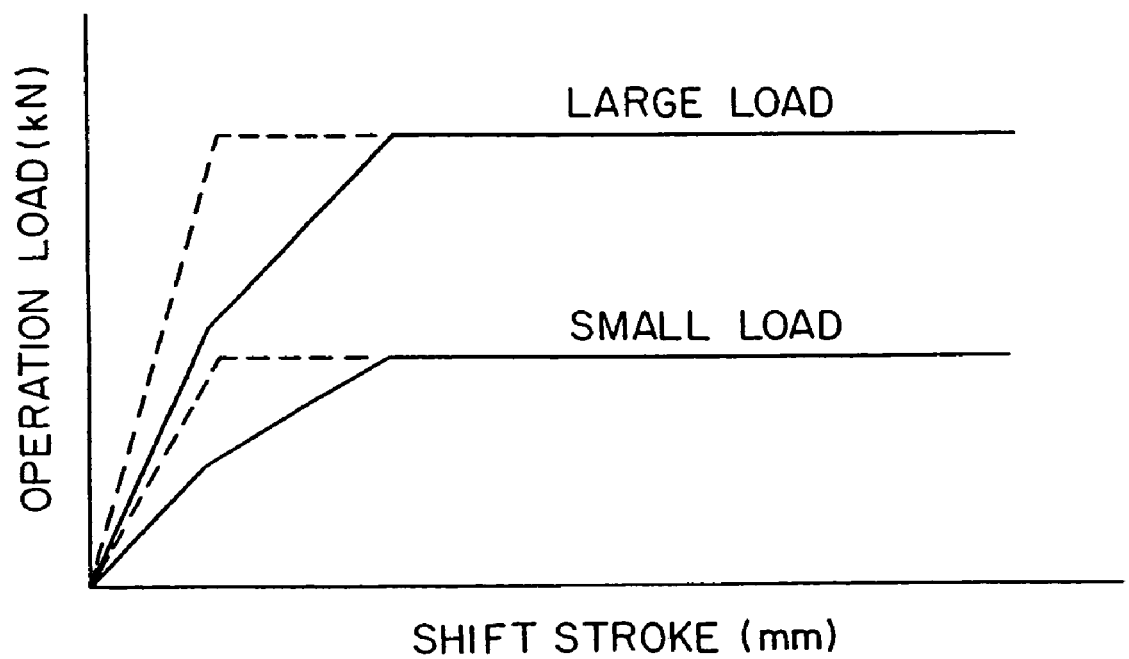
FIG. 72 is a graph showing a relationship between an operation load and a shift stroke of the variable drawing device.

FIG. 71 is a side view (corresponding to FIG. 24 in the fifth embodiment) showing the steering apparatus in a fifteenth embodiment of the present invention. FIG. 72 is a graph showing a relationship between an operation load and a shift stroke of the variable drawing device.

A difference of the fifteenth embodiment from the fifth embodiment (FIGS. 18~30) is that a width of each of U-shaped bending portions 193, 195 of the energy absorbing plate 161 is narrowed.

Namely, as shown in FIG. 71, notches P, . . . P are formed at both edges of the U-shaped bending portions 193, 195 of the energy absorbing plate 161, thus narrowing the width of each of the U-shaped bending portions 193, 195. The start load of the variable drawing device 163 can be thereby, as shown in FIG. 72, reduced, so that there is an effect of being able to smooth a start of collapsing. Note that the dotted lines in FIG. 72 show graphs corresponding to those in the fifth embodiments.

Figure 73A:
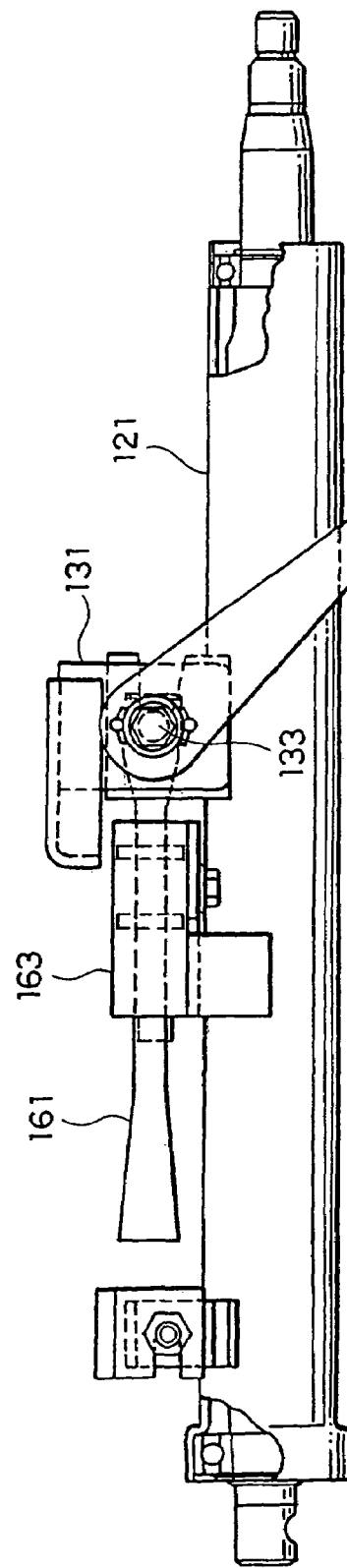
FIGS. 73A and 73B are side views each showing the steering apparatus in a sixteenth embodiment of the present invention.
Figure 73B:
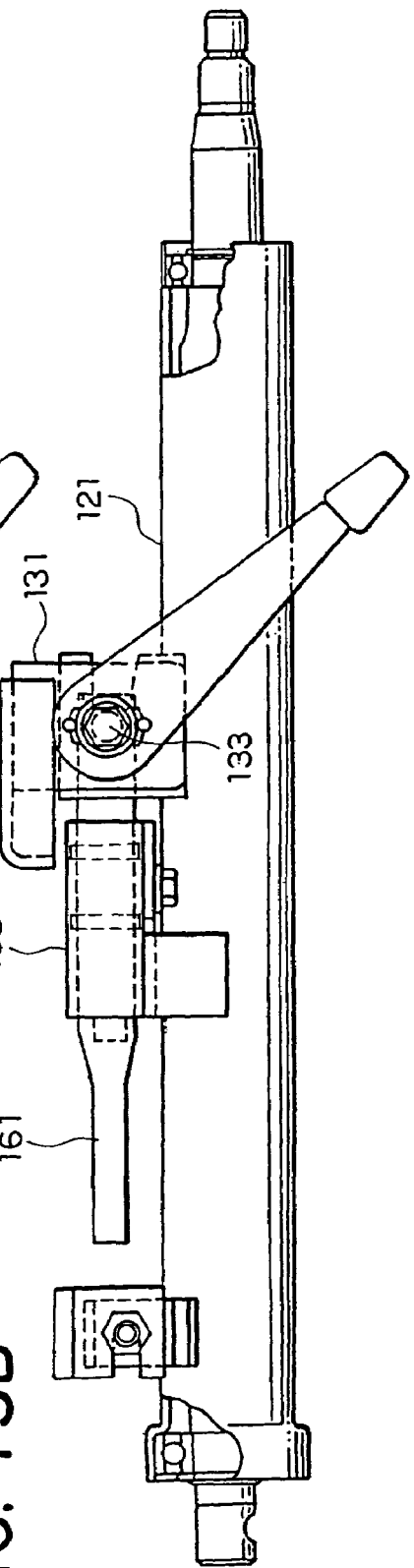
Figure 74A:
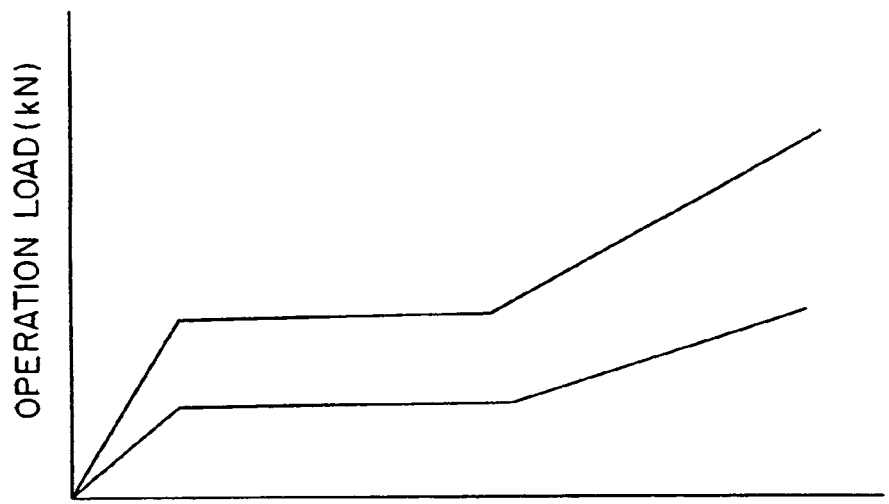
FIGS. 74A and 74B are graphs each showing a relationship between an operation load and a shift stroke of the variable drawing device in each of the cases shown in FIGS. 73A and 73B.
Figure 74B:
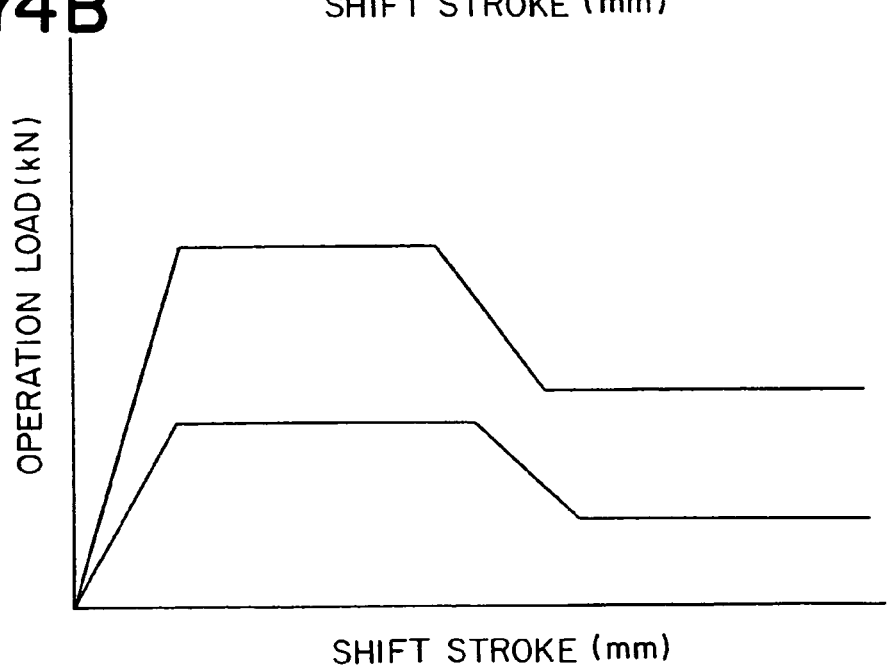

FIGS. 73A and 73B are side views each showing the steering apparatus in a sixteenth embodiment of the present invention. FIGS. 74A and 74B are graphs each showing a relationship between an operation load and a shift stroke of the variable drawing device in the cases of FIGS. 73A and 73B.

A difference of the sixteenth embodiment from the fifth embodiment (FIGS. 18~30) is that the width of the energy absorbing plate 161 is changed midways.

Namely, as shown in FIG. 73A, a width of a middle portion of the energy absorbing plate 161 is narrowed. Thus, when the width is narrowed, the load decreases. It is therefore possible to set a static load characteristic wherein, as shown in FIG. 74A, the load is low at a first half of the shift stroke and gradually increases at a second half of the stroke.

Further, as shown in FIG. 73B, the middle portion of the energy absorbing plate 161 has a large width. Thus, if the width is set large, the load rises. It is therefore feasible to set a static load characteristic wherein, as shown in FIG. 74B, the load is high at the first half of the shift stroke and gradually decreases at the second half of the stroke.

Moreover, according to the first through sixteenth embodiments, the energy absorption characteristic representing the relationship between the shift stroke and the operation load shown in FIG. 7 etc, is defined as the static load characteristic and is obtained by measuring the relationship between the stroke and the operation load, wherein the steering column apparatus is compressed by a compression testing machine at a fixed speed on the order of 50/min.

Further, in the first through fifteenth embodiment discussed above, the energy absorption load is substantially fixed with respect to the progress of the collapse stroke after the rise. Furthermore, in the sixteenth embodiment, referring to FIG. 74A, the energy absorption load becomes substantially fixed after the rise and thereafter gradually increases as the collapse stroke progresses. Referring to FIG. 74B in the sixteenth embodiment, the energy absorption load becomes substantially fixed after the rise and thereafter gradually decreases as the collapse stroke progresses. According to the present invention, the static load characteristic in any one of the cases given above may be taken.

Figure 75A:
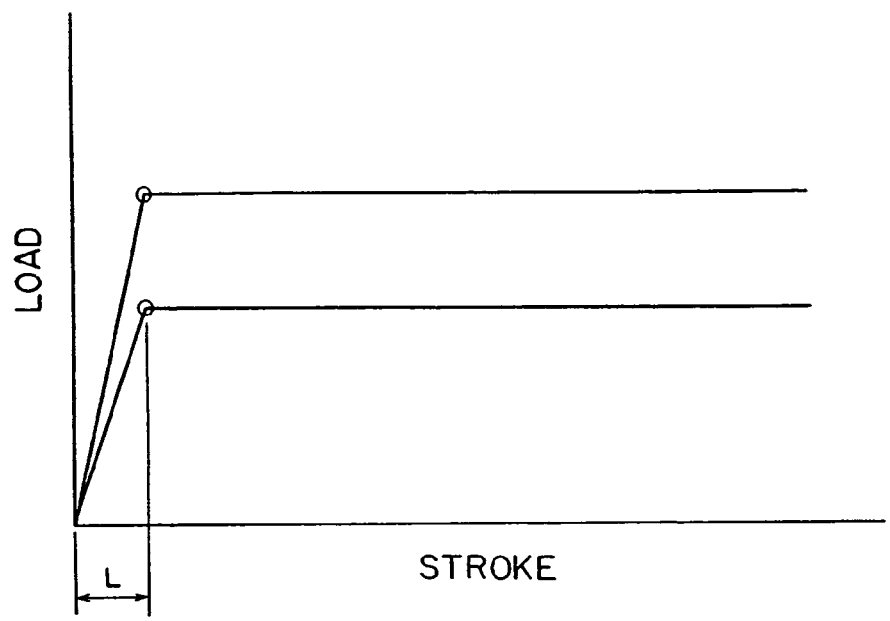
FIGS. 75A and 75B are graphs each showing a static load characteristic with respect to the stroke and the operation load.

The following is a discussion on this static load characteristic. In the case shown in FIG. 75A, after points of inflections (marked with ○) of the two types of static load characteristics, the energy absorption load is substantially fixed with respect to the progress of the collapse stroke. In this case, e.g., a structure with a sufficient allowance of the collapse stroke is capable of obtaining the energy absorption quantities suited respectively to the largeand small-sized physiques. Note that the fixed value of the load implies that this value is not precisely fixed and embraces somewhat a load fluctuation and inclination. Further, when rising, it may take a linear or non-linear form.

Figure 75B:
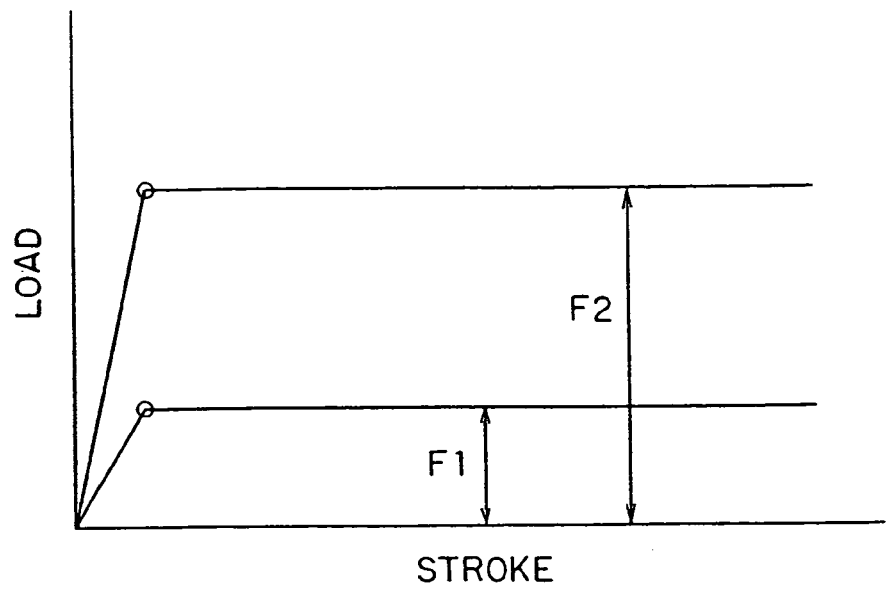

FIG. 75B shows a case of giving a 2-fold or larger difference between a large absorption load (F2) and a small absorption load (F1). Though a cowl, a harness etc involve loads other than the column as a single body when the column gets collapsed, a requirement for giving the 2-fold or larger difference between the two loads is 2F1<F2 as shown in FIG. 75B with the column as the single body. This is attained by thickening a wire diameter of a second wire of two lengths of wires.

Figure 76A:
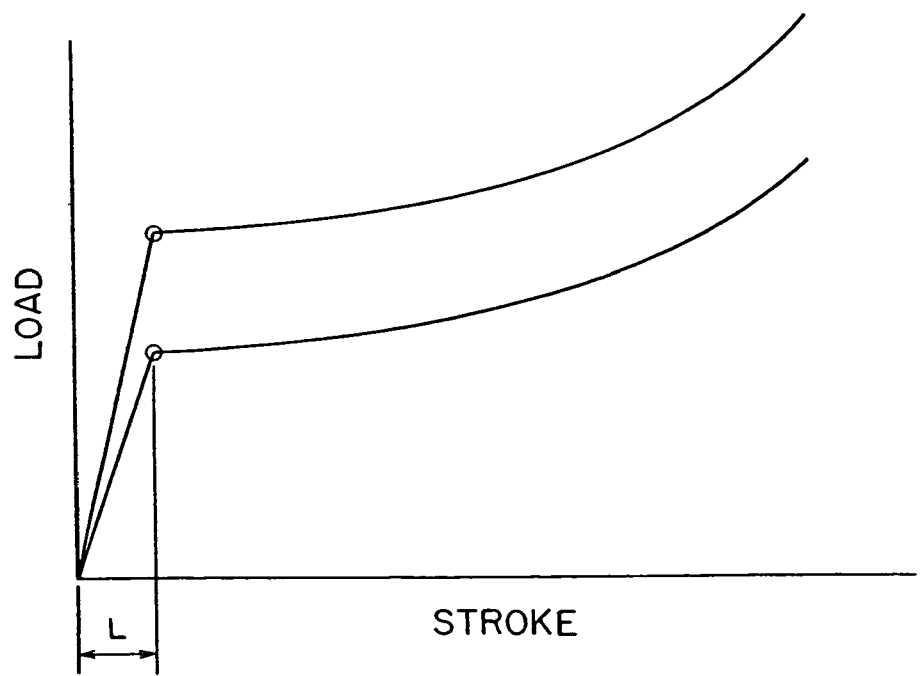
FIGS. 76A and 76B are graphs each showing a static load characteristic with respect to the stroke and the operation load.
Figure 76B:
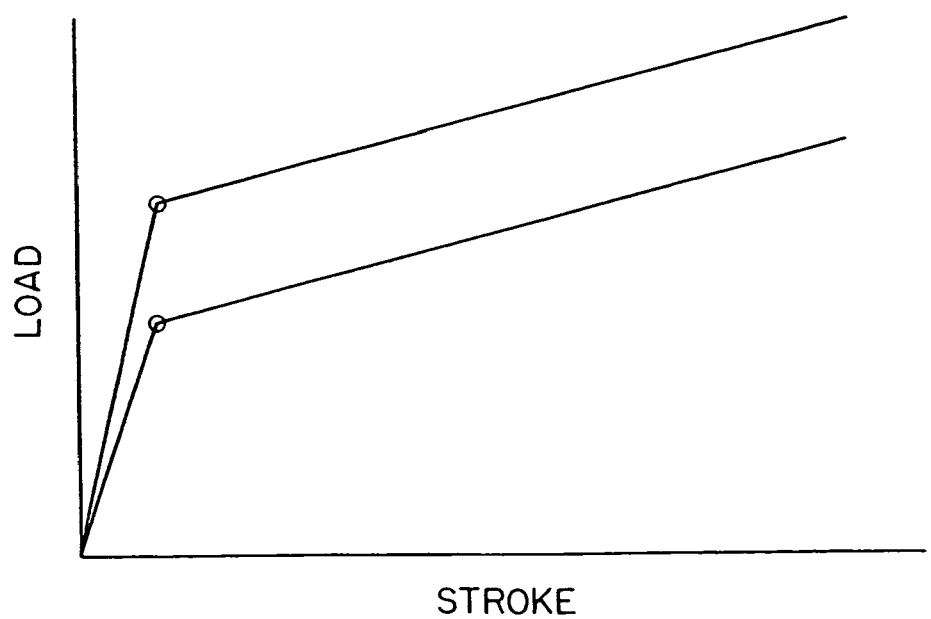
Figure 77:
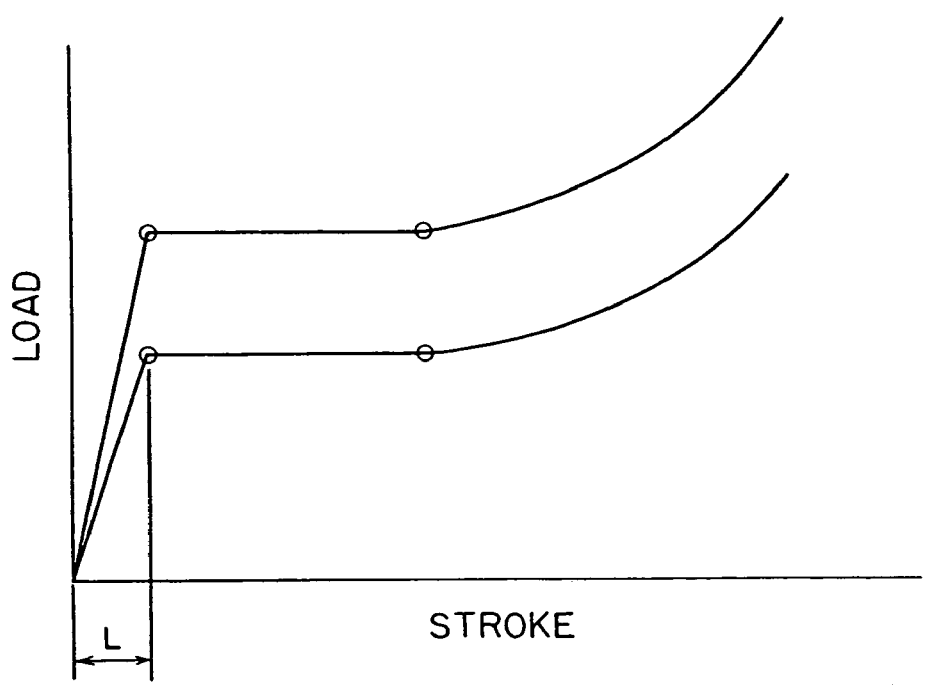
FIG. 77 is a graph showing a static load characteristic with respect to the stroke and the operation load.

In the cases shown in FIGS. 76A, 76B and 77, after points of inflections (marked with ○) of the two types of static load characteristics, the energy absorption load is increases stepwise as the collapse stroke progresses. In this case, when taking e.g., a structure with no sufficient allowance of the collapse stroke, if bottomed at a full stroke, a peak load occurs. A bottomed peak can be, however, eliminated by gradually increasing the load at the second half of the stroke. Note that the load characteristic may take either a non-linear form as shown in FIG. 76A or a linear form as shown in FIG. 76B, and further the load may increase after being kept substantially constant as shown in FIG. 77.

According to the above embodiments of the present invention, the impact absorbing type steering column apparatus including the collision energy absorbing mechanism for absorbing the secondary collision energy of the occupant when the car collides, comprises the energy absorption quantity adjusting mechanism for changing the secondary collision energy absorption quantity of the collision energy absorbing mechanism, at least one sensor for detecting a condition of the occupant or the car, and the electric control unit for controlling the drive of the energy absorption quantity adjusting mechanism on the basis of the result of detection by the sensor. With this construction, for instance, if the weight of the driver is heavy or if the car speed is high, the control unit controls the drive of the energy absorption quantity adjusting mechanism to increase the collapse load with which the collision energy absorbing mechanism functions. By contrast, if the weight of the driver is light or if the car speed is low, the control unit reversely decreases the collapse load with which the collision energy absorbing mechanism functions, whereby the collapsible column is capable of properly getting collapsed.

Figure 78:
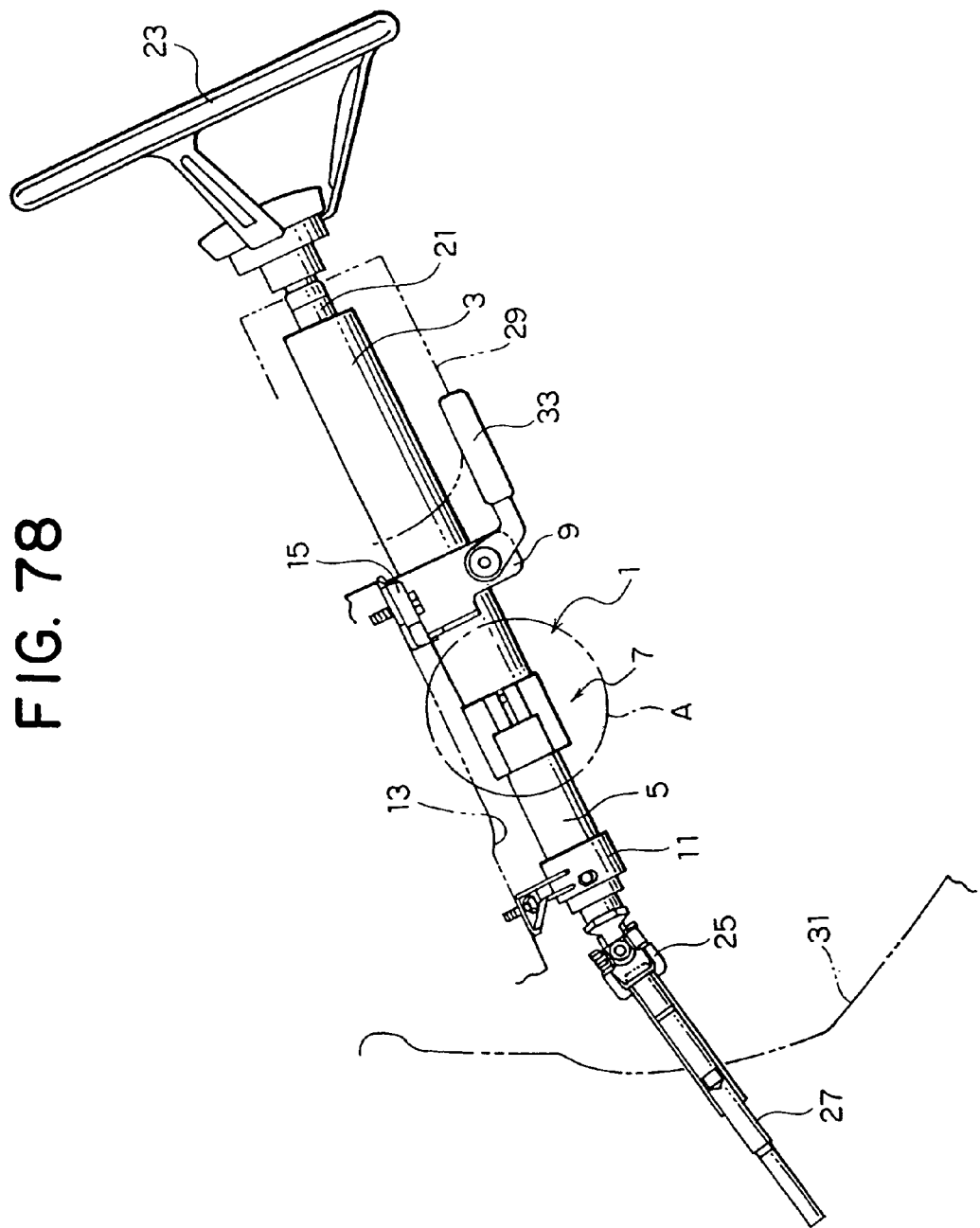
FIG. 78 is a side view showing the steering apparatus on the side of the car cabin in a seventeenth embodiment of the present invention.

FIG. 78 is a side view showing the steering apparatus on the side of the car cabin in a seventeenth embodiment, wherein the reference numeral 1 represents a collapsible column. The collapsible column 1 is constructed of outer and inner columns 3, 5 composed of steel pipes, and a collision energy absorption mechanism 7. The collapsible column 1 is attached to a car body sided member 13 through an upper column bracket 9 for holding the outer column 3 and a lower column bracket 11 for holding the inner column 5. Note that a capsule 15 made of an aluminum alloy is interposed in between the upper column bracket 9 and the car body sided member 13. If an impact load equal to or larger than a predetermined value acts, the upper column bracket 9 comes off forwards together with the outer column 3.

The collapsible column 1 rotatably holds an upper steering shaft 21 through an unillustrated bearing. A steering wheel 23 is secured to an upper side end of the upper steering shaft 21, and a lower steering shaft 27 is connected to a lower side end thereof via a universal joint 25. Referring again to FIG. 78, there are shown a column cover 29 for covering an upper portion of the steering column 1, a dashboard 31 for partitioning a car room from an engine room, and a tilt lever 33 used for a tilt operation of the collapsible column 1.

According to the present steering apparatus, when the driver rotates the steering wheel 23, the rotation thereof is transferred to an unillustrated steering gear via the upper steering shaft 21 and the lower steering shaft 27. The steering gear has a built-in rack-and-pinion mechanism for translating the inputted rotation into a rectilinear motion, and a steering angle of the wheel is changed via a tie rod etc, thus performing the steering. Note that the steering gear may take a variety of known types such as a ball screw type, a worm roller etc in addition to the rack and pinion type.

Figure 79:
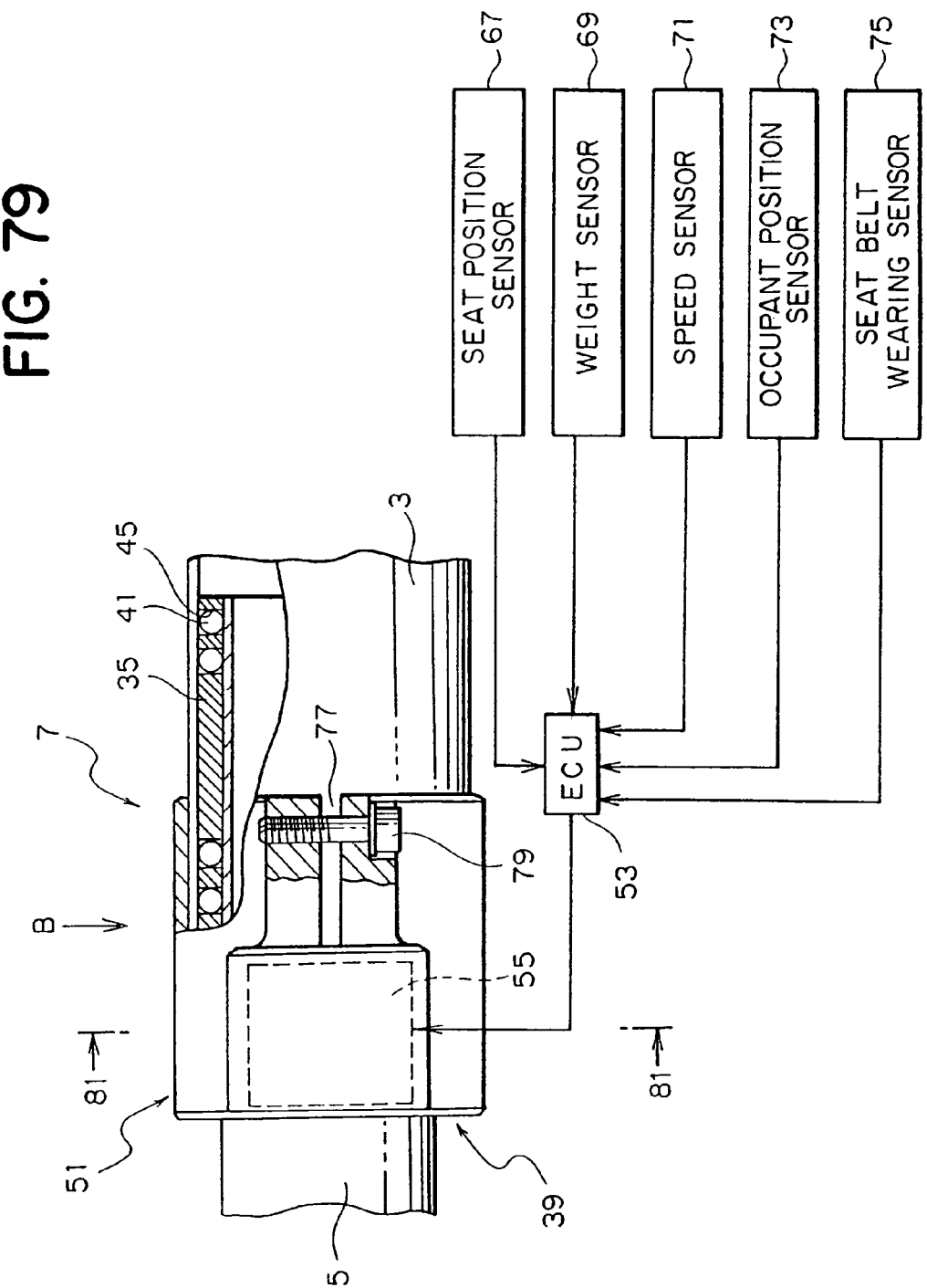
FIG. 79 is an enlarged view showing a portion A in FIG. 78.
Figure 80:
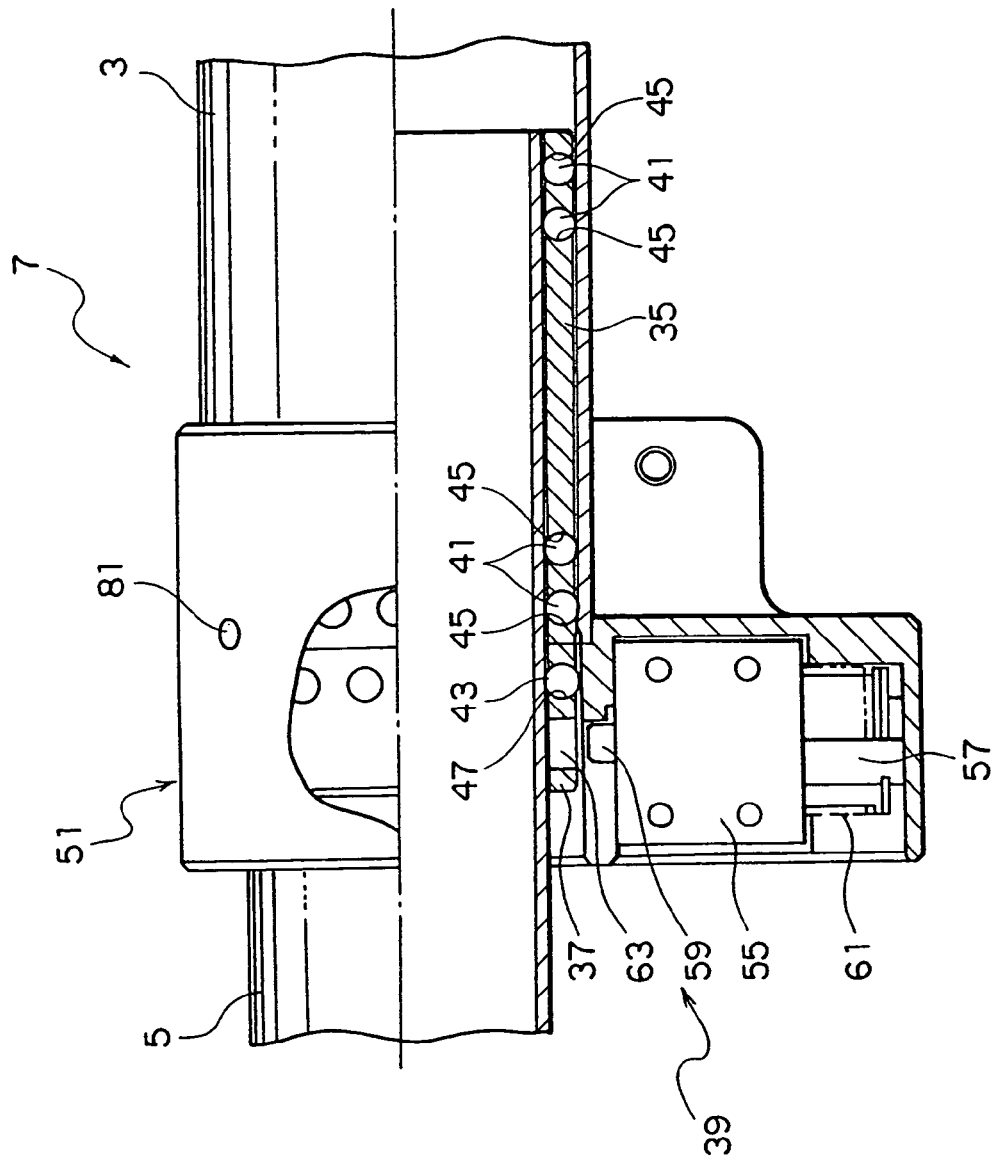
FIG. 80 is a view taken along the arrow line B in FIG. 79.
Figure 81:
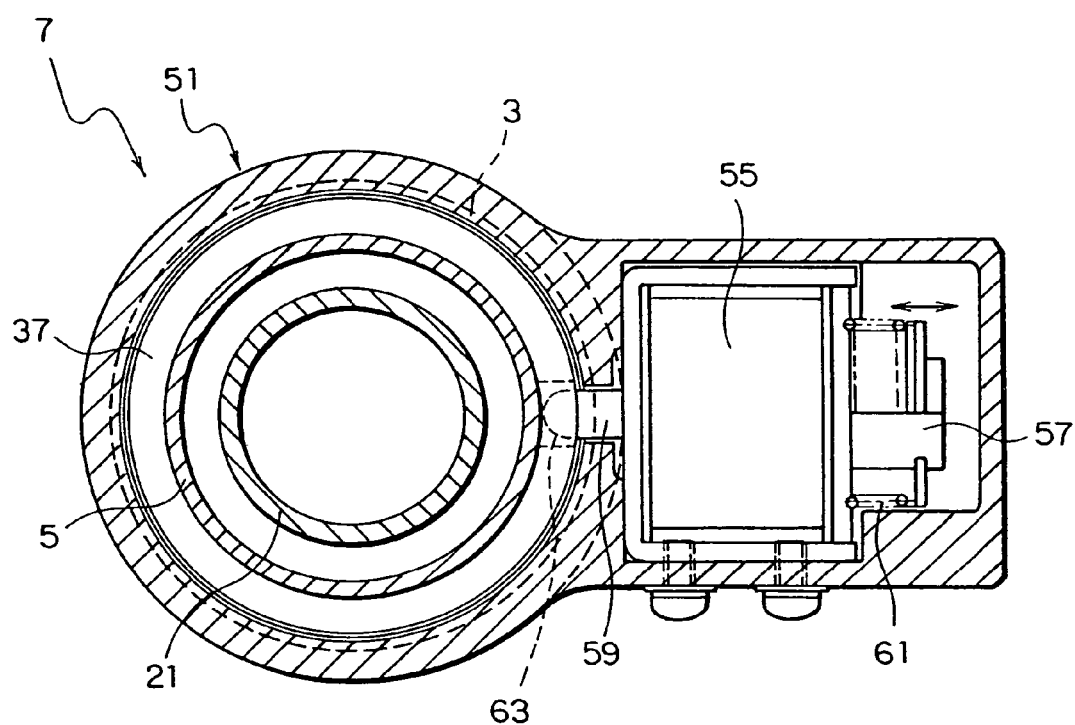
FIG. 81 is a sectional view taken along the line 81—81 in FIG. 79.

FIG. 79 is an enlarged view of a portion A in FIG. 78. FIG. 80 is a view taken along an arrow line B in FIG. 79. FIG. 81 is a sectional view taken along the line 81—81 in FIG. 79. As shown in these drawings, principal constructive members of the collision energy absorption mechanism 7 are a first metal ball retaining cylinder 35 interposed between the outer column 3 and the inner column 5, a second metal ball retaining cylinder 37 disposed in front of the first metal ball retaining cylinder 35, and a retaining cylinder engaging device 39 for fixing an electromagnetic actuator 55.

The first and second metal ball retaining cylinders 35, 37 are each composed of a synthetic resin and an oil-impregnated sintered alloy etc, and are respectively formed with steel ball retaining holes 45, 47 for rotatably retaining steel balls 41, 43. In the seventeenth embodiment, the first and second metal ball retaining cylinders 35, 37 are joined by a predetermined engagement force of an unillustrated engagement pawl but may also be joined by a resinous shearing pin etc.

An outside diameter of each of the steel balls 41, 43 is set larger by a predetermined quantity than a spacing between the outer column 3 and the inner column 5, whereby plastic grooves are formed in inner and outer peripheral surfaces of the two columns 3, 5 when the outer and inner columns 3, 5 relatively move in the axial direction. Note that a steel ball retaining hole 45 on the side of the first metal ball retaining cylinder 35 and a steel ball retaining hole 47 on the side of the second metal ball retaining cylinder 37, are different in their angular phases in the rotating direction, and the two steel balls 41, 43 form the plastic grooves in angular positions different from each other.

The retaining cylinder engaging device 39 includes a housing 51 fixed to the outer column 3 and composed of an aluminum alloy, and a push type electromagnetic actuator (which is hereinafter be called a solenoid) 55 driven under control of an ECU (Electronic Control Unit) 53 in a way of its being held in the housing 51. The retaining cylinder engaging device 39 further includes an engagement protrusion 59 formed at a front side end of a plunger 57 of the solenoid 55, and a compression coil spring 61 for biasing the plunger 57 rightward in FIG. 81. The housing 51 may be made of a resin or a steel without being confined to the aluminum alloy. The second metal ball retaining cylinder 37 is formed with a through-hole 63, and the engagement protrusion 59 is fitted into this through-hole 63 when the plunger 57 protrudes. Note that in addition to a seat position sensor 67, at least one of a weight sensor 69, a car speed sensor 71, an occupant position sensor 73, a seatbelt attaching sensor 75, is connected to the ECU 53.

In the seventeenth embodiment, the housing 51 has a slit 77 formed in its rear portion and is fixed to the outer column 3 by fastening a bolt 79. Further, the housing 51 is formed with a positioning protrusion 81, and an inner side end of this positioning protrusion 81 is fitted into an engagement hole (not shown) formed in the outer column 3, thereby positioning the housing 51 and preventing a rotation of the housing 51 with respect to the outer column 3. It is to be noted that when fixing the housing 51 to the outer column 3, there may be taken a method wherein the housing 51 is formed in a cylindrical shape of which an inside diameter is smaller by a predetermined quantity than an outside diameter of the outer column 3, and is press-fitted into the outer column 3.

An operation of the seventeenth embodiment will hereinafter be explained.

When an automobile starts traveling, the ECU 53, based on detection signals of the variety of sensors 67, 69, 71, 73, 75, repeatedly calculates a target collapse load at a predetermined control interval. For instance, if a weight of the driver is comparatively heavy, or if a car speed is high even though the driver's weight is comparatively light, a kinetic energy of the driver at a collision increases, and therefore the target collapse load rises. Then, the ECU 57 does not output a drive current to the solenoid 55, and, as shown in FIG. 80, the plunger 57 remains positioned downward in FIG. 80 by a biasing force of the compression coil spring 61 with the result that the engagement protrusion 59 is not fitted into the through-hole 63 of the second metal ball retaining cylinder 37.

Figure 82:
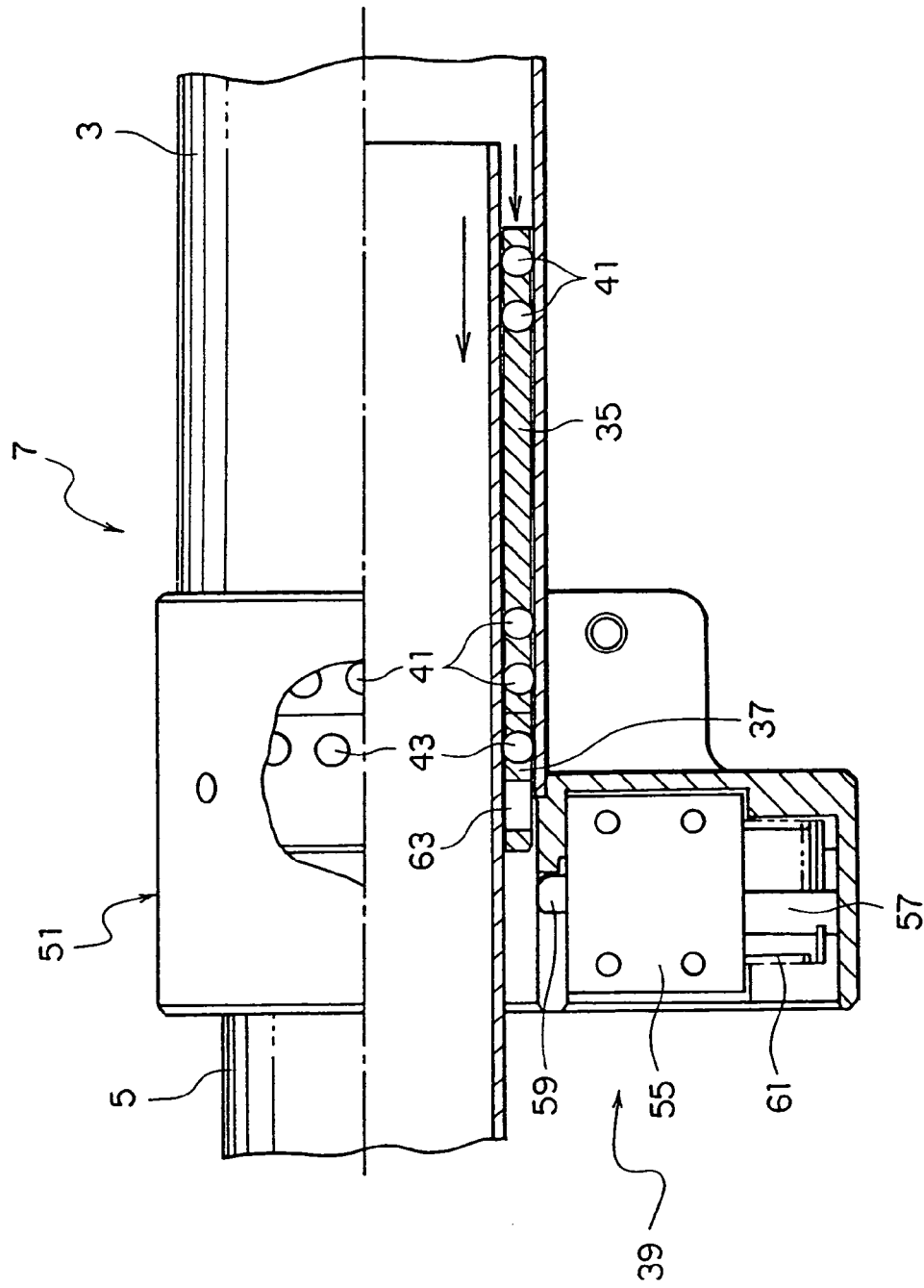
FIG. 82 is a principal side view showing an operation when a large collapse load occurs in the seventeenth embodiment.

In this state, if the automobile collides with other automobile or an obstacle on the road, the driver suffers a secondary collision with the steering wheel 23 by its inertia, and at first the upper column bracket 9 comes off forward together with the outer column 3 due to its impact. Thereafter, a kinetic energy of the driver causes the steering wheel 23 to be pressed forward, and, as shown in FIG. 82, the inner column 5 enters the outer column 3, whereby the collapsible column 1 starts collapsing.

Figure 83:
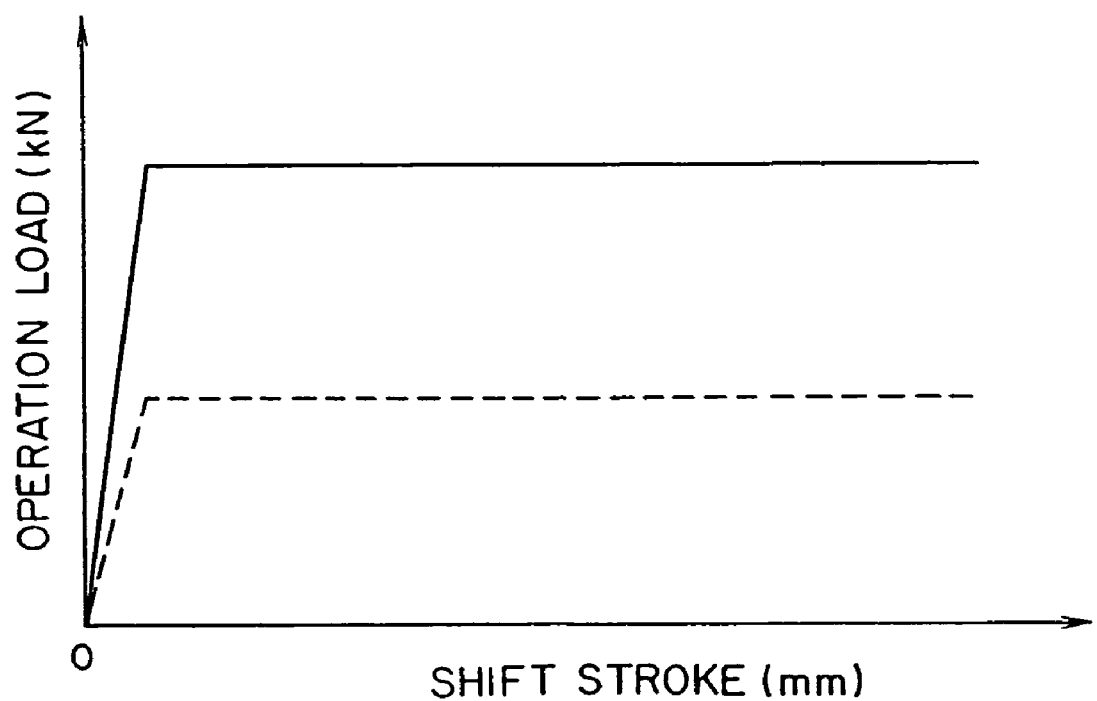
FIG. 83 is a graph showing a relationship between an operation load and a shift stroke of the outer column.

On this occasion, according to the seventeenth embodiment, the first metal ball retaining cylinder 35 and the second metal ball retaining cylinder 37 are connected to each other and therefore move backward together between the outer column 3 and the inner column 5 with a moving quantity that is half a moving quantity of the inner column. With this operation, the steel ball 41 in the first metal ball retaining cylinder 35 and the steel ball 43 in the second metal ball retaining cylinder 37 act to form the plastic grooves in the inner peripheral surface of the outer column 3 and in the outer peripheral surface of the inner column 5, thereby actualizing the comparatively large impact energy absorption. FIG. 83 is a graph showing a relationship between a shift stroke of the outer column 3 and an operation load, wherein a solid line indicates a result of test on that occasion (in the case of a large operation load).

Figure 84:
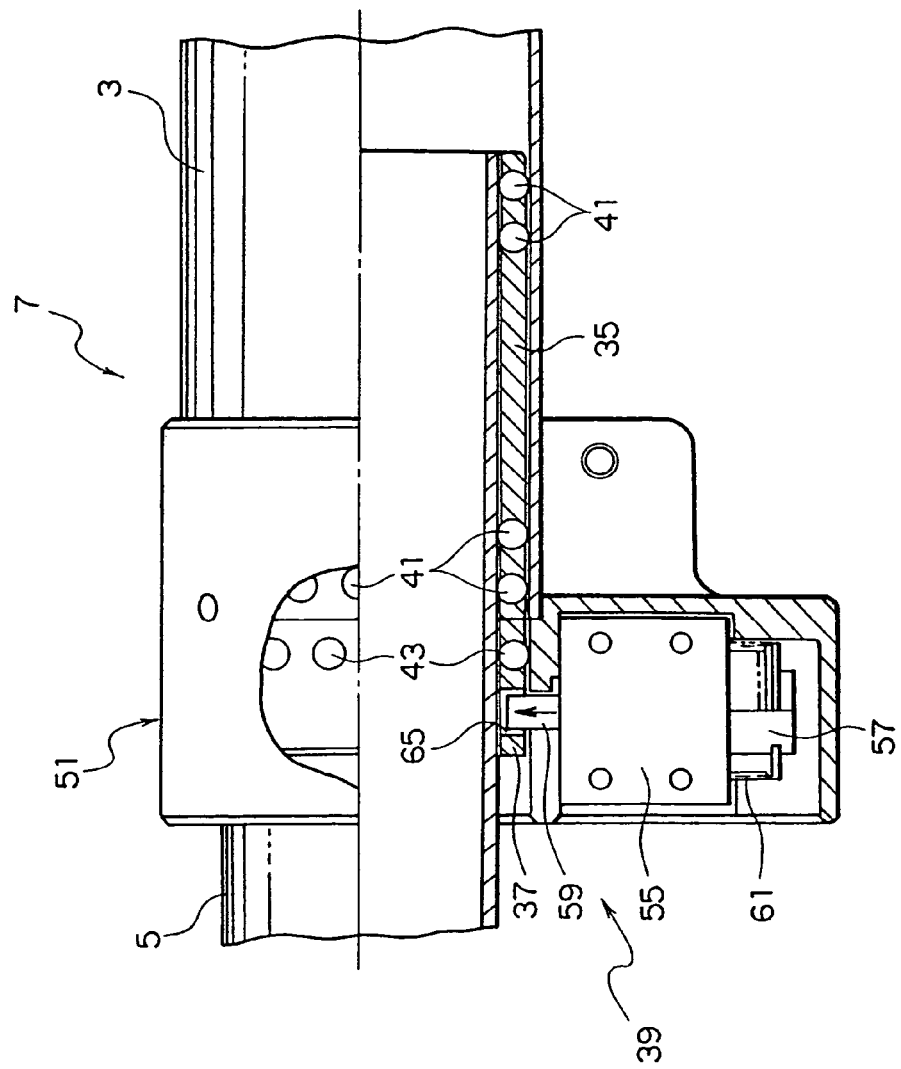
FIG. 84 is a principal side view showing an operation when a small collapse load occurs in the seventeenth embodiment.

Further, if the driver is a small-sized women having a comparatively light weight, the kinetic energy of the driver at the collision is comparatively small, so that the target collapse load calculated by the ECU 53 decreases. Then, the ECU 53 outputs the drive current to the solenoid 55, thereby moving the plunger 57 upward in FIG. 84 resisting the biasing force of the compression coil spring 61. The engagement protrusion 59 is thereby fitted into the through-hole 63 of the second metal ball retaining cylinder 37.

Figure 85:
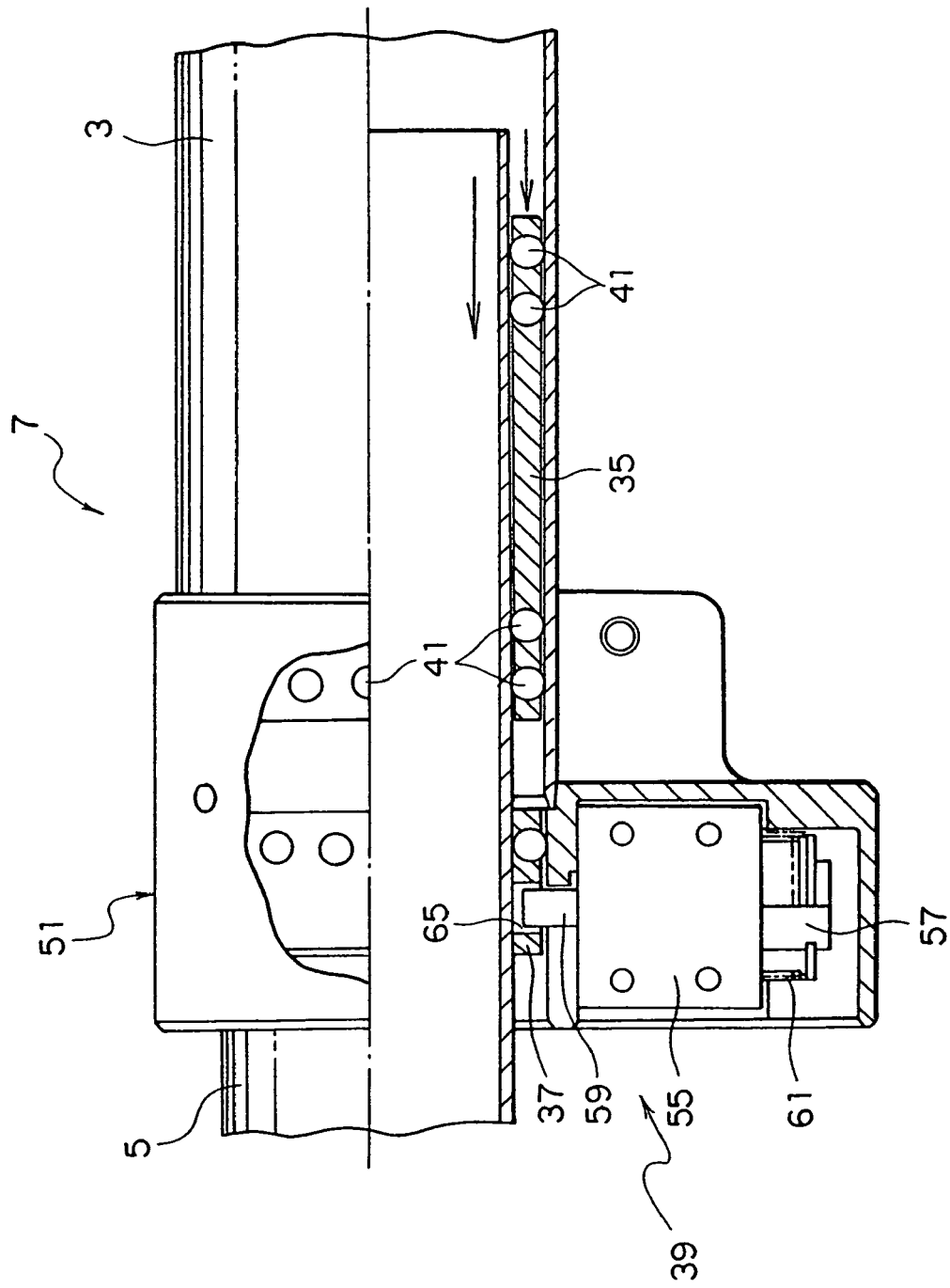
FIG. 85 is a principal side view showing an operation when the large collapse load occurs in the seventeenth embodiment.

In this state, if the automobile collides with other automobile or the obstacle on the road, as in the process described above, after the outer column 3 has come off, the collapsible column 1 starts collapsing. On this occasion, the second metal ball retaining cylinder 37 is engaged with the engagement protrusion 59 of the plunger 57, and hence, as shown in FIG. 85, the inner column is unable to enter the outer column together with the first metal ball retaining cylinder 35 (the two metal ball retaining cylinders 35, 37 become separate from each other overcoming an engaging force of the engagement pawl etc). Then, there is formed only the plastic groove by the steel ball 41 in the first metal ball retaining cylinder 35, and the absorption quantity of the impact energy becomes comparatively small. As a result, even when the driver is the small-sized women, the collapsible column 1 smoothly gets collapsible, thereby eliminating a possibility that a large impact is applied upon the breast and the head of the driver. A broken line in FIG. 83 indicates a result of test on that occasion (in the case of the small collapse load), wherein it can be understood that the small collapse load becomes significantly small with respect to the large collapse load.

On the other hand, when collided, if a current path to the ECU 53 and a current path to the solenoid 55 from the ECU 53 are cut off, the solenoid 55 can not be electrified in the seventeenth embodiment. Therefore, even at the time of the small collapse load, the engagement protrusion 59 is not fitted into the through-hole 63 of the second metal ball retaining cylinder 37. If the driver is the small-sized women having a comparatively light weight, there might be a case where the collapsible column 1 gets smoothly collapsed with a difficulty. A using condition is, however, that a using frequency is by far higher with the large collapse load than with the small collapse load. Therefore, a consumption of the electric power can be remarkably reduced, and in addition a safety probability increases.

Figure 86:
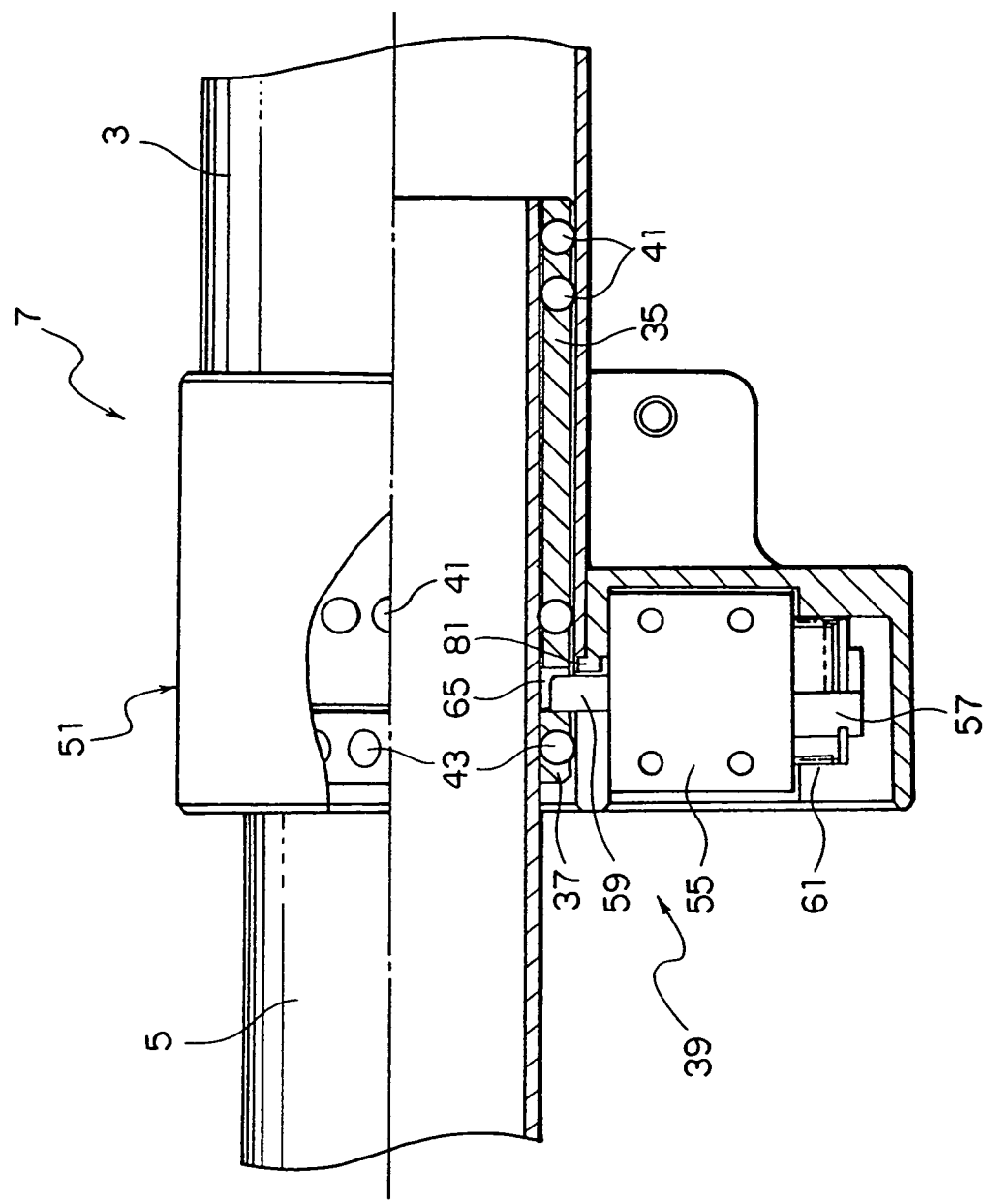
FIG. 86 is a side view showing the principal components of the steering apparatus in an eighteenth embodiment of the present invention.

FIG. 86 is a side view showing the principal components of the steering apparatus in an eighteenth embodiment of the present invention. The eighteenth embodiment takes substantially the same configuration as that of the seventeenth embodiment discussed above, however, the retaining cylinder engaging device 39 has a different structure. Namely, according to the eighteenth embodiment, the positioning protrusion 81 is disposed in substantially the same position as the engagement protrusion 59 of the plunger 57 is disposed, and this engagement protrusion is brought into contact with a rear side end surface of the second metal ball retaining cylinder 37. With this configuration, working of the second metal ball retaining cylinder 37 is facilitated, and at the same time an axial dimension of the cylinder 37 can be made by far smaller than in the seventeenth embodiment. Note that an operation of the eighteenth embodiment is absolutely the same as the seventeenth embodiment.

Figure 87:
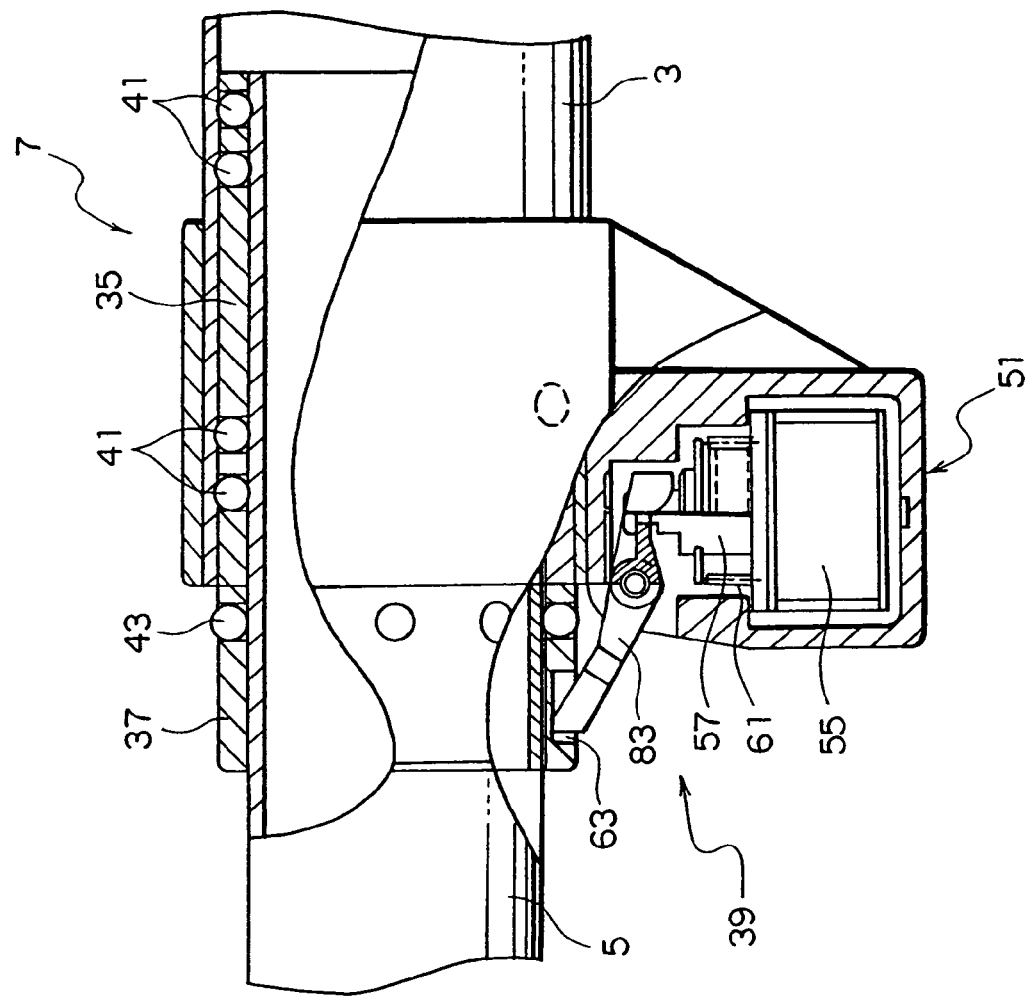
FIG. 87 is a side view showing the principal components of the steering apparatus in a nineteenth embodiment of the present invention.

FIG. 87 is a side view showing the principal components of the steering apparatus in a nineteenth embodiment of the present invention. According to the nineteenth embodiment, the retaining cylinder engaging device 39 involves the use of a pull type solenoid 55, and an engagement lever 83 is connected to a front side end of the plunger 57. Then, in a state where the solenoid 55 is not charged with the electricity, as shown in FIG. 87, the plunger 57 is moved upward in FIG. 87 by the biasing force of the compression coil spring 61, and a front side end of the engagement lever 83 engages with the through-hole 63 of the second metal ball retaining cylinder 37. Note that an operation of the nineteenth embodiment is substantially the same as the seventeenth embodiment.

Figure 88:
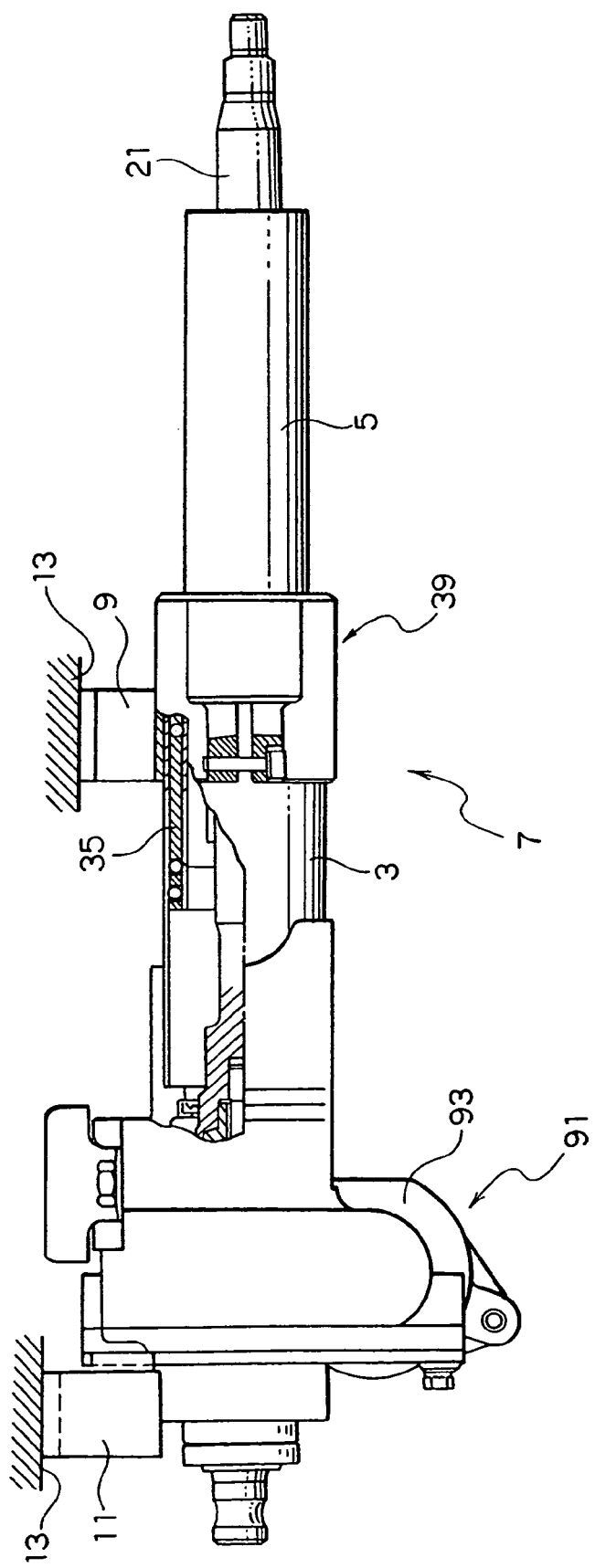
FIG. 88 is a side view showing the principal components of the steering apparatus in a twentieth embodiment of the present invention.

FIG. 88 is a side view showing a twentieth embodiment in which the present invention is applied to an electric power steering apparatus. The twentieth embodiment takes substantially the same configuration as the seventeenth embodiment except that the outer column 3 is fixed to the car body sided member 13 through the upper column bracket 9 and the lower column bracket 11. The numeral 91 in FIG. 88 represents a steering actuator constructed of an electric motor 93, an unillustrated gear etc.

According to the seventeenth through nineteenth embodiments, the first and second metal ball retaining cylinders are separated from each other by engaging the second metal ball retaining cylinder with the outer column with the aid of the electromagnetic actuator, whereby the collapse load is changed to 1:2. This may be, however, attained by use of what the electric motor is combined with a screw mechanism etc, or a variation quantity of the collapse load can be set as intended by properly setting a layout of the steel ball retaining holes formed in the two metal ball retaining cylinders or can be changed at three or more stages. Other than the above, the specific figurations of the steering column apparatus and of the absorbed energy variable mechanism and the specific shapes of the metal ball retaining cylinders, may properly be modified within the range of the present invention without departing from the concept of the invention.

As discussed above, the impact absorbing type steering column apparatus in the seventeenth through nineteenth embodiments, includes the collapsible column rotatably supporting the steering shaft and getting collapsed with the predetermined collapse load. The collapsible column has the outer column, the inner column internally fitted in this outer column and entering the outer column when the collapsible column gets the collapsed, and the plurality of metal balls interposed between the outer column and the inner column and forming the plastic grooves in at least one of the outer column and the inner column in order to absorb the impact energy upon the collapse of the collapsible column. The thus constructed impact absorbing type steering column apparatus further includes the plurality of metal ball retainers, connected to the car body sided member, for retaining the metal balls with the phases different from each other, and the retainer separation mechanism for separating at least one of the metal ball retainers from the car body sided member in order to reduce the number of the plastic grooves formed by the metal balls when the collapsible column gets collapsed. Therefore, for example, if the driver is heavy in weight, the collapse load is increased by setting larger the number of the plastic grooves formed by the metal balls. By contrast, if the driver is light in weight, the collapse load is decreased by setting smaller the number of the plastic grooves. The collapsible column can thereby get collapsed properly.

A twenty first embodiment of the present invention will hereinafter be discussed referring to the accompanying drawings.

Figure 89:
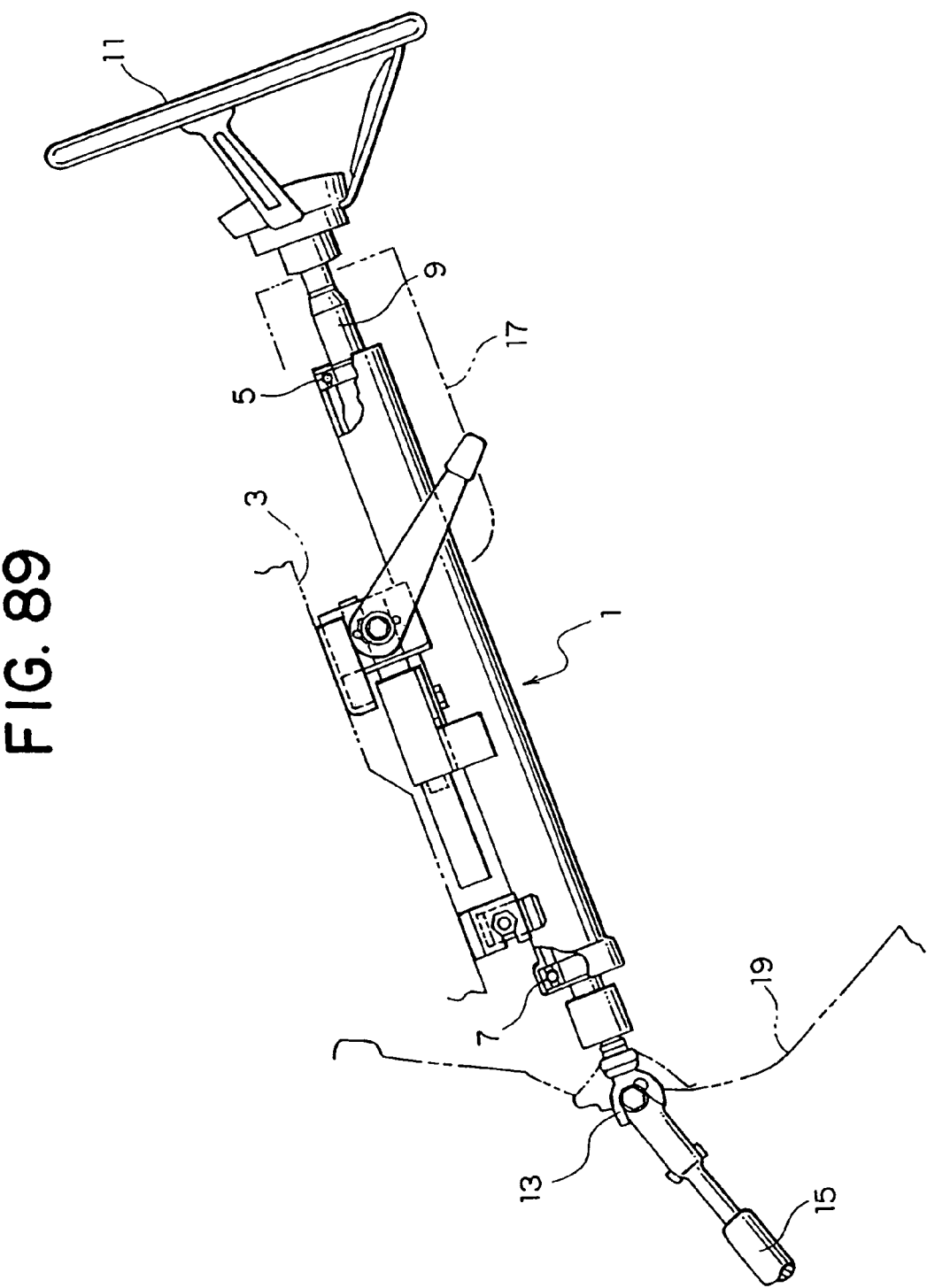
FIG. 89 is a side view showing the steering apparatus on the side of the car cabin in a twenty first embodiment of the present invention.

FIG. 89 is a side view showing the steering apparatus on the side of the car cabin, to which the present invention is applied, wherein the reference numeral 1 represents an impact absorbing type steering column apparatus. The impact absorbing type steering column apparatus 1 is secured to the car body sided member 3 at two portions disposed upward and downward, and the upper steering shaft (which will hereinafter simply called a steering shaft) 9 is rotatably supported by bearings 5, 7. A steering wheel 11 is fitted to an upper side end of the steering shaft 9 and a lower steering shaft 15 is connected to a lower side end thereof via a universal joint 13. Referring again to FIG. 89, the numeral 17 denotes a column cover for covering an upper portion of the steering column 1, and the numeral 19 represents a dashboard for partitioning the car cabin from the engine room.

According to the present steering apparatus, when the driver rotates the steering wheel 23, the rotation thereof is transferred to an unillustrated steering gear via the steering shaft 9 and the lower steering shaft 15. The steering gear has a built-in rack-and-pinion mechanism for translating the inputted rotation into a rectilinear motion, and a steering angle of the wheel is changed via a tie rod etc, thus performing the steering. Note that the steering gear may take a variety of known types such as a ball screw type, a worm roller etc in addition to the rack and pinion type.

Figure 90:
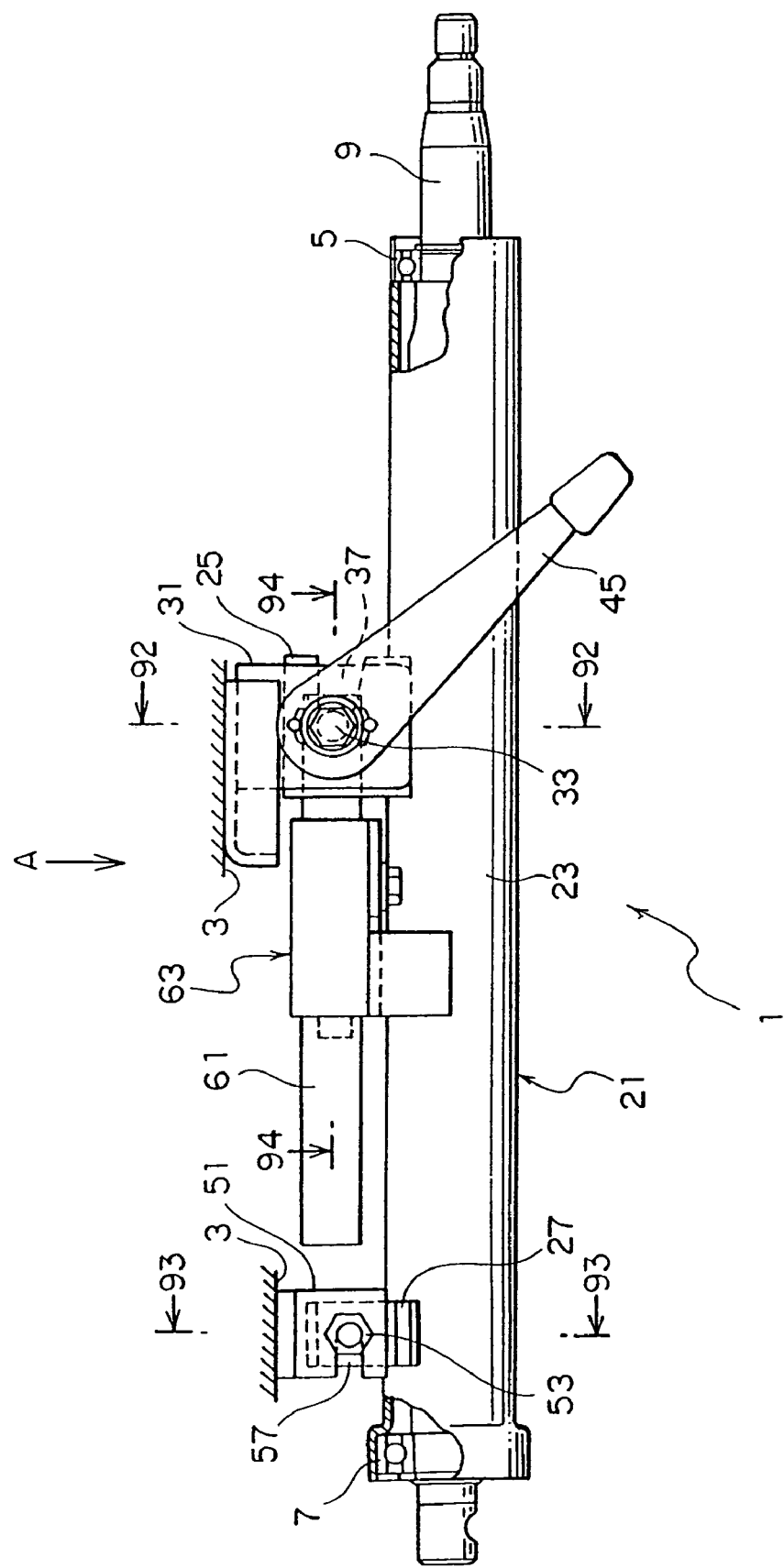
FIG. 90 is a side view showing an impact absorbing type steering column apparatus in the twenty first embodiment.
Figure 91:
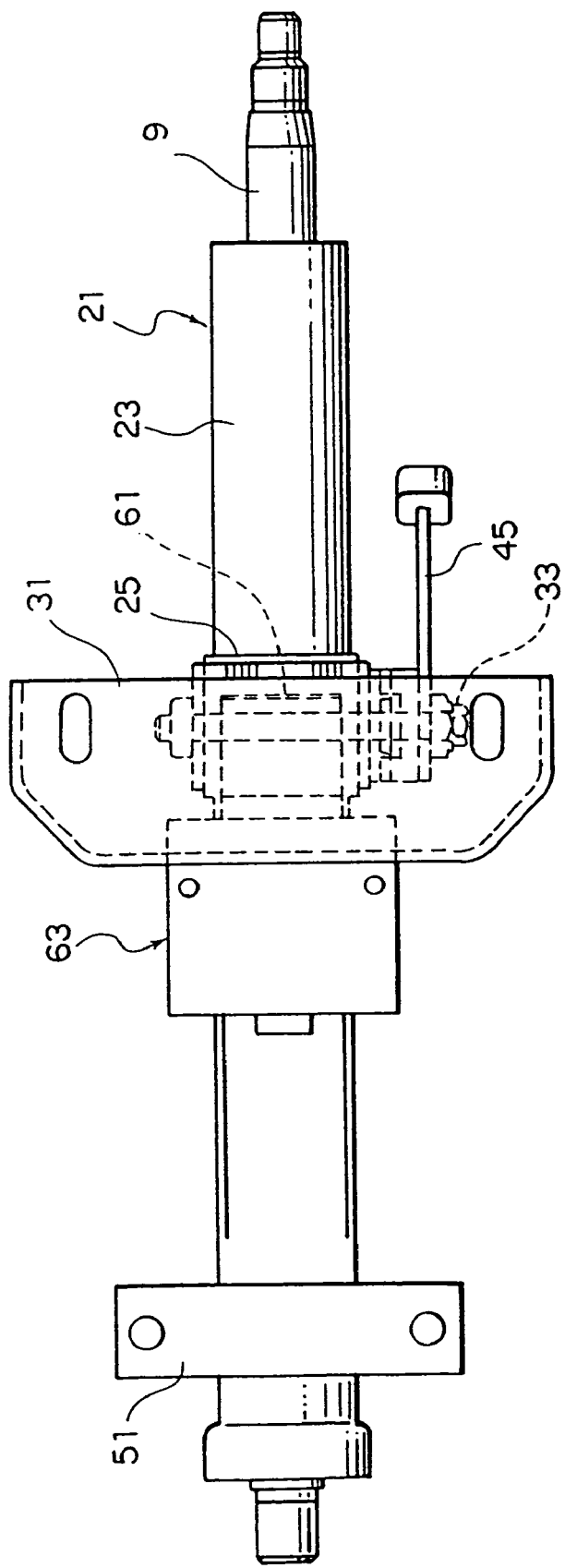
FIG. 91 is a plan view (taken along the arrow line A in FIG. 90) showing the impact absorbing type steering column apparatus.
Figure 92:
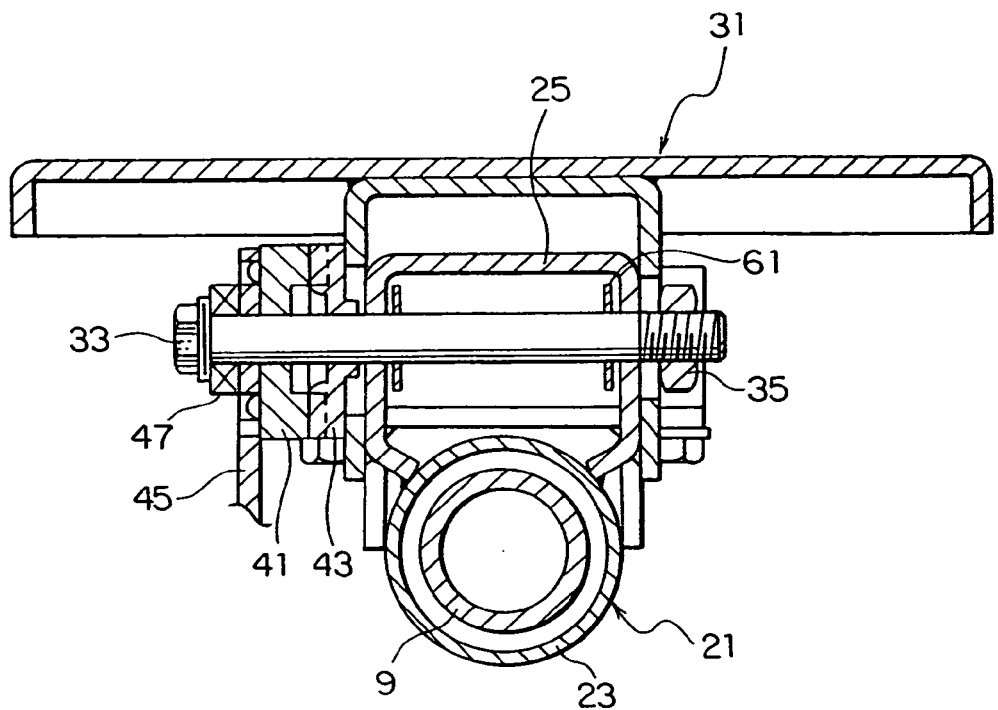
FIG. 92 is an enlarged sectional view taken along the line 92—92 in FIG. 90.
Figure 93:
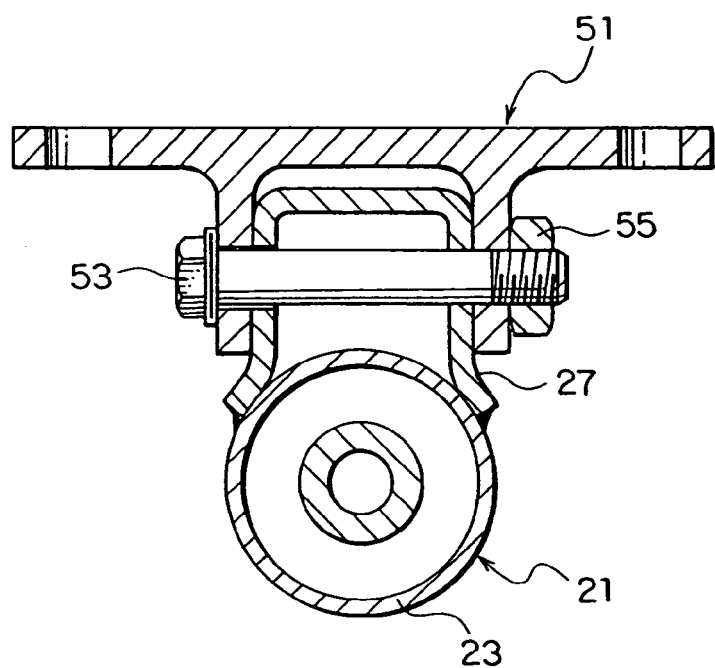
FIG. 93 is an enlarged sectional view taken along the line 93—93 in FIG. 90.
Figure 94:
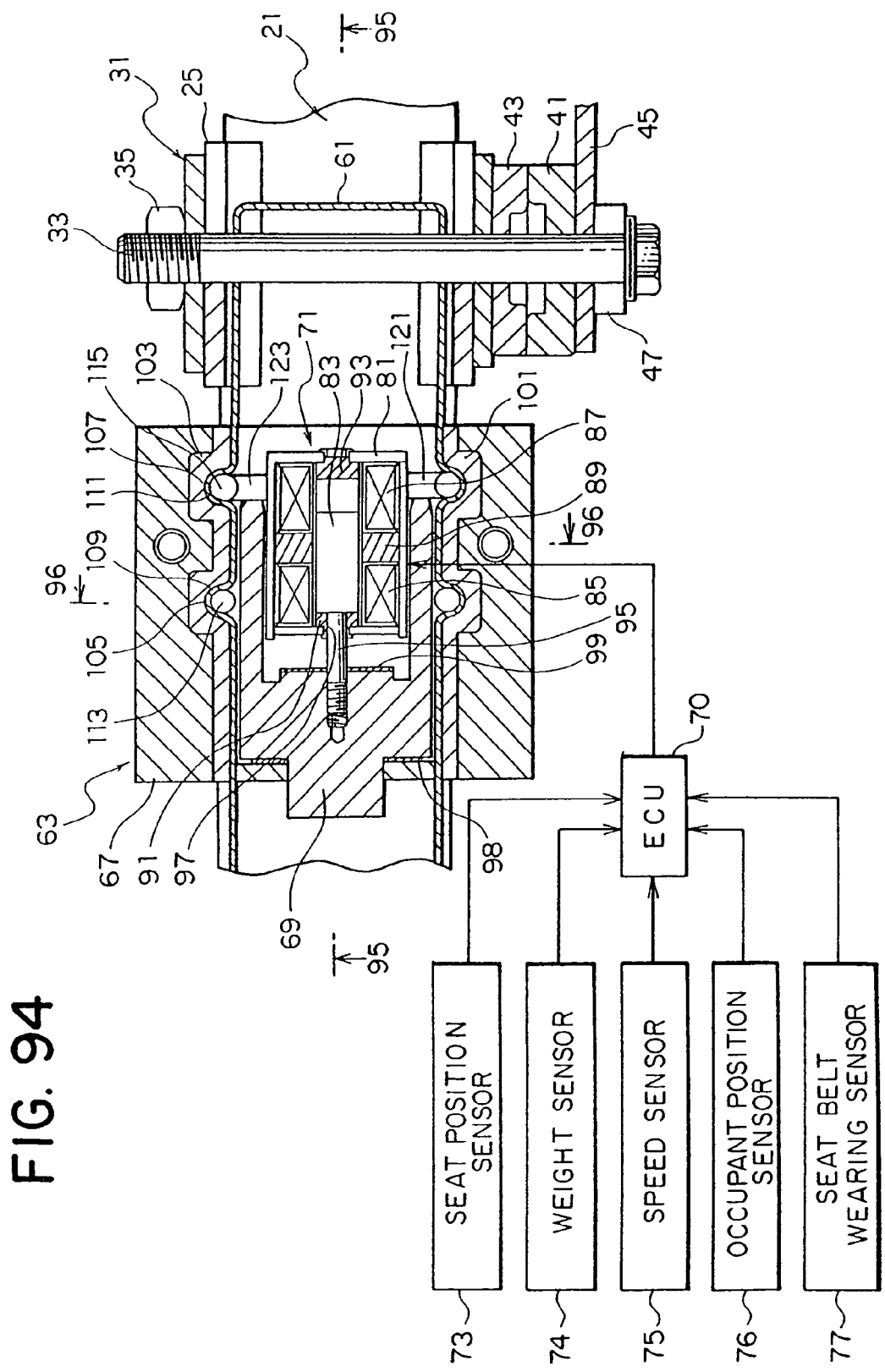
FIG. 94 is an enlarged sectional view taken along the line 94—94 in FIG. 90.

FIG. 90 is a side view showing the impact absorbing type steering column apparatus in the twenty first embodiment. FIG. 91 is a plan view (taken along the arrow line A in FIG. 90) showing the same apparatus. FIG. 92 is an enlarged sectional view taken along the line 92—92 in FIG. 90. FIG. 93 is an enlarged sectional view taken along the line 93—93 in FIG. 90. FIG. 94 is an enlarged sectional view taken along the line 94—94 in FIG. 90. As shown in these drawings, a steering column 21 is manufactured by welding an upper distance bracket (which will hereinafter simply called an upper bracket) 25 composed of a steel plate to substantially the central portion of a steel column tube 23 and further welding a lower distance bracket (which will hereinafter simply called a lower bracket) 27 composed of a steel plate to a front portion (the left side in FIGS. 90 and 91) of the tube 23.

The upper bracket 25 is held by a tilt bracket 31 as a steel plate welding structural member fixed to the car body sided member 3. The upper bracket 25 is forced to be fixed by a predetermined fastening force given by a tilt bolt 33 penetrating the tilt bracket 31 and a nut 35. The upper bracket 25 is formed with a substantially U-shaped notch 37 opening backward. The tilt bolt 33 is inserted into a front side end of this notch 37. Referring to FIGS. 92 and 93, members indicated by the numerals 41, 43 are known tilt cams used for fixing the steering column 21 at a predetermined angle. Further, a member designated by the numeral 45 is a tilt lever for rotationally driving the tilt cam 41. A member indicated by the numeral 47 is a thrust bearing interposed between a head of the tilt bolt 33 and the tilt lever 45.

On the other hand, the lower bracket 27 is held by a pivot bracket 51 as a casting fixed to the car body sided member 3. The lower bracket 27 is fixed by a pivot bolt 53 penetrating a pivot bracket 51 and a nut 55. The pivot bracket 51 is formed with a substantially U-shaped notch 57 opening forward. The pivot bolt 53 is inserted into a rear side end of this notch 57. Note that the steering column 21 is swayable about the pivot bolt 53, and the driver is able to adjust upper and lower positions of the steering wheel 11 within a predetermined range by manipulating the tilt lever 45.

In the twenty first embodiment, the collision energy absorbing mechanism is constructed of an energy absorbing plate 61 held by the tilt bolt 33 and a variable drawing device 63 fixed to the steering column 21. The energy absorbing plate 61 is a substantially U-shaped steel plate opening forward, and the tilt bolt 33 penetrates a portion vicinal to the rear side end of the plate 61.

Figure 95:
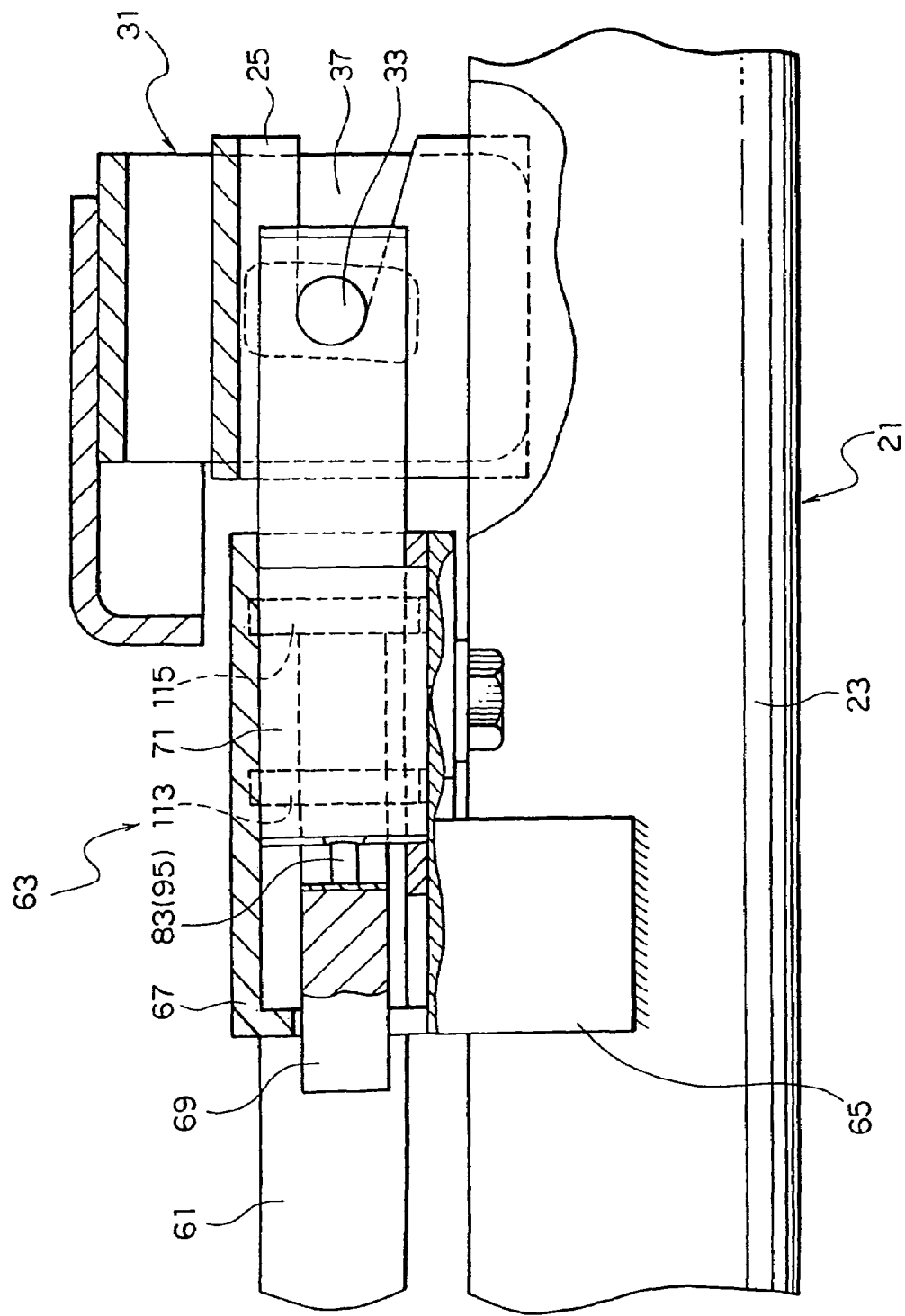
FIG. 95 is an enlarged sectional view taken along the line 95—95 in FIG. 94.
Figure 96:
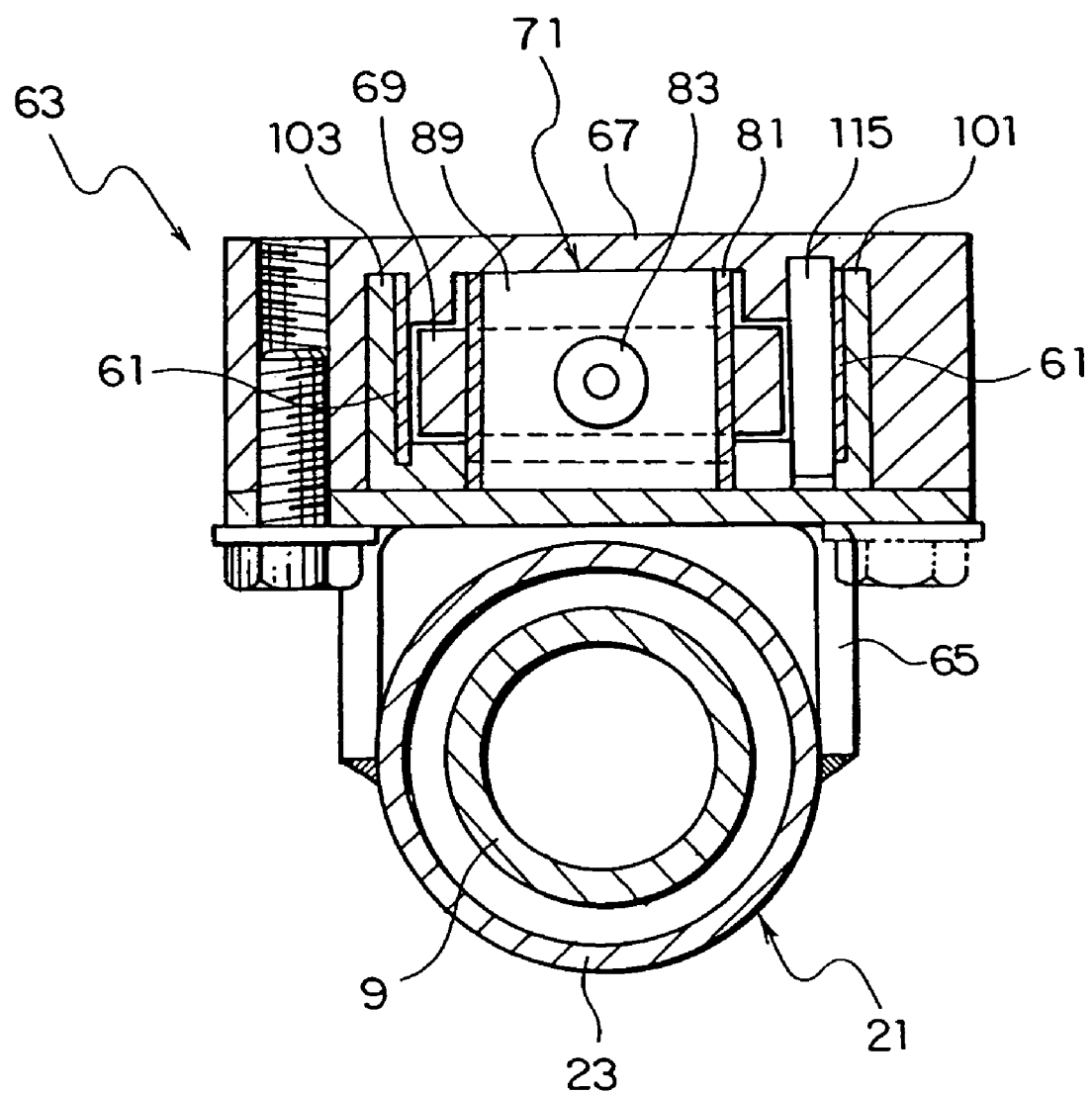
FIG. 96 is an enlarged sectional view taken along the line 96—96 in FIG. 94.

On the other hand, the variable drawing device 63 is, as shown in FIGS. 94, 95 (a sectional view taken along the line 95—95 in FIG. 94) and 96 (a sectional view taken along the line 96—96 in FIG. 94), constructed of a base plate 65 as a steel plate press molding welded to a column tube 23, a housing 67 fastened with a bolt to the base plate 65, a slide block 69 slidably held within the housing 67, and an electromagnetic actuator (which will hereinafter be termed a solenoid) 71 retained in the housing 67 and driven under control of an ECU (Electronic Control Unit) 70. Note that in addition to a seat position sensor 73, at least one of a weight sensor 74, a car speed sensor 75, an occupant position sensor 76, a seatbelt attaching sensor 77, is connected to the ECU 70.

The solenoid 71 is constructed of a yoke 81 as a steel plate press molding, a plunger (movable iron core) 83 so held as to be slidable back and forth within the yoke 81, first and second coils 85, 87 disposed in front and in rear so as to surround the plunger 83, a permanent magnet 89 interposed between the two coils 85 and 87, and first and second fixed iron cores 91, 93 fastened and fixed to front and rear inner side end surfaces of the yoke 81. A rod member 95 provided at a front side end of the plunger 83 is screw-connected to the slide block 69, whereby the plunger 83 moves back and forth integrally with the slide block 69. Note that the first fixed iron core 91 is formed with a through-hole 97 into which the rod member 95 is inserted. Members indicated by the numerals 98, 99 in FIG. 94 are buffer members pasted to the slide block 69. The buffer members 98, 99 function to restrain a sound of impingement of the slide block 69 upon the housing 67 and the solenoid 71.

A pair of guide plates 101, 103 provided right and left are held adjacent to both of the side surfaces of the slide block 69. The energy absorbing plates 61 are inserted and fitted in between the slide block 69 and these guide plates 101, 103. The two guide plates 101, 103 respectively have U-shaped recessed portions 105, 107 formed inwards at substantially the central portion and the rear portion. The energy absorbing plates 61 are formed with front and rear U-shaped bent portions 109, 111 fitted in the U-shaped recessed portions 105, 107.

In the energy absorbing plates 61, fixed drawing pins 113 are fitted in the front U-shaped bent portions 109, and movable drawing pins 115 are fitted in the rear U-shaped bent portions 111. The housing 67 is formed with a pair of left and right elongate holes 121, 123 for retaining the movable drawing pins 115. The movable drawing pins 115 are movable by a predetermined quantity within those elongate holes 121, 123.

An operation of the twenty first embodiment will hereinafter be explained.

Figure 97:
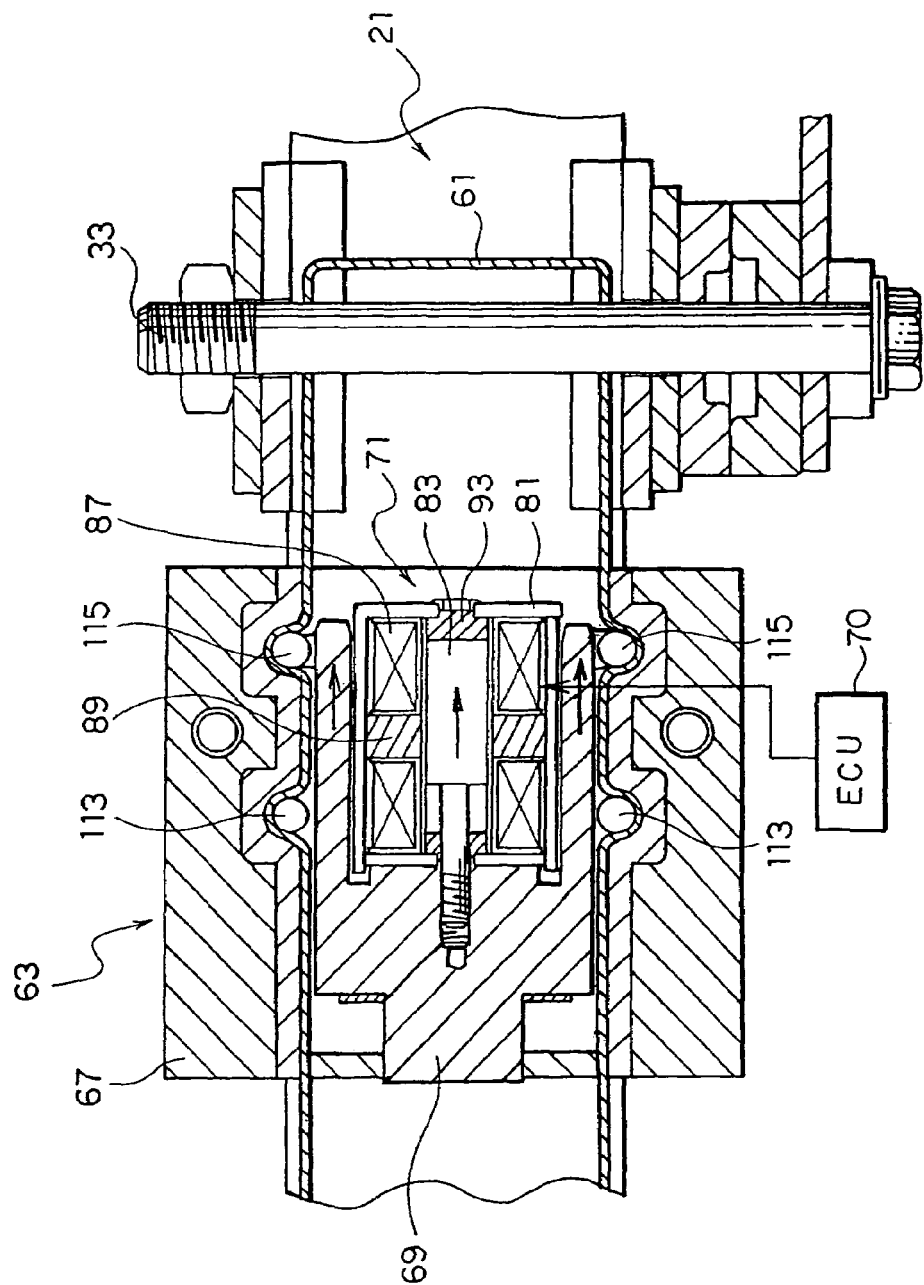
FIG. 97 is an explanatory view showing an operation of the twenty first embodiment.
Figure 98:
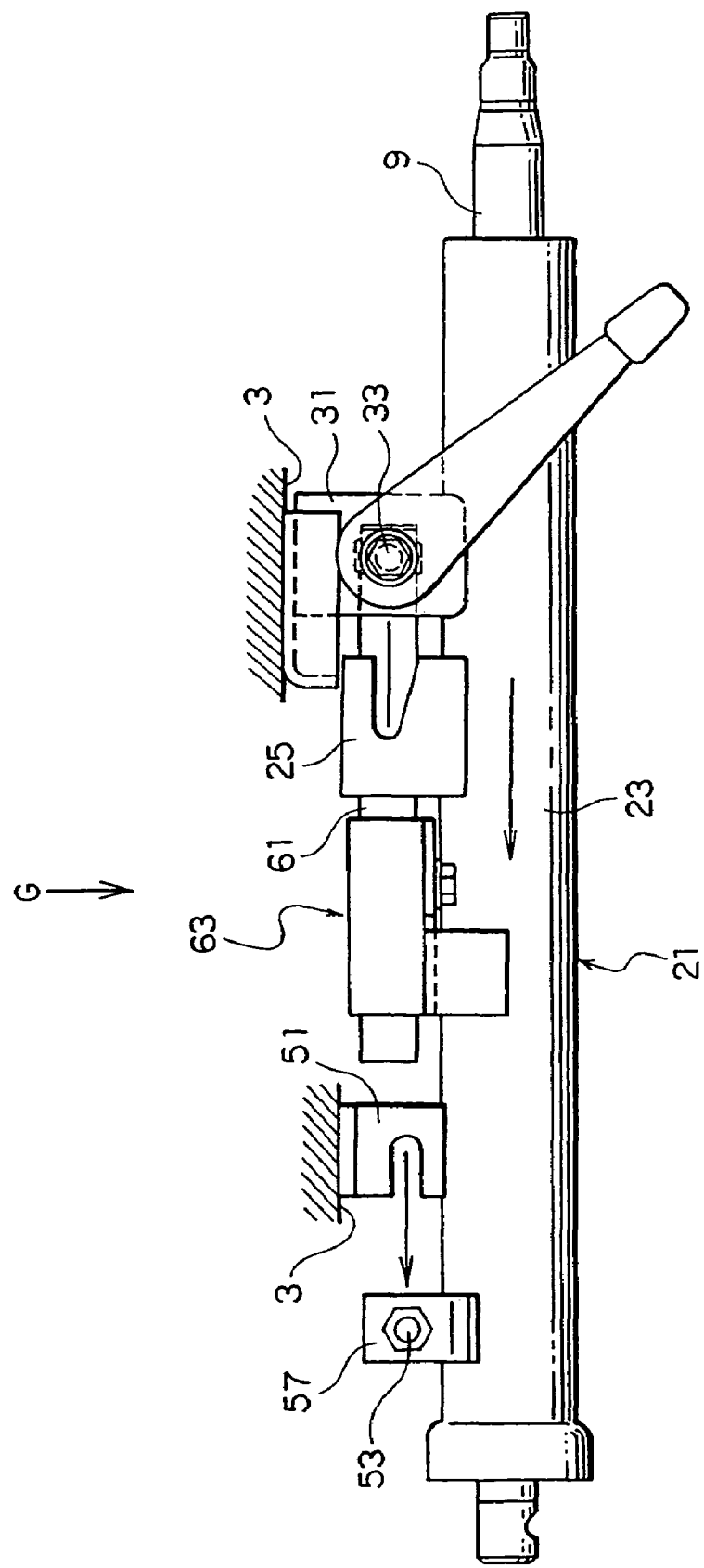
FIG. 98 is a side view showing a state of how the steering column comes off.
Figure 99:
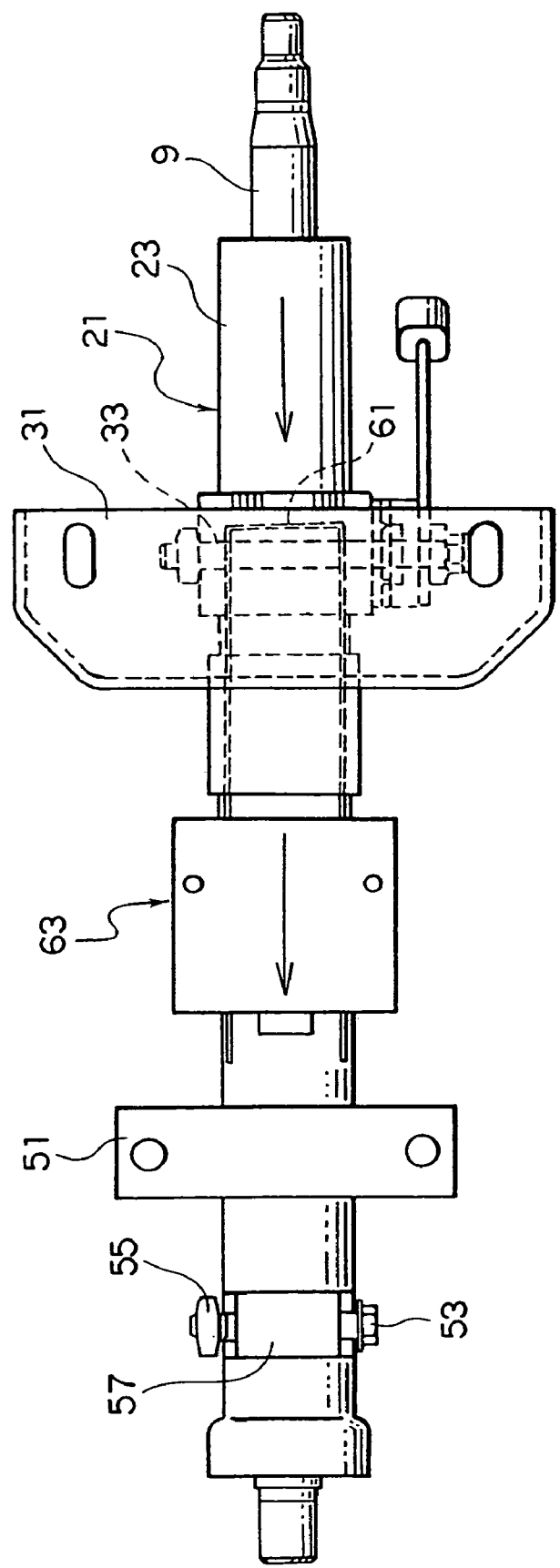
FIG. 99 is a view taken along the arrow line G in FIG. 98.

When the automobile starts traveling, the ECU 70, based on detection signals of the variety of sensors 73~77 described above, repeatedly calculates a target operation load of the collision energy absorbing mechanism at a predetermined control interval. For instance, if a weight of the driver is comparatively heavy, or if a car speed is high even though the driver's weight is comparatively light, a kinetic energy of the driver at a collision increases, and therefore the target operation load increases. Then, the ECU 70 outputs an exciting current to a second coil 87 of the solenoid 71, whereby the plunger 83 is, as shown in FIG. 97, attracted backward by a magnetic force.

As a result, the slide block 69 connected to the plunger 83 moves backward, and a side surface of the rear portion of the block 69 is positioned inwardly of the movable drawing pin 115, thereby restricting a shift to the inside of the movable drawing pin 115. On this occasion, the plunger 83 comes into contact with a side end surface of the second fixed iron core 93, however, since the second fixed iron core 93 is connected to the permanent magnet 93 via the yoke 81, the plunger 83 is magnetically adsorbed to the second fixed iron core 93 with a predetermined adsorbing force. Note that vibrations during traveling of the car and the impact when collided are inevitably applied to the slide block 69, however, the adsorbing force by which the plunger 83 is adsorbed to the second fixed iron core 93 is sufficiently large, and therefore an unprepared shift of the slide block 69 does not occur.

Figure 100:
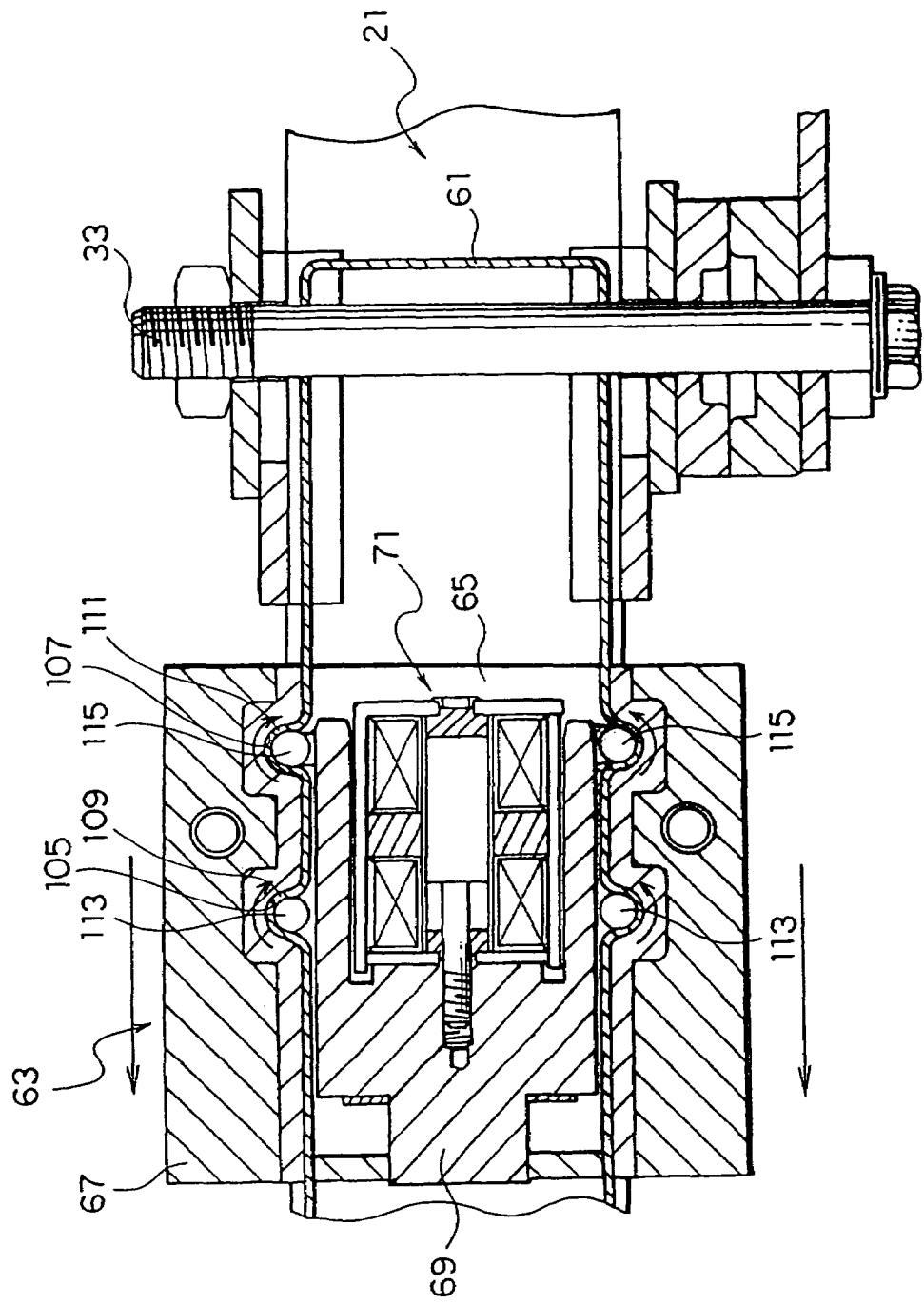
FIG. 100 is an explanatory view showing an operation of the twenty first embodiment.

In this state, if the automobile collides with other automobile or an obstacle on the road, the driver suffers a secondary collision with the steering wheel 11 by its inertia. With its impact, the upper bracket 25 gets released forward from the tilt bracket 31, and the steering column 21 gets released forward from the pivot bracket 51, with the result that the steering column 21 comes off and starts advancing. Then, with the advancement of the steering column 21, as shown in FIG. 100, the variable drawing device 63 on the side of the steering column 21 advances with respect to the energy absorbing plate 61 held by the tilt bolt 33 on the side of the car body sided member 3.

Figure 101:
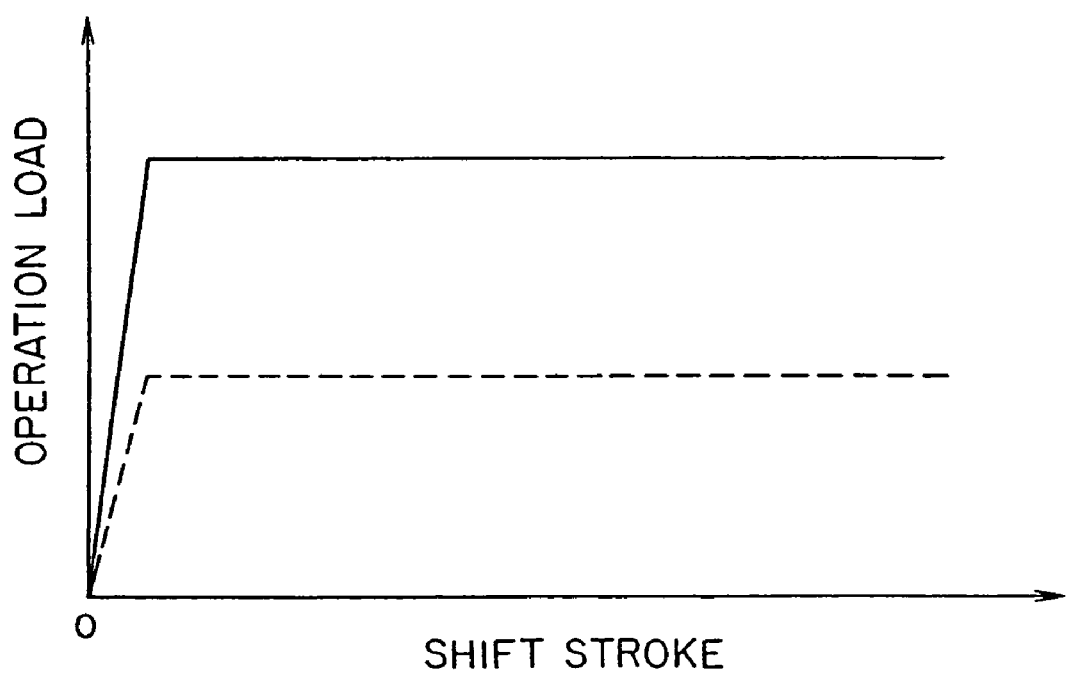
FIG. 101 is a graph showing a relationship between an operation load and a shift quantity of the steering column.

Then, in the energy absorbing plate 61, it follows that there advance the front U-shaped bent portion 109 fitted in between the U-shaped recessed portion 105 and the fixed drawing pin 113 and the rear U-shaped bent portion 107 fitted in between the U-shaped recessed portion 107 and the movable drawing pin 115. As a result, the energy absorbing plate 61 is drawn by the two drawing pins 113, 115 at four right and left portions in a way of its being turned round in sequence, thereby absorbing a comparatively large collision energy. FIG. 101 is a graph showing a relationship between an operation load and a shift stroke of the steering column 21, wherein the solid line indicates a result of test on that occasion (in the case of the large operation load).

Figure 102:
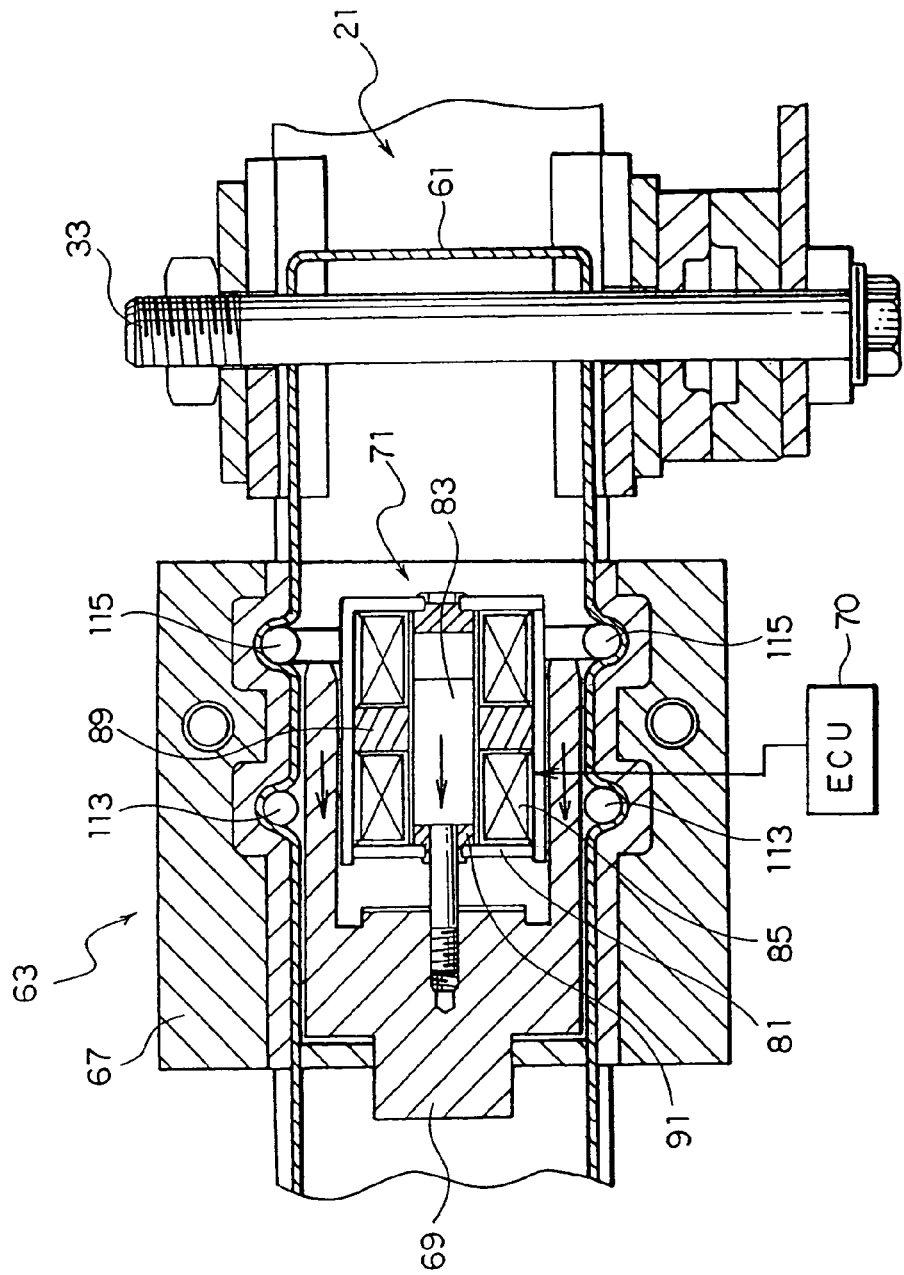
FIG. 102 is an explanatory view showing an operation of the twenty first embodiment.

While on the other hand, if the driver is a small-sized women having a comparatively light weight, the kinetic energy of the driver at the collision is comparatively small, so that the target operation load calculated by the ECU 70 decreases. Then, the ECU 70 outputs the exciting current to the first coil 85 of the solenoid 71 for a predetermined period of time, and, as shown in FIG. 102, the plunger 83 is attracted forward by the magnetic force.

The slide block 69 connected to the plunger 83 is thereby shifted forward, and the side surface of the rear portion thereof moves off from the inside of the movable drawing pin 115, whereby the movable drawing pin 115 becomes movable within the elongate holes 121, 123. On this occasion, the plunger 83 is brought into contact with the side end surface of the first fixed iron core 91, however, since the first fixed iron core 91 is also connected to the permanent magnet 89 through the yoke 81 as the second fixed iron core 93 is, the plunger 83 is magnetically adsorbed to the first fixed iron core 91 with a predetermined adsorbing force.

Figure 103:
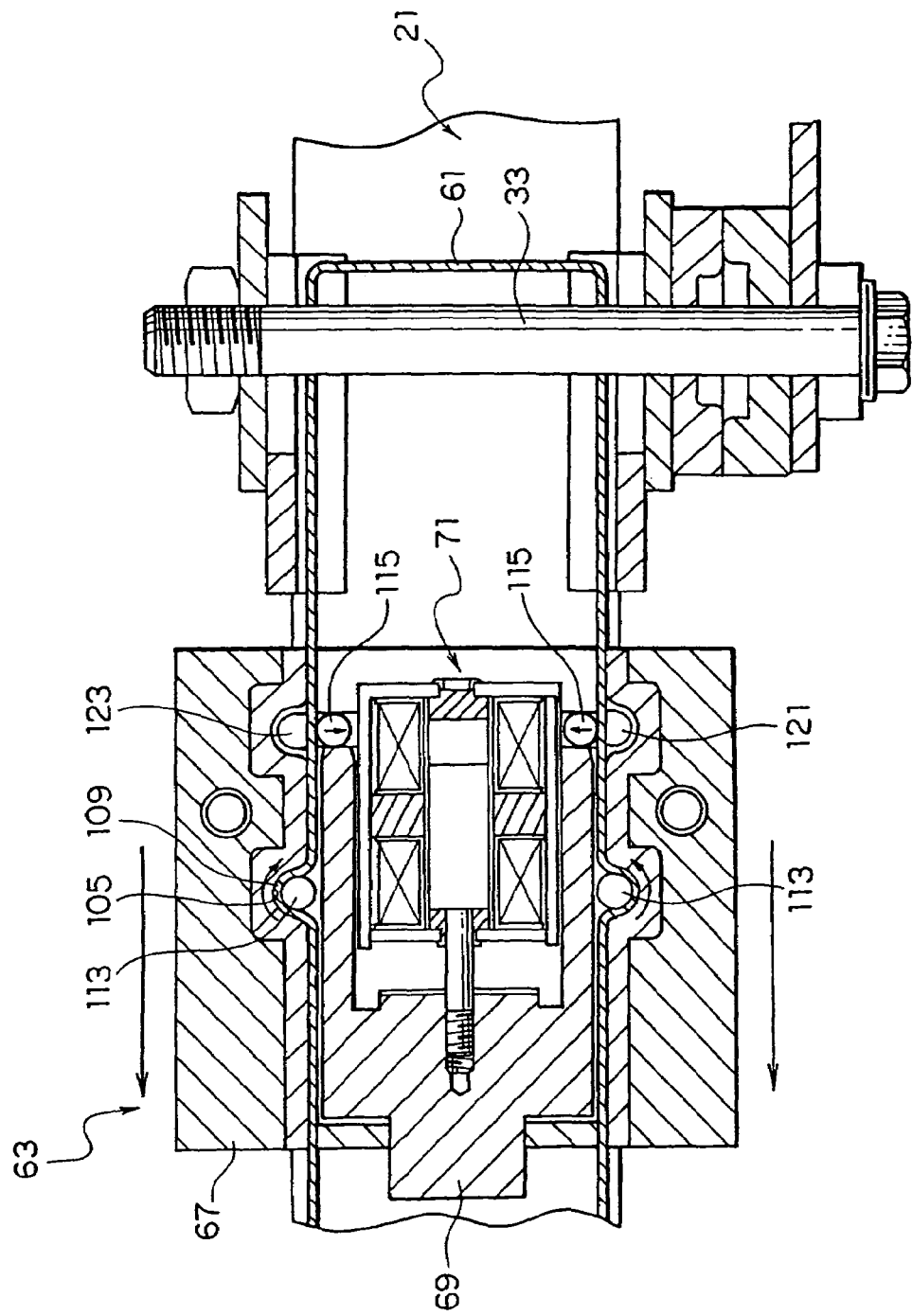
FIG. 103 is an explanatory view showing an operation of the twenty first embodiment.

In this state, if the automobile collides with other automobile or the obstacle on the road, in the same process as in the case described above, the steering column 21 comes off and advances, and the variable drawing device 63 moves forward with respect to the energy absorbing plate 61. In this case, however, the movable drawing pin 115 is not restricted by the slide block 69, and hence, as shown in FIG. 103, the rear U-shaped bent portion 111 of the energy absorbing plate 61, when advancing and getting released from the U-shaped recessed portion 107, presses inwards and moves the movable drawing pin 115 away afterward.

As a result, the energy absorbing plates 61 are drawn only by the fixed drawing pins 113 at the two right and left portions, thereby decreasing a quantity of absorbing the collision energy. At the same time, even though the driver is the small-sized women etc, the steering column 21 smoothly advances, and it never happens that the a large impact is applied upon the breast and the head of the driver. Referring to FIG. 101, the broken line indicates a result of test on this occasion (in the case of the small operation load), and it can be understood that the small operation load significantly decreases with respect to the large operation load.

According to the twenty first embodiment, the energy absorbing member involves the use of the steel plate, and the drawing member involves the use of the pin. A steel wire may be used as the energy absorbing member, and a steel ball etc may also be used as the drawing member. Further, the twenty first embodiment takes the configuration in which the first and second fixed iron cores are connected to the single permanent magnet through the yoke, and may also involve the use of two pieces of permanent magnets for retaining the plungers in front and rear positions. Furthermore, in contrast with the configuration of the twenty first embodiment, the energy absorbing plate is fixed to the steering column, while the variable drawing device may be fixed to the car body. Other than the above, the specific configurations of the steering column apparatus and of the energy absorption quantity adjusting mechanism and the material and shape of the drawing member, may properly be modified within the range of the present invention without departing from the concept of the invention.

As discussed above, the impact absorbing type steering column apparatus in the twenty first embodiment of the present invention, includes the collision energy absorbing mechanism for absorbing the energy of the secondary collision of the occupant upon the collision of the car, and the energy absorption quantity adjusting mechanism for changing the absorption quantity with which the collision energy absorbing mechanism absorbs the secondary collision energy. The electromagnetic actuator is used as the driving source of the energy absorption quantity adjusting mechanism, and the plunger of the electromagnetic actuator is adsorptively held in the predetermined position by the permanent magnet. It is therefore feasible to prevent the coil from becoming exothermic and actualize a reduction in consumption of the electric power owing to the electromagnetic actuator's being electrified only when driving the plunger. In addition, it is also possible to avoid the unprepared shift of the plunger due to the vibrations during the traveling of the car and to the impact when collided, and to simplify the structure with the return spring and the failsafe mechanism unnecessary, and further to reduce the costs thereof.

The discussions on the specific embodiments have been finished so far. The mode of the present invention is not, however, limited to the embodiments discussed above. For example, in each of the embodiments described above, the energy absorption quantity adjusting mechanism is driven under control of the ECU but may also be so driven as to be switched by the driver's manipulating a manual switch etc. In this case, a switching mechanism of a mechanical type as well as of an electrically-driven type, can be adopted. Alternatively, though the calculation has been switched at the predetermined interval so far, the switching of the calculation may be triggered by an input of a change signal for changing a load setting condition, e.g., by attaching or detaching the seatbelt, adjusting a seat position, changing a car speed, confirming a shift of the gearshift lever from the parking position, and so on. Other than the above, the specific configurations of the steering column apparatus and of the energy absorption quantity adjusting mechanism, may properly be modified within the range of the present invention without departing from the concept of the invention.

What is claimed is:

1. An impact absorbing type steering column apparatus provided with a collision energy absorbing device which absorbs energy of a secondary collision of an occupant upon a collision of a vehicle, said apparatus comprising:
    an energy absorption quantity adjusting device which changes a secondary collision energy absorption quantity of said collision energy absorbing device;
    at least one sensor which detects a condition of the occupant or the vehicle;
    an electric control device which controls a drive of said energy absorption quantity adjusting device based on a result of detection by said sensor;
    a steering column rotatably supporting said steering shaft; and
    a bracket fixed to a vehicle body, said bracket supporting said steering column and allowing said steering column to be released therefrom in response to an impact load equal to or larger than a predetermined value,
    wherein said collision energy absorbing device is provided between said steering column and said bracket, and causes fracture, or bending deformation and fracture, of an energy absorbing member composed of a metal plate with a shift of said steering column.

2. An impact absorbing type steering column apparatus according to claim 1, wherein an electric motor is a driving source of said energy absorption quantity adjusting device.

3. An impact absorbing type steering column apparatus according to claim 1,
    wherein said energy absorption quantity adjusting device changes an absorption quantity of the secondary collision energy by said energy absorbing device in at least three stages.

4. An impact absorbing steering column apparatus according to claim 1, wherein said sensor is any one of a seat position sensor, a weight sensor, a speed sensor, an occupant position sensor and a seat belt wearing sensor.

5. An impact absorbing type steering column apparatus according to claim 1, wherein an electromagnetic actuator is a driving source of said energy absorption quantity adjusting device.

6. An impact absorbing type steering column apparatus comprising:
    a steering column rotatably supporting said steering shaft;
    a bracket fixed to a vehicle body, said bracket supporting said steering column and allowing said steering column to be released therefrom in response to an impact load equal to or larger than a predetermined value; and
    a collision energy absorbing device provided between said steering column and said bracket, said collision energy absorbing device absorbing energy of a secondary collision of an occupant by causing fracture, or bending deformation and fracture, of an energy absorbing member composed of a metal plate with a shift of said steering column,
    wherein said steering column apparatus is provided with an energy absorption quantity adjusting device which changes an absorption quantity of the collision energy.

7. An impact absorbing type steering column apparatus according to claim 6, wherein an electric motor is a driving source of said energy absorption quantity adjusting device.

8. An impact absorbing type steering column apparatus according to claim 6,
    wherein said energy absorption quantity adjusting device changes an absorption quantity of the secondary collision energy by said energy absorbing device in at least three stages.

* * * * *